United States Patent [19]

Soderberg et al.

[11] 4,301,507

[45] Nov. 17, 1981

[54] ELECTRONIC POSTAGE METER HAVING PLURAL COMPUTING SYSTEMS

[75] Inventors: John H. Soderberg, Monroe, N.Y.; Alton B. Eckert, Norwalk; Robert B. McFiggans, Stamford, both of Conn.

[73] Assignee: Pitney Bowes Inc., Stamford, Conn.

[21] Appl. No.: 89,413

[22] Filed: Oct. 30, 1979

[51] Int. Cl.[3] ...................... G06F 15/02; G06F 15/20; G06F 15/16

[52] U.S. Cl. .................................... 364/464; 364/704; 364/900; 371/22; 371/34

[58] Field of Search ............... 364/200, 409, 464, 466, 364/704, 900; 371/22, 34, 38, 66

[56] References Cited

U.S. PATENT DOCUMENTS

| | | | |
|---|---|---|---|
| 2,934,009 | 4/1960 | Bach et al. | 101/235 |
| 3,893,078 | 7/1975 | Finet | 371/38 X |
| 3,910,322 | 10/1975 | Hardesty, Jr. et al. | 371/34 X |
| 3,978,457 | 8/1976 | Check, Jr. et al. | 364/200 |
| 4,050,374 | 9/1977 | Check, Jr. | 101/91 |
| 4,084,228 | 4/1978 | Dufond et al. | 364/200 |
| 4,097,923 | 6/1978 | Eckert, Jr. et al. | 364/900 |
| 4,100,601 | 7/1978 | Kaufman et al. | 364/200 |
| 4,137,564 | 1/1979 | Spencer | 364/200 |
| 4,180,856 | 12/1979 | Check, Jr. et al. | 364/466 |

*Primary Examiner*—Jerry Smith
*Attorney, Agent, or Firm*—David E. Pitchenik; William D. Soltow, Jr.; Albert W. Scribner

[57] ABSTRACT

An electronic postal meter has a control unit, an accounting unit and a printing unit, each incorporating a CPU having a separate crystal controlled clock. Communication between the units is serial character asynchronous, bit synchronous, in message form, with the bits of the messages being timed in accordance with a given schedule for synchronous control. The messages themselves, upon receipt by a receiver, are returned bit by bit to the transmitter, for checking, whereupon the transmitter sends a no-error pulse upon successful comparison of the transmitted message and the message received from the receiver. All control and data signals utilize the same pair of conductors in each direction with precisely defined timing for control.

31 Claims, 43 Drawing Figures

SUMMARY FLOW CHARTS OF THE CONTROL UNIT

MAINLINE PROCESSING:

INTERRUPT PROCESSING:

SUMMARY FLOW CHARTS FOR PRINTER UNIT

SUBROUTINE HDR:

SUBROUTINE SHDL:

SUBROUTINE SENSE:

SUBROUTINE SWITCH:

SUMMARY FLOW CHARTS FOR ACCOUNTING UNIT

POWER UP PROCESSING:

MAINLINE PROCESSING: FIG. 16B
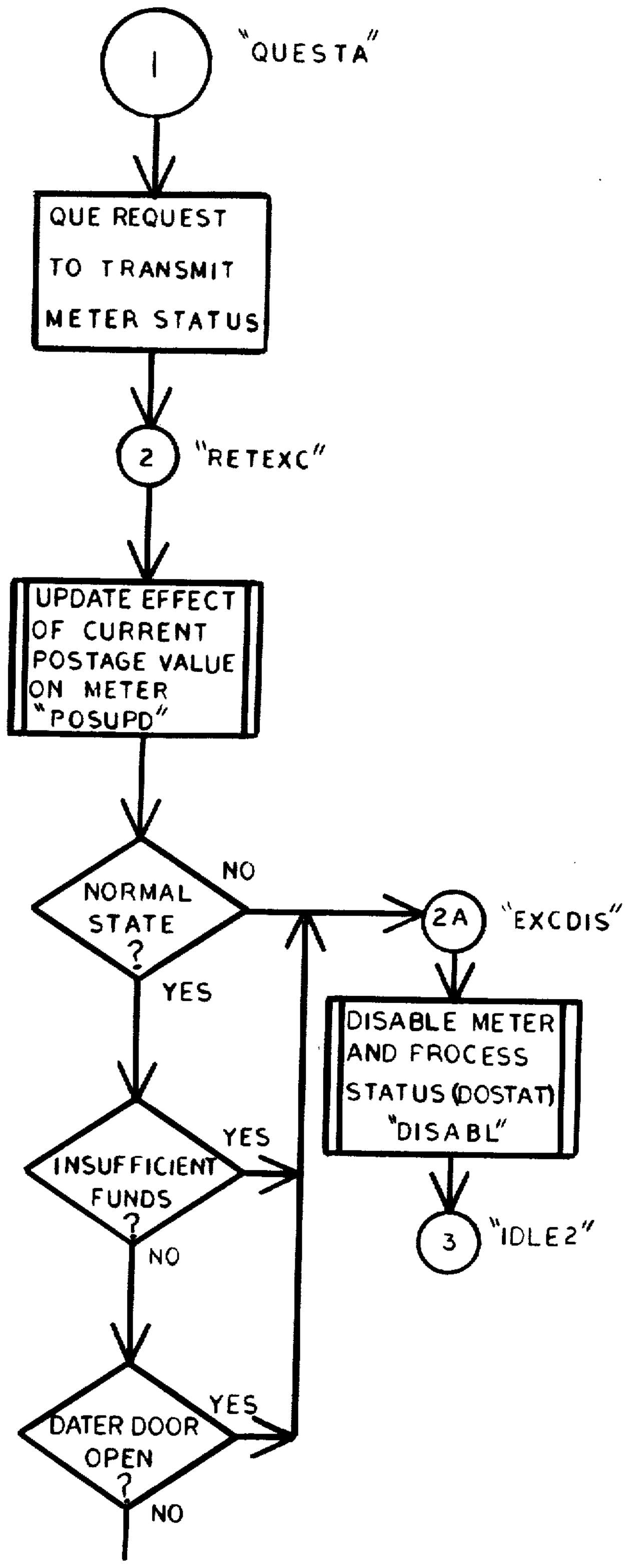

ELECTRONIC POSTAGE METER HAVING PLURAL COMPUTING SYSTEMS

This invention relates to electronic postage meters, and is more particularly directed to an electronic postage meter of the type having a keyboard for the entry of postage to be printed, a display for displaying postage to be printed as well as other data, an electronic accounting device, and a printing mechanism.

Devices of the above type are generally known, and are discussed, for example, in U.S. Pat. No. 3,978,457. This patent discloses a system for a postal meter including a keyboard for the manual introduction of data corresponding to the postage to be printed.

In prior devices of the general category including electronic postal meter operation, it has been found desirable to employ one or more microprocessors to control various meter functions and operations. For security reasons, all data relating to accounting may be maintained separately from other data relating to nonsecure information. By separate maintenance of secure data it is therefore possible to improve security while employing concepts of distributed processing by the use of multiple processors.

The use of multiple processing in a secure environment places stringent requirements on error rate in interprocessor communications, which requirements must be satisfied in order to have successful operation. It is further desired to provide a system of this type which can easily subrogate its control authority to an external unit, thereby allowing substantially one hundred percent control of meter function to be transferred to an external device, without any change in system hardware. In addition, the use of electronics in postal meters allows the capability of greater sophistication in automatic recharging the accounting registers without the need for operating personnel. It is a desirable feature of any meter therefore to provide improved methods of detecting tampering and performing self diagnostic error checking.

It is therefor a principal object of the present invention to provide a distributed processing system for generating and imrinting postal values which will maintain secure data in segregation from non secure data.

It is a further object of the present invention to provide an interprocessor communication system which will minimize error as a result of multiple processor inter-communication.

It is a still further object of the present invention to provide improved self diagnostic error checking.

The foregoing objects are achieved in accordance with the present invention by the provision of a postal meter having two or more units that are each provided with computer control, and to additionally provide communication between units. Communication between the units is preferably minimized, for security purposes, and no additional control lines between the units is provided; all control signals appear in the same data serial channel with message data. As a further requirement, it is necessary that the messages be completely error free upon receipt by a receiving unit, in order to insure the integrity of the postage system, in the error free accounting of all postage.

In a preferred embodiment of the invention, the postal meter is provided with three units, which although mechanically connected together, are each provided with a CPU, and are each provided with a crystal controlled clock. In accordance with the invention, the frequencies of the clocks of the different units need not be identical, and the communication between the units is by way of serial messages that are asynchronously transmitted and received. The format of the messages, and the timing of the bits in different units is precisely set, however, to insure that messages may be sent and received without the necessity for synchronizing the different units. In addition, upon receipt of the first bits of a message from a transmitting unit, the received bits are retransmitted by the receiver back to the transmitter for comparison, to enable the transmitter to send a "no error" within a minimum period of time following the complete message transmission, verifying the correctness of the message as sent and received.

All control and data signals utilize the same pair of conductors in each direction with precisely defined timing for control.

For providing external control, the control flow is in one direction and information flow in the other direction.

All control of the meter and all information inside the meter can be controlled by connection through an interface connector. All functions performed by the meter are controllable electrically from a remote location, except purely local manual functions such as power on and date change. This results from the communication capability of the data units. The organization of the three units results from a flow of commands or control of data from the control unit to the accounting unit and then to the printer unit, for example, relating to a new value of postage and where it is to be set. The flow of information is in the opposite direction such as, for example, a current register value or the like. Within this concept, connection of an external device, such as an electronic scale to the control unit, can operate to place commands or data control instructions information into the meter.

The interface operation allows the external device to take control of the meter, disabling the keyboard. The external device can communicate messages with the display, thereby eliminating the need for a keyboard and display in the external device. One specific advantage of the foregoing arrangement is that the control unit may be physically replaced by the attached external operating device, without any changes in the accounting unit or the printing unit, either in hardware or software.

In order that the invention will be more clearly understood, it will now be disclosed in greater detail with reference to the accompanying drawings, wherein.

Figure 14:
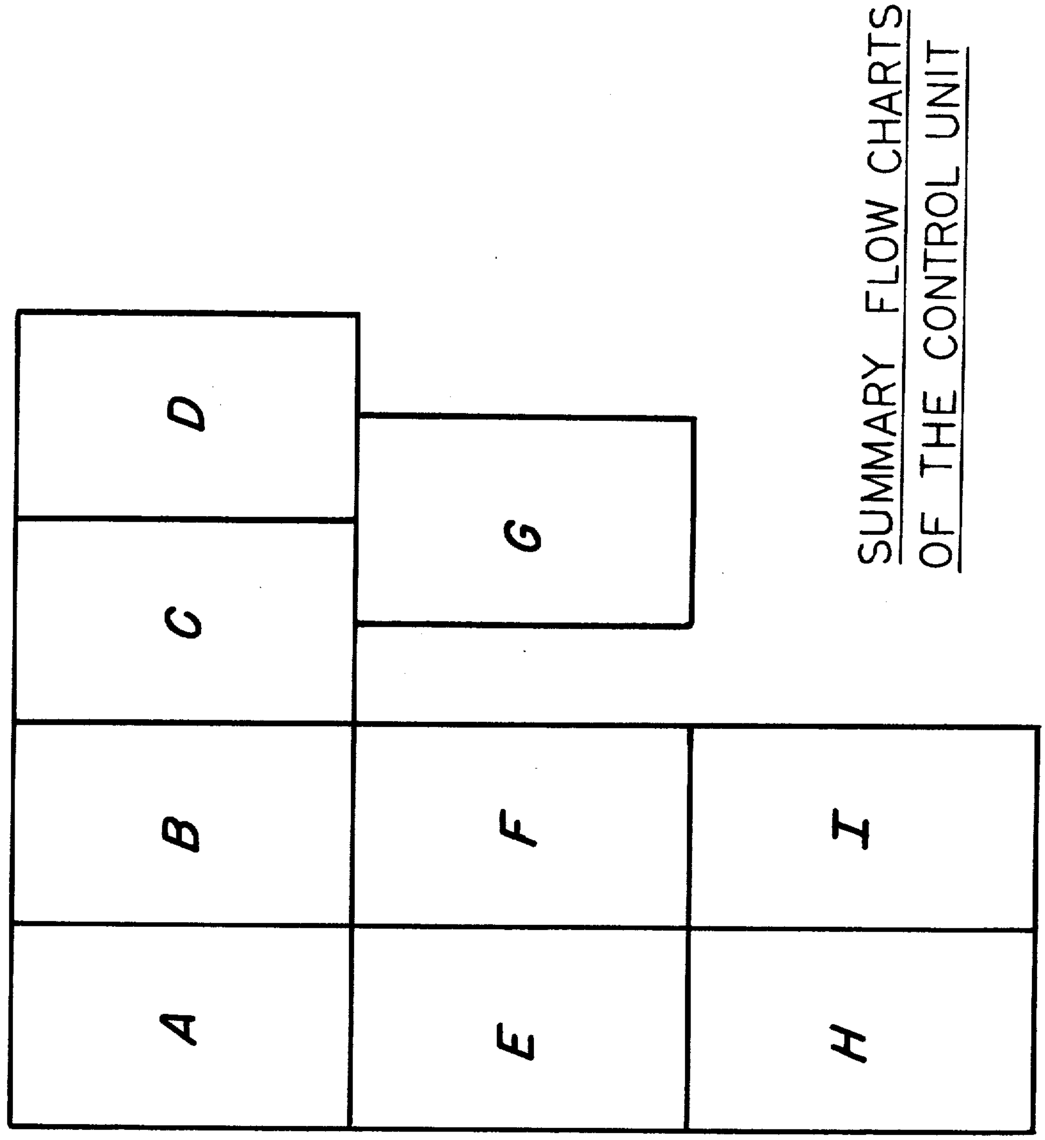
Figure 14A:
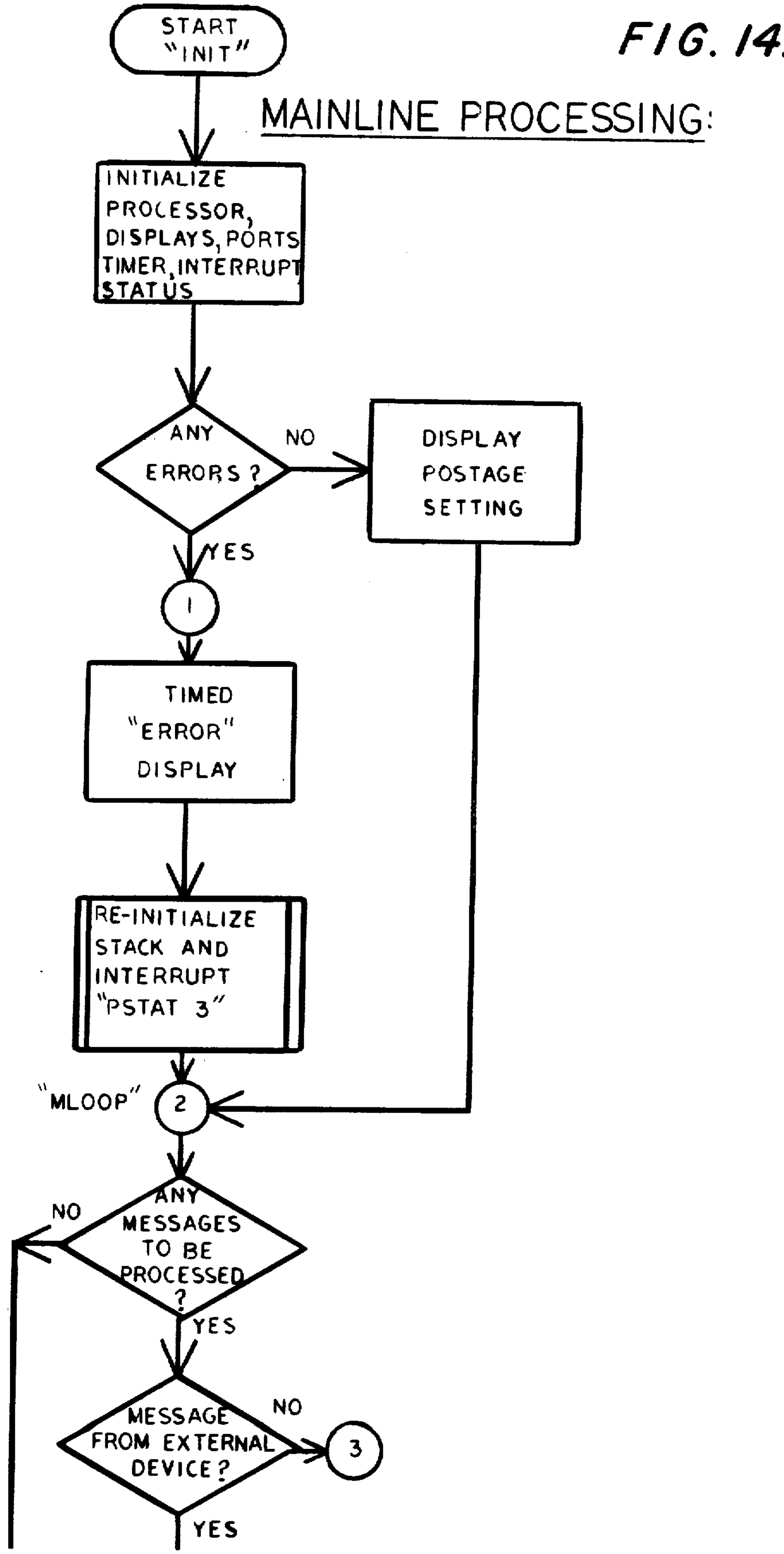
Figure 14B:
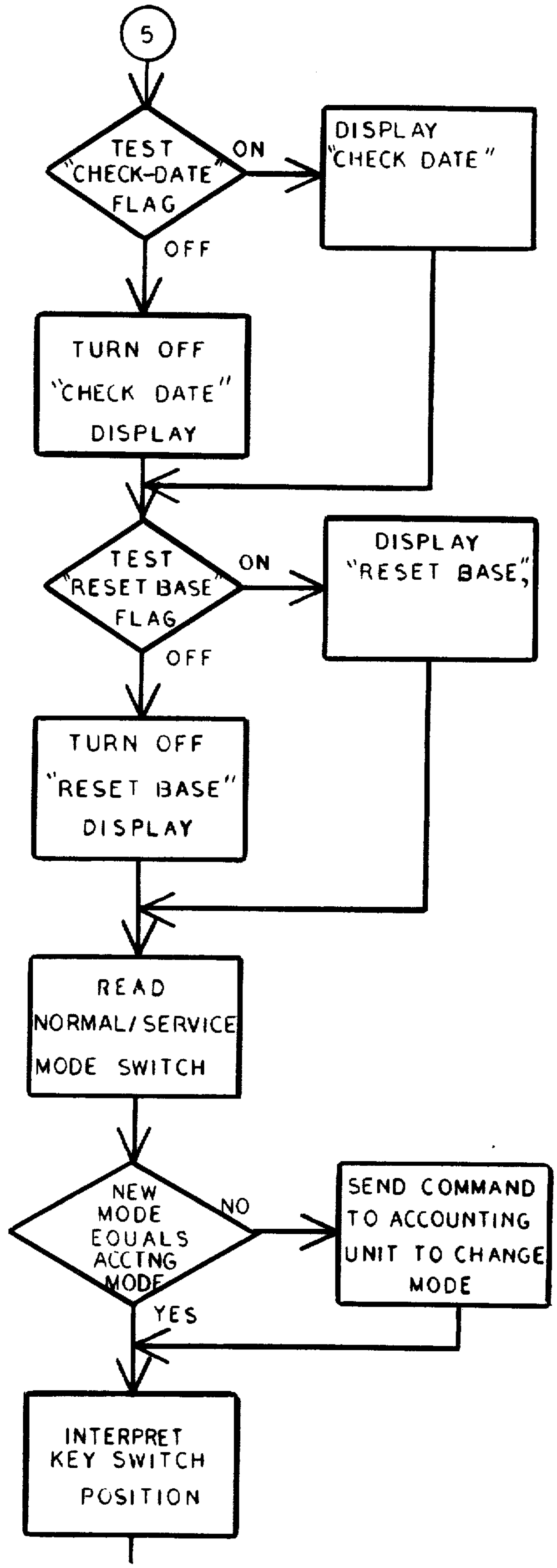
Figure 14C:
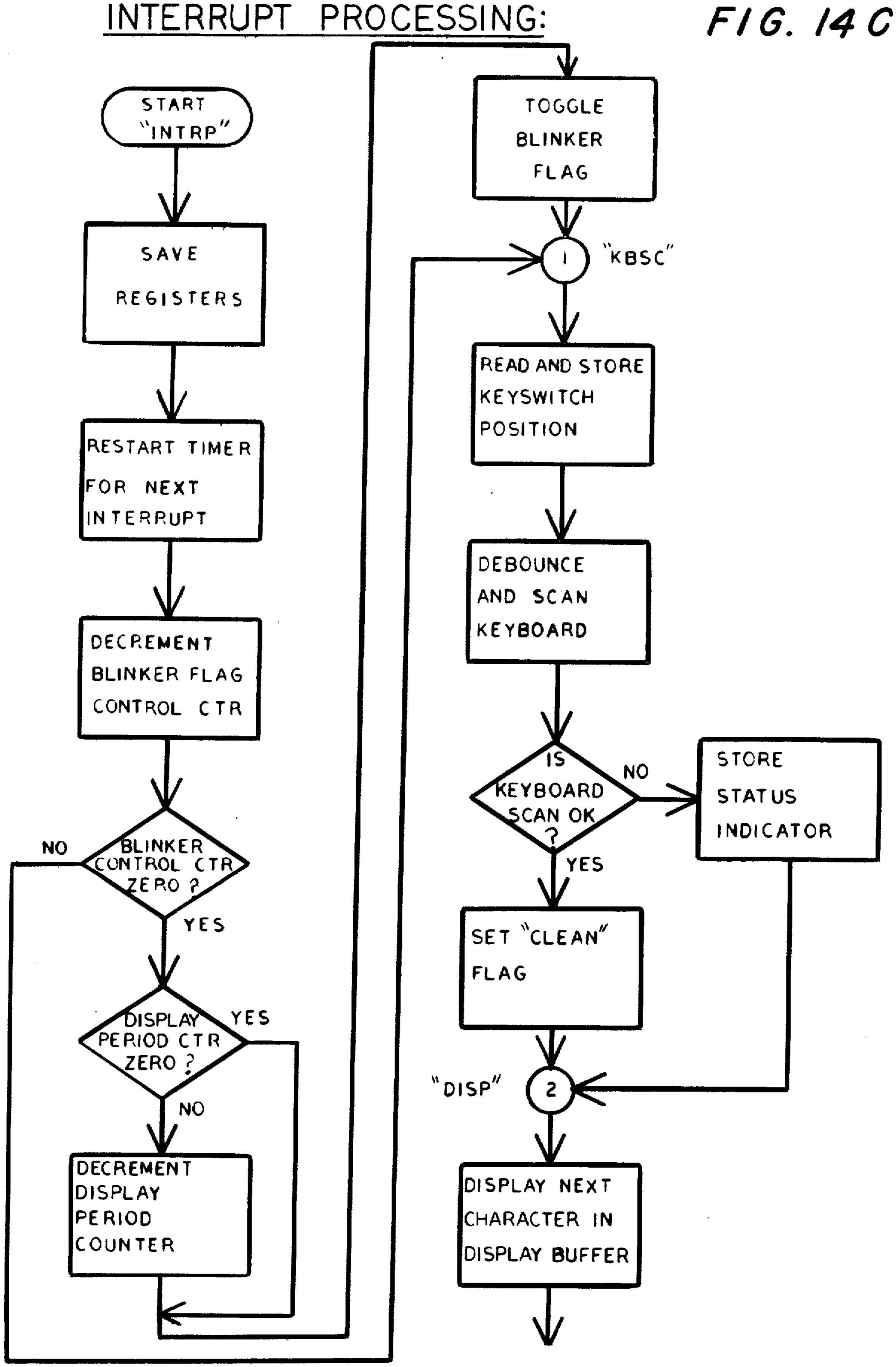
Figure 14D:
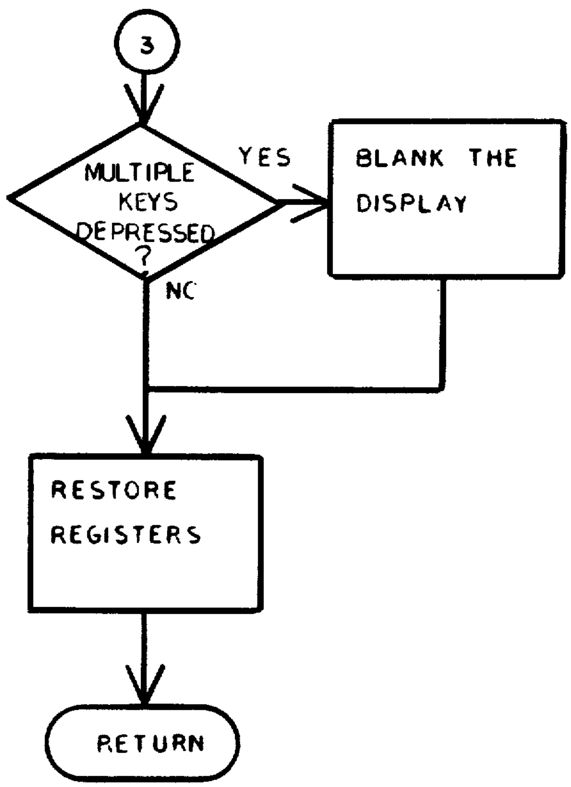
Figure 14E:
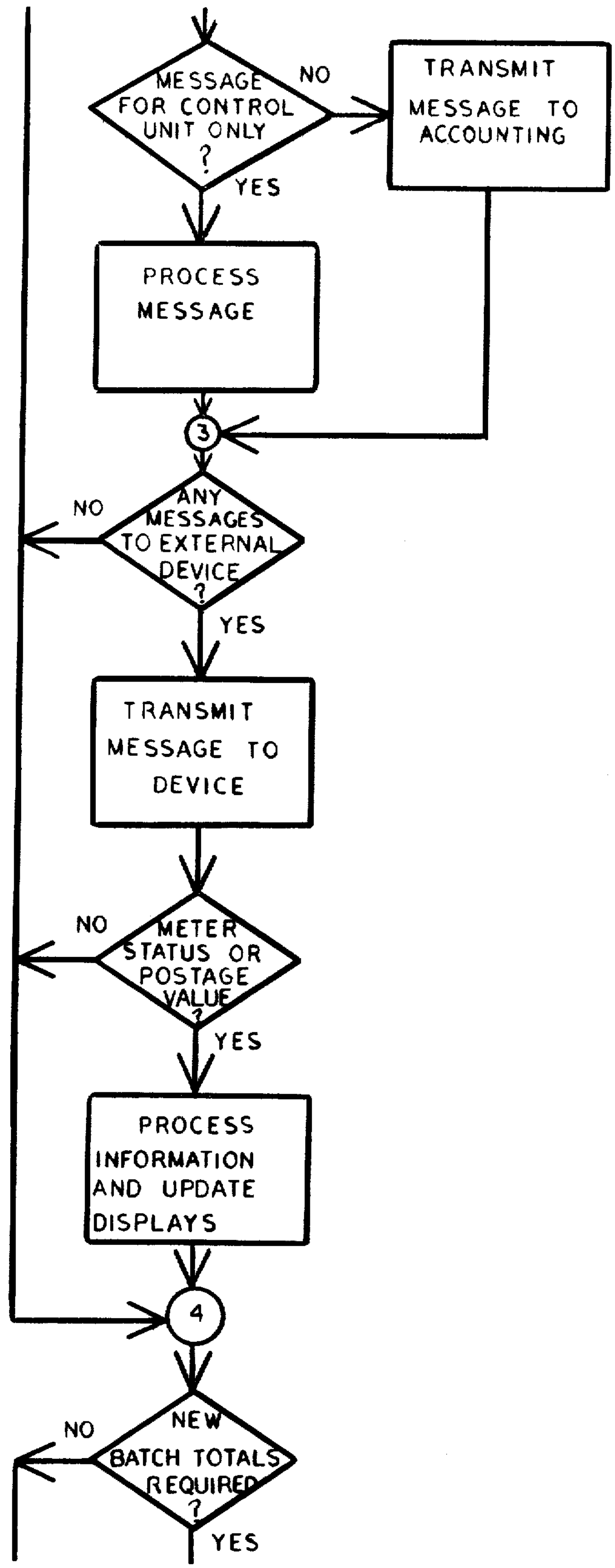
Figure 14F:
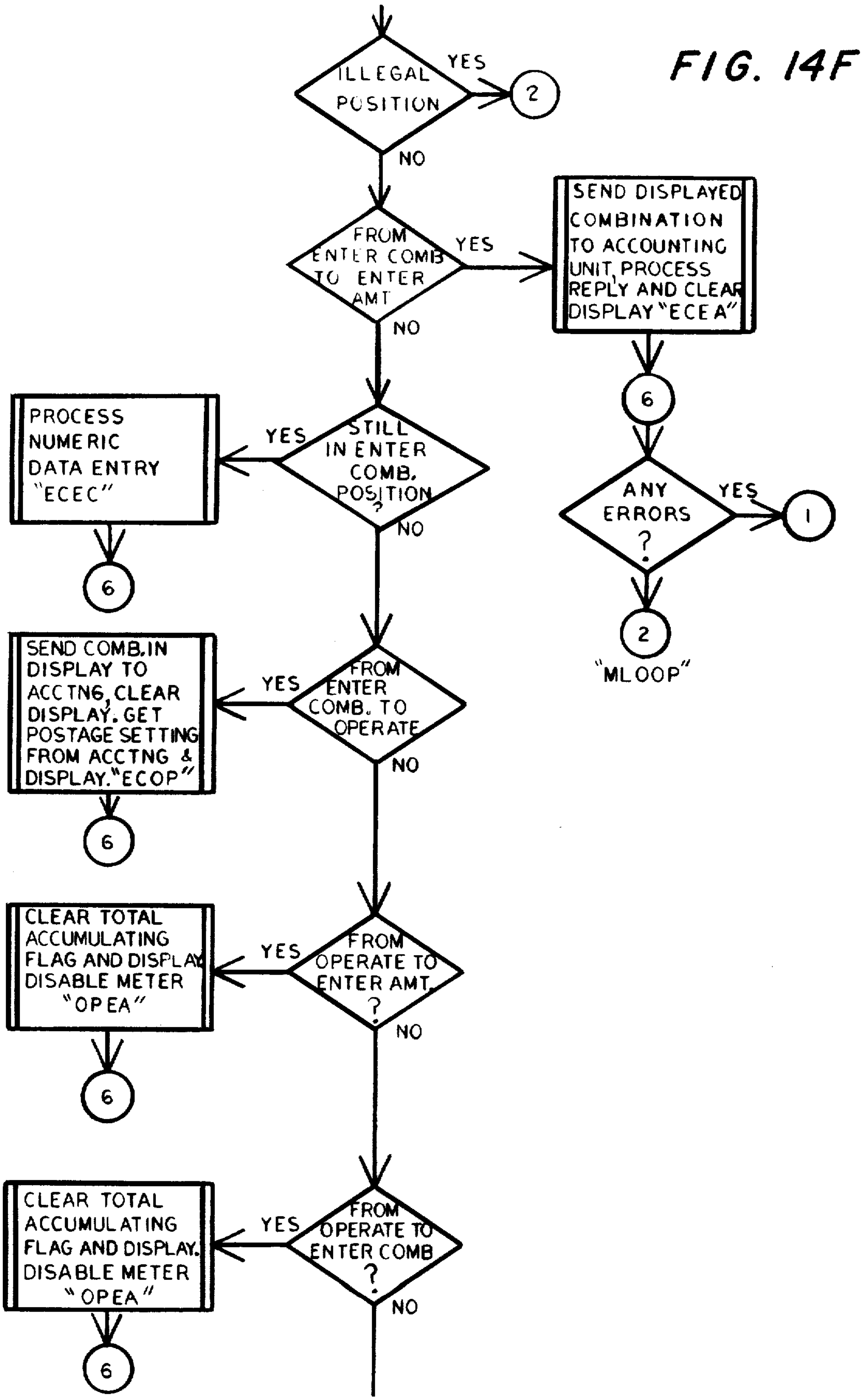
Figure 14G:
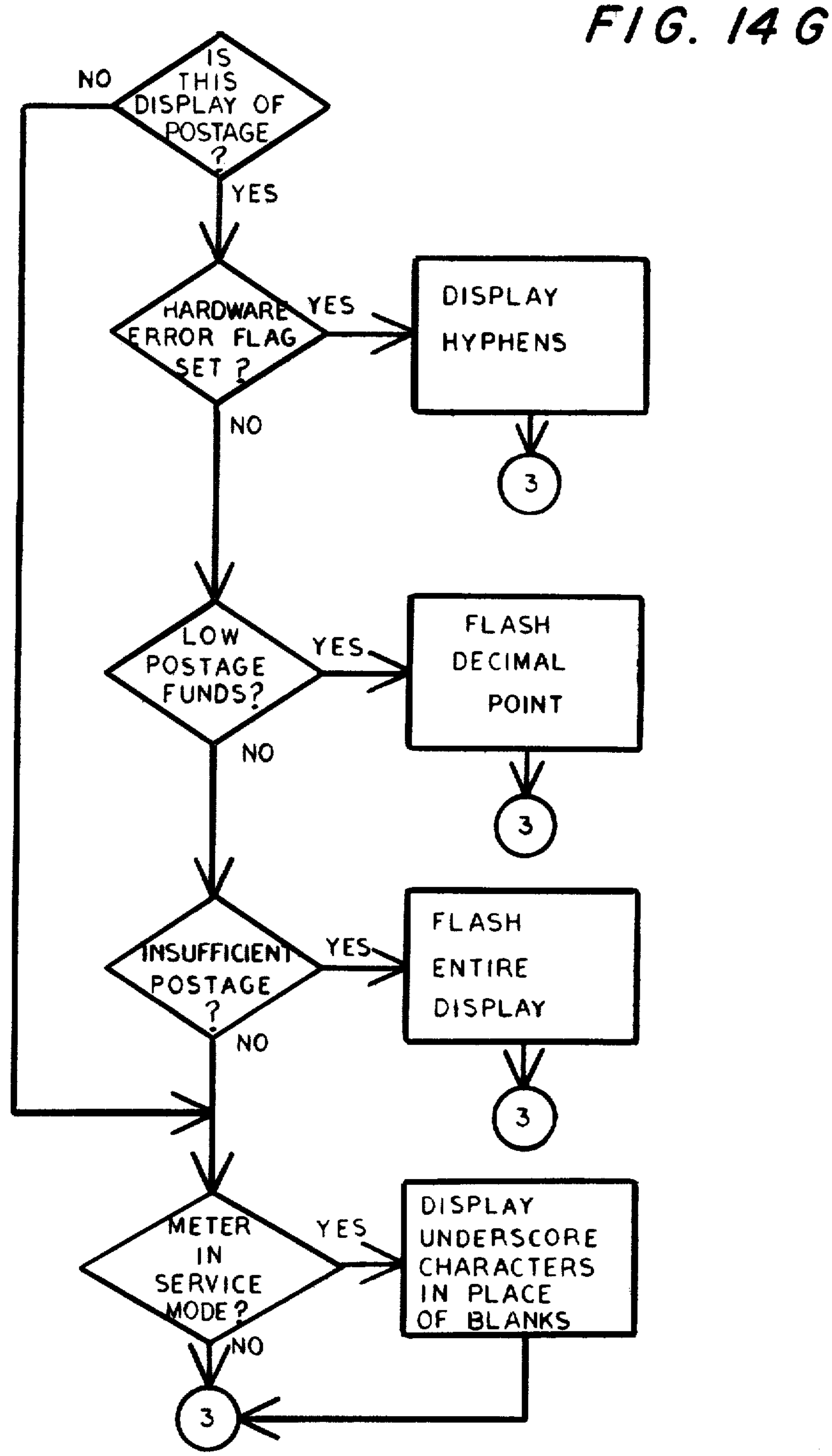
Figure 14H:
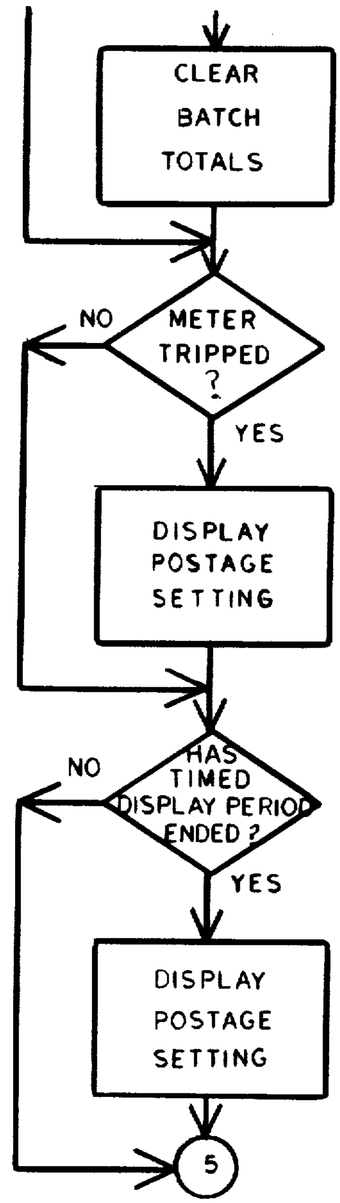
Figure 14I:
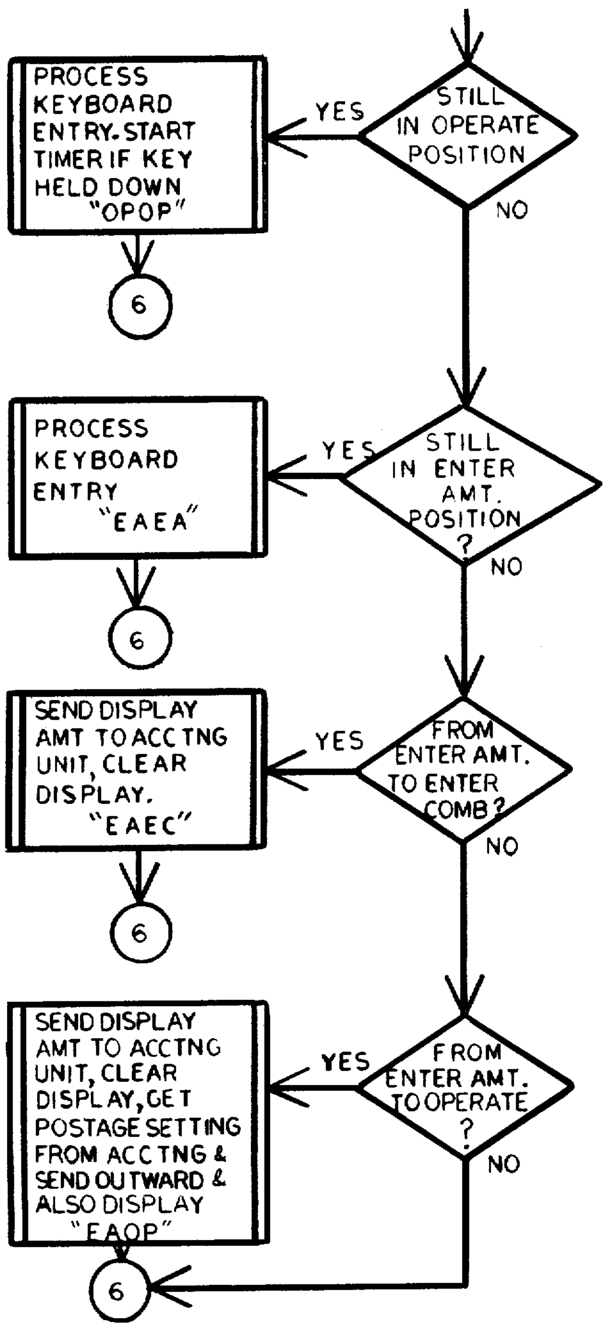

FIG. 14 which comprises FIGS. 14A–14I is a sequential set of flowcharts illustrating the control unit operation.

Figure 15:
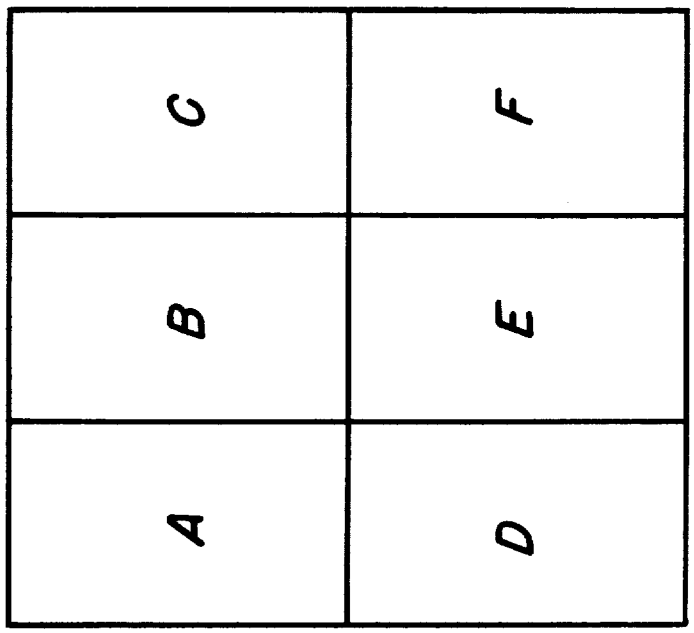
Figure 15A:
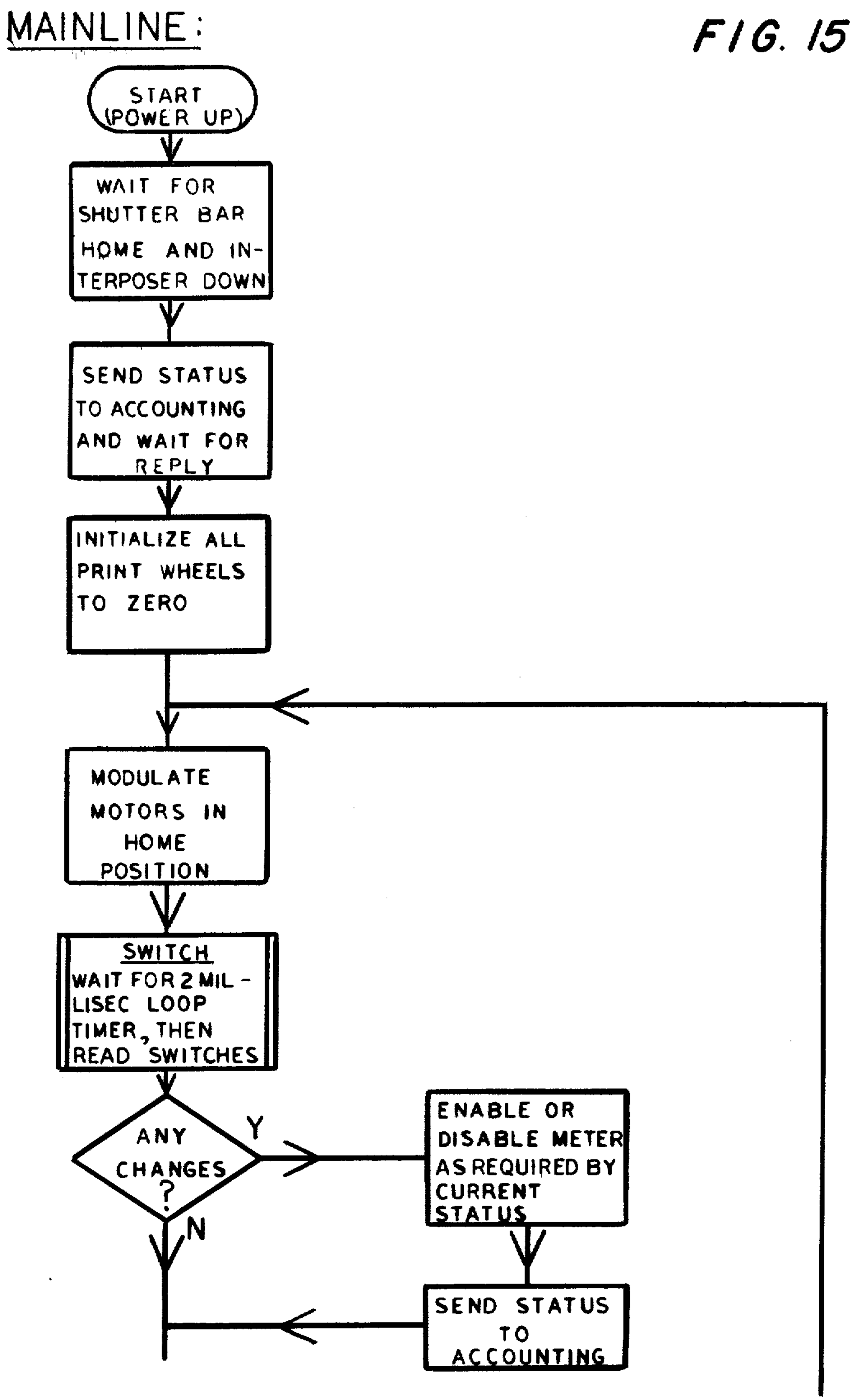
Figure 15B:
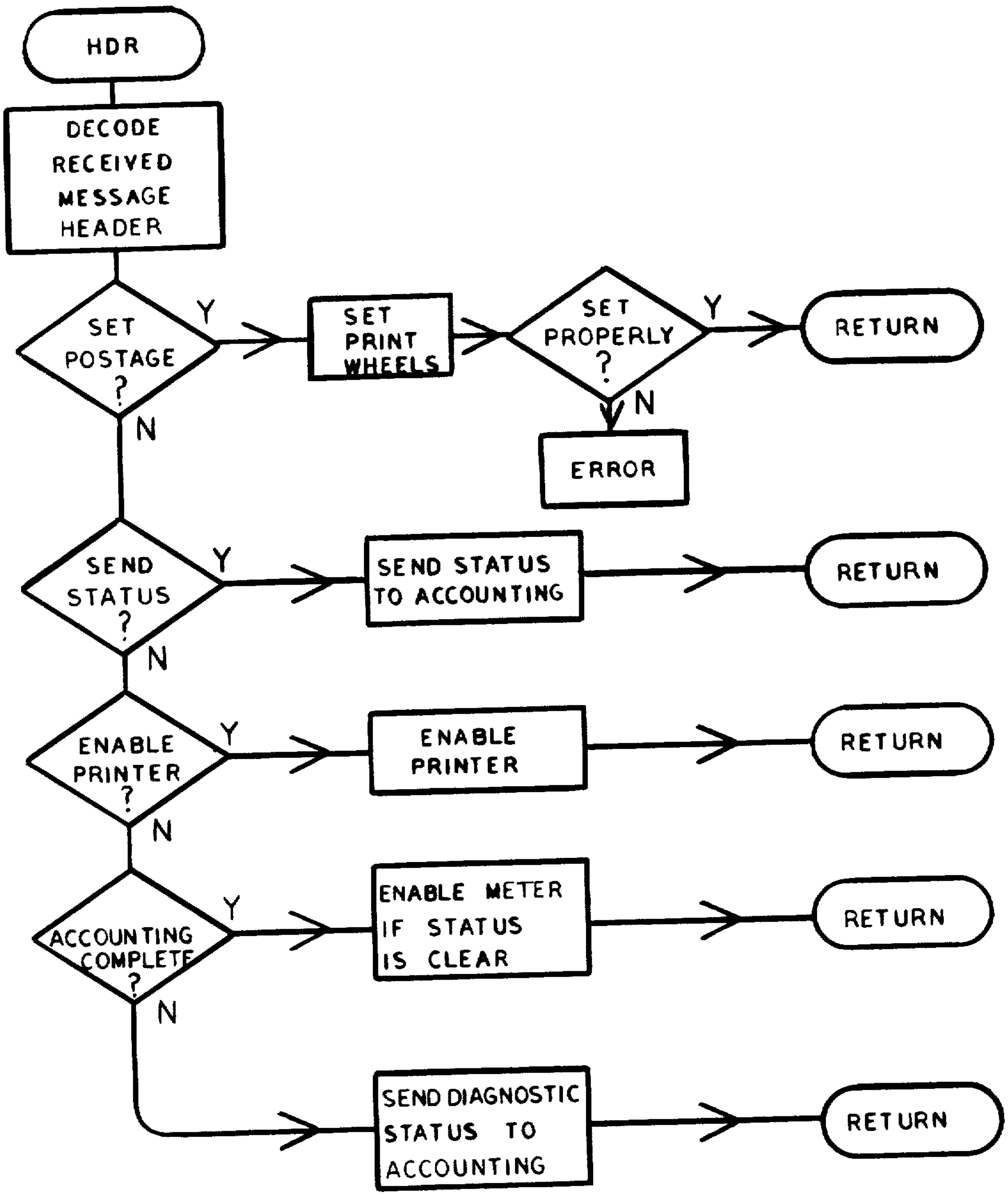
Figure 15C:
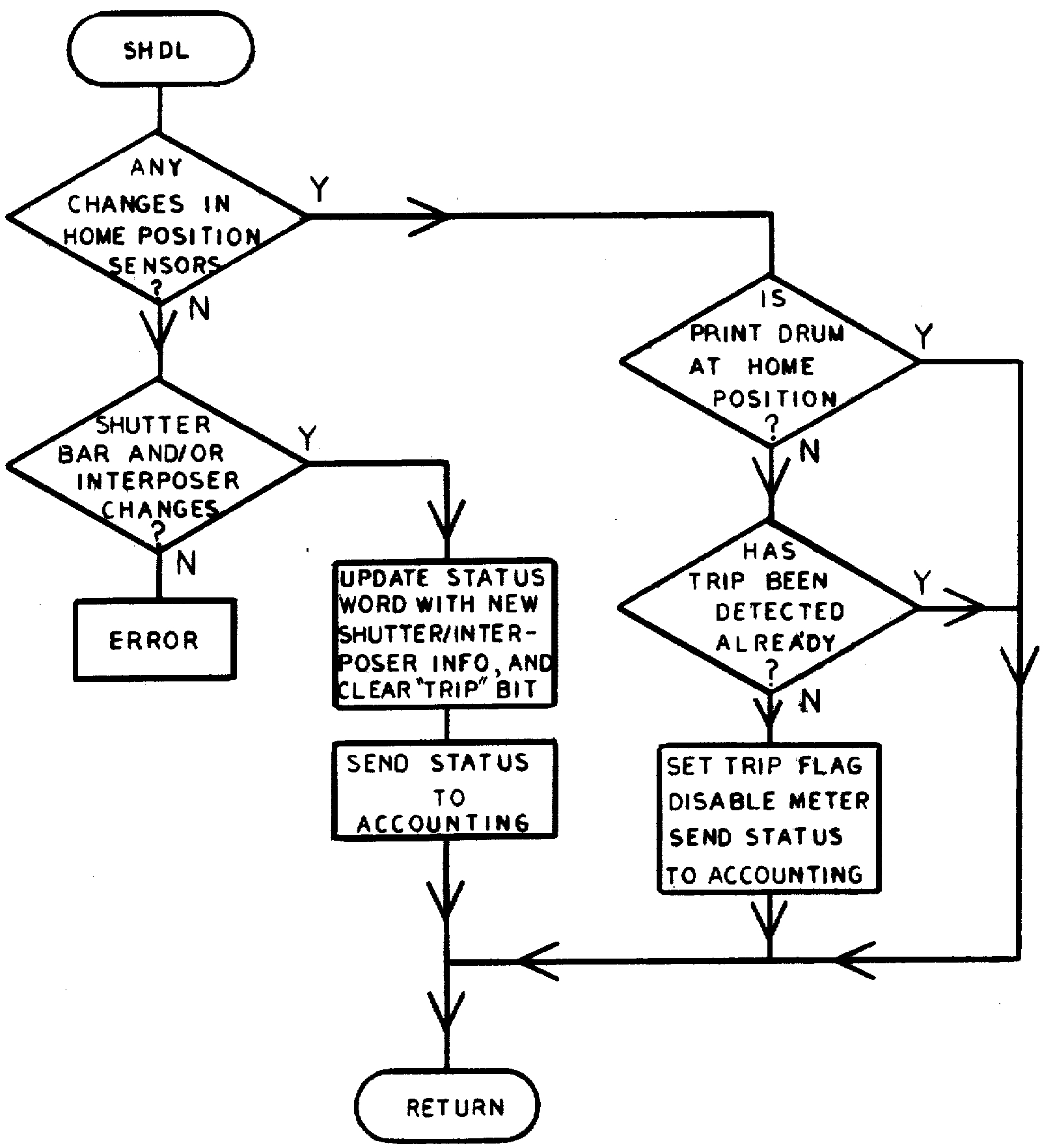
Figure 15D:
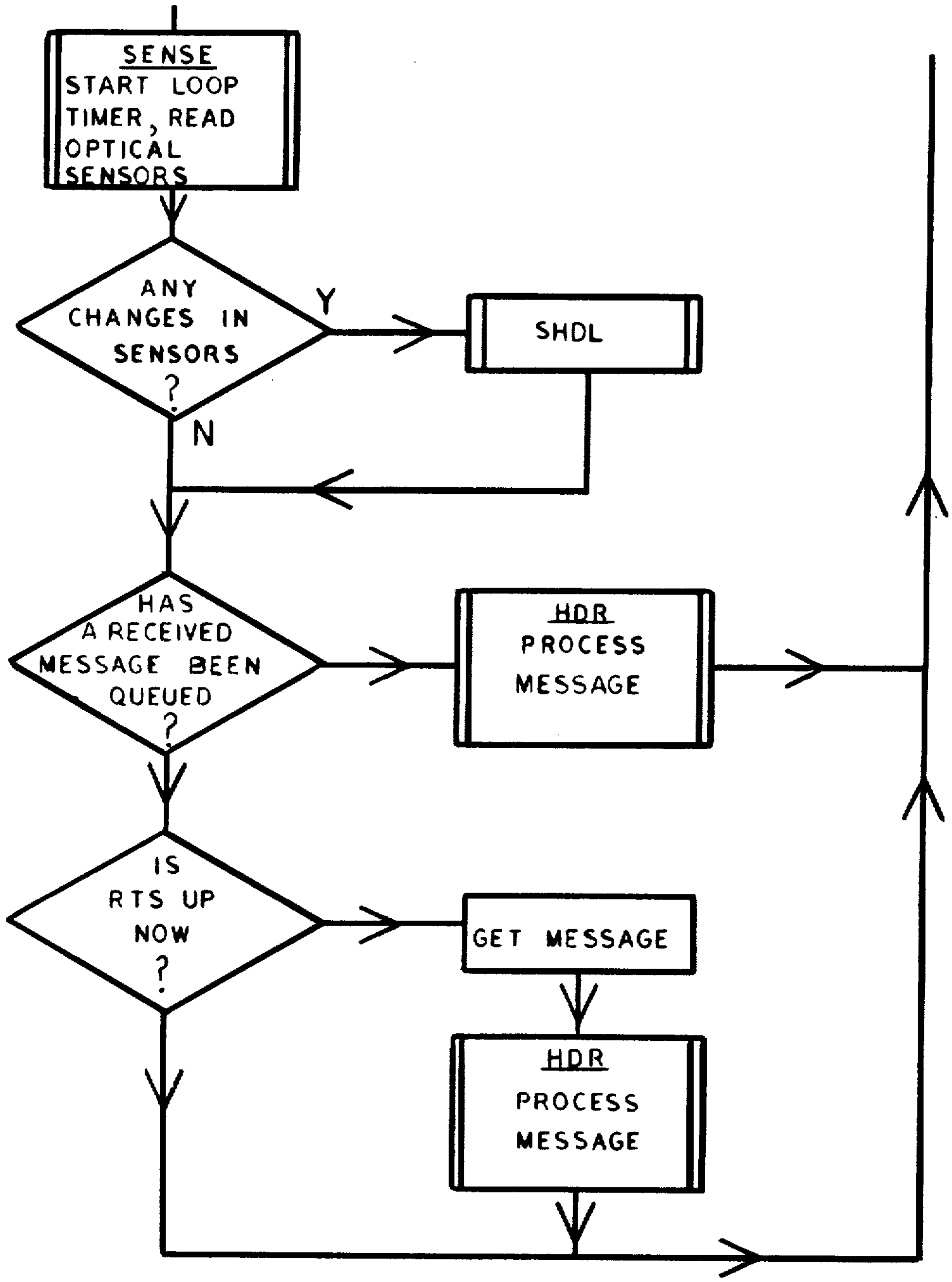
Figure 15E:
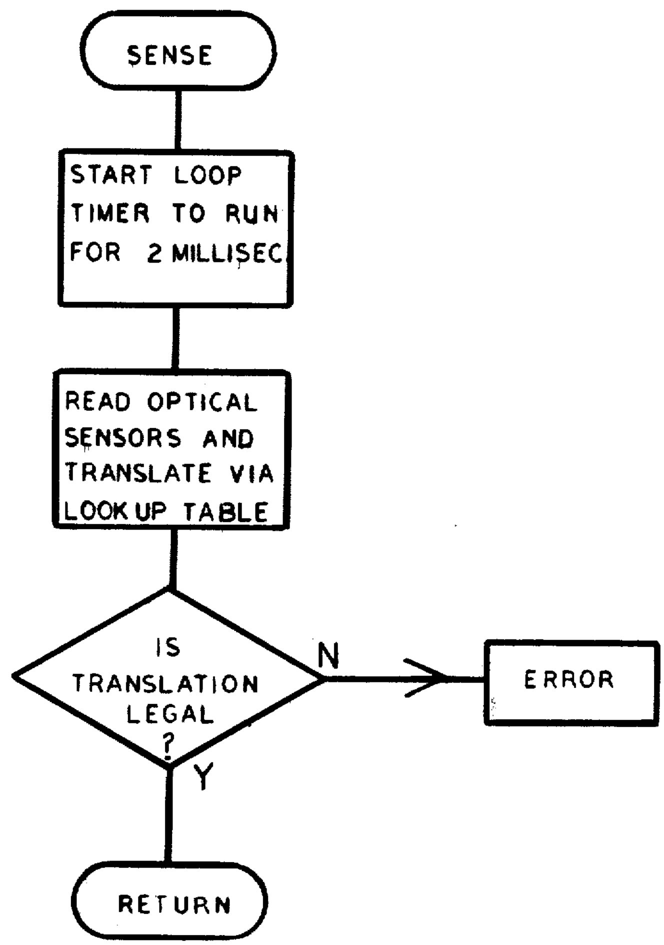
Figure 15F:
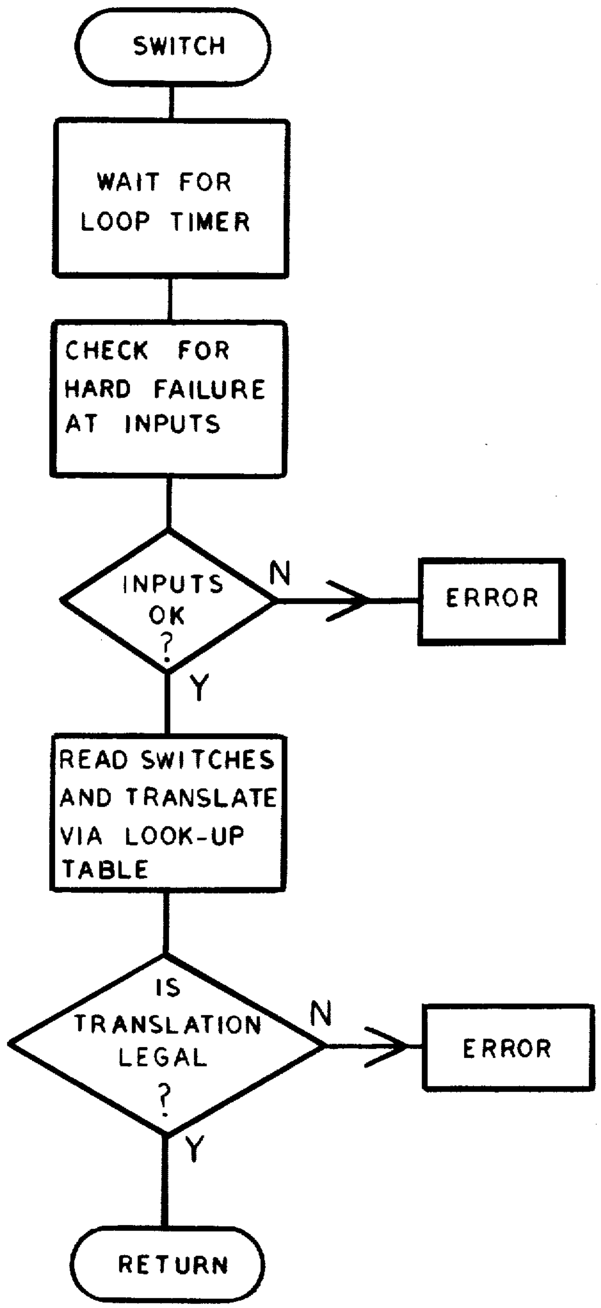

FIG. 15 which comprises FIGS. 15A–15F is a sequential set of flowcharts illustrating the printing unit operation.

Figure 16:
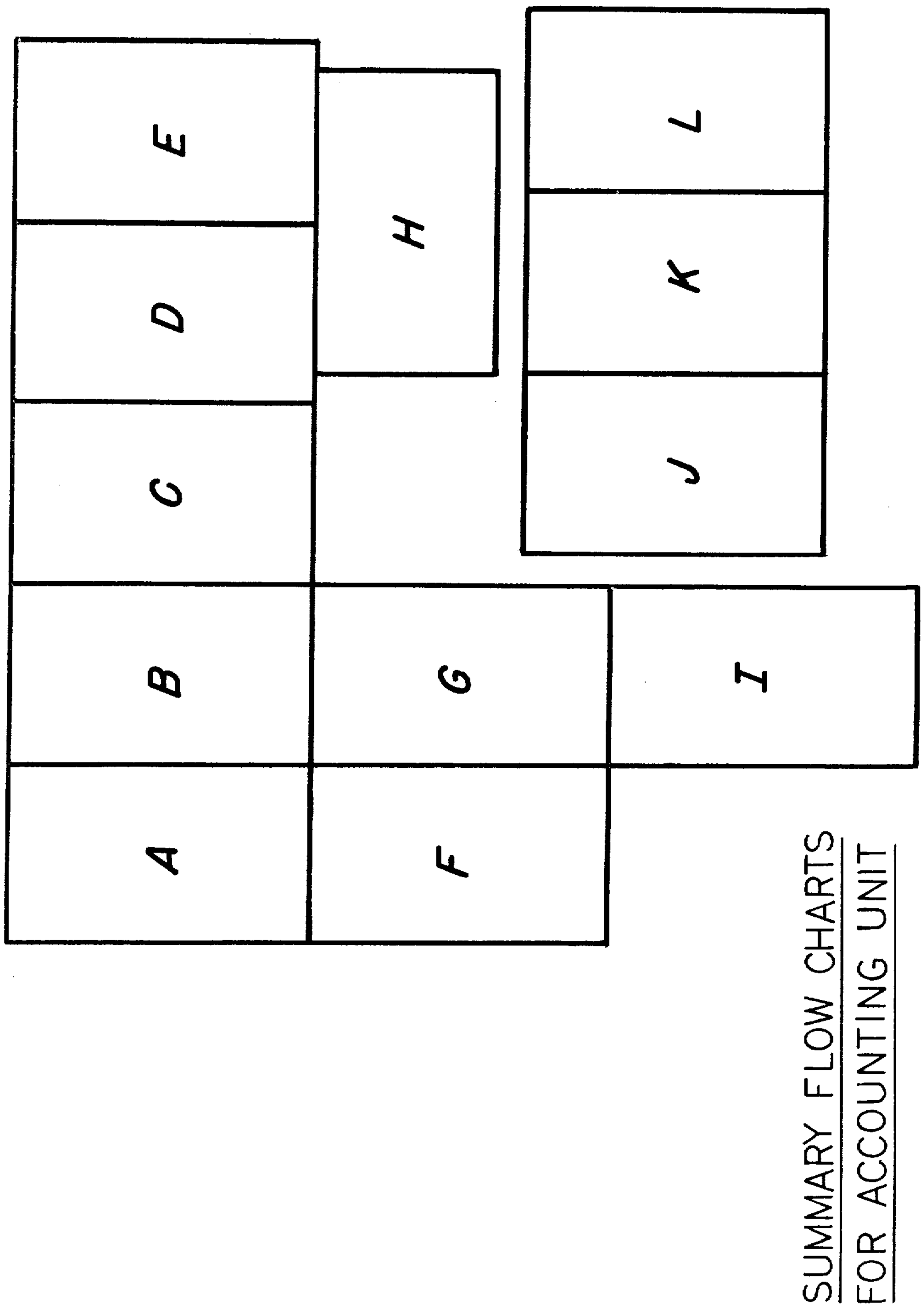
Figure 16A:
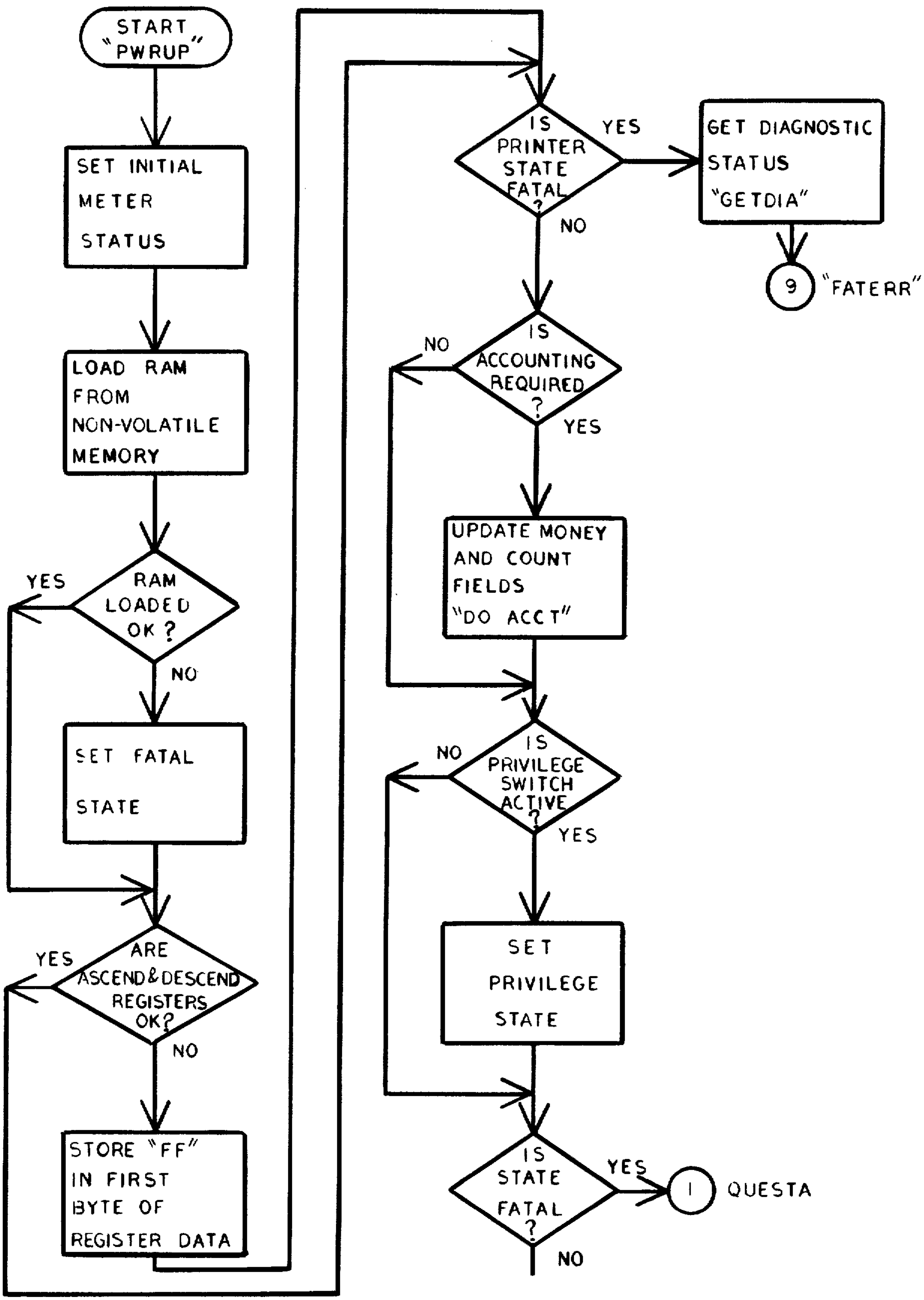
Figure 16C:
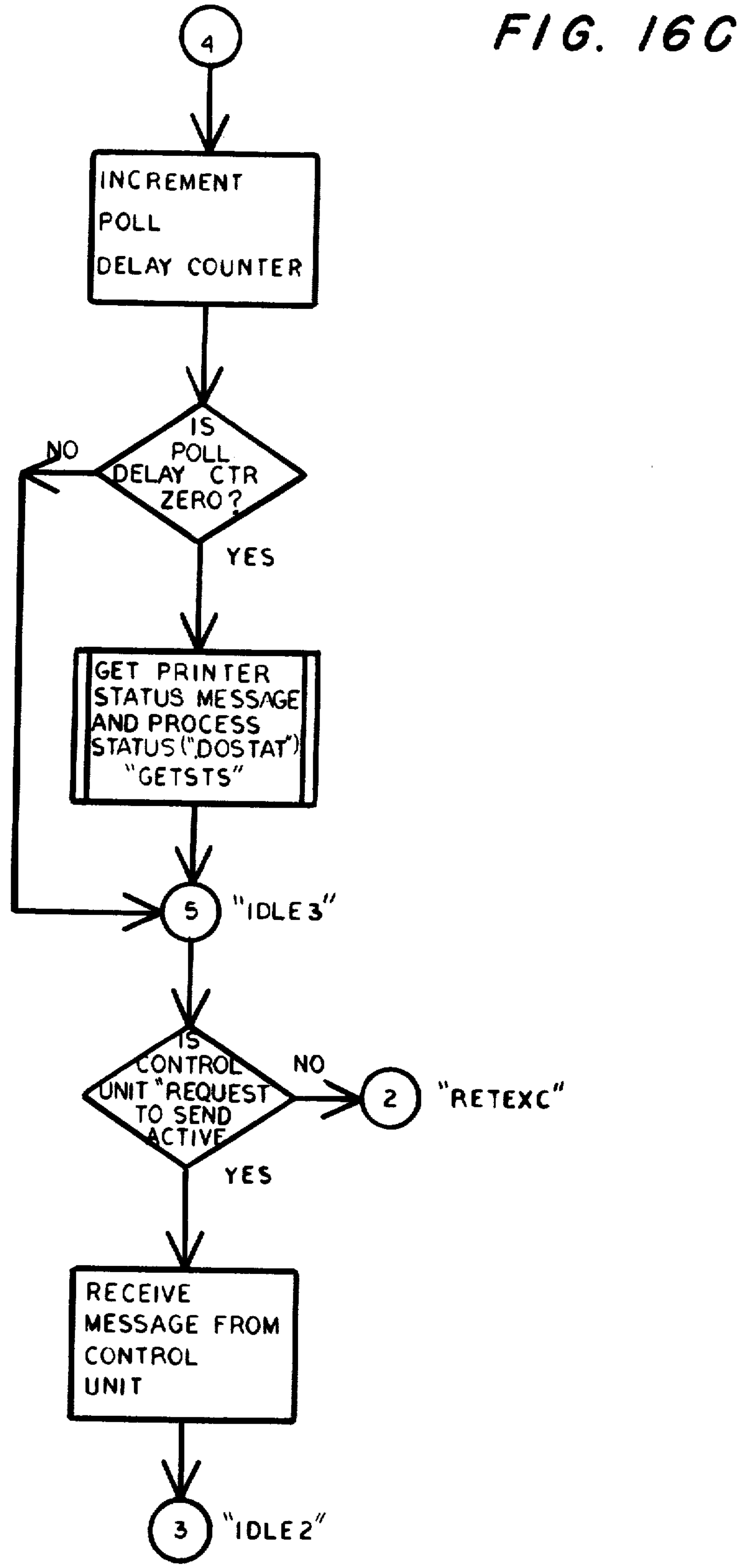
Figure 16D:
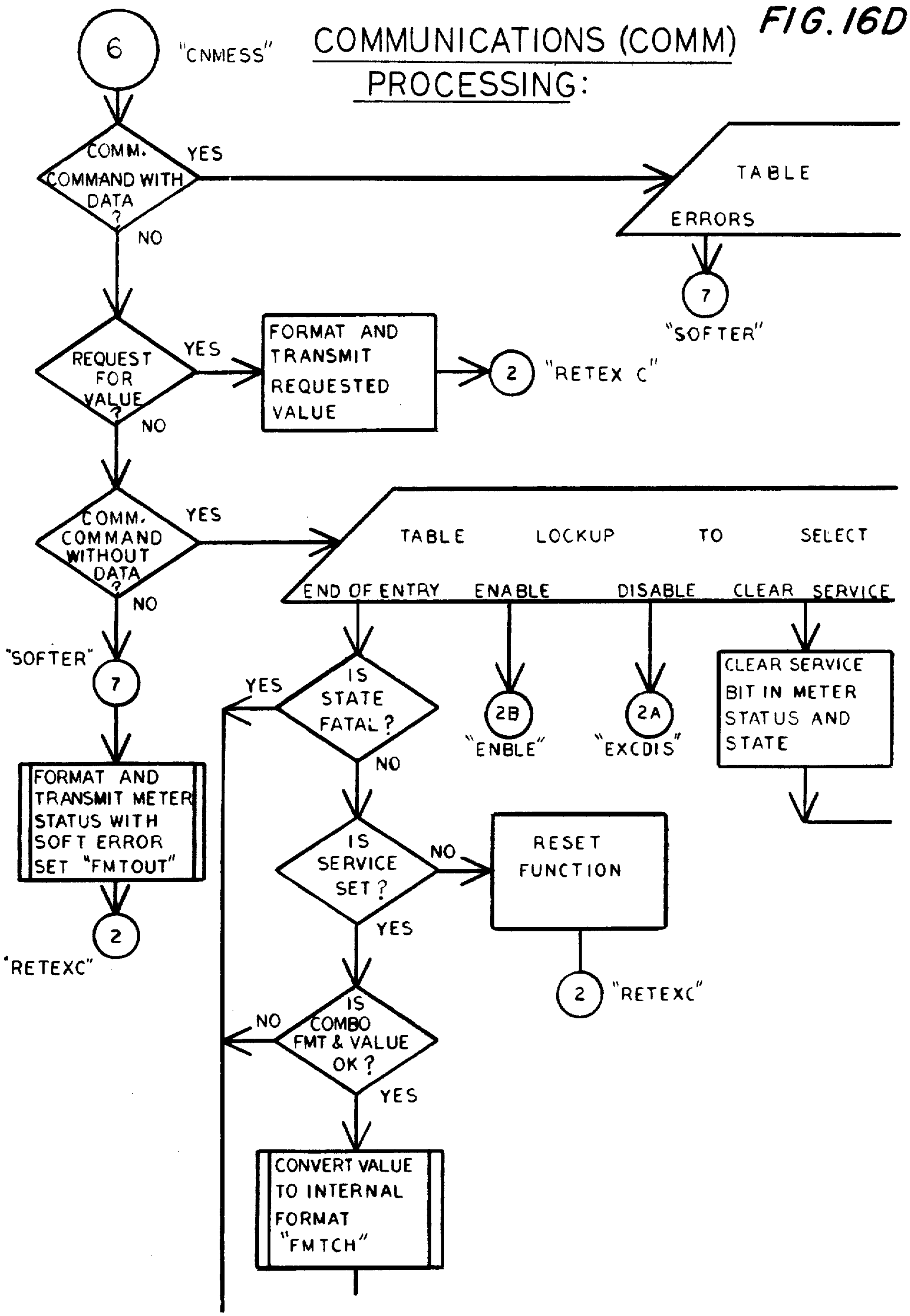
Figure 16E:
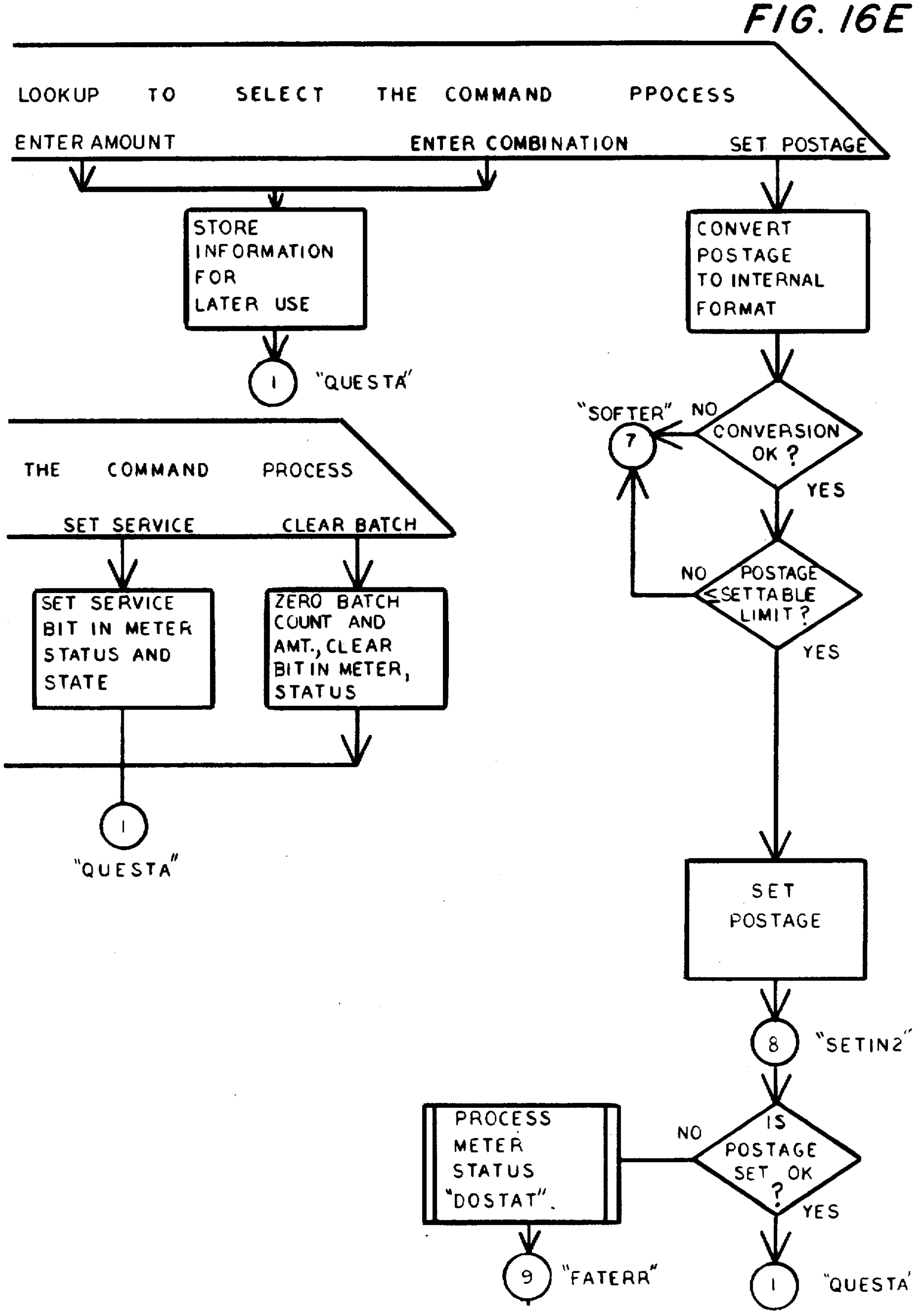
Figure 16F:
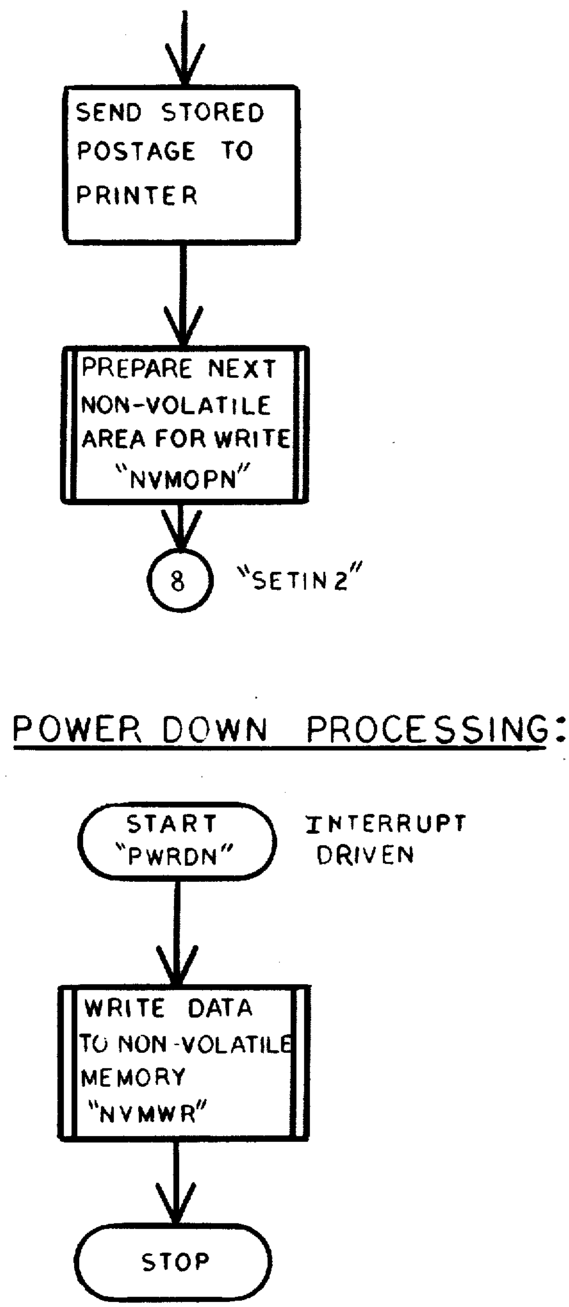
Figure 16G:
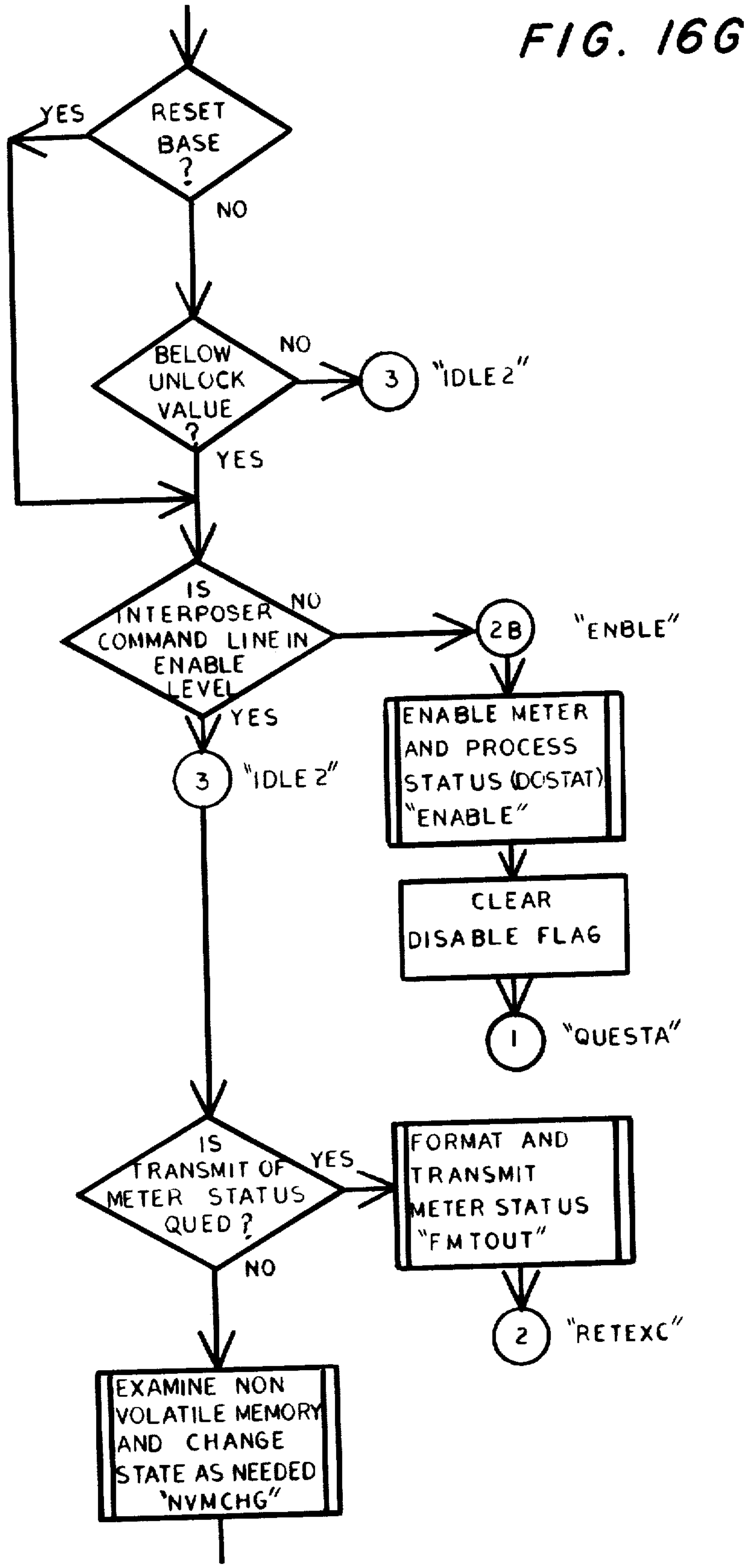
Figure 16H:
Figure 16I:
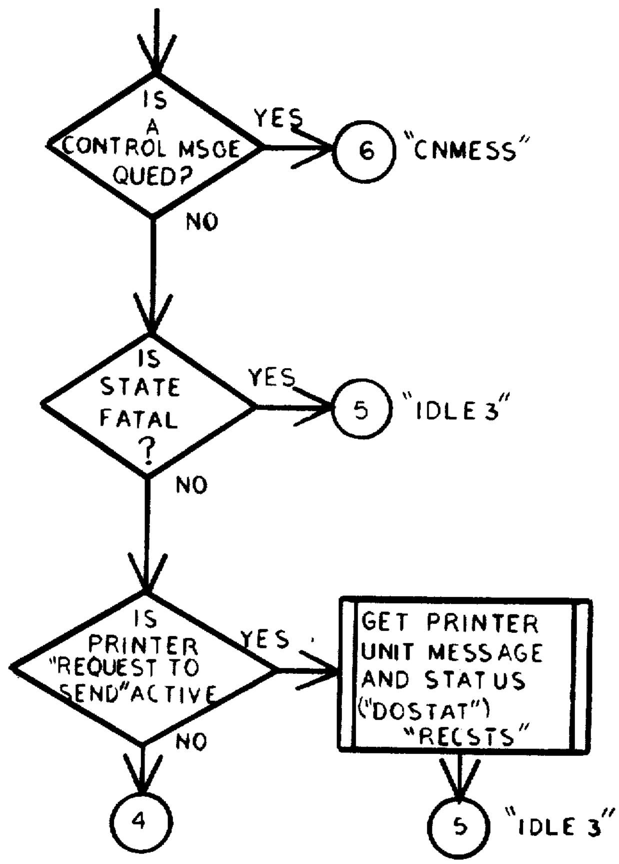
Figure 16J:
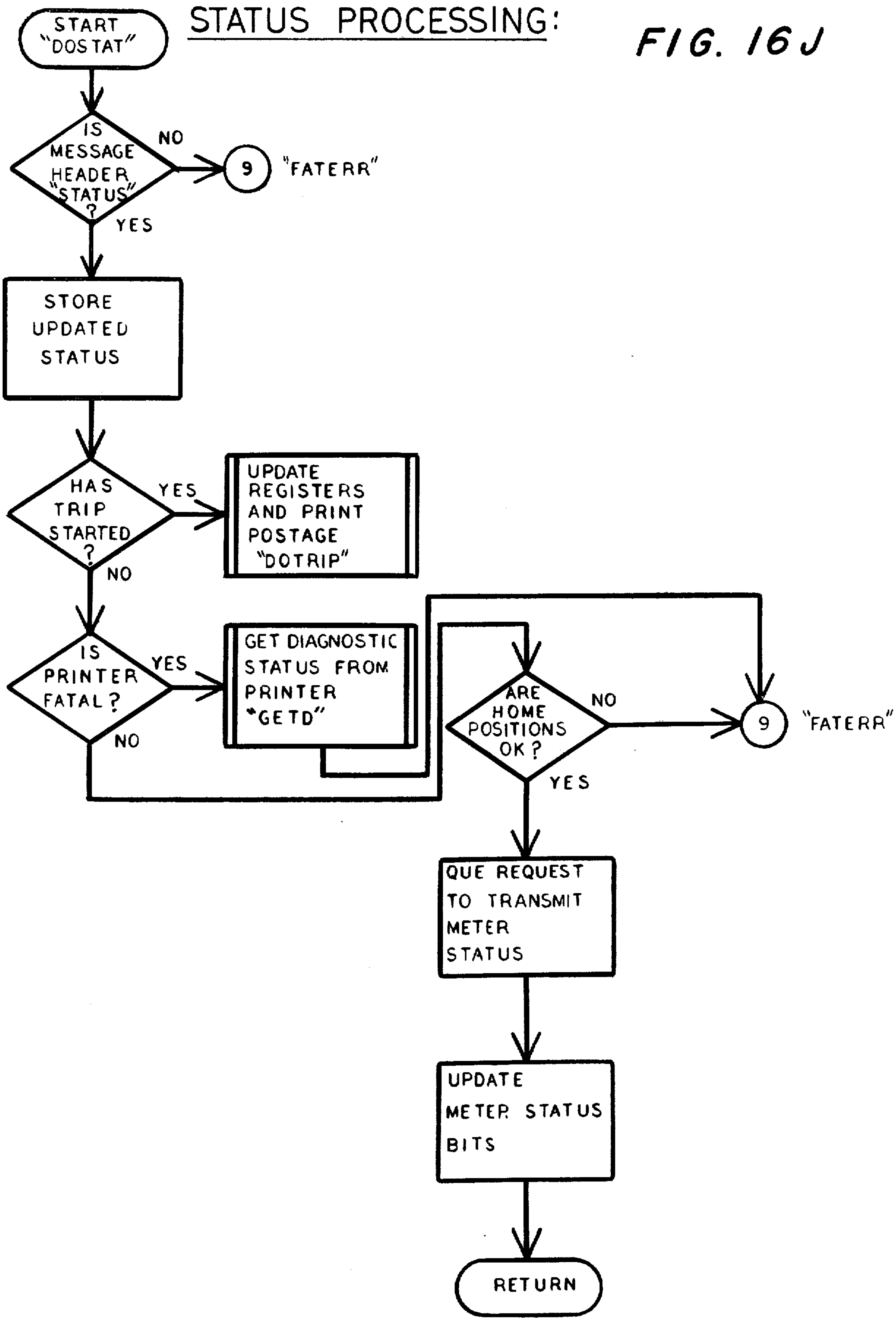
Figure 16K:
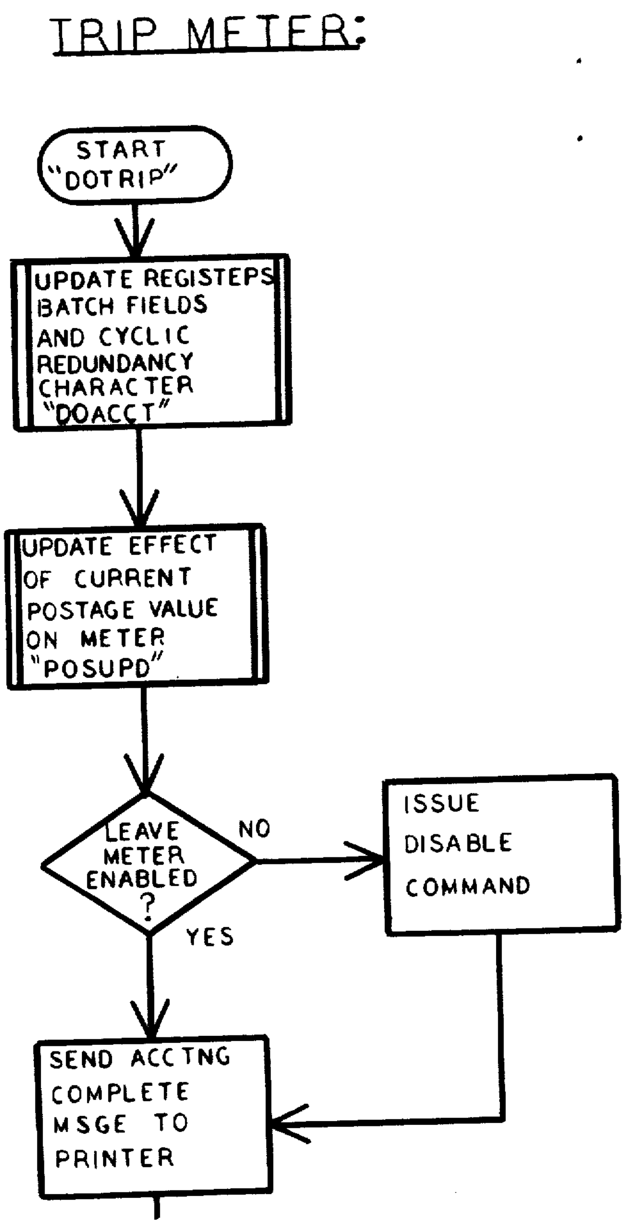
Figure 16L:
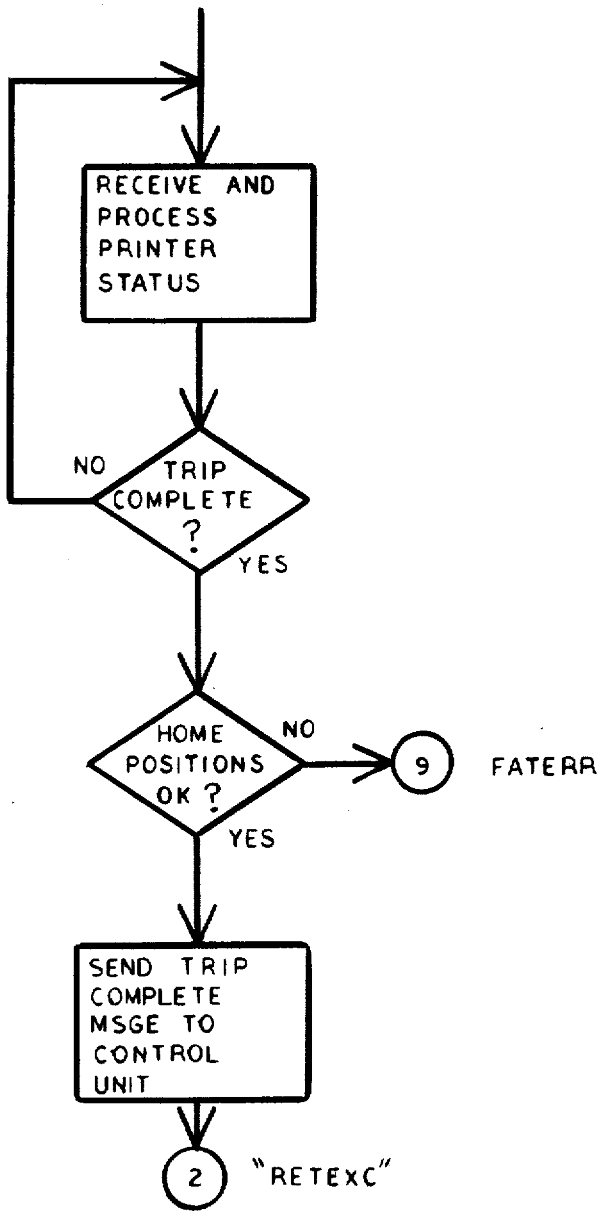

FIG. 16 which comprises FIGS. 16A–16L is a sequential set of flowcharts illustrating the accounting unit operation.

Figure 1:
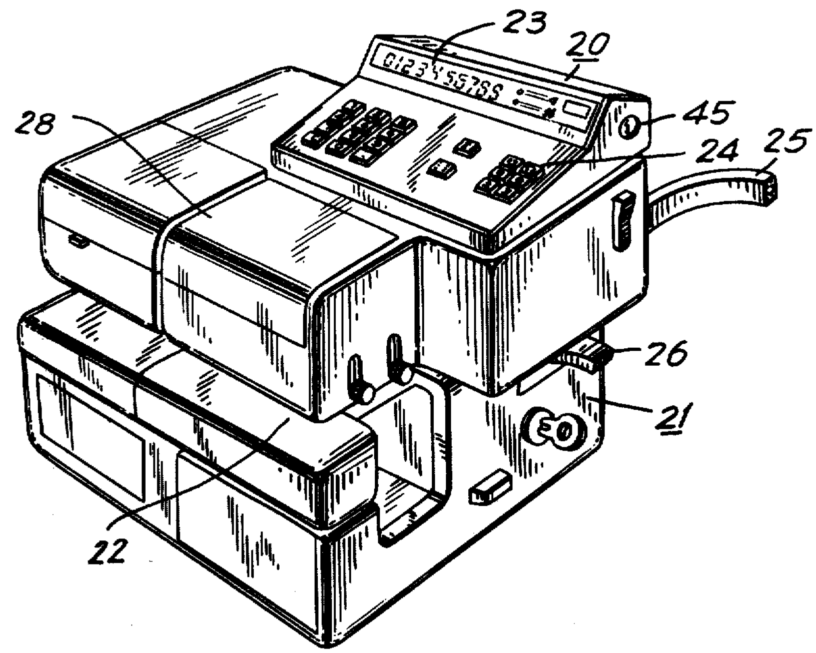
FIG. 1 is a simplified perspective view of a postal meter which may incorporate the system of the present invention.

Referring now to the drawings, and more in particular to FIG. 1, therein is illustrated a postage meter 20 removably affixed to a base 21, in accordance with one embodiment of the invention. In this arrangement, a slot 22 is provided between the postage meter 20 and the base 21 at the forward edge thereof, for receiving envelopes or the like and the printing of postage thereon. The postage meter is provided with a display panel 23, preferably an electronic display device, as well as a control panel 24 which may be organized in a manner to be disclosed in the following paragraphs. The apparatus may be energized by way of a supply cable 25.

The postage meter 20 illustrated in FIG. 1 may be of the type that is removable from the base 21, and the base 21 may be of the type disclosed, for example, in U.S. Pat. No. 2,934,009, Bach, et al, incorporating a mechanical drive for operation of the printing mechanism in the meter 20. The separability of the meter and base renders the electronic meter compatible with conventional driving units, simplifies servicing of the device and, if necesssary, simplifies transport of the meter for recharging if remote charging capabilities are not employed.

Figure 2:
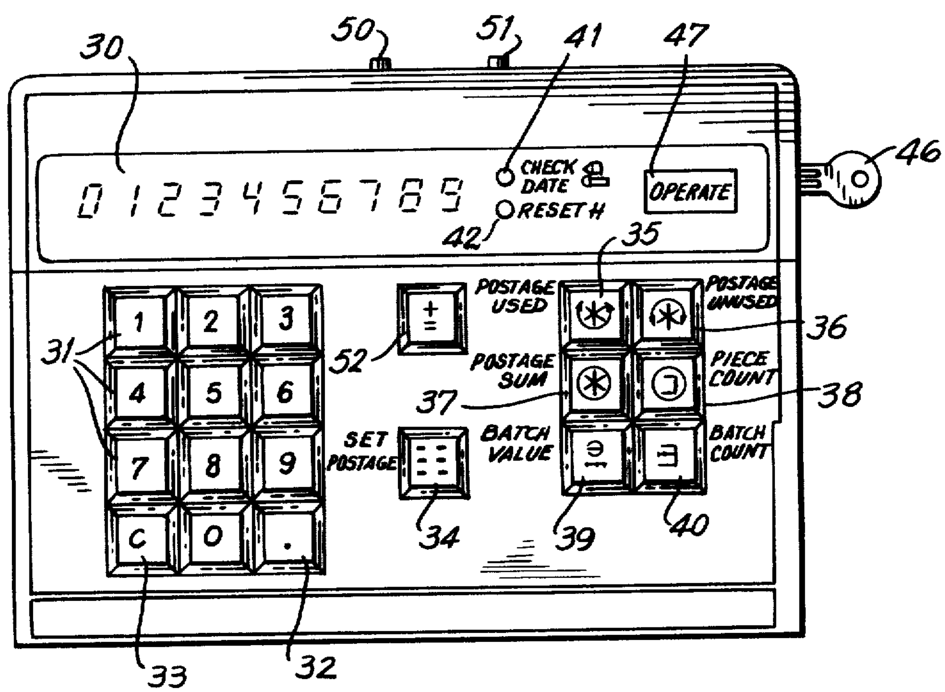
FIG. 2 is an enlarged view of the panel of the postal meter of FIG. 1.

The panel for the postage meter is more clearly illustrated in FIG. 2, wherein it is seen that the meter is provided with a numeric display 30, for example, a conventional multiplexed seven-segment LED or LCD display. In addition, the keyboard is provided with numeric setting keys 31 and a decimal key 32 operative therewith, for setting the meter to print a desired amount of postage, the amount normally being displayed on the display 30. A clear key 33 may also be provided to clear the display amount in the event, for example, of an erroneous entry. When the displayed amount has been set to the desired value, depression of a set postage key 34 effects setting of the print wheels for setting postage.

The panel may further be provided with a series of keys enabling the selective display of other values on the display 30. For example, depression of a key 35 may enable the display of the contents of an ascending register, i.e., the postage used by the meter, and depression of a key 36 may enable display of the contents of a descending register in the meter, i.e., the postage for which the meter is still charged. Further keys 37–40 may enable display in conventional manner of other specific specialized values as control or postage sum, piece count, batch value, and batch count, respectively. The batch value and batch count registers can be cleared by simultaneous depression of either batch value key or batch count key and the clear key C. The panel additionally preferably is provided with an LED 41 which will be lit upon each application of power to the meter, as is conveniently done at the beginning of a day, to indicate that the dater has not been set or that the dater door is open. A further LED display 42 may be provided and interconnected to be lit if necessary to reset the trip mechanism in the base before operation is to continue.

In order to provide recharging of the meter, for example, by way of the keyboard, the meter may be provided with a key slot 45 illustrated in FIG. 1, in which the key 46 of FIG. 2 may be inserted. The shaft of the lock may be visible through a window 47 to display the position of the key. Thus, in the normal setting of the key this shaft may display the message "operate" as illustrated. This arrangement may also be employed for remote meter resetting, as discussed, for example, in U.S. Pat. No. 4,097,923.

As a further feature, the meter may be provided with a service switch 50 at the rear thereof for the convenience of field service personnel enabling use of the keys of the meter for different functions. Upon operation of the switch 50, the keys 35 through 40 may thereby enable the display of additional values such as the unlock value, the low postage warning amount, the meter number, diagnostic status, and the maximum settable amount. Turning the switch to an "enter combination" position, as indicated in the window 47, while entering a correct coded combination in the keyboard, enables the recharging mode of the meter to he effective. In the charging mode, which may be attained by means of an internal switch lock controlled by the key 46, an "enter amount" position as shown by this message at the window 47, may enable entry of recharging value registers of the meter by way of the keyboard. Returning the key to the operate position enables the resumption of the use of the meter for printing postage.

The service switch may be in an unsecured position in the meter, since the display of the additional values rendered possible by the use of this switch does not affect the security of the meter, and merely enables the display of further values. The fact that it is these values that are being displayed may be shown by distinctive underlining of the display, if desired, and the operation of the service switch 50 partially disables the set postage key 34. It will then not be possible to set a new value of postage in the postage meter when it is in the "service" mode and the interposer will act to block operation of the meter in the service mode. However, the set key may still be used to cause the display of the currently set value.

When the meter is in the service mode, i.e., with the switch 50 operated, and the switch 45 and key 46 activated, the entry into the keyboard of a new value and a code indicating the function of that value, will enable the resetting of the unlock value, low warning postage amount or maximum settable amount, respectively. The "unlock" value is a determined value, for example, one dollar, including and above which the operator should be careful in setting so as to avoid accidental printing of excessive amounts. For this purpose, all values including and above the unlock value require an additional step on the part of the operator, such as an additional depression of the set postage key 34. The display may be provided with a distinctive indication, for example, one horizontal bar, to indicate that the printing wheels have been set but the unlock step, i.e., the additional depression of the set postage key, has not been effected. The completion of the unlock step would be indicated by the display, for example, of three horizontal bars to indicate that the meter is enabled to be tripped, to print postage.

If the descending register does not contain sufficient funds to cover the set amount on the print wheels, the entire display may be caused to blink. On the other hand, if the value stored in the descending register is lower than the low postage warning limit, the decimal point may be caused to blink. The "maximum settable" amount, of course, cannot be exceeded in the setting of any postage.

The meter may also be provided with a "privileged" switch 51 that is normally held in the operate position by a seal. The operation of this switch, following the cutting of the seal, enables the recharging of the meter by post office personnel in a nonremote charging mode.

In addition, the meter is provided with one or more arithmetic function keys 52, enabling a variation of the postage setting amount, such as the addition of further values to the already displayed setting value prior to the depression of the set switch 34. This feature enables the introduction by the operator of further values, such as insurance or the like, without the necessity for manual calculation or calculation on a separate device.

Figure 3:
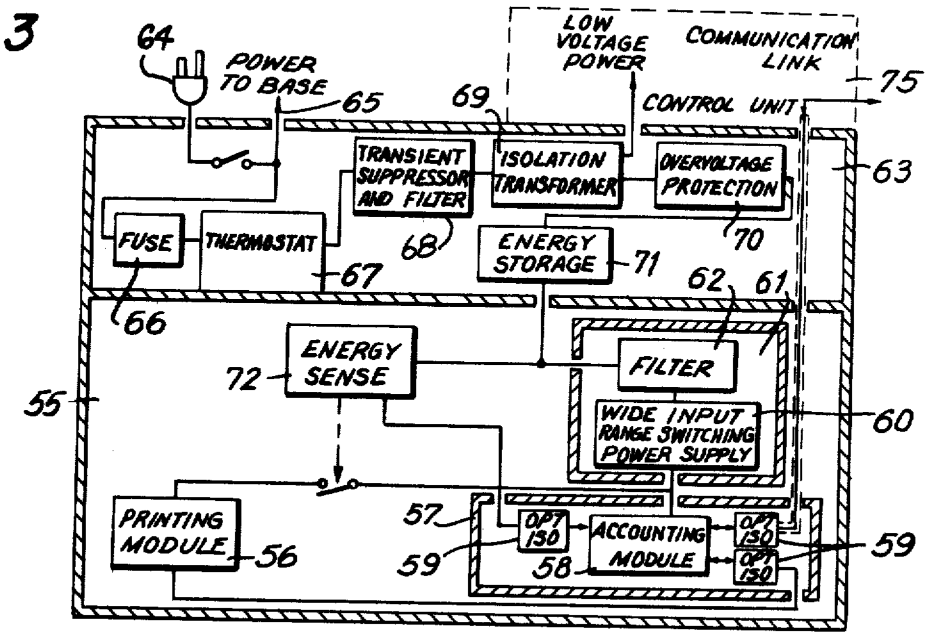
FIG. 3 is a simplified block diagram of the orientation of the elements in accordance with a preferred embodiment of the invention.

The internal components of the postage meter in accordance with the invention are preferably oriented as illustrated in FIG. 3, and include a first compartment 55 that is physically secure, i.e., as secure as is reasonably possible to avoid tampering with internal components thereof. While it may not be possible to provide 100% security in this regard, physical evidence of tampering will be evident in any event before entry can be gained. The compartment 55 encloses the printing module 56, which may include a mechanical printing assembly, and if desired, a separate microcomputer for controlling this module.

The compartment 55 also encloses a further compartment 57, which is preferably electromagnetically shielded, and encloses an accounting module 58. The accounting module is connected to external devices, i.e., external of the compartment 57, only by optical or similar isolation couplers 59 as disclosed in U.S. patent application Ser. No. 918,785 filed June 26, 1978 and now abandoned, in order to avoid damage thereto, either accidental or intentional resulting from introduction of noise, for example, excess voltages into the accounting module. Such coupling is, of course, not provided for the energy source thereof, which extends to a power supply 60 in a separate compartment 61 also within the secure compartment 55. The power supply 60 is energized by way of a filter 62 within the compartment 61, to insure the absence of any voltage variations that would adversely affect the accounting module, the power input to the compartment 61 being directed into the compartment 55 from a power supply system in a further compartment 63 that is preferably defined by the outer secure housing of the compartment 55. Thus, while it is not absolutely necessary for all the elements within the compartment 63 to be physically secure, this feature is preferred.

The power from the mains plug 64 is fed into the compartment 63, from where it may be fed by way of a suitable connection 65 to power the meter base. The power for the meter may be fused in the compartment 63, by means of a fuse 66, applied from the fuse to a thermostat 67 and thence to a transient suppressor and filter 68. The thermostat inhibits application of voltage to the unit in the event of excess temperatures. Further protection for the system is provided by means of an isolation transformer 69 and an over voltage cut-out device 70. The power for the meter is finally applied to an energy storage device 71, such as a large valued capacitor 71, the capacitor 71 having adequate energy storage to enable the self-protection features of the meter to operate, such as to transfer data to a nonvolatile memory, in the event of a power failure. The reduction of voltage may be sensed by a sensor 72 in the secure housing 55, with one output of the sensor being directed to the accounting module for signaling the necessity of a mode change, and another output (which can be mechanical) for inhibiting further printing module functions.

A further output of the isolation transformer 69 may be fed externally of the meter to a control unit 75, and one of the isolated outputs of the accounting module may be directed through the chamber 63 also to the control unit. The control unit 75 may thus constitute a keybord control unit such as illustrated in FIG. 2, including the key switches, displays, etc., necessary for local operation of the device. It is thus apparent that the system of FIG. 3 orients the elements of the postal meter so that elements which are less critical to the security of the postal meter system are provided with successively lower levels of physical and electrical security.

Figure 4:
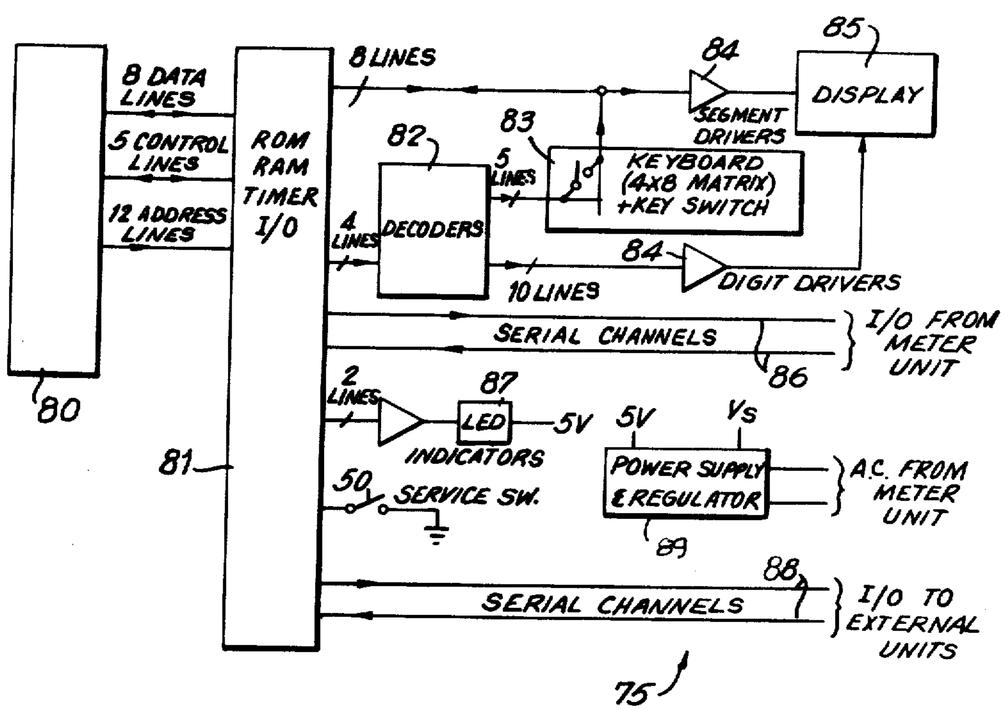
FIG. 4 is a simplified diagram of the circuitry of a control unit for a postal meter in accordance with the invention.

A preferred embodiment of a control unit 75 is illustrated in FIG. 4. This unit, for versatility in design, as well as for minimizing the noncritical elements that must be isolated in the physically secure housing, preferably incorporates a central processing unit 80, for example, of the 6500 series, and connected by way of conventional data lines, control lines and address lines to a multipurpose conventional RAM/ROM I/O timer circuit 81 incorporating read-only memories, random access memories, timing control elements and input-/output interface hardware. By the use of suitable decoders 82, the keyboard 83 may thereby be scanned in the conventional fashion, and by the use of suitable drivers 84 the visual display 85 may be energized, preferably in a multiplexing mode according to conventional practice. The data relating to the depression of any of the keys of the panel may thereby by communicated to the processing unit 80, for the development of a serial input/output on the lines 86 for communication with the accounting module 58 within the secure housing 55. The processor 80 and circuit 81 are responsive to the requirement for operator intervention to recock the trigger mechanism in the base, and the failure to open or close the dater door 28 (FIG. 1) following application of power to the unit, to energize selectively an indicator LED 87 corresponding to the indicators 42 and 41, respectively, of FIG. 2. The service switch 50 may also be connected to the circuit 81. If further input/output device are coupled to the control unit, such as external display devices or control systems, these may be coupled to the unit by way of further input/output lines 88, preferably serial communication paths which may be suitably isolated by opto isolators. The unit may comprise an internal power supply and regulator 89 connected to receive power from the postage meter low voltage power as shown in FIG. 3.

The above-discussed functions under the control of the control unit are thus functions which are not critical in the sense that loss of control or the contents of any register therein will not result in loss to the post office department, or to the user, of funds. These functions have been relegated to the control unit in order that the secure portions of the postal meter include only that programming of the system which must be secure. Additional functions that may be effected by the control unit, such as the additional of sequentially entered amounts may also be controlled by the program of the control unit, since such calculations are not critical to the security of the apparatus, and need not be effected within the physically secure portions of the postal meter. Similarly, the service resettable functions may be effected by the programming in the control unit, since these functions also are not critical to the accounting system and registers themselves. However, to retain these parameters in nonvolatile memory, retention in the accounting unit is desirable.

It will, of course, be apparent that, in a system such as shown in FIG. 4, further arithmetic keys may be provided, without great difficulty, such that the postage meter may be alternately employed also as a calculator.

Alternatively, the central processing unit and its control circuit may be augmented by a calculator chip or the like, connected to the keyboard and display for performing arithmetic functions.

While the control unit of FIG. 4, including all of the functions of the panel shown in FIG. 2 is preferably disposed directly on the postage meter to form a part thereof, it will be apparent that this portion of this system may be physically separate therefrom, or separable therefrom, whereby the postage meter itself may incorporate only the elements that are required to be physically secure.

Since monetary information and control is prevalent in the serial communication employed in the system, a high degree of integrity is mandatory. For this purpose, the system is designed, in the serial transmission communication sections, such that a transmitted bit is returned or "echoed" by the receiver thereof for checking purposes. If the transmitter thereby receives all of the echoed signals satisfactorily, it may issue a "no error" pulse, thereby informing the receiver of the information that the received information is valid.

Figure 5:
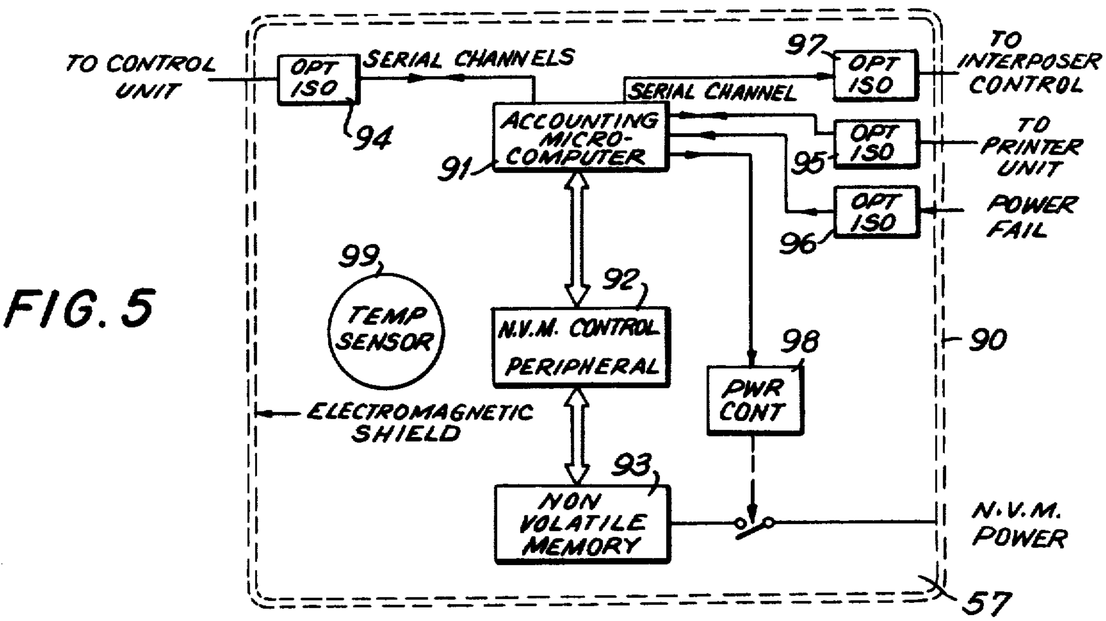
FIG. 5 is a simplified diagram of a circuit for the accounting system of a postal meter in accordance with the invention.

The circuit arrangement of the accounting compartment is shown in somewhat greater detail in FIG. 5, wherein the walls 90 of the compartment are illustrated as preferably forming an elctromagnetic shield. The circuits include an accounting microcomputer 91 having a nonvolatile memory control 92 coupled thereto. The nonvolatile memory control controls the application of stored data between a volatile memory, which may form a part of the accounting microcomputer 91 and a nonvolatile memory 93. The volatile memories, such as random access memories, may function as working ascending registers, working descending registers, and the like. The accounting microcomputer also includes read-only memory control for the necessary accounting routines, as well as control routines. This unit may, in addition, incorporate serial interfaces, to enable its interfacing with the printing and control modules. The microcomputer may, for example, comprise the 8048 series microcomputer from Intel Corporation, Santa Clara, California, with a control circuit in a manner similar to that described above with respect to the control unit 75. In order to avoid damage to the accounting module by electric surges applied accidentally or intentionally, and to eliminate electrical noise induced via groundloops, the accounting microcomputer communicates with the devices external of the compartment 57 by suitable isolators that are not capable of applying voltage surges to the microcomputer. These isolators may, for example, be in the form of opto-electronic couplers, and are also preferably arranged so as to be inaccessible from the exterior of the postal meter. One isolator unit 94 may be provided for the two-way communication path with the control unit. A further isolator arrangement 94 may be provided for the two-way communication with the printer unit, i.e., the printing module 56 of FIG. 3, in particular, the microprocessor circuit thereof. A still further isolator 96 may be provided for applying the power sensing signals to the microcomputer 91. In addition, an isolator 97 may be provided for controlling an interposer (not shown) in the printing module, for example, for mechanically blocking functions of the printer. Such a system is disclosed, for example, in U.S. patent application Ser. No. 024,812 filed Mar. 28, 1979 by R. McFiggans and A. Eckert now U.S. Pat. No. 4,253,015, and assigned to the assignee of the present invention, the disclosure of which is specifically incorporated herein by reference.

The nonvolatile memory 93, at the present state of the art, is preferably in the form of an MNOS memory, which does not require a back-up power source. This memory way, however, alternatively be formed of elements which do require a power back-up, in which case a power control circuit may be employed to apply back-up power thereto external from the compartment 57. The purpose of the power control circuit 98 is to provide power to the MNOS memory for the purpose of effecting its data transfer operation, essentially during power up and power down. The program of the microcomputing unit 91 is organized to enter the contents of the registers of the computer units into the nonvolatile memory as soon as any indication of failure of the power supply occurs, and to restore this data to the working registers upon restoration of the power.

The thermostat 67 in FIG. 3 cuts off power to the meter in the event of high or low temperature operation. This automatically places the meter in its power down cycle, as a result of the power cut-off.

The compartment 57 may further comprise a temperature sensor 99, with suitable circuits (not shown) coupled thereto, such as to the microcomputer, for transferring data to the nonvolatile memory in the event of excess temperatures. The system may further be operative to prevent the operation of the interposer solenoid by way of the isolator 97, in the event of excess temperatures. It will be appreciated that the interposer is controlled by the microcomputer 91 also to inhibit operation of the printer in the event that insufficient postage remains for a printing operation, or other accounting data indicates that the unit should not be operative.

While the isolators have been indicated as individual units, it is, of course, apparent that these units may incorporate multiple devices, so that two-way communication is established in the respective circuits. It is further noted that systems for the transfer of data between volatile and nonvolatile memories are well known, and are disclosed, for example, in copending application Ser. No. 889,627 filed Mar. 24, 1978 and now U.S. Pat. No. 4,224,506.

Figure 6:
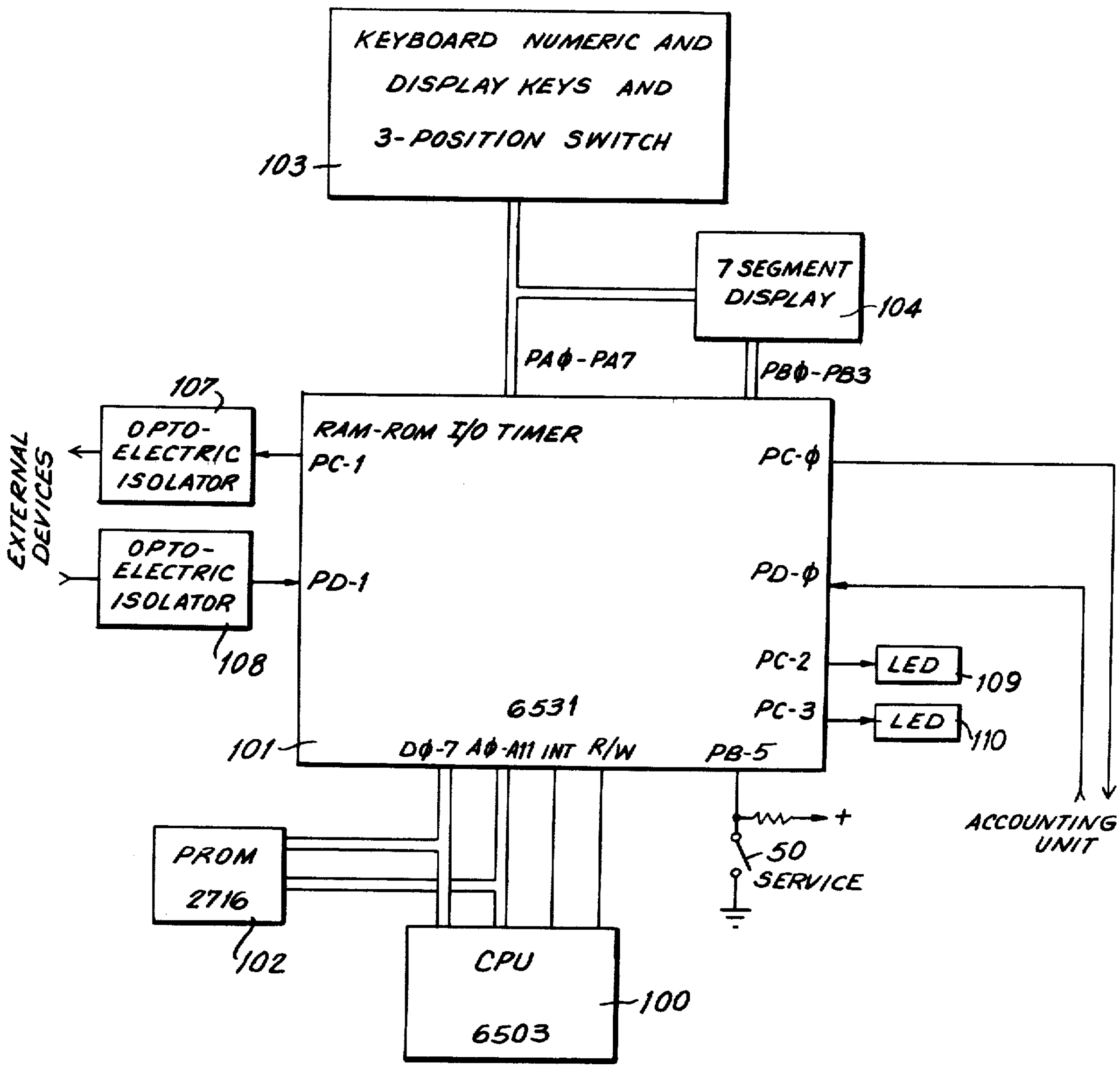
FIG. 6 is a more detailed block diagram of a preferred embodiment of the control unit for a postal meter in accordance with the invention.

Referring now to FIG. 6, therein is illustrated in greater detail a block daigram of a preferred embodiment of a control unit in accordance with the invention. In this figure the blocks have been identified by part numbers and terminals where applicable. This unit is illustrated as incorporating a type 6503 CPU 100 having its data and address lines coupled to RAM/ROM I/O timer circuit 101 as well as to a type 2716 PROM 102, the PROM 102 having stored therein the program for the control unit. Control lines, such as the interrupt line and read/write line may also be connected to the circuit 101. The circuit 101 has a plurality of ports, as will be discussed.

The control unit further incorporates the keyboard 103 including the numeric keys 31, the display keys 35–40, and the three-position switch 45 shown in FIG. 1. This unit also includes the add-through key 52 and the set postage key 34. All of these keys and switches are connected in a matrix to the circuit 101, in conventional manner, to permit the scanning of the keys and switches in accordance with the program, to detect a key or switch closure. The eight-line port A, as well as four lines of port B of the circuit 101, are also connected to the seven-segment display panel 104 for multiplexed display in the conventional manner. The circuit 101 is further connected by a pair of serial ports for communication to and from the accounting unit. In addition, a pair of further serial ports enable communication to and from external devices, by way of opto-electric isolators 107 and 108, respectively. Another output port of the adaptor is connected to LED 109 for indicating on the display panel that the dater door has not been closed. A further output port is connected to an LED 110 on the display panel for indicating that the operator's intervention is required to recock the trigger mechanism on the base. Finally, another port is coupled to the service switch 50, to enable the functions of the postal meter in the service mode.

In the preferred embodiment of the invention, the program of the control unit is directed to servicing of the keyboard unit, display panel, etc., so that the control functions and storage of data are effected primarily in the accounting unit. The program thereby includes those functions necessary for the scanning of the keyboard, multiplexing of the display, formatting of signals for communication with the other units, and with external devices, etc., so that any new information may be passed on to the accounting unit.

Figure 7:
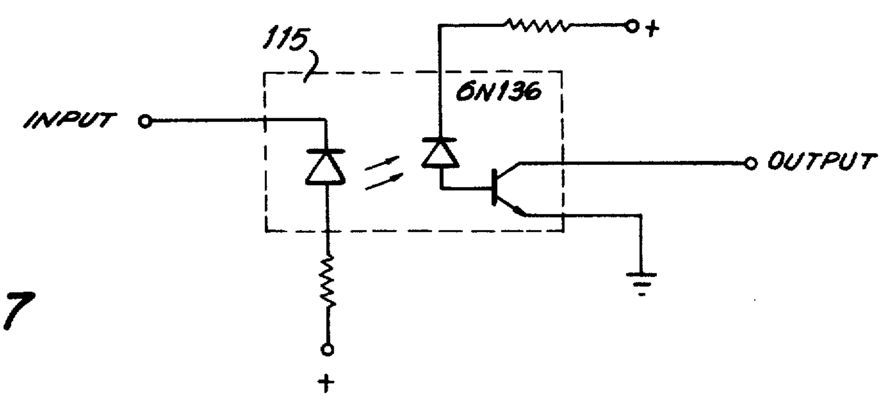
FIG. 7 is a circuit diagram of an opto-electric isolator that may be employed in the present invention.

A typical opto-electric isolator is shown in FIG. 7, this constituting primarily a conventional 6N136 device 115 including a solid state emitter for producing optical signals for reception by a photodiode, the photodiode being connected in the base circuit of a transistor amplifier.

Figure 8:
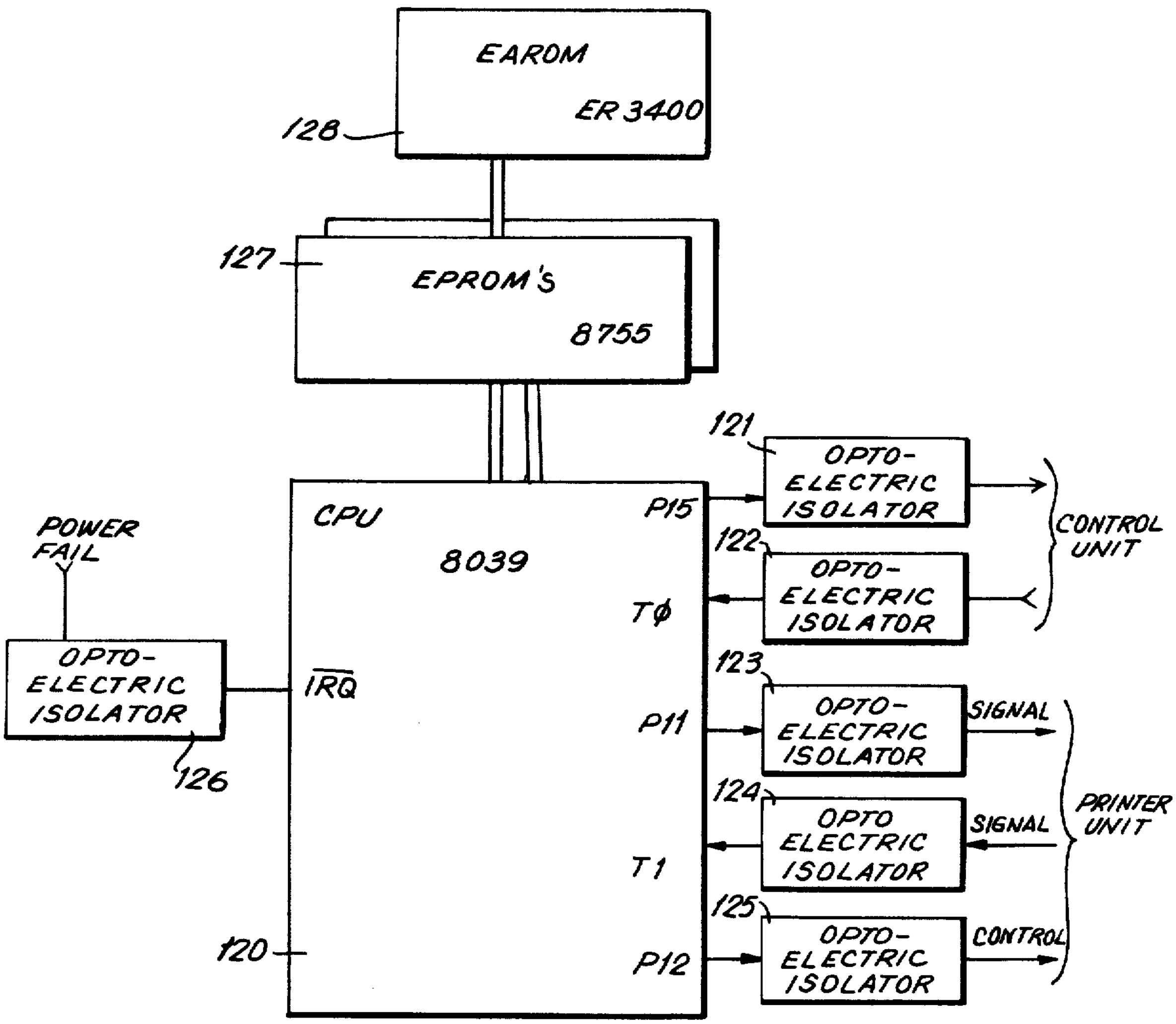
FIG. 8 is a more detailed block diagram of a preferred embodiment of an accounting unit in accordance with the invention.

A block diagram of a preferred example of the accounting unit is illustrated in FIG. 8, wherein a type 8039 CPU 120 is shown to communicate with the control unit by way of opto-electric isolators 121 and 122, and to communicate serially with the printer unit by way of opto-electric isolators 123 and 124. The opto-electric isolators 121 and 122 within the accounting unit thus may be connected directly to the corresponding leads of the control unit. The isolators 123 and 124 may be connected directly to the printer unit signal channels, since no further isolation devices are necessary for this purpose. In addition, a control opto-electric isolator 125, for controlling an interposer or the like in the printing unit may be connected to a further port of the CPU 120. Signals corresponding to a pending power failure are further fed to the interrupt port of the CPU 120, by way of opto-electric isolator 126. It is thus apparent that all signal and control to and from the accounting unit must be directed by way of opto-electric isolators, in order to insure the electrical and physical integrity of this unit. The accounting unit further includes a plurality of PROMs 127 coupled to the address and data lines of the CPU 120, each PROM 127 for example, being a E-PROM type 8755. This unit is connected to an electrically alterable read-only memory (EAROM) 128, for example, a type ER 3400, serving as a nonvolatile memory to store data at times during which the power supply to the postage meter has failed, or has been intentionally disconnected. The working memory for the accounting system, including the registers for storing all operational data, are provided in the CPU 120, this data being transferred to the electrically alterable ROM 128 at such time that a reduction of power is sensed. In order to insure the complete transfer of data, storage capacitors may be connected in conventional manner to store adequate power to insure the proper functioning of the circuit until the transfer of data has been effected.

Figure 9:
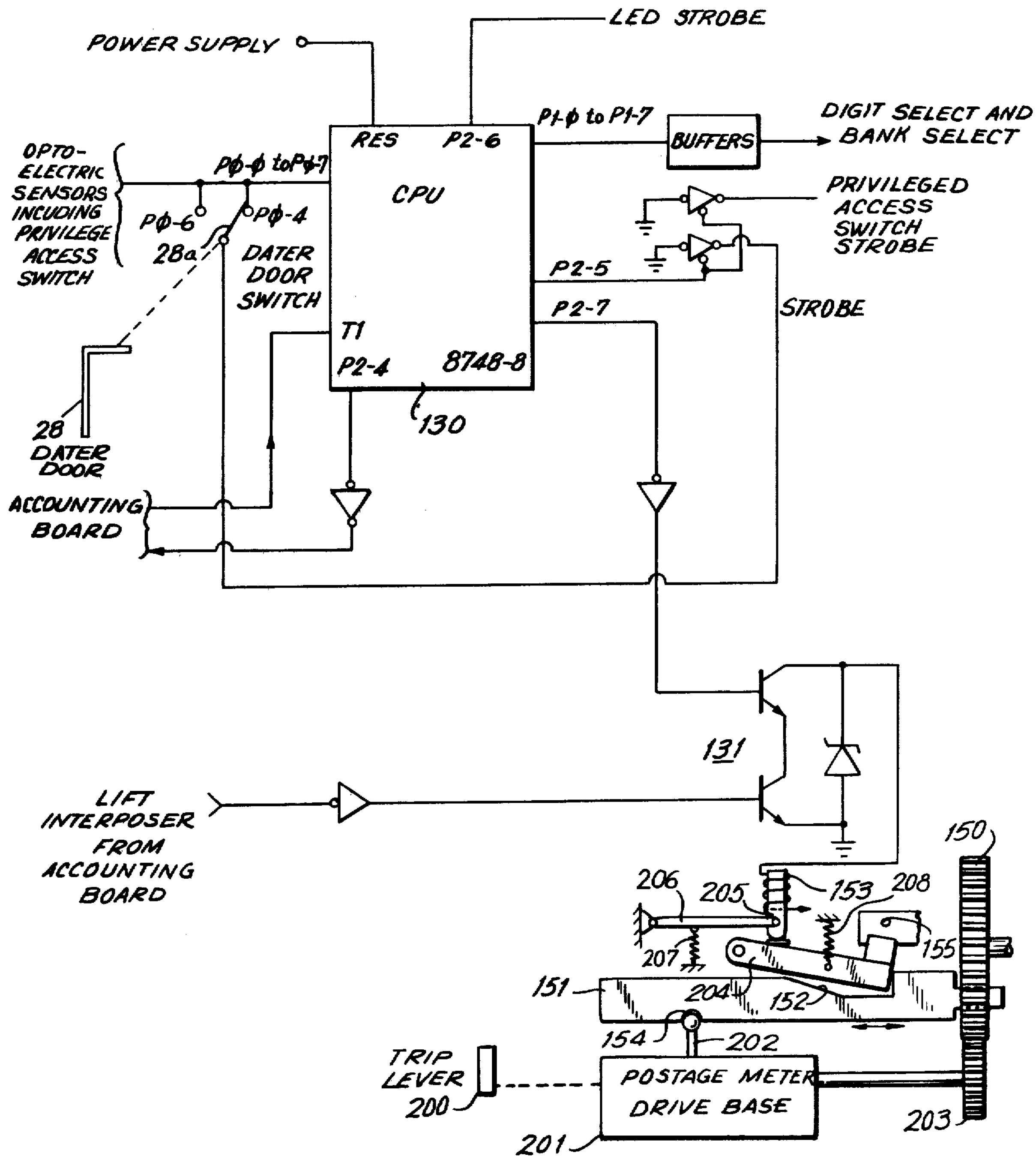
FIG. 9 is a block diagram of a preferred embodiment of the electrical system of the printing unit of a postal meter in accordance with the invention.

A preferred example of the circuit of the printing unit is illustrated in FIG. 9, this circuit consisting primarily of the CPU 130, for example, a type 8748-8, the CPU being connected by way of suitable buffers where necessary, to the I/O devices within the printing unit itself. The mechanical and opto-electric sensing systems in the printing unit are conventional and may be generally of the type disclosed, for example, in U.S. Pat. No. 4,050,374 and aforementioned U.S. Pat. No. 4,253,015, the disclosures of which are specifically incorporated herein by reference. Thus, the CPU is connected to a plurality of opto-electric sensors (not shown) for sensing of the positioning of the print wheels, these lines also being connected to enable the sensing of the privileged access switch 51 of FIG. 2. The privileged access switch 51 is located within the printing unit and is accessible only by way of a door sealed by the post office. These lines of the CPU are further connected to sense the position of the dater door, the dater door switch and privileged access switch being strobed by way of a further output of the CPU 130. The LEDs for the optical sensors are strobed at the proper times by way of another output of the CPU 130, and still further outputs of the CPU enable the stepping of the bank and digit stepping motors for the print wheels. In addition, the CPU 130 has a pair of ports for serially communicating to and from the accounting unit. Further, the interposer output from the accounting unit, and another output of the CPU 130 control a pair of transistors 131 for energizing the interposer solenoid, whereby the interposer solenoid 153 is not energized until all the preconditions are met both in the accounting unit and the printing unit. As a result, a printing cycle cannot commence unless the physical and electrical conditions in the meter are correct for normal printing. In the printing unit, it is therefore evident that the program is provided within the CPU itself.

Postal meters of the above-described form may be provided with several modifications. For example, in one modification, a remote charging feature is available whereby the key is provided for operation of the three-position charging switch on the keyboard. The operator of the unit may thus be provided with suitable combination for entry into the keyboard, to enable remote charging (i.e., away from the post office). In such units the privileged access switch is omitted.

In a further modification, the three-position recharging switch on the keyboard may be controlled by a simple knob, without the necessity of a key. In this type of a system, the meter may be manually recharged at the post office, but the service functions may be effected locally in a manner similar to that of remote recharging system type units.

In other words, recharging of a postal meter of the above type can be effected locally, if devices are provided with a key for the three-position switch, in which event further security is required as will be discussed later. On the other hand, in postal meters having a simple knob switch instead of the key switch, the "privileged access", sealed at the post office, is provided for manual recharging.

In the normal mode of operation of the system, as above discussed, the six display keys, when depressed, effect the display on the display panel of the six parameters above noted, i.e., the total in the ascending register of all postage that has been printed, the total remaining in the descending register of postage available, the control sum, the total number of printing operations of the meter, the value of postage printed and the number of pieces that have been printed since the last batch clear operation of the associated registers. The depression of these keys results only in the number of concern being displayed for a timed period after the key is released, for example, two seconds following which the display will return to the postage setting.

In either type of meter, if the service switch is placed in the service position, with the three-position switch still in the operate position, the display function of the display keys will be different. Thus, depressions of the "postage used" key 35 will now result in a display of the current value set in the dollar unlock register in the machine, at or above which an operator cannot print postage. Postage values above this value require an additional depression of the set postage key for operation, in order to avoid accidental printing of excessive postage values. Depression of the "postage unused" key 36 will now result in a display of the value in the low postage warning register at which a warning should be given that the contents of the descending register are below a determined amount. Depression of the control or "postage sum" key 37, will now result in the display of the serial number of the postal meter. Depression of the "piece count" key 38 will now result in a display of the diagnostic status of the meter. This display provides an indication to the serviceman of possible misfunctions. A depression of the "batch value" key 39 will now result in a display of the maximum settable amount, i.e., the maximum amount set internally within the meter, above which the meter cannot set the print registers. Depression of the "batch count" key 40 will have no effect in the service mode.

The three-position switch is used to effect recharging of the meter or to effect the change of values in the registers concerned with dollar unlock value, the low postage warning amount and the maximum settable amount.

With the remote recharging feature, positioning the three-position switch in either the "enter combination" or "enter amount" positions enables the customer to enter a combination or amount respectively into the meter via the keyboard with indication on the display. When the three position switch is controlled to leave this position, the display value is entered into the accounting unit and the display is blanked for the next entry. Return of the three-position switch to the operate position will cause the accounting unit to complete the recharging routine and return the meter to normal usage with the recharging amount added to the postage unused register. The combination for the remote recharging feature is obtained from a remote data center and is a random or pseudorandom number which changes with each recharging for security reasons.

For meters with the manual recharging feature, the recharging mode is effected by breaking the seal of the privileged access door, and flipping of the privileged access switch. The same sequence of operations of the three-position switch described above for recharging the meter are followed as in those meters having the remote charging feature. In the manual recharging system machine only post office personnel are permitted to effect the change. The combination is a fixed number known only to the post office and is stored within the meter. Normal operation of the meter may proceed once the privileged access switch has been returned to its operate position.

To change values in the registers concerned with dollar unlock value, the low postage warning amount and the maximum settable amount, the serviceman would place the meter in the service mode by placing the service switch in the service position. The three-position switch is used as described above for the entry of combination and amount values. The meter will interpret the combination value to indicate which register is to be changed.

For the remote recharging system meter and the manual recharging system meter if an error has been made in entry, the occurrence of this error will be counted, as constituting evidence of tampering with the machine. When a determined number of such errors have been made, for example, 9, since the last setting of the meter, then the function of the machine is recharging postage will be inhibited. The return of the meter to operating status in such circumstances may be effected at the post office. A discussion of the means to return the meter to full operating status is not of consequence to the present invention and relates to the security of the meter.

As above discussed, each of the three units of the postal meter has a microprocessor with a read-only memory defining a given program, and the communication between the units is effected serially and asynchronously. This is achieved in the first place by providing each of the computer systems with a crystal controlled clock. Further, the signals are defined such that the transitions thereof are closely controlled, whereby it is insured that, if a signal is present, it must be present within a given time period. As a still further insurance of the correctness of communication, the bits of a signal are returned to a transmitter as soon as they are received, for error checking at the transmitter, whereby a "no error" bit may be transmitted immediately following a data message if the data has followed correctly.

The program of the control unit responds to the status of the postal meter with respect to determined parameters. A register in the microprocessor of the accounting unit holds meter status information, for example, of two bytes, the bits of which digitally indicate if the meter trip mechanism requires recocking, if the dater door has not been opened following the last application of power or is presently open, if there are insufficient funds to allow printing of the amount set in the print wheels, if the low postage value has been reached, if the meter is in a service mode, if the meter is enabled, if the batch registers are clear, if a trip has been completed, or if various types of errors have occurred. The status message associated with these bits is not the same as the diagnostic message noted above that is employed in the service mode. The accounting unit keeps the control unit informed of the current status by transmitting a status message to the control unit after power has been turned on and, thereafter, whenever a change in status occurs. The control unit responds to all such messages by insuring that the display on the meter is consistent with the status message as above discussed. These later steps may include, for example, the display of a row of decimals in the event of certain errors, the flashing of the decimal point in the event of low postage funds, the flashing of the entire display in the event of insufficient postage, and the displaying of underscores in the place of blanks if the meter is in the service mode.

An interrupt program in the control unit interrupts the main program of the control unit at regular intervals in order to scan the keyboard and keyswitch, and to drive the display. In order to prevent the display of spurious characters which can be produced by sneak currents when more than one key is pressed, the interrupt program will cause the display to go blank instead. Such values as relate to time, keyboard, and keyswitch are maintained by the interrupt program for use by the main controller program.

The main program for the control unit includes the initializing steps, program steps for the transfer of messages back and forth between the accounting unit and external devices, and control of the timed display, the checking of the status message to insure that dater door and reset base lights are lit in accordance with the status, responding to the reported positions of keys and the three-position switch to ascertain changes of state therein so that the control unit subroutine which corresponds to the function defined for such a state or change of state will be executed.

The program of the accounting unit includes initialization procedures to insure that the working registers are brought up to date, and that no postage has been printed that has not been accounted for, as well as a power down processing program to effect the transfer of data to the nonvolatile (electrically alterable) memory in the event that the power is shut down or is failing.

The main program of the accounting unit effects the transmission of the meter status message to the control unit upon request or change in status, determines the effect of any currently entered postage value on the funding data currently registered and makes any necessary variations in the status message. The main program also controls the timing in the accounting unit for receiving messages from the control unit and the printer. The accounting unit program further includes subroutines for processing of signals in the bringing of the registers up to data when postage is to be printed, and for controlling the operation of the system when the meter is tripped. A further subroutine controls the bringing of the meter status message up to date. In addition an error checking routine which involves cyclical redundancy checking is programmed in the accounting unit software. This will be described in further detail below.

The program of the printer unit includes a main program having initializing steps, steps for scanning the sensors and controlling the strobes for the LEDs of the sensors, and the processing of messages for communication with the accounting system. Subroutines are provided for the setting of the postage wheels, to determine if sensor readings are proper, and to determine if any changes have been made in the outputs of the various hardware sensors and switches such as the privileged access and the dater door switch.

With respect to the program for setting the display unlock value, maximum settable amount and low postage amount, as discussed above, the keys effective for such setting in the above-described manner are matrixed in the keyboard and scanned periodically to determine if a change in the status has been effected. The scanning position also occurs with respect to the service switch, in the control unit, whereby the control of any of the keys and switches is communicated to the accounting unit for storage therein and processing. For example, if the service switch is set to its ON position, then the scanning, which is also effective with respect to the three-position switch, enables as a display routine, to enter combination routine or enter amount routine, in dependence upon the position of the three position switch.

In the display sub-routine, the data in a register corresponding to a depressed display key is sent to the control unit for display. In the enter combination sub-routine, the next entry into the keyboard is stored, so that the value entered into the keyboard when the three-position switch has been turned to the enter amount position will be entered into the corresponding register in the CPU of the accounting unit, whereby the thus entered value will be effective in future operation of the machine in normal operating procedures. It is, of course, apparent that the testing of the set values during normal operation is effectively made with respect to a value range, for example, a range of postage values less than or greater than the stored amount, so that the necessary indication can be given. The term "indication" as employed in this sense refers to the display. When the entered postage value exceeds the maximum settable amount, the entered value is ignored, and the display returns to its original postal value. The service settable features as above disclosed may also be considered to effect the control of the postal meter to different states, such as a non-operative state, when the maximum settable value has been exceeded, a low value warning state when the low value indication is flashing, and a dollar unlock value state requiring an additional depression of the set key when the amount set in the display exceeds this stored value.

With further respect to system diagnostics, briefly referred to above, two basic error checks are provided in the software routine of the meter. These two checks are termed fatal and procedural, respectively. Under the category of fatal error checks, two sub-categories are defined. These two sub-categories are termed hard and soft, respectively. Hard errors are determined by monitoring hardware sensors, such as the bank and digit select sensors, interposer position sensors, shutter bar sensor, and the like. A failure of these sensors to provide proper readings will be termed a fatal hard error, will lock up the meter and will be non-recoverable upon power-up. Central authority intervention will be required to permit further operation of the meter.

Another example of a fatal hard error is a resulting non-compare from a cyclic redundancy check. Each data register is continually monitored. Using standard polynomial techniques, a cyclical redundancy remainder is calculated for each updated data register value. When a power-down cycle is initiated, the contents of each data register and its associated cyclical redundancy remainder is transferred to non-volatile memory. Upon power-up, the cyclical redundancy remainder of each data register is again calculated and compared to the cyclical remainder previously calculated upon power-down. A non-compare will produce a fatal hard error.

Fatal soft errors relate to the intercommunication capability of the meter units. Thus, communication errors between internal units such as the accounting, printer and control units will be sensed, based upon the bit retransmission previously described. In addition, communication time-out functions are provided, so that the failure of a unit to communicate within a specified period will also produce a soft fatal error. Soft fatal errors will block meter operation. Unblocking can be effected by recycling the meter; that is to say, the meter is turned off, then on again, thereby causing recycling and clearing the error. The power recycling will be counted in a data register and, as noted above, upon reaching a predetermined number, could cause total lock up if desired. In other words, a predetermined number of soft fatal errors equals a single hard fatal error.

Procedural errors, such as improper, for example, (high) value entries, or an attempted improper procedure, manifest themselves as visual flags on the display.

Other diagnostic checks, as well as variations as set forth above, may be easily accommodated within the software routines implemented herein.

By allowing data to be communicated between units on a message basis, serially, and by employing the "echo" technique previously described, the implementation of the foregoing error checking capability is achieved expeditiously.

As above discussed, the inter-unit communication is serial channel, bit synchronous, character asynchronous, start/stop communication, for example at 9600 baud. The communication is solely on the basis of messages, i.e., separate control lines are not provided between the units for control of the communications. This type of communication is also provided for with respect to communications between the control units and external devices. The messages are 10 bits long, each including a start bit followed by an 8 bit word, or byte, and terminating with a stop bit. The last stop bit of a message has a sense opposite to that of all other stop bits of the message, in order to indicate the end of the message. A logical zero is indicative of a start bit, an end of message bit, and a data zero or low. A logical one is provided for a request to send, a clear to send, an end of byte, a data one level, and also as the presence of a no-error pulse. The first word of any message has a coded two-bit field stating whether the message contains information, data or control functions. Another bit of the first word indicates whether or not the message concerns the display only, or if it only concerns the accounting unit. The remainder of the bits of the first word are specific message identification bits.

If the messages have more than one word, the second word of the message may contain a format byte, consisting of two nibbles, i.e., four-bit groups. The first word of any message has a coded two-bit field stating whether the message contains information, data, or control functions. Another bit of the first word indicates whether or not the message concerns the display only, or if it only concerns the accounting unit. The remainder of the bits of the first word are specific message identification bits.

If the messages have more then one word, the second word of the message may contain a format byte, consisting of two nibbles, i.e., four-bit groups. The first nibble tells the number of nibbles of data in the message, and the second nibble gives the number of digits to the right of the decimal point of the data, or corresponds to a hexadecimal F if there is no decimal point.

When a message is ready to be sent by a unit, the receive line of the unit is first tested. If it is low then the transmitting device raises its send line to a high, and again tests the receive line. If it is still low, the unit is free to transmit, otherwise, it must become a receiver. This avoids contention between two units. With respect to units of the postage meter itself, the programs of the different units, in the event of possible contention, give priority to the printer unit, accounting unit, control unit or external device in descending order. When external devices are interconnected with the postage meter, i.e., to the control unit, the control unit is given priority.

Figure 10:
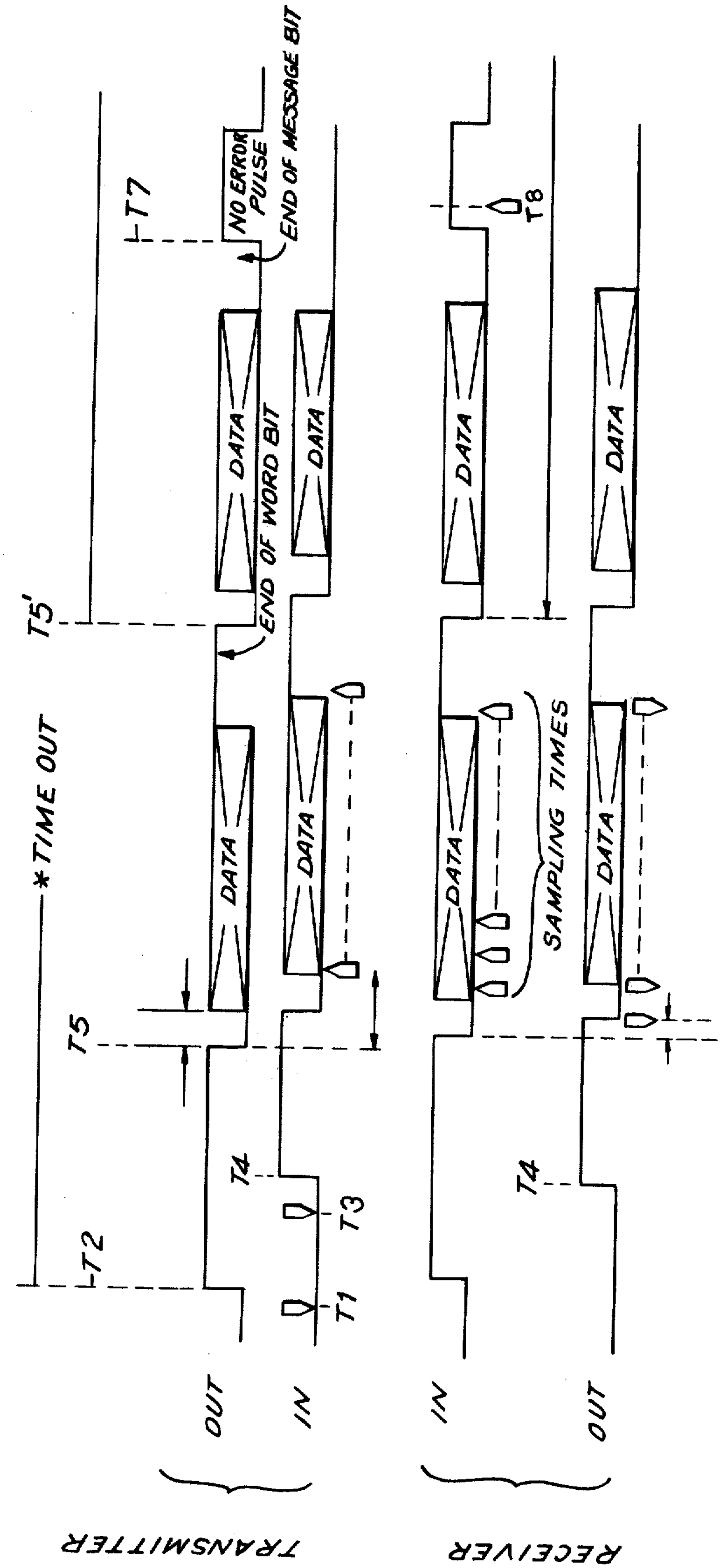
FIG. 10 is a timing diagram illustrating the re-communication operation of the invention.

The timing of the messages constitutes the crux of the communication system whereby the messages may be asynchronous. Typical timing is thus illustrated in FIG. 10, which illustrates the relative timing of the lines of the transmitter for sending a given message, and on the lines of a receiver for receiving the same message. Since the transmitter output line is the same as the receiver input line, it will be evident that these two signal lines are identical. The same is true, of course, with respect to the transmitter input line and the receiver output line.

In a successful transmission system of this type, the transmitter tests its input line at time $t_1$ and, if a low is detected, raises its output line to a high within 50 microseconds, as shown at $t_2$. The transmitter then again tests its input line at time $t_3$ within 50–100 microseconds. If the input line is still at a low then the transmitter can start to send its message at time $t_5$ following a minimum wait of 120 microseconds, by the lowering of this output line to form the start bit of the message. In the meantime, at time $t_4$, the receiver has raised its output line to a high level in a minimum of 100 microseconds indicating it is ready to receive data. This indicates a "clear to send" condition. The timing between the succeeding bytes of a multibyte message, as indicated by the time interval between $t_5$ and $t_5'$, is 1134.375 minimum, in order to insure that the receiver has enabled to effect proper reception and storage of the signals.

The time from the beginning $t_5'$ of the last message byte and the transmission of a no-error pulse at time $t_7$ is set at 1031.25 to 1157.291 microseconds, and the no-error pulse has a width from 309.375 microseconds to 368.228 microseconds. The receiver must test for the occurrence of a no-error pulse at time $t_8$ from 1187.291 to 1340.625 microseconds following the initiation of the start pulse of the last byte of the message. The transmitter bit transitions must be in accordance with table I, and the receiver sampling of the data and stop bits must be in accordance with the timing illustrated in table II.

TABLE I

| n | BIT | MINIMUM | MAXIMUM |
|---|---|---|---|
| 1 | START | φ | φ |
| 2 | DATA 1 | 1φ3.125 | 1φ5.2φ8 |
| 3 | DATA 2 | 2φ6.25 | 21φ.417 |
| 4 | DATA 3 | 3φ9.375 | 315.625 |
| 5 | DATA 4 | 412.5φφ | 42φ.833 |
| 6 | DATA 5 | 515.625 | 526.φ42 |
| 7 | DATA 6 | 618.75φ | 631.25φ |
| 8 | DATA 7 | 721.875 | 736.458 |
| 9 | DATA 8 | 825.φφφ | 841.667 |
| 1φ | STOP | 928.125 | 946.875 |

TABLE II

| n | BIT | MINIMUM |
|---|---|---|
| 1 | START | — |
| 2 | D1 | 115.2φ8 |
| 3 | D2 | 22φ.416 |
| 4 | D3 | 325.624 |
| 5 | D4 | 43φ.832 |
| 6 | D5 | 536.φ4φ |
| 7 | D6 | 641.248 |
| 8 | D7 | 746.456 |
| 9 | D8 | 851.664 |
| 1φ | STOP | 956.872 |

With the above timing, and the use of crystal control for the clock of each of the units, asynchronous transmission is thereby feasible so that control leads for this purpose between the units are unnecessary.

Further, in accordance with the invention, in order to insure that the information is correctly received by the receiver without error, the data is sequentially returned to the transmitter on the receiver output line. The times for the retransmission of the data, from the beginning of the instruction loop detecting start bit, are given in table III, and the times for sampling this data on the input line to the transmitter are given in table IV.

If, and only if the received data at the transmitter is the same as the sent data, will the no-error pulse be transmitted at the end of the message.

As a further control over the message communication, the transmitter will wait for 3.5 milliseconds for a clear to send signals from the receiver after presenting a request to send transmission, and similarly, the receiver will wait for about 3.5 milliseconds maximum for the start of a message after presenting the clear to send message. Contention between units is further minimized by setting determined periods that must be existent between adjacent transmitter activity of a unit, as well as between adjacent receivers.

TABLE III

| n | BIT | MINIMUM | MAXIMUM* |
|---|---|---|---|
| 1 | START | 32.φ83 | 73.125 |
| 2 | D1 | 137.292 | 176.25φ |
| 3 | D2 | 242.5φφ | 279.375 |
| 4 | D3 | 347.7φ8 | 382.5φφ |
| 5 | D4 | 452.917 | 485.625 |
| 6 | D5 | 558.125 | 588.75 |
| F | D6 | 663.333 | 691.875 |
| 8 | D7 | 768.542 | 795.φφφ |
| 9 | D8 | 873.75φ | 898.125 |
| 1φ | STOP | 978.958 | 1φφ1.25φ |

*Allows 1φ usec for program loop uncertainty in detecting start pulse. If uncertainty is greater than 1φ usec the excess should be subtracted from each maximum value.

TABLE IV

| n | BIT | MINIMUM | MAXIMUM |
|---|---|---|---|
| 1 | START | 1φ3.125 | 135.2φ8 |
| 2 | D1 | 2φ6.25φ | 24φ.416 |
| 3 | D2 | 3φ9.375 | 345.625 |
| 4 | D3 | 412.5φφ | 45φ.833 |
| 5 | D4 | 515.625 | 556.φ41 |
| 6 | D5 | 618.75φ | 661.25φ |
| 7 | D6 | 721.875 | 766.458 |
| 8 | D7 | 825.φφφ | 871.667 |
| 9 | D8 | 928.125 | 976.875 |
| 1φ | STOP | 1φ31.25φ | 1φ82.φ83 |

All control and data signals utilize the same pair of conductors in each direction with precisely defined timing for control.

For providing external control, the control flow is in one direction and information flow in the other direction.

All control of the meter and all information inside the meter can be controlled by connection through an interface connector along lines 88, FIG. 4. All functions performed by the meter are controllable electrically from a remote location, except purely local manual functions such as power on and date change. This results from the communication capability of the data units. The software routine will scan for the presence of an external control device, and permit subrogation of control to such external device upon recognition of its validity. The organization of the three units results in a flow of commands or control of data from the control unit to the accounting unit and then to the printer unit. A new value of postage, and where it is to be set, is one example of such data and command. The flow of information is in the opposite direction, such as, for example, a current register value of the like. Within this concept, connection of an external device, such as an electronic scale into the control unit, can operate to place commands or data control instruction information into the meter. The interface operation allows the external device to take control of the meter, including the disabling of the keyboard of the control unit, if desired. The external device interfaces with the meter on a message basis. The external device can send messages to be displayed, or can send messages requesting the contents of the display. The control unit programming will permit the external device to send a message disabling the keyboard, thereby implementing the subrogation function. One specific advantage of the foregoing arrangement is that the control unit may be physically replaced by an attached external operating device, without any changes in the accounting unit or the printing unit, either in hardware or software.

Figure 11:
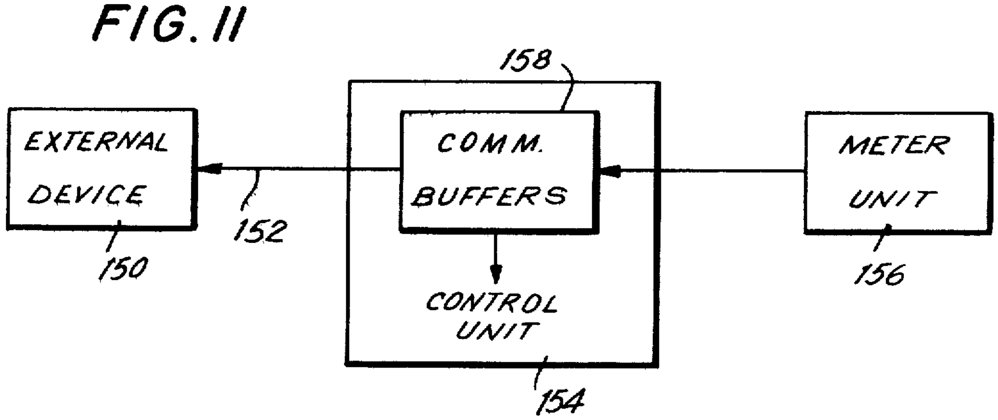
FIG. 11 is a logic diagram illustrating transmission from the meter.
Figure 12:
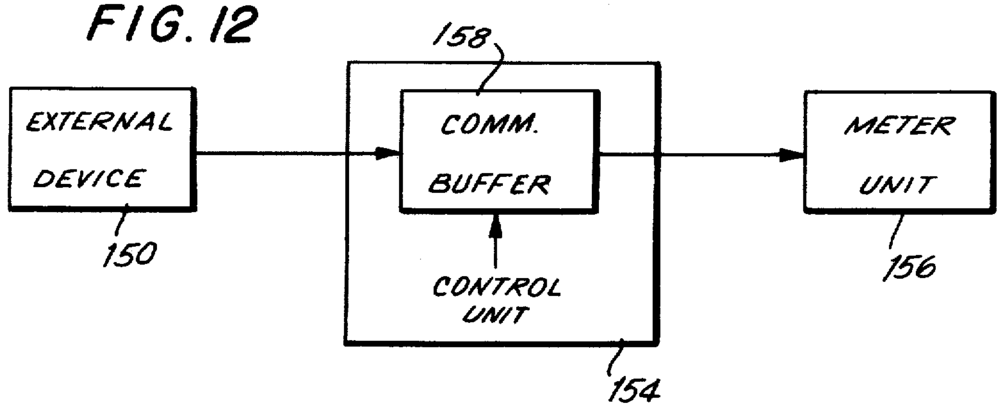
FIG. 12 is a logic diagram illustrating transmission to the meter.

The external device can include a plurality of operating devices, such as a scale and a remote display. The control unit microprocessor can be used to function as a message buffer to allow for flexibility in the development and use of external devices. External devices may include weighers, displays, or other type of device normally interfacing with meters of the type disclosed herein. The software provided in the control unit can be implemented for this function. As shown in FIG. 11, an external device 150 may be used to replace or supplement the control unit function. The external device 150 is preferably coupled through a connector 152, which may be a standard nine pin connector, to the meter control unit 154, and receives messages from the meter unit 156. The schematic illustration of the meter unit 156 includes the accounting unit and the printing unit, as previously described. The control unit includes communication buffers 158 which will logically direct communication from the meter unit 156 to the external device 150 or locally to the control unit 154. The opposite effect is shown in FIG. 12, wherein external devices may communicate with the unit through the communications buffer. The effect is similar in that the buffer will receive messages from either the external device 150 or locally from the control unit 154.

Figure 13:
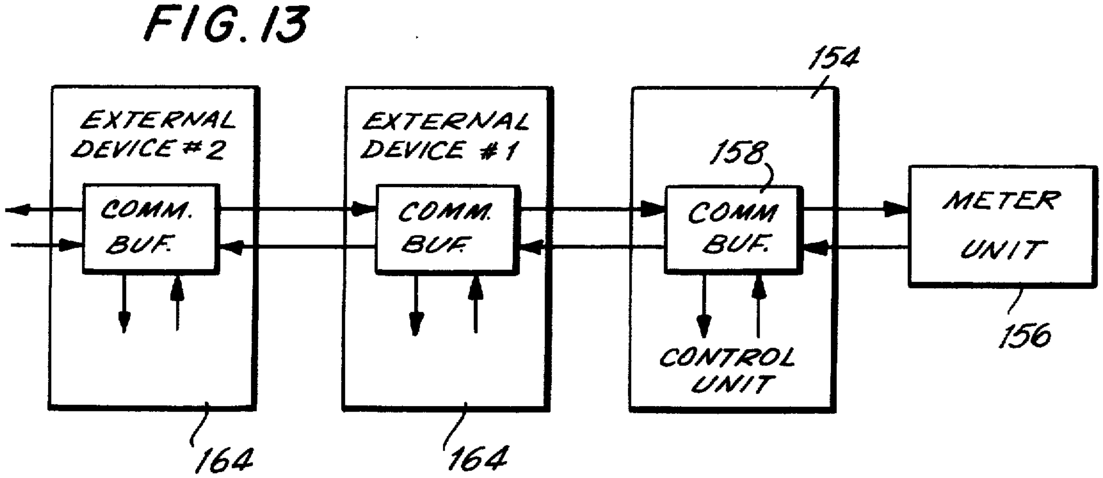
FIG. 13 is a diagram illustrating multiple external devices daisy chained to the meter.

In FIG. 13 a plurality of external devices 164 are shown, interfaced through the control unit 154 into the meter unit. Each external unit may be provided with its own control key for initiation of messages. Each external device could include a communication buffer as part of its software to permit operation of the external devices in a daisy chain manner. Appropriate messages can include complete subrogation of the control unit logic to the external device. The control unit programming is designed to permit such operation.

Regarding external device operation, information flows in two directions, either inbound towards the meter or outbound towards the external device. Control signals and requests, defined generally as controls, flow inbound towards the meter. Informational data flows outbound. Normally, on the inbound leg controls originate in the control unit. However, in accordance with this feature the invention will let an external device 150 issue commands right through the control unit to the meter unit. Conversely, informational data on the outbound leg, from the meter unit (accounting) comes to the control unit 154 and is repeated on the external device line 152 to the external device 150 if an external device is present. The presence of an external device 150 is determined by whether or not it responds with a clear to send signal. If not, the output on the line 152 goes off after a pre-set time period (times out) and the meter continues to function normally. This ability to pass information through the communication buffer in the control unit allows the advantage of placing external devices thereon. The external device may be constructed in the same manner, with a communication buffer, as shown in the control unit, such a device may, in turn, have an external device coupled thereto. Thus, a daisy chain of external devices 164, as shown in FIG. 13, can be provided. The only limitation on the number of external devices which may be daisy chained in this manner would be system tolerance and time out restrictions.

It is a further feature of the invention to provide external devices to give certain commands to the control unit itself, which commands do not necessarily need to go into the accounting module, such as the ability to write a message to the display of the control unit, or to read a message from the display of the control unit, or to command the control unit to disable its keyboard and the rotary three-position switch. In so doing, the communication buffer responds to a bit in the beginning of the digital transmission message sequence, or header, and directs whether the message is to go to the meter unit or the control unit. This bit, which has an assigned location in the header, as described above, is assigned a "1" in that position if it is a message to or from the control unit and a "0" if it is a message to or from the meter unit. In this manner, the control unit, when it receives a message from the external device, can examine the header and from this bit determine whether the message is for the control unit or for the accounting unit. If it is for the control unit, it stops the message and takes the appropriate action. If it is not for the control unit, the message is relayed to the meter unit. The control unit can provide a direct reply to the external device without involving the meter unit at all, for example, in response to receipt of a message to read the display. The control unit does not retain the last meter status message received. Thus, when a keyboard disable command is received, for example, the control unit will request a meter status message from the accounting unit. When the control unit gets the response, it will insert a bit into the meter status message to indicate whether the keyboard is enabled or disabled. Once disabled the control unit will continuously indicate a disabled state in the status message, until reset by receipt of a keyboard enable command, or until power is turned off and on. The keyboard will always be in the enabled state on a power up condition.

The meter is thus capable of interfacing directly with external devices, something that is difficult to impossible to accomplish with present meters.

Summarizing the above, the control unit is provided with a connector for bi-directional communication with a variety of external devices. This enables the external devices to access meter information, such as register readings, piece count, and current value selection. In addition, an external device can control the meter to the same extent that the operator could from the keyboard.

The meter can be equipped with an attachment to automatically record and charge-back postage to various departments based on identification information entered by the operator at the start of each mailing run. The meter can be used with a display/receipt printer, providing the customer with a visual indication of the value on the meter and/or a receipt upon payment of postage. The meter can be used with customer-provided devices, such as a computer terminal or minicomputer system for real-time data capture, as in parcel operations for additions of postage to an addressee's bill.

The relative ease of interfacing to the meter of the present invention suggests further possibilities. Two examples are: (1) use on the end of a decision-making inserter to vary postage with varying number of inserts, (2) as a practical mailomat.

Flowcharts representing the sequence of operation of the various units are shown in FIGS. 14, 15, and 16. In each case, the unlettered figure shows the manner wherein the corresponding figure number and letter are assembled to represent a complete flowchart.

The flowchart representing the operation of the control unit is shown in the sequence of FIG. 14.

The flowchart representing the operation of the printing unit is shown in the sequence of FIG. 15.

The flowchart representing the operation of the accounting unit is shown in the sequence of FIG. 16.

The appendix A regarding the programmed function is attached hereto. The appendix is a detailed printout of each of the programs contained in the accounting unit, control unit and printing unit.

```
                   NAM TEST13
              *SYMBOL
              ***********
              ***********
              **
              **   COPYRIGHT 1979, PITNEY BOWES, INC.
              **
              ***********
              ***********
              *SYMBOL DEFINITIONS
0000               ORG $0000
              *BUFFERS
0000 0005     DISBUF  RMB 5          DISPLAY BUFFER
```

```
0005 0500   WRKBUF  RMB 5        WORK BUFFER
000A 0800   INBUF   RMB 8        INBOUND BUFFER
0012 0800   OUTBUF  RMB 8        OUTBOUND BUFFER
            *VARIABLES
001A 0100   BCTR    RMB 1        BYTE COUNTER FOR FMT AND IO ROUTINES
001B 0100   BEND    RMB 1        END OF RECEIVE BUFFER -1
001C 0100   BLINK   RMB 1        .356 SEC COUNTER
001D 0100   BPTR    RMB 1        BYTE POINTER FOR FMT AND IO ROUTINES
001E 0100   DBOUNC  RMB 1        COUNTER FOR KEYBOARD DEBOUNCE
001F 0100   DECPOS  RMB 1        DECIMAL POSITION
0020 0100   DISCTR  RMB 1        CONTROL COUNTER FOR DISP
0021 0100   DISPTR  RMB 1        BYTE POINTER FOR DISP
0022 0100   GETPTR  RMB 1        NIBBLE POINTER FOR GETNIB
0023 0200   IBPTR   RMB 2        INITIAL BYTE POINTER FOR IO ROUTINES
            *                    (HI/O ZERO FOR INDIRECT ADDRESSING)
0025 0100   IOMASK  RMB 1        BIT SELECTOR FOR RCVMSG,XMTMSG
0026 0100   KCLEAN  RMB 1        DEBOUNCED KEYCODE
0027 0100   KCLEEN  RMB 1        DITTO - NOT CHANGED BY GETKEY
0028 0100   KEYCOL  RMB 1        KEYCOLUMN FOR KBSC
0029 0100   KLUSED  RMB 1        LAST KEYCODE ISSUED BY GETKEY
002A 0100   KSW     RMB 1        KEYSWITCH BITS
002B 0100   LNGTIM  RMB 1        COUNTER FOR TIMED DISPLAY
002C 0100   NIBCTR  RMB 1        COUNT OF DISPLAYED NIBBLES
002D 0100   PKSW    RMB 1        PREVIOUS KEYSWITCH POSITION
002E 0100   PORTB1  RMB 1        PORTB IMAGE
002F 0100   PORTC1  RMB 1        PORTC IMAGE
0030 0100   POLDCO  RMB 1        PORTC IMAGE - DATA=0
0031 0100   POLDC1  RMB 1        PORTC IMAGE - DATA=1
0032 0100   PUTPTR  RMB 1        NIBBLE POINTER FOR PUTNIB
0033 0400   TEMP01  RMB 4        WORK BYTES FOR KBSC
0037 0100   TEMP02  RMB 1        WORK BYTE FOR NON-INTERRUPT RTNS
            *EXTERNAL FLAGS
     3800   YFLAGS  EQU *        POINTER TO FIRST FLAG
0038 0100   YRESBA  RMB 1        RESET BASE
0039 0100   YCKDAT  RMB 1        CHECK DATE
003A 0100   YINSF   RMB 1        INSUFFICIENT FUNDS
003B 0100   YLOWF   RMB 1        LOW FUNDS
003C 0100   YSERV   RMB 1        SERVICE MODE
003D 0100   YENABL  RMB 1        METER ENABLED
003E 0100   YBATRC  RMB 1        BATCH REGISTERS CLEAR
003F 0100   YHARDE  RMB 1        HARD ERROR
0040 0100   YKBDIS  RMB 1        KEYBOARD DISABLED
            *INTERNAL FLAGS
     4100   ZFLAGS  EQU *        POINTER TO FIRST FLAG
0041 0100   ZBCDEF  RMB 1        BATCH CLEAR KEYPRESS
0042 0100   ZKEYMO  RMB 1        KEYENTRY MODE
0043 0100   ZSTABD  RMB 1        SETTABLE DISPLAY
0044 0100   ZSTNGD  RMB 1        SETTING DISPLAYED
0045 0100   ZTIMD   RMB 1        TIMED DISPLAY
0046 0100   ZADDBL  RMB 1        ADDABLE DISPLAY
0047 0100   ZBLINK  RMB 1        DISPLAY BLINKER
0048 0100   ZECHOE  RMB 1        ECHO ERROR
0049 0100   ZEXCOM  RMB 1        EXTERNAL COMMUNICATIONS
004A 0100   ZQIN    RMB 1        QUEUED INBOUND MESSAGE
004B 0100   ZQOUT   RMB 1        QUEUED OUTBOUND MESSAGE
004C 0100   ZTOTAC  RMB 1        TOTAL ACCUMULATING
004D 0100   ZTRIP   RMB 1        METER TRIP
            *MESSAGE HEADERS
            *COMMANDS TO AU - NO DATA
     4100   HENABL  EQU $41      ENABLE METER
     4200   HDISAB  EQU $42      DISABLE METER
     4300   HENDEN  EQU $43      END OF ENTRY
     4400   HRESBA  EQU $44      RESET BATCH TOTALS
     4500   HSETSV  EQU $45      SET SERVICE MODE
     4700   HRESSV  EQU $47      RESET SERVICE MODE
            *COMMANDS TO AU - WITH DATA
     C100   HSETPO  EQU $C1      SET POSTAGE
     C500   HENTAM  EQU $C5      ENTER AMOUNT
     C600   HENTCO  EQU $C6      ENTER COMBINATION
            *REQUEST DATA FROM AU
     5000   HREQST  EQU $50      REQUEST STATUS
     5100   HREQPO  EQU $51      REQUEST POSTAGE SETTING
     5200   HREQAR  EQU $52      REQUEST ASC REGISTER      (OPERATE)
     5200   HREQDL  EQU $52      REQUEST DOLLAR LOCK VAL   (SERVICE)
     5300   HREQDR  EQU $53      REQUEST DESC REGISTER     (OPERATE)
     5300   HREQLP  EQU $53      REQUEST LOW POSTAGE VAL   (SERVICE)
     5400   HREQCS  EQU $54      REQUEST CONTROL SUM       (OPERATE)
     5400   HREQMN  EQU $54      REQUEST METER NUMBER      (SERVICE)
     5500   HREQPC  EQU $55      REQUEST PIECE COUNT       (OPERATE)
     5500   HREQDS  EQU $55      REQUEST DIAGNOSTIC STAT   (SERVICE)
     5600   HREQBA  EQU $56      REQUEST BATCH AMOUNT      (OPERATE)
     5600   HREQHS  EQU $56      REQUEST HIGH SET LIM VAL(SERVICE)
     5700   HREQBC  EQU $57      REQUEST BATCH COUNT
            *DATA FROM AU - WITHOUT FORMAT BYTE
     B000   HSTAT   EQU $B0      STATUS
            *DATA FROM AU - WITH FORMAT BYTE
     8100   HPSET   EQU $81      POSTAGE SETTING
     8200   HAREG   EQU $82      ASCENDING REGISTER
     8A00   HDLOCK  EQU $82+$08  DOLLAR LOCK VALUE
     8300   HDREG   EQU $83      DESCENDING REGISTER
     8B00   HLOPOS  EQU $83+$08  LOW POSTAGE WARNING VALUE
     8400   HCSUM   EQU $84      CONTROL SUM
     8C00   HMTRNO  EQU $84+$08  METER NUMBER
     8500   HPCNT   EQU $85      PIECE COUNT
     8D00   HDIAGS  EQU $85+$08  DIAGNOSTIC STATUS
     8600   HBAMT   EQU $86      BATCH AMOUNT
     8E00   HHSLIM  EQU $86+$08  HIGH SETTING LIMIT
     8700   HBCNT   EQU $87      BATCH COUNT
            *COMMANDS FROM EXT DEV - WITH DATA
     E100   HENWR   EQU $E1      MAKE TEMPORARY DISPLAY
            *COMMANDS FROM EXT DEV - NO DATA
     6100   HEXRD   EQU $61      REQUEST CONTENTS OF DISPLAY
     6200   HENAKB  EQU $62      REQUEST KEYBOARD ENABLE
     6300   HDISKB  EQU $63      REQUEST KEYBOARD DISABLE
            *DATA TO EXT DEV
     A100   HDISEC  EQU $A1      CONTENTS OF DISPLAY
            *MISC PARAMETERS
     0100   AUMASK  EQU $01      SELECTS IO BIT FOR ACCTG UNIT
     0200   EXMASK  EQU $02      SELECTS IO BIT FOR EXTERNAL DEVICE
     1000   IBEND   EQU INBUF+6  END OF INBOUND BUFFER -1
     1800   OBEND   EQU OUTBUF+6 END OF OUTBOUND BUFFER -1
     7F00   TSTACK  EQU $7F      TOP OF STACK
            *PORTS AND TIMERS
     8B00   ACR     EQU $8B      AUXILLIARY CONTROL REGISTER
     8500   CTRHO   EQU $85      COUNTER H/O
     8400   CTRLO   EQU $84      COUNTER L/O
     8A00   IER     EQU $8A      INTERRUPT ENABLE REGISTER
     8900   IFR     EQU $89      INTERRUPT FLAG REGISTER
     8C00   PCR     EQU $8C      PERIPHERAL CONTROL REGISTER
     8000   PORTA   EQU $80      KEYCOLUMN/DISPLAY SEG SELECT
     8D00   PORTAX  EQU $8D
     8100   PORTB   EQU $81      KEYROW/DISPLAY DIGIT SELECT
     8E00   PORTBX  EQU $8E
     8200   PORTC   EQU $82      LEDS AND SERIAL OUTPUT
     8300   PORTD   EQU $83      SERIAL INPUT

            *INTRP
            *INTERRUPT PROCESSING
3800                ORG $3800
3800 48     INTRP   PHA          SAVE ACCUMULATOR
3801 A5 84          LDA CTRLO    CLEAR INTERRUPT FLAG
3803 8A             TXA          SAVE X
3804 48             PHA
3805 98             TYA          SAVE Y
3806 48             PHA
```

```
3807 C6 1C            DEC BLINK        DECREMENT .395 SEC PERIOD COUNTER
3809 D0 0C            BNE INTR02       IF .395 SEC PERIOD COMPLETED
380B A5 2B            LDA LNGTIM         IF 101 SEC COUNTER .NE. 0
380D F0 02            BEQ INTR01
380F C6 2B            DEC LNGTIM           DECREMENT COUNTER
          1138 INTR01 EQU *              ENDIF
3811 A9 80            LDA #$80           TOGGLE BLINKER FLAG
3813 45 47            EOR ZBLINK
3815 85 47            STA ZBLINK
          1738 INTR02 EQU *            ENDIF
                *KBSC
                *KEYBOARD AND SWITCH SCAN ROUTINE
                *PART OF INTERRUPT ROUTINE
3817 A9 05     KBSC   LDA #14          SELECT KEYROW 4
3819 85 81            STA PORTB
381B A0 00            LDY #0           INIT KEYED KEYROW COUNTER
381D 84 28            STY KEYCOL       CLEAR KEYCOLUMN BUCKET
381F 84 8D            STY PORTAX       SET TO READ KEYCOLUMN BITS
3821 46 41            LSR ZBCDWN       CLEAR BATCH-CLEAN-KEYPRESS
3823 4A               LSR A            READ KEYSWITCH, 3 L/O BITS
               *                       CLEAR CARRY FOR LATER BRANCH
3824 25 80            AND PORTA
3826 85 2A            STA KSW
3828 A2 03            LDX #3           SET TO READ 4 KEYROWS
          2A38 KBSC01 EQU *            DO UNTIL 4 KEYROWS READ
382A C6 81            DEC PORTB          SELECT NEXT KEYROW
382C A5 80            LDA PORTA          READ KEYCOLUMN BITS
382E 49 FF            EOR #$FF           MAKE LOGIC POSITIVE
3830 95 33            STA TEMP01,X       SAVE PRESENT COLUMN IMAGE
3832 F0 07            BEQ KBSC02         IF KEYPRESS
3834 86 36            STX TEMP01+3         REMEMBER KEYROW NUMBER
3836 05 28            ORA KEYCOL           REMEMBER KEYCOLUMN BITS
3838 85 28            STA KEYCOL
383A C8               INY                  COUNT KEYED KEYROW
          3B38 KBSC02 EQU *              ENDIF
383B CA               DEX                COUNT KEYROW
383C 10 EC            BPL KBSC01
               *                       ENDDO
383E 98               TYA              IF NO KEY IS DOWN
383F D0 0C            BNE KBSC04
3841 A5 1E            LDA DBOUNC         IF DEBOUNCE COUNTER .EQ. 0
3843 F0 04            BNE KBSC03
3845 A9 FF            LDA #-1              INDICATE NO KEYS DOWN
3847 30 37            BMI KBSC11           LEAVE ROUTINE
          4938 KBSC03 EQU *              ELSE
3849 C6 1E            DEC DBOUNC           DECREMENT DEBOUNCE COUNTER
               *                           CARRY IS CLEAR
384B 90 37            BCC KBSC12           LEAVE ROUTINE
               *                         ENDIF
          4D38 KBSC04 EQU *            ENDIF
384D C0 02            CPY #2           IF MANY KEYS DOWN
384F 10 0D            BPL KBSC06         IF CLEAR KEY IS DOWN
               *                           IF EITHER BATCH KEY IS DOWN
               *                             SET BATCH-CLEAR-KEYPRESS
               *                           ENDIF
               *                         ENDIF
               *                         INDICATE MANY KEYS DOWN
               *                         SET DEBOUNCE COUNTER
               *                         LEAVE ROUTINE
               *                       ENDIF
3851 A5 28            LDA KEYCOL       SET TO CALC KEYCOLUMN
3853 A2 FF            LDX #-1
3855 86 28            STX KEYCOL
          5738 KBSC05 EQU *            DO UNTIL BIT FOUND
3857 E6 28            INC KEYCOL         CALC COLUMN NUMBER
3859 4A               LSR A              SHIFT BIT INTO CARRY
385A 90 FB            BCC KBSC05
               *                       ENDDO
385C F0 13            BEQ KBSC09       IF MORE BITS IN BYTE
385E A5 34     KBSC06 LDA TEMP01+1       IF CLEAR KEY IS DOWN
3860 29 20            AND #$20
3862 F0 09            BEQ KBSC08
3864 A5 33            LDA TEMP01+2           IF EITHER BATCH KEY IS DOWN
3866 29 30            AND #$30
3868 F0 03            BEQ KBSC07
386A 38               SEC                      SET BATCH-CLEAR-KEYPRESS
386B 66 41            ROR ZBCDWN
          6D38 KBSC07 EQU *                  ENDIF
          6D38 KBSC08 EQU *                ENDIF
386D A9 FE            LDA #-2              INDICATE MANY KEYS DOWN
386F 30 0B            BMI KBSC10           SET DEBOUNCE COUNTER
               *                           LEAVE ROUTINE
          7138 KBSC09 EQU *              ENDIF
3871 A4 1E            LDY DBOUNC       IF DEBOUNCE COUNTER .NE. 0
3873 D0 0F            BNE KBSC12         LEAVE ROUTINE
               *                       ENDIF
3875 A5 36            LDA TEMP01+3     CALC KEYCODE
3877 0A               ASL A
3878 0A               ASL A
3879 0A               ASL A
387A 65 28            ADC KEYCOL
387C A2 26     KBSC10 LDX #38          SET DEBOUNCE COUNTER
387E 86 1E            STX DBOUNC
3880 85 26     KBSC11 STA KCLEAN       INDICATE KEYCODE
3882 85 27            STA KCLEEN
          8438 KBSC12 EQU *            LEAVE ROUTINE
               *DISP
               *DISPLAY NEXT NIBBLE IN DISPLAY BUFFER
               *PART OF INTERRUPT ROUTINE
3884 A5 20     DISP   LDA DISCTR       IF SCAN SEQUENCE COMPLETED
3886 10 08            BPL DISP01
3888 A9 00            LDA #DISBUF+0      INITIALIZE DISPLAY POINTER
388A 85 21            STA DISPTR
388C A9 09            LDA #9             INITIALIZE DISPLAY COUNTER
388E 85 20            STA DISCTR
          9038 DISP01 EQU *            ENDIF
3890 4A               LSR A            SET CARRY IF COUNTER ODD
3891 A6 21            LDX DISPTR       FETCH PACKED NIBBLES
3893 B5 00            LDA 0,X
3895 90 05            BCC DISP02       IF COUNT FLAGGED ODD
3897 20 0F3E          JSR SWAP           SWAP NIBBLES
389A 90 02            BCC DISP03
          9C38 DISP02 EQU *            ELSE
389C E6 21            INC DISPTR         POINT AT NEXT 2 NIBBLES
          9E38 DISP03 EQU *            ENDIF
389E 29 0F            AND #$0F         ISOLATE NIBBLE
38A0 AA               TAX              SET FOR TABLE LOOKUP
38A1 E0 0D            CPX #13          IF SET TO DISPLAY WINGS
38A3 D0 09            BNE DISP06
38A5 24 44            BIT ZSTNGD         IF SETTING-DISP FLAG SET
38A7 10 05            BPL DISP05
38A9 24 3D            BIT YENABL           IF METER NOT ENABLED
38AB 30 01            BMI DISP04
38AD E8               INX                    SET TO DISPLAY HYPHEN
          AE38 DISP04 EQU *                  ENDIF
          AE38 DISP05 EQU *                ENDIF
          AE38 DISP06 EQU *            ENDIF
38AE BC F038          LDY DISP16,X     PUT SHIFTED 7 SEG CODE IN Y
38B1 18               CLC              SET TO CLEAR DECIMAL SEGMENT
38B2 A5 1F            LDA DECPOS       IF IN DECIMAL FRAME
38B4 45 20            EOR DISCTR
38B6 D0 01            BNE DISP07
38B8 38               SEC                SET TO SET DECIMAL SEGMENT
          B938 DISP07 EQU *            ENDIF
38B9 24 44            BIT ZSTNGD       IF SETTING-DISPLAY FLAG SET
38BB 10 18            BPL DISP12
```

```
3880 24 3F              BIT YHARDE        IF HARD-ERROR FLAG SET
388F 10 03              BPL DISP08
38C1 38                 SEC                 SET TO SET DECIMAL SEGMENT
38C2 AC 00              LDY #$C0            SET TO DISPLAY BLANK
     C438      DISP08   EQU *             ENDIF
38C4 24 57              BIT ZBLINK        IF BLINKER FLAG CLEAR
38C6 30 0D              BMI DISP11
38C8 A5 2B              LDA YLOWF           IF LOW OR INSUFFICIENT FUNDS
38CA 05 2A              ORA YINSF
38CC 10 01              BPL DISP09
38CE 18                 CLC                   SET TO CLEAR DEC SEG
     CF38      DISP09   EQU *                ENDIF
38CF 24 3A              BIT YINSF            IF INSUFFICIENT FUNDS
38D1 10 02              BPL DISP10
38D3 A0 00              LDY #0                 SET TO DISPLAY BLANK
     D538      DISP10   EQU *                ENDIF
     D538      DISP11   EQU *              ENDIF
     D538      DISP12   EQU *            ENDIF
38D5 98                 TYA              FETCH SHIFTED 7 SEG CODE
38D6 24 3C              BIT YSERV        IF SERVICE FLAG SET
38D8 10 06              BPL DISP14
38DA 49 00              EOR #$00            IF BLANK IS TO BE DISPLAYED
38DC D0 02              BNE DISP13
38DE A9 10              LDA #$10              SUBSTITUTE UNDERLINE
     E038      DISP13   EQU *              ENDIF
     E038      DISP14   EQU *            ENDIF
38E0 6A                 ROR A            SHIFT IN DEC FOR 8 SEG CODE
38E1 A2 00              LDX #0           CLEAR OUTPUT PORT
38E3 86 80              STX PORTA
38E5 CA                 DEX              SET TO OUTPUT
38E6 86 8D              STX PORTAX
38E8 AA                 TAX              MOVE 8 SEG CODE TO X
38E9 A5 20              LDA DISCTR       SELECT DIGIT FOR DISPLAY
38EB 85 81              STA PORTB
38ED A5 26              LDA KCLEAN       IF ONE OR NO KEYS DOWN
38EF C9 FE              CMP #-2
38F1 F0 02              BEQ DISP15
38F3 86 80              STX PORTA           LIGHT UP SEGMENTS
     F538      DISP15   EQU *            ENDIF
38F5 C6 20              DEC DISCTR       COUNT THE DISPLAY
38F7 68                 PLA              RESTORE Y
38F8 A8                 TAY
38F9 68                 PLA              RESTORE X
38FA AA                 TAX
38FB 68                 PLA              RESTORE A
38FC 40                 RTI              RETURN FROM INTERRUPT
     FD38      DISP16   EQU *            7 SEGMENT CODES SHIFTED LEFT
                        *                    0   1   2   3   4   5   6   7   8   9
38FD 7E                 FCB                $7E,$0C,$B6,$9E,$CC,$DA,$FA,$0E,$FE,$DE
38FE 0C
38FF B6
3900 9E
3901 CC
3902 DA
3903 FA
3904 0E
3905 FE
3906 DE
                        *                    UPPER CASE E
3907 F2                         FCB          $F2
                        *                    LOWER CASE R
3908 A0                         FCB          $A0
                        *                    LOWER CASE O
3909 B8                         FCB          $B8
                        *                    WINGS
390A 92                         FCB          $92
                        *                    HYPHEN
390B 80                         FCB          $80
                        *                    BLANK
390C 00                         FCB          $00
                        *INIT
                        *INITIALIZE SYSTEM AT RESET TIME
390D A2 7F     INIT     LDX #TSTACK      INIT STACK POINTER
390F 9A                 TXS
3910 78                 SEI              SET INTERRUPT DISABLE
3911 D8                 CLD              SET TO DO BINARY ARITHMETIC
3912 A9 00              LDA #0           CLEAR ACCUMULATOR
     1439      INIT01   EQU *            DO UNTIL PAGE ZERO CLEARED
3914 95 00              STA 0,X            CLEAR BYTE
3916 CA                 DEX                COUNT BYTE
3917 10 FB              BPL INIT01
                        *                ENDDO
3919 20 183A            JSR BLANK        BLANK FILL DISPLAY BUFFER
                        *                SET X = -1 = $FF
391C 85 49              STA ZEXCOM       SET EXT-COMMUNICATIONS FLAG
391E A9 F7              LDA #$F7         INIT PORTC, TURN ON CKDATE LED
3920 85 2F              STA PORTCI
3922 85 82              STA PORTC
3924 A9 0F              LDA #$0F         INIT PORTB, ENABLE SERIAL IO
3926 85 81              STA PORTB
3928 85 2E              STA PORTBI       INIT PORTB IMAGE
392A 46 40              LSR YKBDIS       CLEAR KEYBOARD-DISABLE FLAG
392C A9 5F              LDA #$5F
392E 85 8E              STA PORTBX
3930 86 20              STX DISCTR       INIT DISPLAY COUNTER
3932 86 29              STX KLUSED       INDICATE NO KEYCODE ISSUED
3934 A2 08              LDX #$08         SET TO OUTPUT IRQ ON PB6
3936 86 8C              STX PCR
3938 A2 0A              LDX #$0A         SET FOR FREE RUN ON PHASE 2
393A 86 8B              STX ACR
393C A2 06              LDX #$06         INIT PREV KEYSWITCH POSITION
393E 86 29              STX PKSW
3940 86 84              STX CTRLO        START 1542 USEC TIMER
3942 86 85              STX CTRHO
3944 A9 50              LDA #REQST       FETCH STATUS
3946 20 6F3B            JSR EDR2AU
                        *                RECEIVE STATUS
3949 20 FE3C            JSR FSK303       FLUSH QUEUED MSG
                        *                REQUEST POSTAGE SETTING
                        *                FLUSH QUEUED MSG
                        *MLOOP
                        *MAINLINE LOOP
     4C39      MLOOP    EQU *            LOOP
394C 20 B23A            JSR FLUSH          FLUSH QUEUED MSG
394F A9 02              LDA #EXMASK        IF RTS FROM EXT DEV
3951 24 83              BIT PORTD
3953 D0 06              BNE ML0001
3955 20 703D            JSR RCVIN            RECEIVE MSG FROM EXT DEV
3958 20 B23A            JSR FLUSH            FLUSH QUEUED MSG
     5B39      ML0001   EQU *              ENDIF
395B A9 01              LDA #AUMASK        IF RTS FROM AU
395D 24 83              BIT PORTD
395F D0 06              BNE ML0002
3961 20 E83D            JSR RCVOUT           RECEIVE MSG FROM AU
3964 20 B23A            JSR FLUSH            FLUSH QUEUED MSG
     6739      ML0002   EQU *              ENDIF
3967 A2 40              LDX #$40           ENABLE INTERRUPTS
3969 86 8A              STX IER
396B 58                 CLI
396C 24 45              BIT ZTIMD          IF TIMED-DISPLAY FLAG SET
396E 10 07              BPL ML0004
3970 A5 2B              LDA LNGTIM           IF TIME PERIOD DONE
3972 D0 03              BNE ML0003
3974 20 013D            JSR PSK104             FETCH POSTAGE SETTING
                        *                      FLUSH QUEUED MESSAGE
     7739      ML0003   EQU *                ENDIF
     7739      ML0004   EQU *              ENDIF
3977 A5 47              LDA ZRESEK         SET TO TURN RESET-BASE ON/OFF
3979 25 38              AND YRESBA
```

```
397B 6A                    ASL A               HOLD BIT IN CARRY
397C A5 47                 LDA ZBLINK          SET TO TURN CHECK-DATE ON/OFF
397E 25 39                 AND YCKDAT
3980 2A                    ROL A               MOVE BITS INTO POSITION
3981 2A                    ROL A
3982 2A                    ROL A
3983 2A                    ROL A
3984 09 F3                 ORA #$F3            SET ALL OTHER BITS
3986 85 2F                 STA PORTC1          TURN LEDS ON OR OFF
3988 85 F2                 STA LORTC
398A A5 61                 LDA PORTB           FETCH SERVICE SWITCH BIT
398C A6 2E                 LDX PORGB1          FETCH PREVIOUS BIT
398E 85 2E                 STA PORTB1          STORE PRESENT BIT
3990 8A                    TXA                 IF SWITCH HAS CHANGED
3991 45 2E                 EOR PORGB1
3993 29 20                 AND #%00100000
3995 F0 15                 BEQ ML0007
3997 A5 2E                 LDA PORGB1            IF IN SERVICE POSITION
3999 29 20                 AND #%00100000
399B D0 06                 BNE ML0005
399D 4E 49                 LSR ZEXCOM              CLEAR EXT-COMMUN FLAG
399F 46 40                 LSR YKBDIS              CLEAR KBD-DISABLED FLAG
39A1 A9 46                 LDA #HRESSA             SET TO REQ SERVICE MODE
39A3 10 05                 BPL ML0006
     A539      ML0005      EQU *                 ELSE, SWITCH IN NORMAL POS
39A5 38                    SEC                     SET EXT-COMMUN FLAG
39A6 66 49                 ROR ZEXCOM
39A8 A9 47                 LDA #HRESSV             SET TO REQ NORMAL MODE
     AA39      ML0006      EQU *                 ENDIF
39AA 20 303B               JSR KEYM03            REQUEST MODE
                           *                     RECEIVE STATUS
                           *                     FLUSH QUEUED MESSAGE
     AD39      ML0007      EQU *               ENDIF
39AD 24 46                 BIT YKBDIS          IF KEYBOARD ENABLED
39AF 30 9?                 BMI ML0019
39B1 24 41                 BIT ZBCDWN            IF BATCH-CLEAR-KEYPRESS
39B3 10 0C                 BPL ML0009
39B5 24 3E                 BIT YBATRG              IF BATCH NEEDS CLEARING
39B7 30 05                 BMI ML0008
39B9 A9 44                 LDA #HRESBA               SET TO CLEAR BATCH REG
39BB 20 303B               JSR KEYM03                SEND MESSAGE TO AU
                           *                         RECEIVE REPLY
                           *                         FLUSH QUEUED MESSAGE
     BE39      ML0008      EQU *                   ENDIF
39BE 20 013D               JSR PSKE04              REQUEST POSTAGE SETTING
                           *                       RECEIVE REPLY
                           *                       FLUSH QUEUED MESSAGE
     C139      ML0009      EQU *                 ENDIF
39C1 24 4D                 BIT ZTRIP             IF METER-TRIP FLAG SET
39C3 10 0F                 BPL ML0012
39C5 46 4D                 LSR ZTRIP               CLEAR METER-TRIP FLAG
39C7 A5 27                 LDA KCLELR              IF NO KEY IS DOWN
39C9 10 06                 BPL ML0010
39CB 20 013D               JSR PSKE04                FETCH POSTAGE SETTING
                           *                         FLUSH QUEUED MESSAGE
39CE 4C D439               JMP ML0011
     D139      ML0010      EQU *                   ELSE, KEY IS DOWN
39D1 20 B03C               JSR PBKE00                CASE
                           *                           PROC REG KEYPRESS
                           *                           NO CASE
                           *                         ENDCASE
     D439      ML0011      EQU *                   ENDIF
     D439      ML0012      EQU *                 ENDIF
39D4 A9 08                 LDA #8                SET CASENUMBER=NOCASE
39D6 A5 2A                 LDX KSW               FETCH KEYPOSITION
39D8 E0 03                 CPX #3                IF LEGAL KEYPOSITION
39DA F0 08                 BEQ ML0013
39DC E0 05                 CPX #5
39DE F0 04                 BEQ ML0013
39E0 E0 06                 CPX #6
39E2 D0 0E                 BNE ML0014
39E4 8A        ML0013      TXA                     CALC CASENUMBER ON PKSW,KSW
39E5 4A                    LSR A
39E6 85 37                 STA TEMP02
39E8 A5 2D                 LDA PKSW
39EA 0A                    ASL A
39EB 0A                    ASL A
39EC 05 37                 ORA TEMP02
39EE 29 0F                 AND #$0F
39F0 86 2D                 STX PKSW                UPDATE PREVIOUS KEYPOSITION
     F239      ML0014      EQU *                 ENDIF
39F2 AA                    TAX                   PUT CASENUMBER IN X
39F3 A9 39                 LDA #ML0018-1<        SET FOR RTS TO ENDCASE
39F5 48                    PHA
39F6 A9 4B                 LDA #ML0018-1>
39F8 48                    PHA
39F9 BD F?39               LDA ML0016-5,X        SET FOR RTS TO CASE
39FC 48                    PHA
39FD BD 063A               LDA ML0017-5,X
3A00 48                    PHA
3A01 60        ML0015      RTS                   CASE - KEYSWITCH TRANSITIONS
3A02 3A        ML0016      FCB ECEA-1<             FROM ENT COM TO ENT AMT
3A03 3A                    FCB ECEC-1<             FROM ENT COM TO ENT COM
3A04 3A                    FCB ECOP-1<             FROM ENT COM TO OPERATE
3A05 39                    FCB ML0015-1<           NO CASE
3A06 3B                    FCB OPEA-1<             FROM OPERATE TO ENT AMT
3A07 39                    FCB OPEC-1<             FROM OPERATE TO ENT COM
3A08 39                    FCB OPOP-1<             FROM OPERATE TO OPERATE
3A09 3A                    FCB ML0015-1<           NO CASE
3A0A 3A                    FCB EAEA-1<             FROM ENT AMT TO ENT AMT
3A0B 3A                    FCB EAEC-1<             FROM ENT AMT TO ENT COM
3A0C 3A                    FCB EAOP-1<             FROM ENT AMT TO OPERATE
3A0D 6B        ML0017      FCB ECEA-1>
3A0E 61                    FCB ECEC-1>
3A0F 69                    FCB ECOP-1>
3A10 00                    FCB ML0015-1>
3A11 92                    FCB OPEA-1>
3A12 52                    FCB OPEC-1>
3A13 AF                    FCB OPOP-1>
3A14 00                    FCB ML0015-1>
3A15 54                    FCB EAEA-1>
3A16 7F                    FCB EAEC-1>
3A17 63                    FCB EAOP-1>
     4C39      ML0018      EQU MLOOP               ENDCASE
     4C39      ML0019      EQU MLOOP             ENDIF
                           *                   ENDLOOP
               *BLANK
               *BLANK FILL DISPLAY BUFFER,SET X = -1
3A18 A2 04     BLANK       LDX #4              SET TO BLANK 5 BYTES,
               *                               AND TO CLEAR 5 FLAGS
     1A3A      BLANK1      EQU *               DO UNTIL BYTES,FLAGS CLEARED
3A1A A9 FF                 LDA #$FF              BLANK FILL BYTE
3A1C 95 00                 STA DISBUF,X
3A1E 56 41                 LSR ZFLAGS,X          CLEAR TIMED-DISPLAY FLAG
               *                                 CLEAR SETTING-DISPLAYED FLAG
               *                                 CLEAR SETTABLE-DISPLAY FLAG
               *                                 CLEAR KEYENTRY-MODE FLAG
               *                                 CLEAR BATCH-CLEAR-KEYPRESS FLAG
3A20 86 2C                 STX NIBCTR            CLEAR NIBBLE COUNT
3A22 CA                    DEX                   COUNT BYTE,COUNT FLAG
3A23 10 F5                 BPL BLANK1
               *                               ENDDO
3A25 86 1F                 STX DECPOS          SUPPRESS DECIMAL
3A27 60                    RTS                 RETURN
```

```
                  *DISBFR
                  *DISPLAY BUFFER
3A28 86 22        DISBFR  STX GETPTR      POINT AT NIBBLE BUF+2*2
3A2A 20 4F3A              JSR DISINT      KILL DISPLAY
3A2D 20 1B3A              JSR BLANK       BLANK FILL DISPLAY
3A30 20 5F3B              JSR GETNIB      PUT CHAR COUNT IN Y
3A33 A8                   TAY
3A34 20 5F3B              JSR GETNIB      FETCH DECIMAL POSITION
3A37 85 1F                STA DECPOS
3A39 66 22                ROR GETPTR      POINT AT BYTE BUF+3
3A3B 98                   TYA             POINT AT NIBBLE BUF+3*2+(0 OR 1)
3A3C 4A                   LSR A
3A3D 26 22                ROL GETPTR
     3F3A         DISB01  EQU *           **** ALTERNATE ENTRY POINT
3A3F C0 0B                CPY #11         IF Y .LT. 11
3A41 10 0E                BPL DISB04
     423A         DISB02  EQU *             DO WHILE Y .GE. 1
3A43 88                   DEY               DECR AND TEST Y
3A44 30 08                BMI DISB03
3A46 20 5F3B              JSR GETNIB          FETCH CHAR
3A49 20 AD3C              JSR PSHNIB          PUSH IT INTO DISPLAY
3A4C 10 F5                BPL DISB02
     4E3A         DISB03  EQU *             ENDDO
     4E3A         DISB04  EQU *           ENDIF
3A4E 60                   RTS             RETURN
                  *DISINT
                  *SET INTERRUPT DISABLE FLAG - KILL DISPLAY
                  *RETURN WITH B/O BIT OF ACCUMULATOR SET TO ZERO
3A4F 78           DISINT  SEI             SET INTERRUPT DISABLE FLAG
3A50 A9 0F                LDA #$0F        KILL DISPLAY
3A52 85 21                STA PORTB
     543A         DIS101  EQU *           **** ALTERNATE ENTRY POINT
3A54 60                   RTS             RETURN
                  *EAEA
                  *PROCESS KEYSWITCH TRANSITION FROM ENT AMT TO ENT AMT
3A55 20 533B      EAEA    JSR GETKEY      FETCH KEYCODE
3A58 30 FA                BMI DIS101      IF NO KEYPRESS
                  *                         RETURN
                  *                       ENDIF
                  *                       CASE
3A5A 20 E03B              JSR PDKEY         PROCESS NUMERIC OR CLEAR KEY
3A5D 4C 023B              JMP PAKE02        PROCESS DECIMAL KEY
                  *                         NOCASE
                  *                       ENDCASE
                  *                       RETURN
                  *EAEC
                  *PROCESS KEYSWITCH TRANSITION FROM ENT AMT TO ENT COM
                  *RETURN WITH POSITIVE STATUS
3A60 A9 C5        EAEC    LDA #HENTAM     TRANSMIT AMOUNT
                  *                       STATUS IS NEGATIVE
3A62 30 07                BMI ECEA01
                  *                       RECEIVE STATUS
                  *                       FLUSH QUEUED MSG
                  *                       CLEAR DISPLAY
                  *                       RETURN
                  *EAOP
                  *PROCESS KEYSWITCH TRANSITION FROM ENT AMT TO OPERATE
3A64 20 603A      EAOP    JSR EAEC        TRANSMIT AMOUNT
                  *                       RECEIVE STATUS
                  *                       FLUSH QUEUED MSG
                  *                       CLEAR DISPLAY
                  *                       STATUS IS POSITIVE
3A67 10 24                BPL ECOP01      TRANSMIT END OF ENTRY
                  *                       RECEIVE STATUS
                  *                       FLUSH QUEUED MESSAGE
                  *                       REQUEST POSTAGE SETTING
                  *                       RECEIVE POSTAGE SETTING
                  *                       FLUSH QUEUED MSG
                  *                       RETURN
                  *ECEA
                  *PROCESS KEYSWITCH TRANSITION FROM ENT COM TO ENT AMT
                  *RETURN WITH POSITIVE STATUS
3A69 A9 C6        ECEA    LDA #HENTCO     DEFINE HEADER TO ENTER COMBINATION
     6B3A         ECEA01  EQU *           **** ALTERNATE ENTRY POINT
3A6B 85 0B                STA INBUF+1
3A6D A5 1F                LDA DECPOS      FETCH DECIMAL POSITION
3A6F 29 0F                AND #$0F        CLEAN IT UP
3A71 A8                   TAY             PUT DECIMAL POSITION IN Y
3A72 A5 20                LDA NIBCTR      FETCH NIBBLE COUNT
3A74 A2 0D                LDX #INBUF+3    FORMAT MESSAGE
3A76 20 283B              JSR FMTB02
3A79 20 753B              JSR HDR2A1      TRANSMIT MESSAGE
                  *                       RECEIVE STATUS
3A7C 20 B23A              JSR FLUSH       FLUSH QUEUED MSG
3A7F 4C 963B              JMP PCLR01      CLEAR DISPLAY
                  *                       RETURN
                  *ECEC
                  *PROCESS KEYSWITCH TRANSITION FROM ENT COM TO ENT COM
3A82 20 533B      ECEC    JSR GETKEY      FETCH KEYCODE
3A85 30 CD                BMI DIS101      IF NO KEYPRESS
                  *                         RETURN
                  *                       ENDIF
                  *                       CASE
3A87 4C E03B              JMP PDKEY         PROCESS NUMERIC OR CLEAR KEY
                  *                         NOCASE
                  *                       ENDCASE
                  *                       RETURN
                  *ECOP
                  *PROCESS KEYSWITCH TRANSITION FROM ENT COM TO OPERATE
3A8A 20 693A      ECOP    JSR ECEA        TRANSMIT COMBINATION
                  *                       RECEIVE STATUS
                  *                       FLUSH QUEUED MSG
                  *                       CLEAR DISPLAY
     8D3A         ECOP01  EQU *           **** ALTERNATE ENTRY POINT
3A8D A9 43                LDA #HENDEN     TRANSMIT END OF ENTRY
3A8F 20 6F3B              JSR HDR2AU
                  *                       RECEIVE STATUS
3A92 4C FE3C              JMP PSKE03      FLUSH QUEUED MSG
                  *                       REQUEST POSTAGE SETTING
                  *                       RECEIVE POSTAGE SETTING
                  *                       FLUSH QUEUED MSG
                  *                       RETURN
                  *FLSOUT
                  *FLUSH QUEUED OUTBOUND MESSAGE
3A95 24 4B        FLSOUT  BIT ZQOUT       IF OUTBOUND MSG QUEUED
3A97 10 18                BPL FLS002
3A99 A5 13                LDA OUTBUF+1      IF STATUS MESSAGE
3A9B C9 80                CMP #HSTAT
3A9D D0 09                BNE FLS001
3A9F A5 40                LDA YKBDIS          INSERT KEYBOARD STATUS
3AA1 29 80                AND #%10000000
3AA3 4A                   LSR A
3AA4 05 15                ORA OUTBUF+3
3AA6 85 15                STA OUTBUF+3
     A83A         FLS001  EQU *             ENDIF
3AA8 20 153F              JSR XMTOUT        TRANSMIT OUTBOUND MSG
                  *                         CASE
3AAB 20 0A3D              JSR PSTATR          PROCESS STATUS REPLY
3AAE 20 443C              JSR PPOSTR          PROCESS POST SETTING REPLY
                  *                           NO CASE
                  *                         ENDCASE
     B13A         FLS002  EQU *           ENDIF
     B13A         FLS003  EQU *           **** ALTERNATE ENTRY POINT
3AB1 60                   RTS             RETURN
```

```
                    *FLUSH
                    *FLUSH QUEUED MESSAGES
          B23A      FLUSH   EQU *           DO WHILE MESSAGES QUEUED
3AB2 A5 4A                  LDA ZQIN          TEST FOR QUEUED MESSAGE
3AB4 05 4B                  ORA ZQOUT
3AB6 10 F9                  BPL FLUSH8
3AB8 20 953A                JSR FLSOUT        FLUSH QUEUED OUTBOUND MSG
3ABB 24 4A                  BIT ZQIN          IF QUEUED INBOUND MSG
3ABD 10 4F                  BPL FLUSH7
3ABF A5 0B                  LDA INBUF+1         IF EXTERNAL DISPLAY READ
3AC1 C9 61                  CMP #HEXRD
3AC3 D0 1F                  BNE FLUSH2
3AC5 56 4A                  LSR ZQIN              CLEAR QUEUED-INBOUND-MSG FLAG
3AC7 24 63                  BIT ZSTBLD            IF SETTABLE DISPLAY
3AC9 10 19                  BPL FLUSH1
3ACB A9 A1                  LDA #HDISPC             FORMAT OUTBOUND REPLY
3ACD 85 13                  STA OUTBUF+1
3ACF A5 1F                  LDA DECPOS
3AD1 29 0F                  AND #$0F
3AD3 A8                     TAY
3AD4 A5 2C                  LDA NIBCTR
3AD6 A2 15                  LDX #OUTBUF+3
3AD8 20 2B3B                JSR FMTB02
3ADB 20 1B3A                JSR BLANK               BLANK FILL DISPLAY
3ADE 20 AB3C                JSR PRKE04              MAKE SHORT TIMED DISPLAY
3AE1 38                     SEC                     SET QUEUED-OUTBOUND MSG FLAG
3AE2 66 4B                  ROR ZQOUT
          E63A      FLUSH1  EQU *                 ENDIF
          E43A      FLUSH2  EQU *               ENDIF
3AE4 A5 0B                  LDA INBUF+1       FETCH HEADER
3AE6 C9 62                  CMP #HENKB        IF KEYBOARD ENABLE REQUEST
3AE8 D0 04                  BNE FLUSH3
3AEA 46 49                  LSR YKBDIS          CLEAR KBD-DISABLE FLAG
3AEC 10 15                  BPL FLUSH5          CHANGE MSG TO STATUS REQ
          EE3A      FLUSH3  EQU *             ENDIF
3AEE C9 63                  CMP #HDISKB       IF KEYBOARD DISABLE REQUEST
3AF0 D0 05                  BNE FLUSH4
3AF2 38                     SEC                 SET KEYBOARD-DISABLED FLAG
3AF3 66 49                  ROR YKBDIS
3AF5 30 0C                  BMI FLUSH5          CHANGE MSG TO STATUS REQUEST
          F73A      FLUSH4  EQU *             ENDIF
3AF7 C9 E1                  CMP #HEXWR        IF EXTERNAL WRITE TO DISPLAY
3AF9 D0 10                  BNE FLUSH6
3AFB A2 18                  LDX #INBUF+2*2      DISPLAY INBOUND BUFFER
3AFD 20 283A                JSR DISBFR
3B00 20 A83C                JSR PRKE02          MAKE TIMED DISPLAY
3B03 A9 01          FLUSH5  LDA #1              CHANGE MSG TO STATUS REQUEST
3B05 85 0A                  STA INBUF+0
3B07 A9 50                  LDA #HREQST
3B09 85 0B                  STA INBUF+1
          0B3B      FLUSH6  EQU *             ENDIF
3B0B 20 A13E                JSR XMTIN         TRANSMIT INBOUND MSG
          0E3B      FLUSH7  EQU *             ENDIF
3B0E 4C B23A                JMP FLUSH
          A13A      FLUSH8  EQU FLS003      ENDLOOP
                    *                       RETURN
                    *FMTBUF
                    *BUILD FORMATTED MESSAGE FROM DISPLAY
3B11 95 FE          FMTBUF  STA -2,X        STORE HEADER IN BUF+1
3B13 86 1D                  STX BPTR        TEMP SAVE BUFFER POINTER
3B15 20 393E                JSR FINDEC      REFORMAT DISPLAY
3B18 A9 03                  LDY #3          ASSUME DECIMAL FOR MILS
3B1A A6 2C                  LDX NIBCTR      ASSUME DIGIT COUNT FOR MILS
3B1C CA                     DEX
3B1D A5 04                  LDA DISBUF+4    IF CENTS DISPLAYED
3B1F C9 FF                  CMP #$FF
3B21 D0 02                  BNE FMTB01
3B23 88                     DEY               SET DECIMAL FOR CENTS
3B24 CA                     DEX               SET DIGIT COUNT FOR CENTS
          253B      FMTB01  EQU *           ENDIF
3B25 8A                     TXA             MOVE DIGIT COUNT TO A
3B26 A6 1D                  LDX BPTR        RESTORE BUFFER POINTER
          283B      FMTB02  EQU *           **** ALTERNATE ENTRY POINT
3B28 85 37                  STA TEMP02      SAVE DIGIT COUNT
3B2A 94 FF                  STY -1,X        PUT DECIMAL IN FORMAT BYTE, BUF+2
3B2C 20 CF3E                JSR SWAP        DEFINE DIGIT COUNT FOR FORMAT BYTE
3B2F 15 FF                  ORA -1,X
3B31 95 FF                  STA -1,X
3B33 A4 37                  LDY TEMP02      STORE MESSAGE BYTE COUNT IN BUF+0
3B35 C8                     INY
3B36 98                     TYA
3B37 4A                     LSR A
3B38 A8                     TAY
3B39 C8                     INY
3B3A C8                     INY
3B3B 94 FD                  STY -3,X
3B3D 0A                     ASL A           TEMP SAVE MESSAGE CHAR COUNT
                    *                       CLEAR CARRY FOR SBC
3B3E 85 1A                  STA BCTR
                    *                       POINT AT H/O DISPLAY CHAR
3B40 A9 0B                  LDA #DISBUF+5*2+1
3B42 E5 2C                  SBC NIBCTR
3B44 85 22                  STA GETPTR
3B46 46 37                  LSR TEMP02      IF DIGIT COUNT IS ODD
3B48 90 02                  BCC FMTB03
3B4A C6 22                  DEC GETPTR        POINT BEYOND H/O DISPLAY CHAR
          4C3B      FMTB03  EQU *           ENDIF
3B4C 8A                     TXA             SET TO SET PUTPTR=BUF+3*2
3B4D 0A                     ASL A
3B4E A4 1A                  LDY BCTR        SET Y = MESSAGE CHAR COUNT
3B50 4C 302C                JMP FLE006      DEFINE PUTPTR
                    *                       EDIT AND MOVE BUFFER
                    *                       RETURN
                    *GETKEY
                    *FETCH KEYCODE INTO ACCUMULATOR
                    *RETURNS KEYCODE=-1 IF KEYPRESS ALREADY READ
3B53 A5 26          GETKEY  LDA KCLEAN      IF UNISSUED KEYCODE PRESENT
3B55 30 07                  BMI GETK01
3B57 A2 FF                  LDX #-1           INDICATE KEYCODE ISSUED
3B59 86 26                  STX KCLEAN
3B5B AA                     TAX               MAKE STATUS MATCH KEYCODE
3B5C 86 29                  STX KEUSED        INDICATE LAST KEYCODE ISSUED
          5E3B      GETK01  EQU *           ENDIF
3B5E 60                     RTS             RETURN
                    *GETNIB
                    *GET NIBBLE FROM (GETPTR) AND INCREMENT GETPTR
3B5F A5 22          GETNIB  LDA GETPTR      FETCH NIBBLE POINTER
3B61 4A                     LSR A           MAKE BYTE POINTER
3B62 AA                     TAX             PUT BYTE POINTER IN X
3B63 B5 00                  LDA 0,X         FETCH BYTE
3B65 B0 03                  BCS GETN01      IF NIBBLE POINTER EVEN
3B67 20 CF3E                JSR SWAP          GET H/O NIBBLE
          6A3B      GETN01  EQU *           ENDIF
3B6A E6 22                  INC GETPTR      POINT AT NEXT NIBBLE
3B6C 29 0F                  AND #$0F        CLEAN UP NIBBLE
3B6E 60                     RTS             RETURN
                    *HDR2AU
                    *SEND HEADER TO ACCOUNTING UNIT, RECEIVE REPLY
3B6F 85 0B          HDR2AU  STA INBUF+1     STORE HEADER IN BUFFER
3B71 A9 01                  LDA #1          STORE BYTE COUNT
3B73 85 0A                  STA INBUF+0
          753B      HDR2A1  EQU *           **** ALTERNATE ENTRY POINT
3B75 20 A13E                JSR XMTIN       TRANSMIT MESSAGE
          783B      HDR2A2  EQU *           **** ALTERNATE ENTRY POINT
3B78 20 953A                JSR FLSOUT      FLUSH QUEUED OUTBOUND MSG
3B7B 4C 7B3D                JMP RCVOUT      RECEIVE REPLY
                    *                       RETURN
```

```
                 *KEYMOD
                 *ENTER KEYENTRY MODE
3B7F 24 42       KEYMOD  BIT ZKEYMO      IF KEYENTRY-MODE FLAG CLEAR
3B81 30 09               BMI KEYM01
3B82 20 183A             JSR BLANK         BLANK FILL DISPLAY
                 *                         SET X = $FF
3B85 86 42               STX ZKEYMO        SET KEYENTRY-MODE FLAG
3B87 86 43               STX ZSTBLD        SET SETTABLE-DISPLAY FLAG
3B89 86 46               STX ZADDBL        SET ADDABLE-DISPLAY FLAG
     8B3B        KEYM01  EQU *           ENDIF
     8B3B        KEYM02  EQU *           ****ALTERNATE ENTRY POINT
3B3B A9 42               LDA #HDISAB     LOAD DISABLE-METER HEADER
     8D3B        KEYM03  EQU *           ****ALTERNATE ENTRY POINT
3B8D 20 6F3B             JSR UDR2AU      SEND MSG TO ACCOUNTING UNIT
                 *                       RECEIVE REPLY
3B90 4C B23A             JMP FLUSH       FLUSH QUEUED MSG
                 *                       RETURN
                 *OPEA
                 *PROCESS KEYSWITCH TRANSITION FROM OPERATE TO ENT AMT
3B93 46 4C       OPEA    LSR ZTOTAC      CLEAR TOTAL-ACCUMULATING FLAG
                 *                       FALL INTO PCLRK WHICH FOLLOWS
                 *                       CLEAR DISPLAY
                 *                       RETURN
                 *PCLRK
                 *PROCESS CLEAR KEY
3B95 20 BB3B     PCLRK   JSR KEYM02      DISABLE METER
     983B        PCLR01  EQU *           **** ALTERNATE ENTRY POINT
                 *                       RETURN WITH POSITIVE STATUS
3B98 20 183A             JSR BLANK       BLANK FILL DISPLAY
3B9B A9 FC               LDA #$FC        PUT SMALL O IN DISPLAY
3B9D 85 04               STA DISBUF+4
3B9F 24 4C               BIT ZTOTAC      IF TOTAL-ACCUMULATING FLAG SET
3BA1 10 0A               BPL PCLR03
3BA3 24 46               BIT ZADDBL        IF ADDABLE-DISPLAY FLAG SET
3BA5 10 06               BPL PCLR02
3BA7 20 393E             JSR FIXDEC          MAKE FIXED DECIMAL DISPLAY
3BAA 20 1C3E             JSR W2DADD          ADD WORK BUF TO DISPLAY
     AD3B        PCLR02  EQU *             ENDIF
     AD3B        PCLR03  EQU *           ENDIF
3BAD 46 4C               LSR ZTOTAC      CLEAR TOTAL-ACCUMULATING FLAG
3BAF 60                  RTS             RETURN
                 *OPEC
                 *PROCESS KEYSWITCH TRANSITION FROM OPERATE TO ENT COM
     933B        OPEC    EQU OPEA        CLEAR TOTAL-ACCUMULATING FLAG
                 *                       CLEAR DISPLAY
                 *                       RETURN
                 *OPOP
                 *PROCESS KEYSWITCH TRANSITION FROM OPERATE TO OPERATE
3BB0 20 502P     OPOP    JSR GETKEY      GET KEYCODE
3BB3 30 0C               BMI OPOP01      IF UNISSUED KEYCODE
                 *                         CASE
3BB5 20 E03B             JSR PDKEY           PROCESS DATA PREP KEYS
3BB8 20 CA3B             JSR PAKEY           PROCESS ARITHMETIC KEYS
3BBB 20 B13C             JSR PRKEY           PROCESS REGISTER DISPLAY KEYS
3BBE 4C DB3C             JMP PSKEY           PROCESS SET KEY
                 *                           NOCASE
                 *                         ENDCASE
                 *                         RETURN
     C13B        OPOP01  EQU *           ELSE
3BC1 A5 1E               LDA DBOUNC        IF KEY HELD DOWN
3BC3 F0 04               BEQ OPOP02
3BC5 A9 05               LDA #5              SET DISPLAY PERIOD TIMER
3BC7 85 2B               STA LNGTIM
     C93B        OPOP02  EQU *             ENDIF
3BC9 60                  RTS               RETURN
                 *                       ENDIF
                 *PAKEY
                 *PROCESS ARITHMETIC KEYCODE
3BCA A5 29       PAKEY   LDA KLOSED      FETCH KEYCODE
3BCC C9 0B               CMP #11         IF += KEYCODE
3BCE D0 02               BNE PAKE01
3BD0 F0 32               BEQ PPEQK         PROCESS += KEYCODE
                 *                         RETURN
     D23B        PAKE01  EQU *           ENDIF
     D23B        PAKE02  EQU *           **** ALTERNATE ENTRY POINT
3BD2 C9 0C               CMP #12         IF DECIMAL KEYCODE
3BD4 D0 09               BNE PAKE04
3BD6 20 7E3B             JSR KEYMOD        ENTER KEYENTRY MODE
                 *                         DISABLE METER
3BD9 A5 1F               LDA DECPOS        IF DECIMAL NOT ALREADY ENTERED
3BDB 10 02               BPL PAKE03
3BDD E6 1F               INC DECPOS          SHIFT DECIMAL INTO DISPLAY
     DF3B        PAKE03  EQU *             ENDIF
     DF3B        PAKE04  EQU *           ENDIF
     DF3B        PAKE05  EQU *           **** ALTERNATE ENTRY POINT
3BDF 60                  RTS             RETURN
                 *PDKEY
                 *PROCESS DATA PREPARATION KEYCODES
3BE0 A5 29       PDKEY   LDA KLOSED      FETCH KEYCODE
3BE2 C9 0A               CMP #10         IF NUMERIC KEY
3BE4 30 06               BMI PNUMK         PROCESS NUMERIC KEYCODE
                 *                         RETURN
                 *                       ENDIF
3BE6 C9 0D               CMP #13         IF CLEAR KEYCODE
3BE8 D0 F3               BNE PDKE01
3BEA F0 A9               BEQ PCLRK         PROCESS CLEAR KEYCODE
                 *                         RETURN
     DF3B        PDKE01  EQU PAKE05      ENDIF
                 *                       RETURN
                 *PNUMK
                 *PROCESS NUMERIC KEY
3BEC 20 7E3B     PNUMK   JSR KEYMOD      SET FOR KEYENTRY MODE
                 *                       DISABLE METER
3BEF A5 2C               LDA NIBCTR      IF DISPLAY BUFFER FULL
3BF1 C9 0A               CMP #10
3BF3 10 EA               BPL PAKE05        RETURN
                 *                       ENDIF
3BF5 A5 1F               LDA DECPOS      IF DECIMAL HAS BEEN ENTERED
3BF7 30 06               BMI PNUM01
3BF9 C9 03               CMP #3            IF 3 DIGITS AFTER DECIMAL
3BFB 10 E2               BPL PAKE05          RETURN
                 *                         ELSE
3BFD E6 1F               INC DECPOS          SHIFT DECIMAL LEFT
                 *                         ENDIF
     FF3B        PNUM01  EQU *           ENDIF
3BFF A5 29               LDA KLOSED      PUSH KEYCODE INTO DISPLAY BUFFER
3C01 4C AD3C             JMP PSHN1B
                 *                       RETURN
                 *PPEQK
                 *PROCESS PLUS-EQUAL KEY
3C04 20 8B3B     PPEQK   JSR KEYM02      DISABLE METER
3C07 24 46               BIT ZADDBL      IF ADDABLE-DISPLAY FLAG CLEAR
3C09 30 0E               BMI PPEQ02
3C0B 24 45               BIT ZTIMD         IF TIMED-DISPLAY FLAG SET
3C0D 10 02               BPL PPEQ01
3C0F 30 87               BMI PCLR01          CLEAR DISPLAY
                 *                           RETURN
     113C        PPEQ01  EQU *             ELSE
3C11 38                  SEC                 SET TOTAL-ACCUMULATING FLAG
3C12 66 4C               ROR ZTOTAC
3C14 20 593E             JSR FIXDEC          MAKE FIXED DECIMAL DISPLAY
                 *                           SET STATUS POSITIVE
3C17 10 0F               BPL PPEQ04          MOVE DISPLAY TO WORK BUFFER
                 *                           RETURN
                 *                         ENDIF
     193C        PPEQ02  EQU *           ENDIF
3C19 20 393E             JSR FIXDEC      MAKE FIXED DECIMAL DISPLAY
3C1C 24 4C               BIT ZTOTAC      IF TOTAL-ACCUMULATING FLAG SET
```

```
3C1E 10 03            BPL PPE003
3C20 20 1C3E          JSR W2DADD          ADD WORK BUFFER TO DISPLAY
     233C    PPE003   EQU *             ENDIF
3C23 38               SEC               SET TOTAL-ACCUMULATING FLAG
3C24 66 4C            ROR ZTOTAC
3C26 46 46            LSR ZADDBL        CLEAR ADDABLE-DISPLAY FLAG
     283C    PPE004   EQU *             ****ALTERNATE ENTRY POINT
3C28 A9 00            LDA #DISBUF+0*2   SET TO GET NIBBLES FROM DISPLAY
3C2A 85 22            STA GETPTR
3C2C A9 0A            LDA #WORKBUF+0*2  SET TO PUT NIBBLES IN WORK BUFFER
     2E3C    PPE005   EQU *             ****ALTERNATE ENTRY POINT
3C2E A0 0A            LDY #10           SET Y TO COUNT 10 NIBBLES
     303C    PPE006   EQU *             ****ALTERNATE ENTRY POINT
3C30 85 32            STA PUTPTR        DEFINE PUTPTR
     323C    PPE007   EQU *             ****ALTERNATE ENTRY POINT
     323C    PPE008   EQU *             DO WHILE Y .NE. 0
3C32 88               DEY                 DECREMENT AND TEST Y
3C33 30 0A            BMI PPE010
3C35 20 5F3B          JSR GETNIB            FETCH NIBBLE
3C38 C9 0A            CMP #$0A              IF NON-NUMERIC
3C3A 30 02            BMI PPE009
3C3C A9 00            LDA #$00                CHANGE TO ZERO
     3E3C    PPE009   EQU *                 ENDIF
3C3E 20 523D          JSR PUTNIB            STORE NIBBLE
3C41 4C 323C          JMP PPE008
     1E3C    PPE010   EQU PPE003        ENDDO
                      *                 RETURN

                      *PPOSTR
                      *PROCESS POSTAGE SETTING REPLY
3C44 A5 13   PPOSTR   LDA OUTBUF+1      IF POSTAGE SETTING REPLY RECEIVED
3C46 C9 81            CMP #HPSET
3C48 D0 3C            BNE PPOST5
3C4A A2 28            LDX #OUTBUF+2*2     DISPLAY SETTING
3C4C 20 283A          JSR DISBFR
3C4F 20 393E          JSR FIXDEC          REFORMAT INTO FIXED DEC DISPLAY
3C52 46 43            LSR ZSTBLD          CLEAR SETTABLE-DISPLAY FLAG
3C54 A9 00            LDA #DISBUF+0*2     SET TO SCAN H/O OF DISPLAY
3C56 85 22            STA GETPTR
     583C    PPOST1   EQU *               DO UNTIL H/O NON-BLANK FOUND
3C58 20 5F3B          JSR GETNIB            LOOK FOR NON-BLANK
3C5B C9 0F            CMP #$F
3C5D F0 F9            BEQ PPOST1
                      *                   ENDDO
3C5F A6 22            LDX GETPTR          POINT AT LAST H/O BLANK
3C61 CA               DEX
3C62 CA               DEX
3C63 86 32            STX PUTPTR
3C65 E0 00            CPX #DISBUF+0*2     IF H/O BLANK FOUND
3C67 F0 05            BEQ PPOST2
3C69 A9 0D            LDA #$D               INSERT H/O WING
3C6B 20 523D          JSR PUTNIB
     6E3C    PPOST2   EQU *               ENDIF
     6E3C    PPOST3   EQU *               DO UNTIL L/O BLANK FOUND
3C6E 20 5F3B          JSR GETNIB            LOOK FOR BLANK
3C71 C9 0F            CMP #$F
3C73 D0 F9            BNE PPOST3
                      *                   ENDDO
3C75 A6 22            LDX GETPTR          POINT AT FIRST L/O BLANK
3C77 CA               DEX
3C78 86 32            STX PUTPTR
3C7A A9 0D            LDA #$D             INSERT L/O WING
3C7C 20 523D          JSR PUTNIB
3C7F 38               SEC                 SET SETTING-DISPLAY FLAG
3C80 66 44            ROR ZSTNGD
     823C    PPOST4   EQU *               **** ALTERNATE ENTRY POINT
3C82 46 46            LSR ZADDBL          CLEAR ADDABLE-DISPLAY FLAG
3C84 46 4C            LSR ZTOTAC          CLEAR TOTAL-ACCUMULATING FLAG
     863C    PPOST5   EQU *             ENDIF
     863C    PPOST6   EQU *             **** ALTERNATE ENTRY POINT
3C86 60               RTS               RETURN

                      *PRKEY
                      *PROCESS REGISTER DISPLAY KEYCODES
3C87 A5 29   PRKEY    LDA KLUSED        FETCH KEYCODE
     893C    PRKE00   EQU *             **** ALTERNATE ENTRY POINT
3C89 C9 10            CMP #16           IF NOT REGISTER DISPLAY KEY
3C8B 90 F9            BCC PPOST6          RETURN
3C8D C9 16            CMP #22
3C8F B0 F5            BCS PPOST6          RETURN
                      *                 ENDIF
                      *                 CARRY IS CLEAR
3C91 69 42            ADC #HREQAR-16    FORM REQUEST HEADER
3C93 20 E13B          JSR HDR2AU        REQUEST REGISTER VALUE
3C96 A5 13            LDA OUTBUF+1      IF UNEXPECTED STATUS REPLY
3C98 C9 80            CMP #HSTAT
3C9A D0 03            BNE PRKE01
3C9C 20 783B          JSR HDR2A2          FLUSH QUEUED OUTBOUND STATUS MSG
                      *                   RECEIVE REGISTER MESSAGE
     9F3C    PRKE01   EQU *             ENDIF
3C9F A2 28            LDX #OUTBUF+2*2   DISPLAY DATA RECEIVED
3CA1 20 283A          JSR DISBFR
     A43C    PRKE02   EQU *             **** ALTERNATE ENTRY POINT
3CA4 A9 05            LDA #5            SET TO SET DISPLAY TIME
     A63C    PRKE03   EQU *             **** ALTERNATE ENTRY POINT
3CA6 85 2B            STA LNGTIM        SET DISPLAY TIMER
     A83C    PRKE04   EQU *             **** ALTERNATE ENTRY POINT
3CA8 38               SEC               SET TIMED-DISPLAY FLAG
3CA9 66 45            ROR ZTIMD
3CAB D0 D5            BNE PPOST4        CLEAR ADDABLE-DISPLAY FLAG
                      *                 CLEAR TOTAL-ACCUMULATING FLAG
                      *                 RETURN

                      *PSHNIB
                      *PUSH NIBBLE INTO DISPLAY BUFFER
3CAD 48      PSHNIB   PHA               SAVE NIBBLE IN STACK
3CAE A5 00            LDA DISBUF+0      FETCH L/O DISPLAY BYTE
3CB0 20 013E          JSR SWAP          MOVE L/O NIBBLE UP
                      *                 MOVE H/O BLANK DOWN
3CB3 85 00            STA DISBUF+0
3CB5 A2 03            LDX #3            SET TO LOOP 4 TIMES
3CB7 86 37            STX TEMP02
3CB9 A2 00            LDX #0            POINT AT BYTE JUST SHIFTED
     BB3C    PSHN02   EQU *             DO UNTIL 8 NIBBLES MOVED UP
3CBB E8               INX                 POINT AT NEXT LOWER BYTE
3CBC B5 00            LDA DISBUF,X        FETCH 2 NIBBLES
3CBE 20 013E          JSR SWAP            MOVE L/O NIBBLE TO H/O
3CC1 48               PHA                 SAVE SWAPPED NIBBLES
3CC2 09 0F            ORA #$0F            PUT BLANK AFTER L/O NIBBLE
3CC4 95 00            STA DISBUF,X        INSERT IN SAME BYTE
3CC6 68               PLA                 FETCH H/O NIBBLE
3CC7 09 F0            ORA #$F0            PUT BLANK BEFORE H/O NIBBLE
3CC9 35 FF            AND DISBUF-1,X      INSERT IN NEXT BYTE UP
3CCB 95 FF            STA DISBUF-1,X
3CCD C6 37            DEC TEMP02          COUNT THE LOOP
3CCF 10 EA            BPL PSHN02
                      *                 ENDDO
3CD1 68               PLA               FETCH SAVED NIBBLE
3CD2 09 F0            ORA #$F0          PUT BLANK BEFORE NIBBLE
3CD4 35 00            AND DISBUF+0,X    INSERT NIBBLE IN L/O BYTE
3CD6 95 00            STA DISBUF+0,X
3CD8 E6 2C            INC NIBCNT        COUNT THE NIBBLE
3CDA 60               RTS               RETURN

                      *PSKEY
                      *PROCESS SET KEYCODE
3CDB A5 29   PSKEY    LDA KLUSED        FETCH KEYCODE
3CDD C9 0A            CMP #10           IF NOT SET KEY
3CDF D0 20            BNE PSKE05          RETURN
                      *                 ENDIF
3CE1 24 44            BIT ZSTNGD        IF SETTING-DISPLAY FLAG SET
3CE3 30 07            BMI PSKE01
```

```
                  *                         SEND ENABLE COMMAND
                  *                         RECEIVE REPLY
                  *                         FLUSH QUEUED MSG
                  *                         RETURN
                  *                       ENDIF
3CE5 24 45                BIT ZSTDLD      IF SETTABLE-DISPLAY FLAG CLEAR
3CE7 30 08                BMI PSKE02
3CE9 20 013D              JSR PSKE04        FETCH POSTAGE SETTING
                  *                         FLUSH QUEUED MSG
     3CEC         PSKE01  EQU *             **** ALTERNATE ENTRY POINT
3CEC A9 41                LDA #MEGABL       SEND ENABLE COMMAND
3CEE 4C B03B              JMP KEY063        RECEIVE REPLY
                  *                         FLUSH BUFFER
                  *                         RETURN
     F13C         PSKE02  EQU *           ENDIF
3CF1 20 043C              JSR PPEQK       SIMULATE += KEYPRESS
3CF4 A9 C1                LDA #RCETPO     SET TO SEND SET-POSTAGE COMMAND
3CF6 A2 0D                LDX #INOBF+3    FORMAT COMMAND IN INBUF
3CF8 20 113B              JSR FMIBUF
3CFB 20 753B              JSR RDB2A1      SEND MSG TO AU
                  *                       RECEIVE STATUS
     FF3C         PSKE03  EQU *           **** ALTERNATE ENTRY POINT
3CFF 20 B23A              JSR FLUSH       FLUSH QUEUED MSG
     013D         PSKE04  EQU *           **** ALTERNATE ENTRY POINT
3D01 A9 51                LDA #RDEQPO     READ AT POSTAGE SETTING
3D03 20 F13B              JSR RD02A0
                  *                       RECEIVE POSTAGE SETTING
3D06 20 B23A              JSR FLUSH       FLUSH QUEUED MSG
     093D         PSKE05  EQU *           **** ALTERNATE ENTRY POINT
3D09 60                   RTS             RETURN

                  *PSTATR
                  *PROCESS STATUS REPLY
3D0A A5 13        PSTATR  LDA OUTBUF+1    IF STATUS REPLY
3D0C C9 86                CMP #BSTAT
3D0E D0 F9                BNE PSTAT5
3D10 A2 F9                LDX #-7           SET TO COPY 7 FLAGS
3D12 A5 14                LDA OUTBUF+2
     143D         PSTAT1  EQU *             DO UNTIL 7 FLAGS COPIED
3D14 2A                   ROL A               MOVE BIT INTO FLAG BYTE
3D15 76 3F                ROR YFLAGS+7,X
3D17 E8                   INX                 COUNT BIT
3D18 30 FA                BMI PSTAT1
                  *                         ENDDO
                  *                         IF METER HAS TRIPPED
3D1A 05 40                ORA ZTRIP           SET METER TRIP FLAG
3D1C 85 40                STA ZTRIP
                  *                         ENDIF
3D1E 26 3F                ROL YHARDE        MOVE PREV HARD-ERROR TO CY
3D20 A5 15                LDA OUTBUF+3      FETCH ERROR BITS
3D22 29 82                AND #%10000010
3D24 85 3F                STA YHARDE        SET/CLEAR HARD ERROR FLAG
3D26 F0 24                BEQ PSTAT4        IF SOFT OR HARD ERROR
3D28 29 02                AND #%00000010      IF SOFT ERROR
3D2A D0 02                BNE PSTAT2            MAKE ERROR DISPLAY
                  *                             JUMP INTO MAIN LOOP
                  *                           ENDIF
3D2C B0 DB                BCS PSKE05          IF HARD ERROR SET BEFORE
                  *                             RETURN
                  *                           ENDIF
     2E3D         PSTAT2  EQU *               **** ALTERNATE ENTRY POINT
3D2E 20 1B3A              JSR BLANK           BLANK FULL DISPLAY
3D31 A9 AB                LDA #$AB            DISPLAY ERROR LEGEND
3D33 85 01                STA DISBUF+1
3D35 A9 BC                LDA #$BC
3D37 85 02                STA DISBUF+2
3D39 A9 BF                LDA #$9F
3D3B 85 03                STA DISBUF+3
3D3D 20 B23C              JSR FPUST4          CLEAR ADDABLE-DISPLAY FLAG
                  *                           CLEAR TOTAL-ACCUMULATING FLAG
3D40 20 A43C              JSR SRK002          SET FOR TIMED DISPLAY
     433D         PSTAT3  EQU *               **** ALTERNATE ENTRY POINT
3D43 78                   SEI                 SET INTERRUPT DISABLE
3D44 A2 7F                LDX #TSTACK         REINITIALIZE STACK
3D46 9A                   TXS
3D47 A5 2F                LDA PORTC1          IDLE SERIAL OUTPUT LINES
3D49 09 03                ORA #3
3D4B 85 32                STA PORTC
3D4D 85 2F                STA PORTC1
3D4F 4C 4C39              JMP MLOOP           JUMP INTO MAIN LOOP
     093D         PSTAT4  EQU PSKE05        ENDIF
     093D         PSTAT5  EQU PSKE05      ENDIF
                  *                       RETURN

                  *PUTNIB
                  *PUT NIBBLE INTO (PUTPTR) AND INCREMENT PUTPTR
3D52 29 0F        PUTNIB  AND #$0F        CLEAN UP NIBBLE
3D54 48                   PHA             TEMP SAVE NIBBLE
3D55 A5 32                LDA PUTPTR      FETCH NIBBLE POINTER
3D57 4A                   LSR A           MAKE BYTE POINTER
3D58 AA                   TAX             PUT BYTE POINTER IN X
3D59 A9 F0                LDA #$F0        SET TO MAKE L/O HOLE
3D5B B0 07                BCS PUTN01      IF NIBBLE POINTER EVEN
3D5D 68                   PLA               MOVE NIBBLE TO H/O
3D5E 20 0A3E              JSR SWAP
3D61 48                   PHA
3D62 A9 0F                LDA #$0F          SET TO MAKE H/O HOLE
     643D         PUTN01  EQU *           ENDIF
3D64 E6 32                INC PUTPTR      POINT AT NEXT NIBBLE
3D66 35 00                AND 0,X         MAKE HOLE
3D68 95 00                STA 0,X
3D6A 68                   PLA             INSERT NIBBLE
3D6B 15 00                ORA 0,X
3D6D 95 00                STA 0,X
3D6F 60                   RTS             RETURN

                  *RCVIN
                  *RECEIVE INBOUND MESSAGE FROM EXTERNAL DEVICE
3D70 24 49        RCVIN   BIT ZEXCOM      IF EXT-COMMUN FLAG SET
3D72 10 1B                BPL RCV103
3D74 20 4F3A              JSR DISINT        DISABLE INTERRUPTS
3D77 20 543F              JSR D120S         DELAY FOR 12 USEC, T3
3D7A 20 833D              JSR RCV102
     7D3D         RCV101  EQU *             **** ALTERNATE ENTRY POINT
3D7D A0 BD                LDY #-67          DELAY 350 USEC, T15
3D7F 20 525F              JSR D201S
3D82 60                   RTS               RETURN
     833D         RCV102  EQU *             **** ALTERNATE ENTRY POINT
3D83 A9 02                LDA #EXMASK       SELECT EXTERNAL DEVICE
3D85 A2 0A                LDX #INBUF        POINT AT INBOUND BUFFER
3D87 A0 10                LDY #IBEND        POINT AT END OF BUFFER
3D89 20 903D              JSR RCVMSG        RECEIVE MESSAGE
3D8C 38                   SEC               SET QUEUED-INBOUND-MSG FLAG
3D8D 66 4A                ROR ZQIN
     8F3D         RCV103  EQU *           ENDIF
3D8F 60                   RTS             RETURN

                  *RCVMSG
                  *RECEIVE MESSAGE
3D90 85 25        RCVMSG  STA IOMASK      SAVE DEVICE SELECTOR
3D92 86 23                STX IBPTR+0     SAVE INITIAL BUFFER POINTER
3D94 86 1D                STX BPTR        INITIALIZE BUFFER POINTER
3D96 84 1B                STY BEND        SAVE POINTER TO BUFFER END
3D98 20 623F              JSR ECHO        ECHO RTS AS CTS
     9B3D         RCVM01  EQU *           DO UNTIL EOM RECEIVED
3D9B A5 1B                LDA BEND          IF BUFFER IS FULL
3D9D C5 1D                CMP BPTR
3D9F 30 43                BMI RCVM04
                  *                           ABORT
                  *                         ENDIF
3DA1 E6 1D                INC BPTR          POINT AT NEXT BYTE
3DA3 20 7D3F              JSR RCVBYT        RECEIVE BYTE
```

```
3DA8 A0 FB              LDY #-5         DELAY 46 USEC, T10
3DAA 20 413F            JSR D26US
3DAD 20 623F            JSR ECHO          ECHO EOB/EOM AS CTS/NCTS
3DAE B0 E8              BCS RCVM01
                   *                    ENDDO
3DB0 38                 SEC             SET CARRY FOR SBC
3DB1 A2 23              LDX #IBPTR+0    CALCULATE NUMBER OF BYTES
3DB3 A5 1D              LDA BPTR
3DB5 F5 00              SBC 0,X
3DB7 81 00              STA (0,X)       STORE IN FIRST BYTE OF BUFFER
3DB9 A0 E9              LDY #-32        DELAY 173 USEC, T8
3DBB 20 533F            JSR D18US
3DBE A5 25              LDA IOMASK      IF NAK
3DC0 25 8C              AND IORTD
3DC2 F0 23              BEQ RCVM05
3DC4 20 703D            JSR RCV101        DELAY 350 USEC, T13
     C73D      RCVM02   EQU *             **** ALTERNATE ENTRY POINT
3DC7 A5 25              LDA IOMASK        IF TALKING TO AU
3DC9 6A                 ROR A
3DCA 90 18              BCC RCVM03
3DCC 20 953A            JSR FLSOUT          FLUSH QUEUED OUTBOUND MSG
3DCF A9 03              LDA #3              BUILD FATAL ERROR STATUS MSG
3DD1 85 12              STA OUTBUF+0
3DD3 A9 C0              LDA #0
3DD5 85 14              STA OUTBUF+2
3DD7 A5 80              LDA #ESTAT
3DD9 85 13              STA OUTBUF+1
3DDB 85 15              STA OUTBUF+3
3DDD 85 3F              STA HERR0E          SET HARD ERROR FLAG
3DDF 85 4B              STA ZQOUT           SET QUEUED-OUTBOUND-MSG FLAG
3DE1 4C 2E3D            JMP PSTAT2          DISPLAY ERROR AND ABORT
     E43D      RCVM03   EQU *             ENDIF
3DE4 4C 4?3D   RCVM04   JMP PSTAT3        ABORT
     E73D      RCVM05   EQU *           ENDIF
3DE7 60                 RTS             RETURN

                   *RCVOUT
                   *RECEIVE OUTBOUND MESSAGE FROM ACCOUNTING UNIT
3DE8 20 4F3A   RCVOUT   JSR DISINT      DISABLE INTERRUPTS
3DEB 20 F13D            JSR RCV001      RECEIVE MSG FROM ACCT UNIT
3DEE 4C 7D3D            JMP RCV101      DELAY 350 USEC, T15
                   *                    RETURN
     F13D      RCV001   EQU *           **** ALTERNATE ENTRY POINT
3DF1 A9 01              LDA #AUMASK     SELECT ACCOUNTING UNIT
     F33D      RCV002   EQU *           DO UNTIL RTS SEEN
3DF3 24 83              BIT PORTD         LOOK FOR RTS
3DF5 10 FC              BNE RCV002
                   *                    ENDDO
3DF7 A2 12              LDX #OUTBUF     POINT AT OUTBOUND BUFFER
3DF9 A0 15              LDY #OBEND      POINT AT END OF BUFFER
3DFB 20 993D            JSR RCVMSG      RECEIVE MESSAGE
3DFE 38                 SEC             SET QUEUED-OUTBOUND-MSG FLAG
3DFF 66 4B              ROR ZQOUT
3E01 60                 RTS             RETURN

                   *SETXMT
                   *SET TO TRANSMIT - SET PORT IMAGES - SET TO TEST FOR RTS
3E02 48        SETXMT   PHA             TEMP SAVE DEVICE SELECT
3E03 45 2F              EOR PORTC1      SAVE PORT IMAGE FOR DATA=1
3E05 85 31              STA PORTC1
3E07 A5 2F              LDA PORTC1      SAVE PORT IMAGE FOR DATA=0
3E09 85 30              STA PORTC0
3E0B 68                 PLA             PLACE DEVICE SELECT IN ACCUMULATOR
3E0C 24 83              BIT PORTD       SET TO TEST FOR RTS
3E0E 60                 RTS             RETURN

                   *SWAP
                   *SWAP NIBBLES IN ACCUMULATOR
                   *RETURN WITH CLEAR CARRY
3E0F 0A        SWAP     ASL A   SHIFT H/O BIT TO CARRY, CLEAR L/O BIT
3E10 69 00              ADC #0  MOVE CARRY TO L/O BIT,CLEAR CARRY
3E12 0A                 ASL A
3E13 69 00              ADC #0
3E15 0A                 ASL A
3E16 69 00              ADC #0
3E18 0A                 ASL A
3E19 69 00              ADC #0
3E1B 60                 RTS             RETURN

                   *W2DADD
                   *ADD WORK BUFFER TO DISPLAY
3E1C 20 4F3A   W2DADD   JSR DISINT      DISABLE INTERRUPTS
3E1F A9 60              LDA #DISBUF+0*2 POINT AT DISPLAY
3E21 85 22              STA GETPTR
3E23 20 2F3C            JSR PPE005      SET X TO COUNT 10 NIBBLES
                   *                    DEFINE PUTPTR
                   *                    EDIT MOVE
3E26 A2 04              LDX #4          SET TO ADD 5 BYTES
3E28 18                 CLC
3E29 F8                 SED             SET FOR DECIMAL ADD
     2A3E      W2DA01   EQU *           DO UNTIL 5 BYTES ADDED
3E2A B5 00              LDA DISBUF,X      ADD BUFFERS
3E2C 75 05              ADC WRKBUF,X
3E2E 95 30              STA DISBUF,X      PUT RESULT IN DISPLAY
3E30 CA                 DEX               COUNT BYTE
3E31 10 F7              BPL W2DA01
                   *                    ENDDO
3E33 D8                 CLD             SET FOR BINARY ARITHMETIC
3E34 90 03              BCC W2DA02      IF OVERFLOW
3E36 4C 2E3D            JMP PSTAT2        DISPLAY ERROR AND ABORT
     393E      W2DA02   EQU *           ENDIF
                   *                    FALL INTO FIXDEC WHICH FOLLOWS
                   *                    MAKE FIXED DECIMAL DISPLAY
                   *                    RETURN

                   *FIXDEC
                   *REFORMAT DISPLAY INTO FIXED DECIMAL FORMAT
                   *RETURNS WITH STATUS WORD INDICATING POSITIVE RESULT
3E39 20 4F3A   FIXDEC   JSR DISINT      DISABLE INTERRUPTS
3E3C A9 60              LDA #DISBUF+0*2 POINT AT H/O NIBBLE
3E3E 85 22              STA GETPTR
3E40 85 32              STA PUTPTR
3E42 A0 0A              LDY #10         ASSUME DISPLAY IS FULL
3E44 84 20              STY NIBCTR
3E46 88                 DEY             SET TO COUNT 10 NIBBLES
     473E      FIX001   EQU *           LOOP WITH 2 EXITS
3E47 20 5F3B            JSR GETNIB        FETCH NIBBLE FROM H/O END
3E4A D0 02              BNE FIX002        IF LEADING ZERO
3E4C A9 0F              LDA #$0F            MAKE IT NON NUMERIC
     4E3E      FIX002   EQU *             ENDIF
3E4E C9 0A              CMP #$0A          **** EXIT IF NUMERIC NIBBLE
3E50 30 0A              BMI FIX003
3E52 A9 0F              LDA #$0F          BLANK NON-NUMERIC NIBBLE
3E54 20 723D            JSR PUTNIB
3E57 C6 20              DEC NIBCTR        DECR DISPLAYED NIBBLE COUNT
3E59 88                 DEY               **** EXIT IF 10 NIBS SCANNED
3E5A 10 EB              BPL FIX001
     5C3E      FIX003   EQU *           ENDLOOP
3E5C A5 1F              LDA DECPOS      IF DECIMAL NOT ENTERED
3E5E 10 04              BPL FIX004
3E60 A9 02              LDA #2            FIX ITS POSITION AT 2
3E62 85 1F              STA DECPOS
     643E      FIX004   EQU *           ENDIF
3E64 38                 SEC             IF DISPLAY CAN'T BE FORMATTED
3E65 A5 20              LDA NIBCTR
3E67 E5 1F              SBC DECPOS
3E69 C9 07              CMP #7
3E6B 30 05              BMI FIX005
3E6D 4C 2E3D            JMP PSTAT2        DISPLAY ERROR AND ABORT
     703E      FIX005   EQU *           ENDIF
     703E      FIX006   EQU *           DO WHILE DECPOS .NE. 4
3E70 A5 1F              LDA DECPOS
3E72 C9 04              CMP #4
```

```
[illegible] 10 [illegible]          BPL FIX007
[illegible]                         LDY [illegible]     PUSH BLANK INTO DISPLAY
[illegible] 20 [illegible]          JSR CSHR1B
[illegible] E6 1F                   INC DECPOS          SHIFT DECIMAL LEFT
[illegible] D0 E1                   BNE FIX006
     [illegible]    FIX007  EQU *               ENDDO
                    *                           SET TO OPERATE ON UNITS
[illegible] A9 03                   LDA #DISBUF+2*2+1
[illegible] 85 22                   STA CPTR
[illegible] A0 05                   LDY #5              SET TO MOVE 5 NIBBLES
[illegible] 20 [illegible]          JSR [illegible]     DECING [illegible]
                    *                           [illegible] AND MOVE
[illegible]                         LDA #81             SET TO BLANK MILS AND END
[illegible] 4E 45                   STA ZSTBL9          SET SETTABLE-DISPLAY FLAG
3E8? A4 04                  LDY DISBUF+4        IF MILS AND END NOT 00
3E8E F0 02                  BEQ FIX008
3E90 A9 0F                  LDA #$0F              SET TO BLANK END ONLY
     923E           FIX008  EQU *               ENDIF
3E92 05 04                  ORA DISBUF+4        BLOT MILS AND END
3E94 85 04                  STA DISBUF+4
3E96 A5 1F                  LDA DECPOS          IF NIBCTR EXCLUDES LEAD ZERO
3E98 C5 2C                  CMP NIBCTR
3E9A 30 02                  BMI FIX009
3E9C 85 2C                  STA NIBCTR            INCLUDE LEAD ZERO IN NIBCTR
     9E3E           FIX009  EQU *               ENDIF
3E9E 46 41                  LSR ZSTNGD          CLEAR SETTING-DISPLAYED FLAG
3EA0 46 42                  LSR ZKEYMO          CLEAR KEYENTRY-MODE FLAG
3EA2 60                     RTS                 RETURN

                    *XMTIN
                    *TRANSMIT IN INBOUND DIRECTION TO ACCOUNTING UNIT
3EA3 20 4F3A XMTIN  JSR DISINT          DISABLE INTERRUPTS
3EA6 85 4A                  STA ZQIN            CLEAR QUEUED-INBOUND-MSG FLAG
3EA8 A9 01                  LDA #AUMASK         SET TO TRANSMIT
3EAA 20 023E                JSR SETXMT
3EAD F0 08                  BEQ XMT101          IF NO RTS FROM ACCOUNTING UNIT
3EAF 20 5B3F                JSR DOUT01            RAISE RTS/CTS TO ACCOUNTING UNIT
3EB2 A0 FC                  LDY #-4               DELAY 39 USEC. T2
3EB4 20 5?3F                JSR D2?US
     B73E           XMT101  EQU *               ENDIF
3EB7 24 03                  BIT PORTD           IF RTS FROM ACCOUNTING UNIT
3EB9 D0 0B                  BNE XMT102
3EBB 20 F13D                JSR RCV001            RECEIVE MSG FROM ACCOUNTING UNIT
3EBE 20 5B3F                JSR DOUT01            OUTPUT RTS
3EC1 A0 CD                  LDY #-51              DELAY 270 USEC. T17
3EC3 20 323F                JSR D20US
     C63E           XMT102  EQU *               ENDIF
3EC6 A9 01                  LDA #AUMASK         TRANSMIT INBUF TO ACCOUNTING UNIT
3EC8 A2 0A                  LDX #INBUF
3ECA 20 CE3E                JSR XMTMSG
3ECD 60                     RTS                 RETURN

                    *XMTMSG
                    *TRANSMIT MESSAGE
3ECE 85 25          XMTMSG  STA IOMASK          STORE DEVICE SELECTOR
3ED0 86 1D                  STX BPTR            INIT BYTE POINTER
3ED2 86 48                  STX ZECHER          CLEAR ECHO-ERROR FLAG
3ED4 B5 00                  LDA 0,X             INIT BYTE COUNTER
3ED6 85 1A                  STA BCTR
3ED8 20 5B3F                JSR DOUT01          RAISE RTS
     DB3E           XMTM01  EQU *               DO UNTIL ALL BYTES SENT
3EDB A2 00                  LDX #0                SET TIMEOUT COUNTER, T13
     DD3E           XMTM02  EQU *                 LOOP - EXIT ON CTS
3EDD A5 25                  LDA IOMASK              **** EXIT IF CTS
3EDF 25 03                  AND PORTD
3EE1 F0 0C                  BEQ XMTM05
3EE3 E8                     INX                       INCR TIMEOUT COUNTER
3EE4 D0 F7                  BNE XMTM04                IF TIMED OUT
3EE6 A9 02                  LDA #EXMASK                 IF SENDING TO EXT DEV
3EE8 C5 25                  CMP IOMASK
3EEA D0 F1                  BNE XMTM03
3EEC 4C 573F                JMP DOUT00                    LOWER RTS
                    *                                     RETURN
     DD3E           XMTM03  EQU XMTM02                  ENDIF
     DD3E           XMTM04  EQU XMTM02                ENDIF
     EF3E           XMTM05  EQU *                 ENDLOOP
3EEF A0 F5                  LDY #-11              DELAY 72 USEC. T4
3EF1 20 513F                JSR D22US
3EF4 E6 1D                  INC BPTR              INCR BYTE POINTER
3EF6 20 A93F                JSR XMTBYT            TRANSMIT BYTE
3EF9 C6 1A                  DEC BCTR              DECR BYTE COUNTER
3EFB D0 DE                  BNE XMTM01
                    *                           ENDDO
3EFD 24 48                  BIT ZECHER          IF ECHO ERROR
3EFF 10 03                  BPL XMTM06
3F01 4C C73D                JMP RCVN02            CHECK STATUS, ABORT
     043F           XMTM06  EQU *               ENDIF
3F04 20 5B3F                JSR DOUT01          SEND ACK
3F07 A0 CB                  LDY #-53            DELAY 236 USEC. T7
3F09 20 4?3F                JSR D26US
3F0C 20 573F                JSR DOUT00          SEND EOM
3F0F A0 FE                  LDY #-18            DELAY 409 USEC. T14
3F11 20 50?F                JSR D24US
3F14 60                     RTS                 RETURN

                    *XMTOUT
                    *TRANSMIT IN OUTWARD DIRECTION TO EXTERNAL DEVICE
3F15 20 4F3A XMTOUT JSR DISINT          DISABLE INTERRUPTS
3F18 85 4B                  STA ZQOUT           CLEAR QUEUED-OUTBOUND-MSG FLAG
3F1A 24 49                  BIT ZEXCOM          IF EXT-COMMUN FLAG SET
3F1C 10 1E                  BPL XMT002
3F1E A9 02                  LDA #EXMASK           SET TO TRANSMIT
3F20 20 023E                JSR SETXMT
3F23 D0 10                  BNE XMT001            IF RTS FROM EXTERNAL DEVICE
3F25 A0 FC                  LDY #-4                 DELAY 35 USEC. T3
3F27 20 323F                JSR D20US
3F2A 20 833D                JSR RCV102              RECEIVE MSG FROM EXT DEV
3F2D 20 5B3F                JSR DOUT01              RAISE RTS
3F30 A0 CD                  LDY #-51                DELAY 270 USEC. T17
3F32 20 323F                JSR D20US
     353F           XMT001  EQU *                 ENDIF
3F35 A9 02                  LDA #EXMASK           TRANSMIT OUTBUF TO EXT DEV
3F37 A2 12                  LDX #OUTBUF
3F39 20 CE3E                JSR XMTMSG
     3C3F           XMT002  EQU *               ENDIF
3F3C 60                     RTS                 RETURN

3F4F                        ORG $3FFA-171
                    *D26US
                    *TIME DELAY ROUTINES. DELAY INCLUDES LDY # AND JSR
                    *KEEP CODE AWAY FROM PAGE BOUNDARIES
                    *                           SETTINGS FOR Y
                    *                           -1,-2,-3,-4,-5,-6,-7,-8,-9
3F4F EA             D26US   NOP                 26,31,36,41,46,51,56,61,66
3F50 EA             D24US   NOP                 24,29,34,39,44,49,54,59,64
3F51 EA             D22US   NOP                 22,27,32,37,42,47,52,57,62
3F52 EA             D20US   NOP                 20,25,30,35,40,45,50,55,60
3F53 C8             D18US   INY                 18,23,28,33,38,43,48,53,58
3F54 30 F9                  BMI D18US
3F56 60             D12US   RTS                 12

                    *DOUT00
                    *OUTPUT DATA 0 OR DATA 1 TO CURRENT DEVICE
3F57 A6 30          DOUT00  LDX PORTC0          SET TO OUTPUT DATA 0
3F59 D0 02                  BNE DOUT02          JUMP AROUND ALTERNATE ENTRY POINT
     5B3F           DOUT01  EQU *               **** ALTERNATE ENTRY POINT
3F5B A6 31                  LDX PORTC1          SET TO OUTPUT DATA 1
3F5D 86 02          DOUT02  STX PORTC           OUTPUT DATA
3F5F 86 2F                  STX PORTCI          RECORD PORT IMAGE
3F61 60                     RTS                 RETURN
```

```
                  *ECHO
                  *READ AND ECHO INPUT
                  *ON RETURN CARRY REPRESENTS DATA=0 OR DATA=1
3F62 A5 23        ECHO     LDA IOMASK         READ INPUT
3F64 24 03                 BIT PORTD
3F66 D0 00                 BNE *+2            IF BIT=1 FOR DATA=0
3F68 F0 07                 BEQ ECHO01
3F6A 18                    CLC                  CARRY=0 FOR DATA=0
                  *                             SET TO ECHO BIT=1 FOR DATA=0
3F6B 49 00                 EOR #$00             (EQUALIZE TIME)
3F6D 05 2F                 ORA PORTC1
3F6F 90 07                 BCC ECHO02
        713F      ECHO01   EQU *              ELSE
3F71 38                    SEC                  CARRY=1 FOR DATA=1
3F72 49 FF                 EOR #$FF             SET TO ECHO BIT=0 FOR DATA=1
3F74 25 2F                 AND PORTC1
3F76 B0 00                 BCS ECHO02           (EQUALIZE TIME)
        783F      ECHO02   EQU *              ENDIF
3F78 85 2F                 STA PORTC1         OUTPUT BIT
3F7A 85 02                 STA PORTC
3F7C 60                    RTS                RETURN

                  *RCVBYT
                  *RECEIVE BYTE
3F7D A9 80        RCVBYT   LDA #$80           SET SENTINEL - CLEAR BUFFER
3F7F A6 1D                 LDX BPTR
3F81 95 00                 STA 0,X
3F83 A2 00                 LDX #0             SET TIMEOUT COUNTER, T13
        853F      RCVB01   EQU *              LOOP - EXIT ON START
3F85 A5 23                 LDA IOMASK           **** EXIT IF START
3F87 24 03                 BIT PORTD
3F89 D0 06                 BNE RCVB03
3F8B E8                    INX                  INCREMENT TIMEOUT COUNTER
3F8C D0 F7                 BNE RCVB02           IF TIMED OUT
3F8E 4C 433D               JMP PSTAT3             ABORT
        853F      RCVB02   EQU RCVB01           ENDIF
        913F      RCVB03   EQU *              ENDLOOP
3F91 20 563F               JSR D12US          DELAY 12 USEC, T10
3F94 20 623F               JSR ECHO           ECHO START BIT
3F97 20 563F               JSR D12US          DELAY 12 USEC, T10
        9A3F      RCVB04   EQU *              DO UNTIL 8 BITS EXPOSE SENTINEL
3F9A A0 FD                 LDY #-8              DELAY 53 USEC, T10
3F9C 20 533F               JSR D18US
3F9F 20 623F               JSR ECHO             READ AND ECHO BIT
3FA2 A6 1D                 LDX BPTR             ROTATE BIT INTO BYTE
3FA4 76 00                 ROR 0,X
3FA6 90 F2                 BCC RCVB04           CHECK FOR SENTINEL
                  *                           ENDDO
3FA8 60                    RTS                RETURN

                  *XMTBYT
                  *TRANSMIT BYTE
3FA9 A6 1D        XMTBYT   LDX BPTR           COPY BYTE INTO WORK AREA
3FAB B5 00                 LDA 0,X
3FAD 85 37                 STA TEMP02
3FAF 38                    SEC                ASSUME EOB WILL END BYTE
3FB0 A6 1A                 LDX BCTR           IF THIS IS LAST BYTE
3FB2 CA                    DEX
3FB3 D0 01                 BNE XMTB01
3FB5 18                    CLC                  EOM WILL END BYTE
        B63F      XMTB01   EQU *              ENDIF
3FB6 20 573F               JSR DOUT00         OUTPUT START BIT
3FB9 A2 F7                 LDX #-9            SET TO OUTPUT 9 BITS
3FBB A0 F5                 LDY #-11           DELAY 68 USEC, T9
3FBD 20 533F               JSR D18US
        C03F      XMTB02   EQU *              DO UNTIL 9 BITS SENT
3FC0 66 37                 ROR TEMP02           FETCH NEXT BIT
3FC2 B0 00                 BCS *+2              IF CARRY IS SET
3FC4 90 04                 BCC XMTB03
3FC6 A4 31                 LDY PORTC1             SET TO OUTPUT DATA=1
3FC8 B0 04                 BCS XMTB04
        CA3F      XMTB03   EQU *                ELSE
3FCA A4 30                 LDY PORTC0             SET TO OUTPUT DATA=0
3FCC 90 00                 BCC XMTB04             (EQUALIZE TIME)
        CE3F      XMTB04   EQU *                ENDIF
3FCE A5 2F                 LDA PORTC1           FETCH PREVIOUS BIT
3FD0 84 2F                 STY PORTC1           OUTPUT PRESENT BIT
3FD2 84 02                 STY PORTC
3FD4 20 E63F               JSR XMTB05           COMPARE PREVIOUS BIT WITH ECHO
3FD7 A0 FB                 LDY #-5              DELAY 38 USEC, T9
3FD9 20 533F               JSR D18US
3FDC E8                    INX                  COUNT BIT
3FDD 30 E1                 BMI XMTB02
                  *                           ENDDO
3FDF A0 FE                 LDY #-2            DELAY 23 USEC, T9
3FE1 20 533F               JSR D18US
3FE4 A5 2F                 LDA PORTC1         FETCH PREVIOUS BIT OUT, (STOP)
        E63F      XMTB05   EQU *              **** ALTERNATE ENTRY POINT
3FE6 45 03                 EOR PORTD          COMPARE PREVIOUS BIT WITH ECHO
3FE8 25 23                 AND IOMASK
3FEA F0 00                 BEQ *+2            IF BITS MATCH
3FEC D0 03                 BNE XMTB06
3FEE 18                    CLC                  SET TO MAINTAIN ECHO-ERROR FLAG
3FEF 90 03                 BCC XMTB07
        F13F      XMTB06   EQU *              ELSE
3FF1 38                    SEC                  SET TO SET ECHO-ERROR FLAG
3FF2 B0 00                 BCS XMTB07           (EQUALIZE TIME)
        F43F      XMTB07   EQU *              ENDIF
3FF4 6A                    ROR A              UPDATE ECHO-ERROR FLAG
3FF5 05 48                 ORA ZECHER
3FF7 85 48                 STA ZECHER
3FF9 60                    RTS                RETURN

                  *END
                  *INTERRUPT VECTOR AND END STATEMENT
        0036      NMINT    EQU INTRP
3FFA 0036                  FDB NMINT
3FFC 0D59                  FDB INIT
3FFE 0038                  FDB INTRP
                           END
```

```
CROSS REFERENCE

       0048    127    370
  [?]SK 0001   121    400 1313 1446 1460
  [?]R  001A   18     787  796 1471 1493 1610
  [?]D  001B   19     1260 1263
  [?]N  3A13   538    361  559  721  844  870 1189
  [?]KI 3A1A   540    350
  [?]NX 001C   20     149
  [?]R  001D   21     758  770 1259 1264 1268 1277 1468 1491 1579 1598
                      1606
  [?]   0085   128    362
  [?]   0084   129    144  381
  [?]S  3F56   1542   1239 1591 1593
  [?]S  3F53   1540   1281 1541 1596 1618 1634 1639
  [?]S  3F52   1539   1243 1458 1518 1522
  [?]S  3F51   1538   1490
  [?]S  3F50   1537   1451 1503
  [?]S  3F4F   1536   1271 1502
  [?]NC 001E   22     190  195  233  242  903
  [?]CS 001F   23     280  352  563  635  715  924  926  954  959 1398
                      1401 1405 1411 1416 1433
  [?]   3A8F   568
  [?]02 3A43   571    576
  [?]   3A4E   577    573
  [?]   3A6E   578    570
  [?]   3A2C   557    742 1020 1077
```

```
S[illegible] 0100     13    252  542  763  789  872  993 1023 1034 1092 1095
                           1107 1105 1100 1109 1115 1116 1191 1193 1195 1352
                           1361 1363 1379 1420 1427 1431 1432
S[illegible] 0020     24    250  255  281  319  326  373
[illegible]01 3A54   587    593  650
[illegible] 3B4F     504    559 1238 1305 1351 1378 1444 1510
SP     3A84     250
SP01   3B96     256    251
SP02   3B9C     263    260
SP03   3BA2     265    262
SP04   3BAE     275    273
SP05   3BAC     276    271
SP06   3BAE     277    269
SP07   3BB9     284    282
SP08   3BC4     291    288
SP09   3BCF     298    296
SP10   3BD5     302    300
SP11   3BD5     303    293
SP12   3BD5     304    286
SP13   3BE9     311    309
SP14   3BE0     312    307
SP15   3BF5     325    323
SP16   3BFD     333    278
SP[illegible] 0021     25    253  258  264
[illegible]00 3F57  1546   1484 1503 1615
[illegible]01 3F5B  1548   1449 1456 1472 1500 1520
[illegible]102 3F5D 1550   1547
AEA    3A53     592    518  529
AEI    3A[illegible]     666    519  530  616
AOP    3A64     616    520  531
CEA    3A[illegible]     632    510  521  661
CEA01  3A6B     633    503
CEC    3A82     649    511  522
CHD    3F62    1557   1261 1272 1592 1597
CHD01  3F71    1566   1563
CHD02  3F78    1571   1563 1570
CCP    3A8A     661    512  523
CCP01  3A8D     665    621
[illegible]MASK 0002  122    394 1246 1481 1514 1524
FXD01  3E47    1385   1396
FXD02  3E4E    1389   1387
FXD03  3E5C    1397   1391
FXD04  3E64    1402   1399
FXD05  3E70    1409   1407
FXD06  3E79    1410   1417
FXD07  3E7F    1418   1413
FXD08  3E92    1430   1428
FXD09  3E9E    1437   1435
FXD0C  3E39    1378    759  877  978  984 1021
FLS001 3AA8     687    681
FLS002 3AE1     694    678
FLS003 3AB1     695    752
FLSOUT 3A[illegible]     677    704  836 1290
FLUSH  3AB2     760    393  398  404  643  751  855 1150 1155
FLUSH1 3AE4     725    712
FLUSH2 3AE4     726    709
FLUSH3 3AEF     732    729
FLUSH4 3AF7     735    734
FLUSH5 3B03     714    731  737
FLUSH6 3B08     743    740
FLUSH7 3B0E     750    706
FLUSHB 3AB[illegible]     752    703
FMTB01 3B25     768    765
FMTB02 3B28     771    640  720
FMTB03 3B4C     793    793
FMTOUT [illegible]     737   1146
GETK01 3B5E     812    807

GETKEY 3B53     806    592  649  892
GETP01 3B6A     823    821
GETPIB 3B3F     817    560  562  574 1004 1026 1040 1306
GETPTR 0022      26    557  564  567  791  794  817  824  994 1024 1030
                       1044 1353 1380 1421
HAREC  0092     101
HBANT  0086     109
HBCNT  0087     111
HCSUB  0084     105
HD1ACS 00BD     108
HDISAB 0042      74    851
HDISEB 0063     117    733
HDISPC 00A1     119    713
HD[illegible]CK 008A     102
HDR2A1 3B75     833    641 1147
HDR2A2 3B78     835   1073
HDR2AU 3B6F     830    384  667  853 1069 1153
HDRSC  0083     103
HENABL 0041      73   1138
HENAKB 0062     116    720
HENDEN 0043      75    666
HENTAM 0045      81    606
HENTCO 0046      82    632
HEXRD  0061     115    708
HEXWR  0051     113    739
HGSLIM 008E     110
HLOPOS 0088     104
HNTRNO 008C     106
HPC11  0083     107
HPS[illegible]  0091     100   1017
HREQAR 0052      58   1068
HREQCA 0056      94
HREQBC 0057      96
HREQCS 0054      96
HR[illegible]  0052      87
HRFOPR 0053      88
HR[illegible]OS 0055      93
HR[illegible]  0056      95
HR[illegible]P 0053      59
HREQ[illegible] 0054      91
HREQEC 0055      92
HRE[illegible] 0051      65   1152
HRE[illegible] 0056      84    383  746
HRESCA 0050      76    458
HRESV  0047      78    446
HSE[illegible] 0051      80   1144
HSETS[illegible] 0046      77    441
HSTA[illegible] 0100      98    680 1071 1162 1295
IBEND  0010     125   1248
IB[illegible]IR 0023      27   1258 1276
IER    006A     130    407
IER    0089     131

INBUF  000A      15    123  634  639  707  727  741  745  747  838  832
                       1143 1247 1461
INIT   390D     351   1461
INIT01 3914     356    359
INTR01 3811     154    152
INTR02 3817     158    150
INTR[illegible] 3800     143   1659 1662
IOMASK 0025      29   1257 1282 1287 1467 1476 1482 1557 1583 1643
KBSC   3817     163
KBSC01 382A     174    186
KBSC02 383B     134    179
KBSC03 3849     194    191
KBSC04 384D     199    189
KBSC05 3857     213    216
KBSC06 385E     219    201
KBSC07 386D     227    224
KBSC08 386D     228    221
KBSC09 3971     232    218
KBSC10 387C     241    230
KBSC11 3880     243    193
```

| | | | |
|---|---|---|---|
| KBSC12 | 3B84 | 245 | 197 234 |
| KCLEAN | 0026 | 30 | 243 321 806 809 |
| KCLEEN | 0027 | 31 | 244 470 |
| KEYCOL | 0028 | 32 | 166 181 182 210 212 214 240 |
| KEYM01 | 3B8B | 849 | 843 |
| KEYM02 | 3B8B | 850 | 867 968 |
| KEYM03 | 3B8D | 832 | 448 459 1139 |
| KEYMOD | 3B7E | 842 | 922 949 |
| KLOSTD | 0029 | 33 | 374 611 913 934 962 1060 1122 |
| KSW | 002A | 34 | 172 433 |
| LNCTIM | 002B | 35 | 151 153 411 906 1081 |
| ML0001 | 395B | 399 | 396 |
| ML0002 | 3967 | 405 | 402 |
| ML0003 | 3977 | 415 | 412 |
| ML0004 | 3977 | 416 | 410 |
| ML0005 | 39A5 | 443 | 438 |
| ML0006 | 39AA | 447 | 442 |
| ML0007 | 39AD | 451 | 435 |
| ML0008 | 39BE | 462 | 457 |
| ML0009 | 39C1 | 466 | 455 |
| ML0010 | 39C1 | 475 | 471 |
| ML0011 | 39D4 | 480 | 474 |
| ML0012 | 39D4 | 481 | 468 |
| ML0013 | 39E4 | 490 | 485 467 |
| ML0014 | 39F2 | 499 | 489 |
| ML0015 | 3A01 | 509 | 513 517 524 528 |
| ML0016 | 3A32 | 510 | 505 |
| ML0017 | 3A0D | 521 | 507 |
| ML0018 | 394C | 532 | 501 503 |
| ML0019 | 394C | 533 | 453 |
| ML00P | 394C | 392 | 532 533 1207 |
| OBCTR | 002C | 36 | 546 638 718 761 790 950 1117 1383 1394 1404 |
| | | | 1434 1436 |
| NMINT | 3800 | 1659 | 1666 |
| OBEND | 001B | 124 | 1319 |
| OPEA | 3893 | 869 | 514 325 886 |
| OPEC | 3B93 | 836 | 515 526 |
| OPOP | 3BB0 | 892 | 516 327 |
| OPOP01 | 3BC1 | 902 | 893 |
| OPOP02 | 3BC9 | 997 | 964 |
| OUTBUF | 0012 | 16 | 124 679 685 686 714 719 1016 1019 1070 1076 |
| | | | 1161 1165 1177 1292 1294 1296 1297 1318 1525 |
| PAKE01 | 3BD2 | 918 | 915 |
| PAKE02 | 3BD2 | 919 | 598 |
| PAKE03 | 3BDF | 927 | 925 |
| PAKE04 | 3BDF | 928 | 921 |
| PAKEE5 | 3BDF | 929 | 943 952 957 1011 |
| PAKEY | 3BCA | 913 | 896 |
| PCLR01 | 3B93 | 868 | 644 973 |
| PCLR02 | 3BAD | 879 | 876 |
| PCLR03 | 3BAE | 886 | 874 |
| PCLICK | 3B92 | 867 | 941 |
| PCR | 003C | 132 | 376 |
| PDKE01 | 3BDF | 943 | 940 |
| PDKEY | 3BE3 | 934 | 597 654 893 |
| PKSW | 002D | 37 | 380 493 498 |
| PNUM01 | 3BF7 | 961 | 955 |
| PNUMK | 3BEC | 946 | 936 |
| PORTA | 0030 | 133 | 171 176 315 324 |
| PORTAX | 003D | 134 | 167 317 |
| PORTB | 0031 | 135 | 164 175 320 368 429 586 |
| PORTB1 | 002E | 38 | 369 430 431 433 436 |
| PORTB2 | 0032 | 136 | 372 |
| PORTC | 0032 | 137 | 366 426 1205 1550 1573 1631 |
| PORTC0 | 0030 | 40 | 1331 1546 1626 |
| PORTC1 | 0031 | 41 | 1329 1549 1623 |
| PORTC2 | 002F | 39 | 365 427 1203 1206 1328 1330 1551 1564 1569 1572 |
| | | | 1629 1630 1640 |
| POSTD | 0033 | 138 | 395 401 1285 1315 1333 1453 1477 1558 1584 1642 |
| PPEQ01 | 3C11 | 975 | 972 |
| PPEQ02 | 3C19 | 983 | 970 |
| PPEQ03 | 3C23 | 938 | 936 |
| PPEQ04 | 3C28 | 992 | 980 |
| PPEQ05 | 3C2E | 996 | 1354 |
| PPEQ06 | 3C36 | 998 | 799 1423 |
| PPEQ07 | 3C32 | 1000 | |
| PPEQ08 | 3C32 | 1001 | 1010 |
| PPEQ09 | 3C3E | 1008 | 1006 |
| PPEQ10 | 3BEF | 1011 | 1003 |
| PPEQR | 3C04 | 958 | 916 1143 |
| PPOST1 | 3C56 | 1025 | 1028 |
| PPOST2 | 3C6E | 1038 | 1033 |
| PPOST3 | 3C6E | 1040 | 1042 |
| PPOST4 | 3C82 | 1051 | 1033 1196 |
| PPOST5 | 3C86 | 1054 | 1018 |
| PPOST6 | 3C86 | 1055 | 1063 1065 |
| PPOSTR | 3C44 | 1616 | 691 |
| PRKE00 | 3C89 | 1061 | 476 |
| PRKE01 | 3C9F | 1075 | 1072 |
| PRKE02 | 3CA6 | 1078 | 742 1198 |
| PRKE03 | 3CA6 | 1030 | |
| PRKE04 | 3CA6 | 1032 | 722 |
| PRKEY | 3C87 | 1060 | 657 |
| PSTR02 | 3CBB | 1095 | 1111 |
| PSHR1B | 3CAD | 1091 | 575 963 1415 |
| PSKE01 | 3CEC | 1132 | 1127 |
| PSKE02 | 3CF1 | 1142 | 1134 |
| PSKE03 | 3CFE | 1149 | 386 669 |
| PSKE04 | 3D01 | 1151 | 413 463 472 1135 |
| PSKE05 | 3D09 | 1156 | 1124 1185 1208 1209 |
| PSKEY | 3CDD | 1122 | 898 |
| PSTAT1 | 3D14 | 1166 | 1170 |
| PSTAT2 | 3D2E | 1188 | 1182 1300 1369 1408 |
| PSTAT3 | 3D43 | 1199 | 1502 1593 |
| PSTAT4 | 3D69 | 1208 | 1180 |
| PSTAT5 | 3D69 | 1209 | 1163 |
| PSTATR | 3D0A | 1161 | 690 |
| PUTH01 | 3D64 | 1225 | 1220 |
| PUTHOR | 3D52 | 1214 | 009 1037 1048 1393 |
| PUTPTR | 0032 | 42 | 999 1033 1046 1216 1226 1381 |
| RCVB01 | 3F83 | 1532 | 1509 |
| RCVB02 | 3F85 | 1539 | 1587 |
| RCVB03 | 3F91 | 1590 | 1585 |
| RCVB04 | 3F9A | 1594 | 1600 |
| RCVBYT | 3F7D | 1578 | 1269 |
| RCVI01 | 3D7D | 1241 | 1283 1310 |
| RCVI02 | 3D83 | 1245 | 1340 1519 |
| RCVI03 | 3D8F | 1252 | 1237 |
| RCVI04 | 3D79 | 1236 | 367 |
| RCVM01 | 3D9B | 1252 | 1273 |
| RCVM02 | 3DC7 | 1286 | 1198 |
| RCVM03 | 3DE4 | 1301 | 1267 |
| RCVM04 | 3DE4 | 1302 | 1265 |
| RCVM05 | 3DE7 | 1303 | 1264 |
| RCVREC | 3D90 | 1257 | 1249 1320 |
| RCVR01 | 3DF1 | 1312 | 1309 1435 |
| RCVR02 | 3DF3 | 1314 | 1316 |
| RCVRTN | 3DEB | 1308 | 403 837 |
| SETXMT | 3E02 | 1327 | 1547 1515 |
| SWAI | 3E0F | 1339 | 261 774 822 1093 1102 1222 |
| TEMP01 | 0030 | 44 | 176 187 219 222 236 |
| TEMP02 | 0037 | 46 | 452 451 772 777 792 1097 1110 1608 1620 |
| TSTRNG | 0031 | 125 | 351 1201 |
| W2P001 | 3E2A | 1350 | 1365 |
| W2P002 | 3E29 | 1349 | 1368 |
| W2PA | 3E1C | 1351 | 370 987 |

```
WRKBUF  0005     14     995  1562
XMTD01  3FB6   1614    1612
XMTD02  3FC0   1619    1636
XMTD03  3FCA   1625    1622
XMTD04  3FCE   1628    1624  1627
XMTD05  3FF6   1641    1632
XMTD06  3FF1   1618    1645
XMTD07  3FF4   1651    1647  1630
XMTEXT  3FA9   1606    1492
XMTI01  3EB7   1452    1443
XMTI02  3EC6   1459    1454
XMTIN   3EA3   1444     749   834
XMTM01  3EDB   1473    1494
XMTM02  3EDD   1475    1486  1487
XMTM03  3EED   1486    1483
XMTM04  3EF2   1487    1480
XMTM05  3EEF   1480    1476
XMTM06  3F04   1479    1497
XMTMSG  3ECF   1467    1162  1525
XMTO01  3F23   1523    1516
XMTO02  3F3C   1527    1513
XMTOUT  3F15   1510     683
YBATNG  003E     53     456
YCKPNT  0039     48     421
YENBL   003D     52     272
YFLAGS  0038     46    1168
YHMODE  003F     54     287  1176  1179  1298
YINST   003A     49     293   299
YKBLIS  0040     55     370   440   452   682   730   736
YLOCK   003L     50     294
YRESJA  0036     47     418
YSERV   003C     51     306
ZADDRL  0046     63     818   875   969   991  1052
ZBCDWN  0041     58     168   226   454
ZBLINK  0047     64     156   157   292   417   420
ZECHER  0048     65    1469  1496  1653  1654
ZEXCOM  0049     66     363   439   445  1236  1512
ZFLAGS  0041     57     543
ZKEYNO  0042     59     842   846  1439
ZOIN    004A     67     701   706   710  1251  1445
ZGOO    004B     68     677   702   721  1299  1322  1511
ZSCHLD  0043     60     711   847  1022  1138  1426
ZSTAGE  0044     61     270   287  1059  1126  1438
ZTIN    0045     62     409   971  1084
ZIGTAC  004C     69     860   873   881   977   985   990  1053
ZTR     004D     70     467   469  1173  1174
```

```
                   ;       D M 2 : P E P A C C . S R C
                   ;
                           NLIST
                           LIST
                   ;
                   ;
                   ;
                   ;       ***********************************************************
                   ;       ***********************************************************
                   ;       **                                                      **
                   ;       **      6 5 0 0    A C C O U N T I N G    M O D U L E   **
                   ;       **                                                      **
                   ;       ***********************************************************
                   ;       **                                                      **
                   ;       **      COPYRIGHT 1979 PITNEY BOWES INCORPORATED        **
                   ;       **                                                      **
                   ;       ***********************************************************
                   ;       ***********************************************************
                   ;
                           INCLUDE DMO:ACCTBL
                           NLIST
                           LIST
                           PAGE
                   ;       ***********************************************************
                   ;       **                                                      **
                   ;       **           RAM MAP FOR NON VOLITLE MEMORY             **
                   ;       **                                                      **
                   ;       ***********************************************************
                   ;
                   ;
0020               PECEKT  EQU     20                        ; 8 DIGIT PIECE COUNT
0024               DSCECC  EQU     PECEKT + PECESZ           ; 1 BYTE CRC FOR DSC REC
0025               DSCREG  EQU     DSCECC + DSERSZ           ; 8 DIGIT DESCENDING REGISTER ( USABLE POSTAGE )
0029               ASCECC  EQU     DSCREG + DSCRSZ           ; 1 BYTE CRC FOR ASC REC
002A               ASCREG  EQU     ASCECC + ASERSZ           ; 10 DIGIT ASCENDING REGISTER ( CUMULATIVE USED POSTAGE )
002F               PRSTAT  EQU     ASCREG + ASCRSZ           ; 1 BYTE PRINTER STATUS
0030               POSVAL  EQU     PRSTAT + PRSTSZ           ; 6 DIGIT POSTAGE VALUE
0033               BATAMT  EQU     POSVAL + POSTSZ           ; 8 DIGIT BATCH AMOUNT
0037               BATCNT  EQU     BATAMT + BATASZ           ; 6 DIGIT BATCH COUNT
                   ; NON VOL CHECKSUM FOR BLOCK 0
003A               DATE    EQU     BATCNT + BATCSZ           ; NEXT RMRS COMBO AVAILABLE IN TABLE
003C               CONECC  EQU     DATE + DATESZ             ; 1 BYTE CRC FOR CHECK SUM
003D               RSTVAR  EQU     CONECC + 1                ; RMRS METER RESET VALUE
0041               RSTCNT  EQU     RSTVAR + RSTVSZ           ; 1 BYTE FOR COUNTING UNSUCESSFUL RESET ATTEMPTS
0042               FATCOD  EQU     RSTCNT + 1                ; 1 BYTE FOR STORING CODE CAUSING FATAL ERROR
0043               FATCNT  EQU     FATCOD + 1                ; 2 DIGIT FATAL ERROR COUNT
0044               MTRTYP  EQU     FATCNT + 1                ; 1 BYTE FOR METER TYPE: 0 = MANUAL, 1 = RMRS
0045               MSERNO  EQU     MTRTYP + 1                ; 7 DIGITS FOR SERIAL NUMBER
0049               UNLOCK  EQU     MSERNO + MSERSZ           ; 6 DIGIT FIELD FOR UNLOCK VALUE
004C               LOWPOS  EQU     UNLOCK + UNLVSZ           ; 4 DIGIT FIELD FOR LOW POSTAGE WARNING VALUE
004E               SETLIM  EQU     LOWPOS + LWPSSZ           ; 4 DIGIT FIELD FOR SETTABL POSTAGE LIMIT
0050               RSTBAS  EQU     SETLIM + SETLSZ           ; MANUAL COMBINATION
                   ;  CHECKSUM FOR BLOCK 1
0054               TIMCNT  EQU     RSTBAS +RSTBSZ            ; 1 BYTE FOR TIMER COUNTS
0055               TIMWHO  EQU     TIMCNT + 1
0056               MRSTAT  EQU     TIMWHO + 1                ; 2 BYTES FOR MAINTANCE OF METER STATUS
0058               STATE   EQU     MRSTAT + 2                ; 1 BYTE FOR STATE OR MODE OF OPPERATION
0059               ACTBLK  EQU     STATE + 1                 ; 1 BYTE FOR TRACKING WHICH BLOCK IS CURRENTLY OPEN
005A               NVMBLK  EQU     ACTBLK + 1                ; 1 BYTE FOR TRACKING ERASED PARTITION OF NVM
005B               CNTXFL  EQU     NVMBLK + 1                ; 1 BYTE FOR QUEUING STATUS MESSAGE TO CONTROL
005C               RECPFL  EQU     CNTXFL + 1                ; CONTROL RECEIVE FLAG (0 = NO MESSAGE WAITING PROCESSING)
005D               POLCNT  EQU     RECPFL + 1                ; PRINTER RECEIVE FLAG (0 = NO MESSAGE AWAITING PROCESSING)
005E               RECBUF  EQU     POLCNT + 1                ; 8 BYTE BUFFER TO RECEIVE MESSAGES
0066               WRKBF1  EQU     RECBUF + RECBSZ           ; 8 BYTE WORK BUFFER
006E               WORKBF  EQU     WRKBF1 + WRKBSZ           ; SECOND 8 BYTE WORK BUFFER
0076               AMTBF   EQU     WORKBF + WRKBSZ           ; BUFFER FOR AMOUNT ENTRY
007B               CMBOBF  EQU     AMTBF + AMTSZ             ; BUFFER FOR COMBINATION ENTRY
007F               LAST    EQU     CMBOBF + CMBOSZ - 1       ; LAST USED  RAM LOCATION
                   ;
                           SUBTTL  HEADER ASSIGNMENTS
                           PAGE
                   ;       ***********************************************************
                   ;       **                                                      **
                   ;       **               HEADER ASSIGNMENTS                     **
                   ;       **                                                      **
                   ;       ***********************************************************
                   ;
                   ;
                   ;
                   ;MNEMONIC        VALUE    DESCRIPTION
                   ;
                   ;COMMANDS NO DATA
                   ;
0040               NODATA  EQU     40      ;
0041               ENBLHD  EQU     41      ; ENABLE METER COMMAND
0042               DSBLHD  EQU     42      ; DISABLE METER COMMAND
0043               ENDEHD  EQU     43      ; END OF ENTRY
0044               CLRBHD  EQU     44      ; CLEAR BATCH COMMAND
0045               ACMPHD  EQU     45      ; ACCOUNTING COMPLETE
0046               SETSHD  EQU     46      ; SET SERVICE MODE
0047               CLRSHD  EQU     47      ; CLEAR SERVICE MODE
                   ;
```

```
                    ;COMMANDS WITH DATA
                    ;
00C0                WTHDAT  EQU     0C0
00C1                SPOSHD  EQU     0C1     ; SET POSTAGE VALUE
                    ;SPARE  EQU     0C2
                    ;SPARE  EQU     0C3
00C4                SDATHD  EQU     0C4     ; SET DATE
00C5                ENTAHD  EQU     0C5     ; ENTER RESET AMOUNT
00C6                ENTCHD  EQU     0C6     ; ENTER RESET COMBINATION
                    ;
                    ;REQUEST VALUE
                    ;
0050                REQVHD  EQU     50      ; REQUEST VALUE LOW NIBBLE SPECIFIES QUANTITY
0080                VLISHD  EQU     080     ; VALUE RETURNED AS PER REQUEST
                    ;
                    ;ITEMS REQUESTABLE
                    ;
0080                STATEB  EQU     080
0081                POSVNB  EQU     081     ; POSTAGE VALUE
                    ; VALUE            NORM            SERVICE
                    ;                  0XXX            1XXX
                    ;   2              ASC REC         UNLOCK VAL
                    ;   3              DSC REC         LOW POSTAGE
                    ;   4              CONTROL SUM     METER NO
                    ;   5              PEICE COUNT     DIAG STATUS
                    ;   6              BATCH AMT       SETTABLE POS LIMIT
                    ;   7              BATCH COUNT     SPARE
                    ;
                    ;
                            SUBTTL  STATUS ASSIGNMENTS
                            PAGE
                    ;       *************************************************************
                    ;       **                                                         **
                    ;       **              STATUS ASSIGNMENTS                         **
                    ;       **                                                         **
                    ;       *************************************************************
                    ;
                    ;       BIT             DESCRIPTION
                    ;
                    ; PRINTER
                    ;       7       PRIV ACCESS SW          1 = SELECTED
                    ;        6      DATER DOOR              1 = OPEN        0 = CLOSED
                    ;         5     SHUTTER BAR             1 = FOWARD      0 = HOME
                    ;          4    LAST HOME               1 = FROM OR IN POS 2
                    ;                                       0 = FROM OR IN POS 1
                    ;           3   TRIP (NOT HOME)         1 = TRIPPED
                    ;            2  INTERPOSER POSITION     1 = RELEASED (ENABLED)
                    ;             1 SPARE
                    ;              0 HARD ERROR             1 = FATAL ERROR CANNOT CONTINUE
                    ;
                    ; CONTROL (METER) STATUS
                    ;  FIRST WORD
                    ;       7       RESET BASE              1 = BASE NEEDES TO BE RESET
                    ;        6      CHECK DATE              1 = DATER DOOR OPEN OR NOT OPENED SINCE POWER UP
                    ;         5     INSUFFICIENT FUNDS      1 = DESC REG < POST VALUE
                    ;          4    LOW POSTAGE             1 = DESC REG < LOW POST VALUE
                    ;           3   SERVICE MODE            1 = SERVICE
                    ;            2  ENABLED                 1 = ENABLED
                    ;             1 BATCH CLEAR             1 = BATCH AMOUNT AND COUNT EQUAL 0
                    ;              0 TRIP
                    ;  SECOND WORD
                    ;       7       HARD (FATAL) ERROR
                    ;        6      SPARE
                    ;         5     SPARE
                    ;          4    SPARE
                    ;           3   SPARE
                    ;            2  SPARE
                    ;             1 SOFT ERROR              1 = RECOVERABLE ERROR
                    ;              0 SPARE
                    ;
                    ; METER MODE (STATE)
                    ;       ALL 0           NORMAL OPPERATION
                    ;       7       TRIP
                    ;        6      ENABLE
                    ;         5     DISABLE
                    ;          4    SPARE
                    ;           3   SPARE
                    ;            2  FATAL
                    ;             1 SERVICE
                    ;              0 PRIVLEDGE
                    ;
                            SUBTTL  ASSIGNMENT TABLE
                            PAGE
                    ;       *************************************************************
                    ;       **                                                         **
                    ;       **              ASSIGNMENT TABLE                           **
                    ;       **                                                         **
                    ;       *************************************************************
                    ;
                    ;
                    ;       TIME VALUES FOR TRIP ACTIVITY
0064                TRPSET  EQU     100.            ; 2 SEC TIME-OUT
00A3                TRPTOL  EQU     163.            ; RESIDUE + <- NO CARRY OK, C=1 OVERSPEED
                                                    RESIDUE < 93. COUNTS
                    ;
                    ;
                    ;       CRC ASSIGNMENTS
00FF                CRCINL  EQU     0FF             ; INITIAL VALUE FOR CRC CALCULATION
009B                CRCPLY  EQU     9B              ; CRC GENERATOR POLYNOMIAL
                    ;
                    ;
                    ;
                    ;       FATAL ERROR CODES FOR ACCOUNTING DETECTED FAILURES
                    ;
0001                PRTFAT  EQU     1               ; PRINTER COMMUNICATIONS DEAD
0002                PROFAT  EQU     2               ; INVALID HEADER OR SOFTWARE ERROR
0003                COMFAT  EQU     3               ; TIMEOUT DURING COMMUNICATION (PRINTER OR CONTROL)
0004                INTFAT  EQU     4               ; ACC INTERPOSER LINE SHORTED
0005                HOMFAT  EQU     5               ; LOSS OF SYNC ON HOME POSITIONS
0006                ECHFAT  EQU     6               ; ECHO ERROR DURING TRANSMIT
0007                SETFAT  EQU     7               ; > 2 SEC ON SET POSTAGE
0008                TRPFAT  EQU     8               ; OVER OR UNDER SPEED ON TRIP (140MS < TRIP < 2SEC)
0009                RSTTRY  EQU     9               ; NO SUCESSFUL RESET IN 9 CONSECUTIVE TRYS
                    ;
                            SUBTTL  INTERUPT VECTORS
                            PAGE
                    ;       *************************************************************
                    ;       **                                                         **
                    ;       **              INTERRUPT VECTORS                          **
                    ;       **                                                         **
                    ;       *************************************************************
                    ;
                    ; POWER UP
0000                        ORG     0
0000    04 0E               JMP     PWRUP
                    ;
                    ; POWER FAILURE
0003                        ORG     3
0003    65                  STOP    TCNT
0004    04 09               JMP     PWRDN
                    ;
                    ; TIMER INTERRUPT
0007                        ORG     7
0007    64 24               JMP     TIMINT
                    ;
                            INCLUDE DMO:PWRDN
                            SUBTTL  POWER DOWN
                            PAGE
```

```
                        ;       ****************************************************************
                        ;       **                                                            **
                        ;       **          POWER DOWN AND POWER FAILURE                      **
                        ;       **                                                            **
                        ;       ****************************************************************
                        ;
                        ;       STORE VARIABLES IN NVM, LOCK CPU IN RESET MODE.
                        ;
0009    15              PWRDN:  DIS     I
000A    F4 BE                   CALL    NVMWR           ; WRITE TO NVM
000C    8A 40                   ORL     P2, #40         ; ALLOW 8755 RESET AND TURN OFF NVM
                        ;
000E    86 0E           PWRUP:  JNI     $               ; WAIT FOR POWER FAIL TO CLEAR
0010    27                      CLR     A
0011    D7                      MOV     PSW, A
0012    9A 0F                   ANL     P2, #0F         ; CLEAR 8755 RESET, TURN ON NVM
                        ; CLEAR RAM
0014    B8 20                   MOV     R0, #PECEKT
0016    BA 60                   MOV     R2, #80-PECEKT
0018    F4 EE                   CALL    CLRBLK
                        ; SET INITIAL METER STATUS  IE CHECK DATE
001A    B8 56                   MOV     R0, #MRSTAT
001C    B0 C0                   MOV     @R0, #0C0
                        ; LOAD NVM
001E    F4 61                   CALL    NVMRD
0020    C6 24                   JZ      PWRUP0          ; READ OK?
0022    F4 4A                   CALL    NVMFAT          ; SET FATAL STATE
0024    34 CA           PWRUP0: CALL    ASCCHC
0026    F5                      SEL     MB1             ; POWER UP IN UPPER 2 K
0027    E4 04                   JMP     PWRUPA
                        ;
                                INCLUDE DM0:CTXBYT
                                SUBTTL  TRANSMIT ONE BYTE
                                PAGE
                        ;       ****************************************************************
                        ;       **                                                            **
                        ;       **          TRANSMIT BYTE WITH ECHO CHECK                     **
                        ;       **                                                            **
                        ;       ****************************************************************
                        ;
                        ;       TRANSMIT 10 BITS (1 START + 8 DATA + 1 STOP), RECEIVE ECHO, AND
                        ;       SET ERROR IF NOT EXACT MATCH.
                        ;       NOTE: INTERNAL LOGIC LEVEL REQUIRES INVERSION FOR TRANSMIT FUNCTION.
                        ;
                        ;       -OM     A       = ERROR COUNT DURING TRANSMIT
                        ;       I-M     R0      = ADDRESS OF DATA BYTE
                        ;       --M     R3 - R7
                        ;       I--     F1        = UNIT
                        ;                           0, CONTROL
                        ;                           1, PRINTER
                        ;       I--     C         = STOP BIT LEVEL
                        ;                           0, END OF MESSAGE
                        ;                           1, END OF BYTE
                        ;
0029    27              CTXBYT: CLR     A
002A    AC                      MOV     R4, A           ; CLEAR ERROR COUNTER
002B    BB 0A                   MOV     R3, #10.        ; LOOP COUNT FOR 10. BYTES
002D    BF 02                   MOV     R7, #2          ; SWITCH FOR ECHO CHECK OF STOP BIT
002F    17                      INC     A
0030    AD                      MOV     R5, A           ; PRIME FOR FIRST DUMMY ECHO
0031    04 57                   JMP     CTXBL8          ; OUTPUT LOW FOR START EDGE
                        ; LOOP
0033    E6 57           CTXBLP: JNC     CTXBL8          ; OUTPUT HIGH
                        ; OUTPUT LOW
0035    39                      OUTL    P1, A
0036    23 01                   MOV     A, #1
0038    00                      NOP
                        ;
0039    2D              CTXBL1: XCH     A, R5           ; PREPARE ACC FOR ECHO
003A    76 51                   JF1     CTXBL6
                        ; CONTROL
003C    36 55                   JT0     CTXBL7
003E    07              CTXBL2: DEC     A               ; INDICATE ECHO OF LOGIC "1"
003F    00                      NOP                     ; BALANCE TIME
                        ;
0040    C6 5C           CTXBL3: JZ      CTXBL9          ; NO ERROR
                        ; SAVE ERROR OCCURRANCE
0042    1C                      INC     R4
0043    27                      CLR     A
0044    00              CTXBL4: NOP                     ; ADJUST LOOP TIMMING
                        ;
0045    F0                      MOV     A, @R0          ; LOAD DATA
0046    67                      RRC     A               ; MOVE NEXT BIT TO C FLAG
0047    A0                      MOV     @R0, A          ; STORE ROTATED DATA
                        ; NOTE: TRANSMIT IS DESTRUCTIVE
0048    FE                      MOV     A, R6           ; LOAD MASK
0049    EB 33                   DJNZ    R3, CTXBLP      ; OUTPUT 10. BITS
                        ;
004B    BB 01                   MOV     R3, #1          ; FINE LOOP FOR ECHO OF STOP
004D    EF 39                   DJNZ    R7, CTXBL1
004F    FC                      MOV     A, R4           ; MOVE ERROR COUNT TO ACC
0050    83                      RET
                        ;
0051    56 3E           CTXBL6: JNT1    CTXBL2          ; ECHO = LOGIC "1"
                        ; ECHO = LOGIC "0"
0053    04 40                   JMP     CTXBL3
                        ;
0055    04 40           CTXBL7: JMP     CTXBL3          ; BALANCE TIME
                        ;
0057    89 22           CTXBL8: ORL     P1, #22         ; OUTPUT HIGH
0059    27                      CLR     A
005A    04 39                   JMP     CTXBL1
                        ;
005C    04 44           CTXBL9: JMP     CTXBL4          ; BALANCE TIME
                        ;
                                INCLUDE DM0:STCHK
                        ;       ****************************************************************
                        ;       **                                                            **
                        ;       **          STATE CHECK UTILITY                               **
                        ;       **                                                            **
                        ;       ****************************************************************
                        ;
                        ;
005E    34 D3           STCHK:  CALL    DISABL          ; CANNOT DESTROY RECBUF CONTENTS
0060    54 E8           STCHK1: CALL    LSFATW
0062    B9 56                   MOV     R1, #MRSTAT
0064    83                      RET
                        ;
                                INCLUDE DM0:BLKMOV
                                SUBTTL  BLOCK MOVE
                                PAGE
                        ;       ****************************************************************
                        ;       **                                                            **
                        ;       **          BLOCK MOVE                                        **
                        ;       **                                                            **
                        ;       ****************************************************************
                        ;
                        ;       I-M     R0      = TARGET START ADDRESS
                        ;       I-M     R1      = SOURCE START ADDRESS
                        ;       I-M     R2      = NUMBER OF BYTES TO MOVE
                        ;
0065    F1              BLKMOV: MOV     A, @R1
0066    A0                      MOV     @R0, A
0067    18                      INC     R0
0068    19                      INC     R1
0069    EA 65                   DJNZ    R2, BLKMOV
006B    C8                      DEC     R0              ; POINT TO LAST BYTE
006C    83                      RET
                        ;
```

```
                          INCLUDE DM0:DECSUB
                          SUBTTL  DECIMAL SUBTRACT AND COMPARE N DIGITS
                          PAGE
                 ;        **************************************************************
                 ;        **                                                          **
                 ;        **      DECIMAL SUBTRACT AND COMPARE DIGIT STRINGS          **
                 ;        **                                                          **
                 ;        **************************************************************
                 ;
                 ;        SUBTRACT, AND COMPARE, TWO BCD STRINGS (A = A - B).
                 ;
                 ;        I-M      R0      = ADDRESS OF LOW ODRER BYTE OF DIGIT STRING A
                 ;        I-M      R1      = ADDRESS OF LOW ORDER BYTE OF DIGIT STRING B
                 ;        I-M      R2      = NUMBER OF BYTES TO BE SUBTRACTED
                 ;        -OM      F0      = 0, A # B; 1, A = B
                 ;        -OM      C       = 0, A < B; 1, A > B
                 ;
006D  97         DECSUB:  CLR      C
006E  A7                  CPL      C
006F  85                  CLR      F0
0070  95                  CPL      F0              ; SET FOR EQUALITY
                 ;
0071  F1         DECSB1:  MOV      A, @R1          ; LOAD A BYTE VALUE INTO ACC
0072  37                  CPL      A
0073  13 9A               ADDC     A, #9A
0075  60                  ADD      A, @R0
0076  57                  DA       A
0077  A0                  MOV      @R0, A
0078  C6 7B               JZ       DECSB2          ; A = B
007A  85                  CLR      F0              ; A <> B
007B  C8         DECSB2:  DEC      R0
007C  C9                  DEC      R1
007D  EA 71               DJNZ     R2, DECSB1      ; UPDATE BYTE COUNTER AND CONTINUE
007F  83                  RET
                 ;
                          INCLUDE DM0:MISC
                          SUBTTL  MISC ROUTINES TO SAVE CODE
                          PAGE
                 ;        **************************************************************
                 ;        **                                                          **
                 ;        **      MISCELLANEOUS ROUTINES                              **
                 ;        **                                                          **
                 ;        **************************************************************
                 ;
0080  D4 28      RECSTS:  CALL     PRCRX
0082  04 96               JMP      RECST1
                 ;
0084  B8 6F      GETD:    MOV      R0, #WORKBF + 1
0086  A0                  MOV      @R0, A          ; STORE HEADER
0087  C8                  DEC      R0
0088  B0 01               MOV      @R0, #1         ; SIZE OF TRANSMIT PACKET
008A  F8         GETD0:   MOV      A, R0
008B  94 8A               CALL     PRCTX
008D  D4 28               CALL     PRCRX
008F  83                  RET
                 ; GET PRINTER STATUS
0090  54 04      GETSTA:  CALL     STRT0M
0092  23 50               MOV      A, #50          ; REQUEST STATUS HEADER
0094  14 84      GETSTS:  CALL     GETD            ; SEND MESSAGE AND PROCESS RETURNED STATUS
0096  74 16      RECST1:  CALL     DOSTAT
0098  83                  RET
                 ;
                          INCLUDE DM0:LIMTST
                          SUBTTL  LOAD AND REFORMAT LIMIT
                          PAGE
                 ;        **************************************************************
                 ;        **                                                          **
                 ;        **              LOAD AND REFORMAT LIMIT                     **
                 ;        **                                                          **
                 ;        **************************************************************
                 ;
                 ;        I--      R1      = ADDRESS OF LIMIT
                 ;        --M      R0, R2
                 ;
0099  B8 66      LIMTST:  MOV      R0, #WRKBF1
009B  BA 02               MOV      R2, #2
009D  B0 40               MOV      @R0, #40        ; DUMMY HEADER
009F  18                  INC      R0
00A0  14 65               CALL     BLKMOV
00A2  B9 66               MOV      R1, #WRKBF1
00A4  23 83               MOV      A, #83
00A6  A4 32               JMP      FMTCH
                 ;
                          INCLUDE DM0:CHGPRV
                          SUBTTL  CHANGE PRIV FLAG
                          PAGE
                 ;        **************************************************************
                 ;        **                                                          **
                 ;        **              CHANGE PRIV FLAG                            **
                 ;        **                                                          **
                 ;        **************************************************************
                 ;
                 ;        CHANGE PRIV STATE: NORM -> PRIV OR PRIV -> NORM.
                 ;
00A8  54 EB      CHGPRV:  CALL     LSTATW          ; LOAD STATE VALUE
00AA  D3 01               XRL      A, #1           ; CHANGE PRIV STATE BIT
00AC  A0                  MOV      @R0, A          ; STORE NEW STATE VALUE
00AD  F4 0A               CALL     NVMCHG          ; CHANGE OPEN BLOCK IN NVM
00AF  93                  RETR
                 ;
                          INCLUDE DM0:MILDEL
                          SUBTTL  MILLISECOND DELAY
                          PAGE
                 ;        **************************************************************
                 ;        **                                                          **
                 ;        **              DELAY N MILLISECONDS                        **
                 ;        **                                                          **
                 ;        **************************************************************
                 ;
                 ;        DELAY 302.4 U-SEC.
                 ;
00B0  BE 21      DEL300:  MOV      R6, #33.        ; WITH CALL 302.4 U-SEC
00B2  EE B2      DELOOP:  DJNZ     R6, DELOOP      ; WAIT
00B4  83                  RET
                 ;
                 ;
0100                      ORG      100
                          INCLUDE DM0:ACCEXC
                          SUBTTL  MAIN CONTROL LOOP FOR ACCOUNTING FUNCTION
                          PAGE
                 ;        **************************************************************
                 ;        **                                                          **
                 ;        **              ACCOUNTING MAIN CONTROL LOOP                **
                 ;        **                                                          **
                 ;        **************************************************************
                 ;
                 ;        LOOP TO CONTINUOUSLY SCAN RECEIVE LINE FOR PENDING MESSAGES.
                 ;        SUPPLIES ABILITY TO RECEIVE A MESSAGE AND PROCESS OR PROCESS
                 ;        A MESSAGE RECEIVED WHILE TRYING TO TRANSMIT.
                 ;
                 ; NO DATA
0100  76         TBCMDN:  DB       LOW SOFTER              ; SPARE
0101  7C                  DB       LOW ENBLE               ; ENABLE METER
0102  89                  DB       LOW DSBLE               ; DISABLE METER
0103  5C                  DB       LOW ENOENT              ; END OF ENTRY
0104  8F                  DB       LOW CLRBAT              ; CLEAR BATCH
0105  76                  DB       LOW SOFTER              ; ACCOUNTING COMPLETE
0106  67                  DB       LOW SETSER              ; SET SERVICE MODE
```

```
0107  A5         DB      LOW CLRSER              ; CLEAR SERVICE MODE
                ;
                ; CMDS WITH DATA
0108  76       TBCMDW: DB      LOW SOFTER              ; SPARE
0109  C7                DB      LOW SETPO               ; SET POSTAGE
010A  76                DB      LOW SOFTER              ; SPARE
010B  76                DB      LOW SOFTER              ; SPARE
010C  76                DB      LOW SOFTER              ; SET DATE
010D  C3                DB      LOW ENTAMT              ; ENTER AMOUNT
010E  29                DB      LOW ENTCMB              ; ENTER COMBINATION
010F  76                DB      LOW SOFTER              ; SPARE
                ;
                ; ADDRESS TABLE  FOR SERVICE ENTER NEW VALUE AND SET POSTAGE
0110  49       TBCMDS: DB      LOW UNLOCK              ; UNLOCK ADDRESS
0111  4C                DB      LOW LOWPOS              ; LOW POSTAGE WARNING ADDRESS
0112  4E                DB      LOW SETLIM              ; SETTABLE LIMIT ADDRESS
0113  7B                DB      LOW CMBOBF              ; POSTAGE VALUE SET ADDRESS
                ;
                        PAGE

                ; QUE METER STATUS ENTRY TO ENC
0114  B8 5B    QUESTA: MOV     R0, #CNTXFL
0116  10                INC     @R0             ; SET FLAG NON ZERO
                ; UPDATE FLAGS IN METER STATUS
0117  94 F4    RETEXC: CALL    POSUPD          ; ACC = RETURN CODE AS FOLLOWS
                ;                                 BIT 0 = "0"  POSTAGE BELOW UNLOCK VALUE
                ;                                 BIT 1 = "1"  INSUFFICIENT FUNDS FOR CURRENT POSTAGE
0119  67                RRC     A               ; STORE UNLOCK IN CARRY BIT
011A  14 60             CALL    STCHK1          ; LOAD STATE AND POINTER TO MRSTAT
011C  96 30             JNZ     EXCDIS          ; IF STATE NORMAL CHECK INTERPOSER
011E  F1                MOV     A,@R1           ; LOAD METER STATUS
011F  B2 30             JB5     EXCDIS          ; IF INSUFFICIENT POSTAGE
0121  D2 30             JB6     EXCDIS          ; IF DATER DOOR OPEN
0123  F2 2B             JB7     EXCBAS          ; RESET BASE ACTIVE, CHECK IF ANOTHER ENABLE NEEDED
0125  F6 32             JC      IDLE2           ; IF ABOVE UNLOCK, DO NOTHING
0127  B4 B9    EXCENB: CALL    ENABLE
0129  24 32             JMP     IDLE2
012B  09       EXCBAS: IN      A,P1            ; READ INTERPOSER COMMAND LINE
012C  52 27             JB2     EXCENB          ; IF INTERPOSER COMMAND LINE LOW, LEAVE ALONE
012E  24 32             JMP     IDLE2
                ;
0130  34 D3    EXCDIS: CALL    DISABL
                ; IS STATUS TO BE OUTPUT TO PRINTER
0132  27       IDLE2:  CLR     A               ; SET UP FOR EASY ZERO OF FLAGS
0133  B8 5B             MOV     R0, #CNTXFL     ; FLAG IF NON ZERO TO TRANSMIT METER STATUS
0135  20                XCH     A, @R0          ; LOAD FLAG AND ZERO
0136  96 B6             JNZ     METSTA          ; SEND STATUS
0138  F4 0A             CALL    SVNCHG          ; CHANGE OPEN BLOCK IF NEEDED
013A  27       IDLE0:  CLR     A
013B  B8 5C             MOV     R0, #RECBFL     ; POINT AT REC BUFFER FLAG
013D  20                XCH     A, @R0
013E  96 5F             JNZ     CNMESS          ; MESSAGE QUED, CAN ONLY BE CONTROL MESS
0140  54 E7    IDLE1:  CALL    LSTATE
0142  52 54             JB2     IDLE3           ; IF ALREADY FATAL, NO COMM WITH PRINTER
0144  56 4C             JT1     IDLE4           ; NO PRINTER RTS
0146  94 04             CALL    STR10M          ; START TIMER
0148  14 D0             CALL    RECSTS          ; RECEIVE AND PROCESS STATUS
014A  24 53             JMP     IDLE3
                ;
                ; INCREMENT POLL DELAY COUNTER
014C  18       IDLE4:  INC     R0              ; POINT AT POLL DELAY COUNTER
014D  10                INC     @R0             ; INCREMENT POLL COUNTER DELAY
014E  F0                MOV     A, @R0
014F  96 54             JNZ     IDLE3
0151  14 90             CALL    GETSTA
0153  65       IDLE3:  STOP    TCNT
                ; CHECK FOR CONTROL RTS
0154  26 58    IDLE5:  JNT0    RCNMES          ; RECEIVE CONTROL MESSAGE
0156  24 17             JMP     RETEXC
                ;
0158  94 04    RCNMES: CALL    STR10M
015A  94 2C             CALL    CNCRX
015C  65                STOP    TCNT            ; STOP TIMER
015D  24 32             JMP     IDLE2
                ;
015F  B8 5E    CNMESS: MOV     R0, #RECBUF     ; ADDRESS OF REC BUFFER
                ; TEST HIGH NIBBLE AND BRANCH TO PROPER CODE FOR TYPE COMMAND
0161  85                CLR     F0              ; USED FOR SET POSTAGE
0162  27                CLR     A
0163  20                XCH     A, @R0
0164  72 74             JB3     HRDBAD          ; BIT 3 SHOULD NOT BE SET
0166  30                XCHD    A, @R0          ; SEPARATE HIGH AND LOW NIBBLES
0167  47                SWAP    A               ; PUT HIGH NOB IN LOW HALF OF ACC
0168  D3 0C             XRL     A, #0C          ; COMMAND WITH DATA ?
016A  C6 B5             JZ      CMDDAT
016C  95                CPL     F0
016D  D3 09             XRL     A, #09          ; VALUE REQUEST ?
016F  C6 CD             JZ      RETVAL
0171  07                DEC     A
0172  C6 7A             JZ      CMDONY
0174  24 17    HRDBAD: JMP     RETEXC          ; IF HEADER INVALID FOR PEP IGNORE AND NO RESPONSE
0176  23 0F    SOFTER: MOV     A, #0F
0178  44 32             JMP     VALUES
                ;
                ; COMMAND ONLY
017A  F0       CMDONY: MOV     A, @R0          ; LOAD  LOW PART
017B  B3                JMPP    @A              ; ON PAGE INDIRECT TABLE JUMP
                ;
017C  54 E8    ENBLE:  CALL    LSTATE          ; LOAD STATE VALUE
017E  53 DF             ANL     A, #0DF         ; CLEAR DISABLE BIT
0180  95                CPL     F0
0181  A0       DISSTA: MOV     @R0, A          ; STORE UPDATED STATE VALUE
0182  B6 14             JF0     QUESTA
0184  B4 BB             CALL    ENABLE
                ;
0186  27       METSTA: CLR     A
0187  44 32             JMP     VALUES
                ;
0189  14 5E    DSBLE:  CALL    STCHK
018B  43 20             ORL     A, #20          ; SET DISABLE BIT
018D  24 81             JMP     DISSTA
018F  B8 33    CLRBAT: MOV     R0, #BATAMT
0191  BA 07             MOV     R2, #BATASZ+BATCSZ
0193  F4 EE             CALL    CLRBLK
0195  24 14             JMP     QUESTA
0197  14 5E    SETSER: CALL    STCHK           ; ENTER SERVICE MODE
0199  43 02             ORL     A, #2           ; SET SERVICE BIT
019B  A0                MOV     @R0, A
019C  F1                MOV     A, @R1          ; LOAD METER STATUS
019D  43 08             ORL     A, #8
019F  A1       SETSR1: MOV     @R1, A
01A0  24 14             JMP     QUESTA
01A2  14 5E    CLRSER: CALL    STCHK
01A4  53 FD             ANL     A, #0FDH        ; CLEAR SERVICE BIT
01A6  A0                MOV     @R0, A
01A7  F1                MOV     A, @R1          ; LOAD METER STATUS
01A8  53 F7             ANL     A, #0F7
01AA  24 9F             JMP     SETSR1
                ;
01AC  14 5E    ENDCNT: CALL    STCHK           ; CHECK IF FATAL
01AE  52 76             JB2     SOFTER          ; IF FATAL READ ONLY
01B0  32 CF             JB1     SERENT          ; IF IN SERVICE MODE
01B2  F5                SEL     MB1
01B3  24 B0             JMP     RESET
                ;
                ; COMMAND WITH DATA
01B5  F0       CMDDAT: MOV     A, @R0
01B6  03 08             ADD     A, # LOW TBCMDW
01B8  B3                JMPP    @A              ; JUMP ON TABLE
```

```
01B9   B8 7B         ENTCMB: MOV     R0, #CMBOBF
01BB   B9 5F         ENTCB1: MOV     R1, #RECBUF+1
01BD   BA 05                 MOV     R2, #AMTSZ
01BF   14 65                 CALL    BLKMOV
01C1   24 14         SERENT: JMP     QUESTA
01C3   B8 76         ENTANT: MOV     R0, #AMTBF
01C5   24 B6                 JMP     ENTCB1
01C7   23 03         SETPO:  MOV     A, #3           ; NOTE: CANNOT DESTROY DATA IN RECEIVE BUFFER
01C9   B9 51                 MOV     R1, #RECBUF+1
01CB   24 DF                 JMP     SETPOS
                     ;
                     ;
                     ; VALUE REQUEST
01CD   44 27         RETVAL: JMP     FMTVAL
                     ;
                     ; SERVICE VALUE SET AND SET POSTAGE
01CF   B9 76         SERENT: MOV     R1, #AMTBF
01D1   B8 7B                 MOV     R0, #CMBOBF
01D3   F0                    MOV     A, @R0          ; LOAD COMBO FORMAT ONLY ACCEPT IF
01D4   D3 1F                 XRL     A, #1F
01D6   96 76                 JNZ     SOFTER
01D8   18                    INC     R0              ; CHECK COMBO VALUE
01D9   F0                    MOV     A, @R0
01DA   53 FC                 ANL     A, #0FC         ; ONLY VALID ARE 0, 1, 2, 3
01DC   96 76                 JNZ     SOFTER
01DE   F0                    MOV     A, @R0
01DF   43 10         SETPOS: ORL     A, #10          ; OFFSET FOR TABLE
01E1   AB                    MOV     R3, A           ; SAVE FOR LATER
01E2   E3                    MOVP3   A, @A           ; LOAD FORMAT SPEC
01E3   54 32                 CALL    FMTCH           ; CHECK FORMAT
01E5   03 02                 ADD     A, #2           ; FOR UNLOCK POINT TO LAST BYTE
01E7   A8                    MOV     R0, A
01E8   14 F4                 CALL    CLRAM
01EA   FB                    MOV     A, R3
                     ; CODE TO PREVENT ENTERING UNLOCK VALUE IN MILS
01EB   32 F3                 JB1     SERENO          ; NOT UNLOCK VALUE
01ED   12 F3                 JB0     SERENO
01EF   27                    CLR     A
01F0   30                    XCHD    A, @R0
01F1   96 76                 JNZ     SOFTER
01F3   FB            SERENO: MOV     A, R3
01F4   E3                    MOVP3   A, @A           ; LOAD TARGET ADDRESS
01F5   A8                    MOV     R0, A
01F6   14 65                 CALL    BLKMOV
01F8   B6 14                 JF0     QUESTA          ; NOT SETPOS
01FA   24 DE                 JMP     SETINT
                     ;
                     ;
0200                         ORG     200
                             INCLUDE DM0:FMTOUT
                             SUBTTL  RETURN VALUE WITH UNECESSARRY ZEROS REMOVED
                             PAGE
                     ;       ***********************************************************
                     ;       **                                                       **
                     ;       **              RETURN REQUESTED VALUE                   **
                     ;       **                                                       **
                     ;       ***********************************************************
                     ;
                     ;       RETURN VALUE WITH UNEEDED ZEROS' SUPPRESSED. TWO ENTRIES ARE
                     ;       PROVIDED: (1) OUTPUT WANTED IN METER UNITS, AND (2) USER TO SUPPLY
                     ;       DECIMAL PLACES. JUMP TABLE DIRECTS PROPER ENTRY ASSUMING THAT LOW
                     ;       NIBBLE OF HEADER + 10H IS IN ACCUMULATOR.
                     ;
                     ;       I--     R0      = ADDRESS OF DATA TO FORMAT
                     ;       I--     R1      = ADDRESS POINTER
                     ;       I--     R2      = SIZE OF DATA IN BYTES
                     ;       I--     R4      = NO. OF IMPLIED DEC PLACES
                     ;       I--     R5      = HEADER FOR TRANS
                     ;       --N     R1, R3, R7
                     ;
                     ; TABLE FOR DATA FORMATS (HIGH NIBB = NO. BYTES, LOW NIBB = NO. DEC PLACES)
0200   2F                    DB      2F              ; METER STATUS
0201   33                    DB      33              ; POSTAGE VALUE
0202   53                    DB      53              ; ASCENDING REGISTER
0203   43                    DB      43              ; DESCENDING REGISTER
0204   53                    DB      53              ; CONTROL SUM
0205   4F                    DB      4F              ; PIECE COUNT
0206   43                    DB      43              ; BATCH AMOUNT
0207   3F                    DB      3F              ; BATCH COUNT
                     ;
                     ; SERVICE
0208   20                    DB      20              ; METER STATUS
0209   33                    DB      33              ; POSTAGE VALUE
020A   33                    DB      33              ; UNLOCK VALUE
020B   20                    DB      20              ; LOW POSTAGE WARNING
020C   4F                    DB      4F              ; METER SERIAL NUMBER
020D   3F                    DB      31              ; DIAGNOSTIC STATUS
020E   20                    DB      20              ; SETTABLE POSTAGE LIMIT
020F   2F                    DB      2F              ; USED FOR SOFT ERROR
                     ;
                             PAGE
                     ; LOOP FOR DELETING ZERO BYTES
0210   18            FMTO01: INC     R0              ; UPDATE ADDRESS POINTER
0211   EA 5E                 DJNZ    R2, FMTOU8
                     ; HERE IF ALL ZERO BYTES
0213   C8                    DEC     R0              ; POINT AT KNOWN 0 DATA
0214   FC                    MOV     A, R4           ; LOAD DEC PLACES
0215   BB 01                 MOV     R3, #1
0217   C6 9C                 JZ      FMTO14          ; 0 DEC PLACES
0219   D3 0F                 XRL     A, #0F          ; CHECK FOR NO DEC PLACES
021B   C6 9C                 JZ      FMTO14          ; OUTPUT 0
021D   C8                    DEC     R0
021E   BB 03                 MOV     R3, #3
0220   D3 0C                 XRL     A, #0C
0222   96 9C                 JNZ     FMTO14          ; OUTPUT 0.00
0224   1B                    INC     R3
0225   44 78                 JMP     FMTO03          ; OUTPUT 0.00 AFTER STRIP TRAIL ZERO
                     ;
0227   F0            FMTVAL: MOV     A, @R0          ; LOAD HEADER
0228   07                    DEC     A               ; CHECK IF POSTAGE VALUE
0229   C6 31                 JZ      VALUE           ; IF ACC = 0 DO NOT INSERT SERVICE BIT
022B   54 E7                 CALL    LSTATE          ; INTERPRET REQUEST DIFFERENT IF IN SERVICE MODE
022D   53 02                 ANL     A, #02
022F   E7                    RL      A
0230   E7                    RL      A
0231   40            VALUE:  ORL     A, @R0          ; LOAD HEADER AND ADD SERV BIT IF NEEDED
0232   A9            VALUES: MOV     R1, A           ; FROM LOW NIBB EXTRACT OUT DATA ADDR, SIZE, NO. DECIMAL PLACES
0233   E3                    MOVP3   A, @A           ; ADDRESS OF DATA
0234   29                    XCH     A, R1           ; STORE ADDR
0235   AD                    MOV     R5, A
0236   A3                    MOVP    A, @A           ; LOAD SPEC
                                                     ; HIGH = NO. BYTES,  LOW = NO. DECIMAL PLACES
0237   AC                    MOV     R4, A
0238   53 0F                 ANL     A, #0F          ; MASK TO LOW NIBB
023A   2C                    XCH     A, R4           ; STORE DEC PLACES
023B   DC                    XRL     A, R4           ; FORM NO. BYTES
023C   47                    SWAP    A
023D   AA                    MOV     R2, A
023E   AF                    MOV     R7, A           ; SAVE FOR LATER USE
023F   BB 03                 MOV     R3, #3          ; SET DEFAULT DIGIT COUNT
                     ;
0241   F1                    MOV     A, @R1
0242   17                    INC     A
0243   96 47                 JNZ     FMTOT1          ; IF DATA = FF BAD
0245   24 76                 JMP     SOFTER
0247   74 E9         FMTOT1: CALL    CLRWK
0249   B8 71                 MOV     R0, #(WORKBF+3)
024B   14 65                 CALL    BLKMOV          ; MOVE TO WORK AREA
                     ; CHECK FOR SERVICE VALUE
024D   FD                    MOV     A, R5           ; LOAD HEADER
```

```
0249  17          INC   A
024F  92 B7       JB4   FMTSOF        ; SOFT ERR * XF.  * 10
                ; CHECK FOR CONTROL SUM
0251  F9        FMTOT2: MOV  A, R5
0252  C6 B9       JZ    FMTSTA        ; IF STATUS BYPASS FORMAT
0254  D3 04       XRL   A, #4
0256  96 5A       JNZ   FMTOUA        ; NOT CONTROL SUM
                ; CONTROL SUM
0258  54 B9       CALL  CTLSUM
                ;
025A  B8 71     FMTOUA: MOV  R0, #(WORKBF+3)
025C  FF          MOV   A, R7
025D  AA          MOV   R2, A
025E  F0        FMTOU0: MOV  A,@R0        ; LOAD ONE BYTE OF DATA
025F  C6 10       JZ    FMTOU1         ; IF BOTH DIGITS ZERO CONTINUE CHECK'NG
                ; CAN STILL HAVE ONE LEADING ZERO IN UPPER NIBB
0261  FA          MOV   A, R2         ; FORM DIGIT COUNT
0262  E7          RL    A
0263  AB          MOV   R3, A         ; SAVE IN R3
0264  F0          MOV   A, @R0
0265  53 F0       ANL   A, #0F0       ; CHECK HIGH NIBBLE OF DATA BYTE
0267  96 6A       JNZ   FMTOU2
0269  CB          DEC   R3            ; REFLECT SUPPRESSION OF HIGH ZERO
026A  FC        FMTOU2: MOV  A,R4      ; CHECK IF 3 DEC PLACES
026B  D3 03       XRL   A, #3
026D  96 B5       JNZ   FMTO10        ;  IF NOT MILLS NO FURTHER SUPPRESSION
                ; HERE IF THREE (3) DEC REQUIRED
026F  F8          MOV   A,R0          ; DATA POINTER
0270  6A          ADD   A, R2
0271  07          DEC   A             ; START + SIZE - 1
0272  A9          MOV   R1, A
0273  F1          MOV   A, @R1        ; LOAD LOW BYTE
0274  53 0F       ANL   A, #0F        ; TEST LOW NIBB FOR ZERO
0276  96 B6       JNZ   FMTO10        ; JMP IF CANNOT SUPPRESS
                ; HERE TO STRIP TRAILING ZERO
0278  FB        FMTOU3: MOV  A, R3
0279  17          INC   A             ; ROUND UP FOR BYTE COUNT OF DATA
027A  67          RRC   A             ; FORM BYTE COUNT
027B  AA          MOV   R2, A
027C  E6 83       JNC   FMTOU4        ;ALREADY ODD DIGIT COUNT
027E  C8          DEC   R0            ; ADJUST ADDRESS TO LOOK LIKE ODD DIGIT COUNT
027F  1A          INC   R2
0280  F8        FMTOU4: MOV  A,R0
0281  B4 B2       CALL  FMTNB2        ; SHIFT LEFT ONE NIBBLE
0283  A8          MOV   R0, A         ; NEW ADDRESS POINTER
0284  CB          DEC   R3            ; ADJUST DIGIT COUNT
0285  CC          DEC   R4            ; ADJUST DEC COUNT
                ; PREPARE TRANSMIT PACKET
0286  FC        FMTO10: MOV  A, R4      ; CHECK NON ZERO DIG > DEC PLACES
0287  C6 9C       JZ    FMTO14
0289  D3 0F       XRL   A, #0F
028B  C6 9C       JZ    FMTO14        ; IF DEC PLACES = 0. SKIP TEST
028D  FC          MOV   A, R4
028E  37          CPL   A             ; SUBTRACT AND CHECK CARRY
028F  97          CLR   C
0290  7B          ADDC  A, R3
0291  F6 9C       JC    FMTO14        ; DIG'S OK
                ; PAD IN LEADING "0" S AS NEEDED
0293  2B        FMTO11: XCH  A, R3      ; CHECK IF ODD DIGIT COUNT
0294  12 97       JB0   FMTO12
0296  C8          DEC   R0            ; MOVE ADDRESS POINTER UP 1 BYTE
0297  2B        FMTO12: XCH  A, R3      ; REPLACE DIGIT IN R3 AND ADJUST COUNT IN ACC
0298  1B          INC   R3            ; INC DIGIT COUNT
0299  17          INC   A             ; ADJ COUNT
029A  96 93       JNZ   FMTO11
029C  FB        FMTO14: MOV  A, R3      ; FORM FORMAT IN ACCUMULATOR
029D  47          SWAP  A
029E  4C          ORL   A, R4
029F  C8          DEC   R0            ; ADJ ADDRESS POINTER
02A0  A0          MOV   @R0, A        ; STORE FORMAT
02A1  C8        FMTSTS: DEC  R0
02A2  FD          MOV   A, R5         ; INSERT HEADER
02A3  43 80       ORL   A, #80        ; INSERT UPPER NIBBLE OF HEADER
02A5  A0          MOV   @R0, A
02A6  C8          DEC   R0
02A7  FB          MOV   A, R3         ; COMPUTE TRANSMIT BYTE COUNT
02A8  97          CLR   C
02A9  17          INC   A
02AA  67          RRC   A             ; DIVIDE BY 2
02AB  03 02       ADD   A, #2
02AD  A0          MOV   @R0, A        ; STORE BYTE COUNT
02AE  F8        FMTTRP: MOV  A, R0      ; PACKET ADDRESS
02AF  94 64       CALL  STRTOM
02B1  A5          CLR   F1
02B2  94 BC       CALL  CTXMES
02B4  65          STOP  TCNT
02B5  24 2A       JMP   IDLE0
                ;
02B7  10        FMTSOF: INC  @R0       ; SET SOFT ERR BIT IN TRANSMIT BUFFER
02B8  10          INC   @R0
02B9  BD 00     FMTSTA: MOV  R5, #VLISHD  ; CHANGE DUMMY HEADER "8F" TO "00"
02BB  C8          DEC   R0            ; BACK UP TO FIRST BYTE
02BC  CB          DEC   R3            ; CHANGE DIG COUNT SO MESS = 3 BYTES
02BD  44 A1       JMP   FMTSTS
                ;
                ; CONTROL SUM
02BF  B9 28     CTLSUM: MOV  R1, #DSCREG+DSCRSZ-1
02C1  BA 04       MOV   R2, #DSCRSZ
02C3  34 EC       CALL  PFCADD
02C5  27          CLR   A
02C6  F6          ADDC  A, @R0        ; ADD C FLAG AND HIGH BYTE OF ACC
02C7  17          INC   A
02C8  A0          MOV   @LO, A
02C9  93          RET
                ;
                  INCLUDE DM0:ASCCRC
                  $STTL  COMPUTE CRC FOR ASCENDING REGISTER
                  PAGE

                ;     ************************************************************
                ;     **                                                        **
                ;     **          COMPUTE CRC FOR ASCENDING REGISTER            **
                ;     **                                                        **
                ;     ************************************************************

02CA  B8 2A     ASCCRC: MOV  R0, #ASCREG
02CC  BA 05       MOV   R2, #ASCRSZ
02CE  F4 CF       CALL  CRC
02D0  B8 29       MOV   R0, #ASCRCC
02D2  83          RET
                ;
                  INCLUDE DM0:DISABL
                  $STTL  DISABLE METER
                  PAGE

                ;     ************************************************************
                ;     **                                                        **
                ;     **                 DISABLE METER                          **
                ;     **                                                        **
                ;     ************************************************************
                ;
                ;     IF METER ENABLED, THEN DISABLE METER AND VERIFY PRINTER'S RESPONSE,
                ;     ELSE DO NOTHING.
                ;
                ; IS METER ENABLED?
02D3  89 04     DISABL: ORL  P1, #4        ; DISABL ACC HALF OF INTERPOSER
02D5  B8 2E       MOV   R0, #PRSTAT
02D7  F0          MOV   A, @R0
02D8  52 DB       JB2   DISAB1        ; IS CURRENTLY ENABLED
02DA  83        DISAB0: RET
```

```
                        ;
02DB   34 E7    DISAB1: CALL    LSTATE
02DD   52 DA            JB2     DISRET          ; IF FATAL CAN NOT TALK TO PRINTER
02DF   94 12            CALL    STROOM
02E1   14 60    DISAB2: CALL    RECSTS          ; WAIT FOR STATUS RESPONSE
02E3   52 E1            JB2     DISAB2          ; WAIT TILL DISABLED OR TIMEOUT
02E5   A4 CF    DISAB3: JMP     ENABRT
                        ;
                        INCLUDE DMO:LSTATE
                        SUBTTL  LOAD STATE VALUE
                        PAGE
                        ;       ***************************************************************
                        ;       **                                                           **
                        ;       **              LOAD STATE VALUE                             **
                        ;       **                                                           **
                        ;       ***************************************************************
                        ;
02E7   D5       LSTATE: SEL     RB1
02E8   B8 5B    LSTATW: MOV     R0, #STATE
02EA   F0               MOV     A, @R0
02EB   93               RETR
                        ;
                        INCLUDE DMO:DECADD
                        SUBTTL  DECIMAL ADDITION OF N DIGITS
                        PAGE
                        ;       ***************************************************************
                        ;       **                                                           **
                        ;       **              DECIMAL ADDITION OF N BYTES                  **
                        ;       **                                                           **
                        ;       ***************************************************************
                        ;
                        ;       ADD TWO (2) STRINGS OF BCD NUMBERS (A = A + B).
                        ;
                        ;       I--     R0      = ADDRESS OF LOW ORDER BYTE OF A
                        ;       I--     R1      = ADDRESS OF LOW ORDER BYTE OF B
                        ;       I--     R2      - NUMBER OF BYTES TO ADD
                        ;       -OM     C       = 0, NO OVERFLOW; = 1, OVERFLOW
                        ;
02EC   97       DECADD: CLR     C
                        ;
02ED   F0       DECAD1: MOV     A, @R0          ; LOAD ACC WITH "A" BYTE
02EE   71               ADDC    A, @R1          ; ADD "A" + "B"
02EF   57               DA      A
02F0   A0               MOV     @R0, A          ; SAVE ANSWER
                        ;
                        ; UPDATE ADDRESS POINTERS
02F1   C8               DEC     R0
02F2   C9               DEC     R1
02F3   EA ED            DJNZ    R2, DECAD1      ; DECREMENT BYTE COUNTER AND CONTINUE
02F5   83               RET
                        ;
                        INCLUDE DMO:TMRTST
                        SUBTTL  CHECK TIME LEFT TILL TIMMER INTERUPT
                        PAGE
                        ;       ***************************************************************
                        ;       **                                                           **
                        ;       **      ENSURE TIMER WILL NOT INTERRUPT FOR > 4 MILLISEC     **
                        ;       **                                                           **
                        ;       ***************************************************************
                        ;
02F6   42       TMRTST: MOV     A, T            ; LOAD TIMER VALUE
02F7   03 30            ADD     A, #30          ; ADD ABOUT 5-6 MILLISEC
02F9   F6 FE            JNC     TMRTS1          ; C = 0 OK
02FB   53 CF            ANL     A, #0CF         ; ALTER TIMER TO WAIT 5-6 MILLISEC
02FD   62               MOV     T, A            ; MOVE MODIFIED VALUE TO TIMER
02FE   83       TMRTS1: RET
                        ;
                        ;
0300                    ORG     300
                        INCLUDE DMO:PC3TBL
                        SUBTTL  DATA TABLE OF RAM ADDRESS
                        PAGE
                        ;       ***************************************************************
                        ;       **                                                           **
                        ;       **              TABLE  FOR ADDRESS OF DATA                   **
                        ;       **                                                           **
                        ;       ***************************************************************
                        ;
                        ;       EACH ENTRY IS STARTING ADDRESS OF DATA ASSOCIATED WITH  HEADER.
                        ;
                        ; NORMAL MODE
0300   56               DB      MRSTAT          ; METER STATUS
0301   30               DB      POSVAL          ; POSTAGE VALUE
0302   2A               DB      ASCREG          ; ASCENDING REG
0303   25               DB      DSCREG          ; DESCENDING REG
0304   2A               DB      ASCREG          ; CONTROL SUM
0305   20               DB      PECEKT          ; PIECE COUNT
0306   35               DB      BATAMT          ; BATCH AMOUNT
0307   37               DB      BATCNT          ; BATCH COUNT
                        ;
                        ; SERVIVE MESSAGES
0308   56               DB      MRSTAT          ; METER STATUS
0309   30               DB      POSVAL          ; POSTAGE VALUE
030A   49               DB      UNLOCK          ; UNLOCK VALUE
030B   4C               DB      LOWPOS          ; LOW POSTAGE
030C   4?               DB      MSSRNO          ; METER SERIAL NUMBER
030D   51               DB      RSTCNT          ; CODE FOR FATAL CONDITION
030E   47               DB      SETLIM          ; LIMIT FOR SETTABLE POSTAGE
030F   56               DB      MRSTAT          ; SPARE
                        ;
                        ; SERVIVE MODE AMOUNT FORMAT SPEC'S
0310   63               DB      63              ; UNLOCK FMT SPEC
0311   40               DB      40              ; LOW POSTAGE FMT SPEC
0312   40               DB      40              ; SETTABLE LIMIT FMT SPEC
0313   53               DB      53              ; SET POSTAGE SPEC
                        ;
                        INCLUDE DMO:DOSTAT
                        SUBTTL  PROCESS PRINTER STATUS
                        PAGE
                        ;       ***************************************************************
                        ;       **                                                           **
                        ;       **              PROCESS PRINTER STATUS                       **
                        ;       **                                                           **
                        ;       ***************************************************************
                        ;
                        ;       UPDATE PRINTER STATUS, REFLECT CHANGES IN STATE AND METER STATUS.
                        ;
                        ;       I--     R0      = ADDRESS TO MESSAGE WITH HEADER AND STATUS BYTE
                        ;       M       R1, R5, R6, R7
                        ;
0314   64 7C    TRIPST: JMP     LOTRIP
                        ;
0316   B9 59    DOSTAT: MOV     R1, #POLCNT     ; ZERO POLL DELAY COUNTER
0318   B1 00            MOV     @R1, #00        ; WAIT 200 MILLISEC
031A   D3 80            XRL     A, #ALISON      ; CHECK STATUS OF ACK
031C   00               XRL     A, @R0
031D   C6 24            JZ      DOSTA1          ; HEADER OK
                        ; BAD HEADER  FATAL - PROCEDURE
031F   BF 0.            MOV     R7, #FTNSTAT    ; FATAL CODE
0321   64 33            JMP     FATERR
0323   B9 21    DOSTA1: MOV     R1, #PRSTAT     ; EXCHANGE STATUS
0325   18               INC     R0              ; POINT AT DATA
0326   15               DIS     I               ; ENSURE IF ERR IS TRANSMITTED IT IS PROCESSED
0327   F0               MOV     A, @R0
0328   21               XCH     A, @R1
0329   D1               XRL     A, @R1          ; FORM XRL OF OLD AND NEW STATUS
032A   53 DF            ANL     A, #0DF         ; MASK SPITTER BAR
032C   C6 6?            JZ      DOSTAT          ; NO CHANGE
```

```
032F   AF             MOV     R7, A
0330   54             XRL     A, @R1          ; FORM AND OF NEW AND XRL OF OLD AND NEW
0330   AE             MOV     R6, A
0331   72 14          JB3     TRIEST          ; DO ACCOUNTING ON START OF TRIP
0333   05             EN      I               ; NO TRIP
0334   02 71          JB0     GETDIA          ; IF NEW FATAL ERROR GET DIAGNOSTIC STATUS
0336   FF             MOV     A, R7
0337   72 3A          JB3     DOSTA3          ; WAS CHANGE IN TRIP BIT
; CHECK HOME POSITION
0339   92 A2          JB4     BADHOM          ; HOME POSITION AGREE
033B   37     DOSTA3: CPL     A
033C   AD             MOV     R5, A
033D   B8 5A          MOV     R0, #CNTXFL     ; CHANGE IN STATUS THEREFORE QUE TO CONTROL
033F   10             INC     @R0
; CHECK CHANGE IN INTERPOSTER
0340   B8 56  DOSTA4: MOV     R0, #MRSTAT
0342   52 5A          JB2     DOSTA5          ; NO CHANGE IN INTERPOSER
0344   F1             MOV     A, @R1
0345   77             RR      A               ; CARRY = INTERPOSTED POS
0346   77             RR      A
0347   F7             RLC     A
0348   F0             MOV     A, @R0          ; LOAD METER STATUS AND INSERT INTERPOSER
0349   F6 4F          JC      DOSTA4          ; C = 0 -> DISABLE
; C = 1 (NEG => ENABLE) MUST CLEAR RESET CASE BIT
034B   53 7F          ANL     A, #7F
034D   77     DOSTA4A RR      A
034E   77             RR      A
034F   77             RR      A
0350   97             CLR     C
0351   F7             RLC     A
0352   E7             RL      A
0353   A0             MOV     @R0, A
0354   FD     DOSTA5: MOV     A, R5
; CHECK METER DOOR
0355   D2 63          JB6     DOSTA6          ; NO CHANGE
0357   97             CLR     C               ; DEFAULT CHECK DATE BIT TO = 1
0358   A7             CPL     C
0359   FE             MOV     A, R6
035A   D2 5D          JB6     DOST5A          ; DOOR JUST OPENED USE DEFAULT
035C   A7             CPL     C               ; DOOR CHANGE AND NOT JUST OPENED *
035D   F0     DOST5A: MOV     A, @R0          ; LOAD METER STATUS
035E   77             RR      A
035F   E7             RL      A
0360   67             RRC     A
0361   77             RR      A
0362   A0             MOV     @R0, A          ; SAVE UPDATED STATUS
0363   FD     DOSTA6: MOV     A, R5
; CHECK PRIV SWITCH
0364   F2 6E          JB7     DOSTA7          ; NO CHANGE
0366   B8 58          MOV     R0, #STATE
0368   F1             MOV     A, @R1          ; LOAD NEW STATUS
0369   F7             RLC     A               ; CHECK PRIV BIT
036A   F0             MOV     A, @R0          ; LOAD STATE VALUE
036B   77             RR      A
036C   F7             RLC     A               ; INSERT PRIV INFO
036D   A0             MOV     @R0, A
036E   F1     DOSTA7: MOV     A, @R1          ; LOAD PRINTER STATUS INTO ACC
036F   05             EN      I
0370   83             RET
;
0371   94 04  GETDIA: CALL    STR10M
0373   23 5D          MOV     A, #5DH         ; HEADER FOR DIA STATUS
0375   14 C4          CALL    GETD
0377   65             STOP    TCNT
0378   18             INC     R0
0379   F0             MOV     A, @R0
037A   44 3C          JMP     FATBRI
;
                      INCLUDE DK0:DOTRIP
                      SUBTTL  PROCESS TRIP AND ACCOUNTING
                      PAGE
              ;       ***************************************************************
              ;       **                                                          **
              ;       **             PROCESS TRIP AND ACCOUNT                     **
              ;       **                                                          **
              ;       ***************************************************************
              ;
              ;       PROCESS OCCURRENCE OF TRIP AND ACCOUNT.
              ;
              ;       I--     A       = VALUE OF NEW STATUS
              ;       I--     R0      = ADDRESS OF OLD STATUS
              ;       I--     R1      = ADDRESS OF NEW STATUS
              ;
; UPDATE METER STATUS
037C   65     DOTRIP: STOP    TCNT
037D   23 64          MOV     A, #TRPSET      ; TIME ALLOWED FOR TRIP
037F   94 19          CALL    ST820M          ; START TIMER
0381   B0 02          MOV     @R0, #2         ; #2 INDICATES TRIP BEING TIMED
0383   74 B3          CALL    DOACCT
0385   05             EN      I               ; ALLOW POWER FAIL
0386   14 F4          CALL    POSUPD
0388   C6 8C          JZ      DOTRP1          ; LEAVE ENABLED
038A   89 04          ORL     P1, #4          ; DISABLE MY HALF NOW !
; CRITICAL ACCOUNTING NOW COMPLETE SO INDICATE TO PRINTER
038C   23 43  DOTRP1: MOV     A, #ACMPLD
038E   14 97          CALL    GETSTS
0390   37             CPL     A
0391   72 97          JB3     DOTRP3          ; TRIP COMPLETE
; WAIT FOR TRIP COMPLETE
0393   14 BC  DOTRP2: CALL    RECSTS
0395   72 93          JB3     DOTRP2          ; KEEP WAITING TILL TRIP BIT CLEARS
0397   94 81  DOTRP3: CALL    TIMSTP          ; STOP TIMER
0399   03 A3          ADD     A, #TRPTOL      ; CHECK FOR OVERSPEED *
039B   E6 9F          JNC     DOTRP4          ; SPEED OK
; OVERSPEED
039D   84 79          JMP     TRIPTM
039F   FF     DOTRP4: MOV     A, R7           ; CHECK HOME POS
03A0   92 A6          JB4     DOTRP5          ; HOME POS CHANGED OK
; BAD HOME POSITION
03A2   BF 05  BADHOM: MOV     R7, #HOMFAT
03A4   04 53          JMP     FATERR
03A6   B9 56  DOTRP5: MOV     R1, #MRSTAT
03A8   B8 76          MOV     R0, #WORKBF+2
03AA   BA 02          MOV     R2, #2
03AC   14 65          CALL    BLKMOV
03AE   C8             DEC     R0              ; POINT TO FIRST BYTE
03AF   10             INC     @R0             ; TRIP BIT 0
03B0   C8             DEC     R0
03B1   B0 00          MOV     @R0, #VLISHD
03B3   C8             DEC     R0
03B4   B0 03          MOV     @R0, #3
03B6   44 AE          JMP     FIITRP
;
                      SUBTTL  ACCOUNT FOR OCCURANCE OF TRIP
                      PAGE
              ;       ***************************************************************
              ;       **                                                          **
              ;       **                 ACCOUNT FOR TRIP                         **
              ;       **                                                          **
              ;       ***************************************************************
              ;
              ;       UPDATE ASCENDING AND DECENDING REGISTERS, PIECE COUNT, AND BATCH
              ;       COUNT AND BATCH AMOUNT FIELDS.
              ;
03B3   94 E5  DOACCT: CALL    POSWRK          ; MOVE POSTAGE VALUE TO WORK BUFFER WITH LEAD 0'S
; UPDATE ASCENDING REGISTER
03B5   B8 2F          MOV     R0, #(ASCREG+ASCRSZ-1)
03B7   B9 73          MOV     R1, #(WORKBF+POSTSZ+3-1)
03B9   BA 07          MOV     R2, #ASCRSZ
```

```
                CALL    DECADD          ; BO=B0+B1
        ; NEW CRC
0402    [illegible]     CALL    ASC[illegible]
0404    [illegible]     MOV     @R0, A
        ; UPDATE DESCENDING REGISTER
0405    [illegible]     INC     R0              ; POINT AT LAST BYTE OF DESC REG
0406    [illegible]     MOV     R1, #(WORKBF+POSTSZ+3-1)
[illegible]             MOV     R2, #DSCRSZ
[illegible]             MOV     @CSEL
[illegible]             [illegible]
        ; NEW CRC
[illegible]     34 65   CALL    BSCCRC
[illegible]             MOV     @R0, A
        ; UPDATE BATCH ACCOUNT FIELD
[illegible]             MOV     R0, #BATCNT + BATASZ - 1
[illegible]             MOV     R1, #(WORKBF+POSTSZ+3-1)
[illegible]             MOV     R2, #BATASZ
0307    34 1C           CALL    DECADD
        ; UPDATE PIECE COUNT
0309    [illegible]     CALL    CLRWRK
030B    [illegible]     MOV     R1, #WORKBF + WRKSZ - 1
[illegible]             INC     @R1
[illegible]             MOV     R0, #(PCECNT+PCESZ-1)  ; ADDRESS OF LAST BYTE OF PIECE COUNT
[illegible]             MOV     R2, #PCESZ      ; NO. OF BYTES
[illegible]             CALL    DECADD
        ; UPDATE BATCH [illegible]
[illegible]             MOV     R0, #BATCNT + BATCSZ - 1
[illegible]             MOV     R1, #WORKBF + WRKSZ - 1
[illegible]             MOV     R2, #BATCSZ
[illegible]             CALL    DECADD
        ; CHECK [illegible]
[illegible]
        ;
                INCLUDE DMO:LOWSET
                SUBTTL  COMMUNICATION MASK SET
                [illegible]
        ;       ********************************************************************
        ;       **                                                                **
        ;       **              COMMUNICATION LOW MASK SET                        **
        ;       **                                                                **
        ;       ********************************************************************
        ;
        ;       DETERMINE PROFFER OUTPUT FOR P1 TO OUTPUT LOW LEVEL ON ACTIVE
        ;       COMMUNICATION AND LEAVE OTHER LINE UNAFFECTED.
        ;
        ;       -OM     A       ; MASK VALUE ON RETURN
        ;
03F2    09      LOWSET: IN      A,P1            ; READ CURRENT P1
03F3    53 CC           ANL     A, #0CC         ; CLEAR COMMUNICATION LINES
03F5    76 FA           JF1     LOWST1          ; PRINTER
        ; CONTROL
03F7    43 13           ORL     A, #13
03F9    33              RET
        ; PRINTER
03FA    43 31   LOWST1: ORL     A, #31
03FC    83              RET
        ;
        ;
0400                    ORG     400
                        INCLUDE DMO:TIMER
                        SUBTTL  TIMER AND FATAL ERROR FUNCTIONS
                        PAGE
        ;       ********************************************************************
        ;       **                                                                **
        ;       **              TIMER  -  FATAL ERROR                             **
        ;       **                                                                **
        ;       ********************************************************************
        ;
        ;       PROVIDES THREE FUNCTIONS: (1) CONTROL OF ON-CHIP TIMER, (2) TIME-OUT
        ;       PROCESSING OF TIMED EVENTS, AND (3) PROCESSING FOR FATAL ERROR.
        ;
        ;       I-M     A       - AMOUNT OF TIME TO COUNT
        ;       --M     R0
        ;
        ; TABLE FOR TIMEOUT JUMPS
0400    31              DB      LOW FATCOM      ; IF COMMUNICATIONS TIME-OUT
0401    37              DB      LOW INTPOS      ; IF TIME-OUT ON INTERPOSER CHANGE
0402    79              DB      LOW TRIPTM      ; TRIP TO LONG
0403    7D              DB      LOW SETPTM      ; POSTAGE TIMED OUT
        ;
        ; PROVIDE TIMEOUT FUNCTION FOR TIMES 1 - 20 MILLISEC
0404    AB      STR10M: MOV     R3, A
0405    23 07           MOV     A, #14.         ; GENERAL COMMUNICATION TIME-OUT
0407    B8 54   STRMIL: MOV     R0, #TIMCNT     ; ENTRY WITH TIMEOUT IN ACC IN MILLI-SEC
0409    B0 01           MOV     @R0, #1         ; SETUP TO ALLOW 1 PASS THROUGT MAIN TIME LOOP
040B    E7              RL      A               ; MILLI-SEC * 8 IS ABOUT NEEDED COUNT
040C    E7              RL      A
040D    E7              RL      A
040E    37              CPL     A
040F    17              INC     A               ; FORM 2'S COMP FOR COUNT UP OVERFLOW
0410    84 1E           JMP     STRTIM          ; USE COMMON CODE
        ; MAIN TIMER LOOPS
0412    B8 55   STR60N: MOV     R0, #TIMWRD     ; ENTRY FOR INTERPOSER TIME-OUT
0414    B0 01           MOV     @R0, #1         ; TABLE ENTRY FOR INTERPOSER TIMEOUT
0416    AB              MOV     R3, A           ; SAVE ACC VALUE
0417    23 04           MOV     A, #4           ; 60 MILLI-SEC = 3 * 20 MS CNTS
0419    B8 54   STR20M: MOV     R0, #TIMCNT     ; ENTRY IF GENERAL VALUE IN ACC
041B    A0      RSTR20: MOV     @R0, A          ; COMMON CODE FOR NEW COUNT AND RESTAPT OF 20 MS COUNT
041C    23 6B           MOV     A, #256. - 149. ; COMPLEMENTED COUNT FOR 20 MILLI-SEC
041E    62      STRTIM: MOV     T, A            ; LOAD TIMER
041F    55              STRT    T
0420    25              EN      TCNTI
0421    FB              MOV     A, R3           ; RESTORE ACC FOR TIMER RESTART
0422    18              INC     R0
0423    93      TIMDMY: RETR
        ;
0424    D5      TIMINT: SEL     RB1             ; ON INTERUPT DO NOT DISTURB INTERRUPTED ACTIVITY
0425    AB              MOV     R3, A           ; SAV R3
0426    65              STOP    TCNT            ; STOP TIMER
0427    B8 54           MOV     R0, #TIMCNT
0429    F0              MOV     A, @R0
042A    07              DEC     A
042B    96 1B           JNZ     RSTR20          ; IF COUNT NOT 0 WAIT ANOTHER 20 MS
        ; TIMED OUT
042D    18              INC     R0              ; POINT AT TIMWRD
042E    20              XCH     A, @R0
042F    C5              SEL     RB0
0430    B3              JMPP    @A              ; GO TO PROPPER TIME-OUT ROUTINE
        ;
0431    BF 03   FATCOM: MOV     R7, #COMFAT     ; CODE FOR COMMUNICATION FAILURE
0433    94 F[illegible] FATERR: CALL TIMSTP
0435    39 [illegible]  ORL     P1, #0FF        ; CLEAR COMM LINES AND FORCE DISABLE
0437    54 E[illegible] CALL    LSTATF
0439    52 47           JB2     FATER1          ; IF ALREADY FATAL SKIP
043B    FF              MOV     A, R7
043C    B8 42   FATHLD: MOV     R0, #FATCOD     ; STORE FATAL CODE
043E    A0              MOV     @R0, A
043F    18              INC     R0              ; INCREMENT FATAL ERROR COUNTER
0440    F0              MOV     A, @R0          ; MUST KEEP IN BCD
0441    17              INC     A
0442    97              CLR     C
0443    57              DA      A
0444    A0              MOV     @R0, A
0445    94 4A           CALL    SYMFAT          ; COMMON CODE TO SET FATAL STATE AND BIT IN METER STATUS
0447    C5      FATER1: SEL     RB0
0448    24 14           JMP     [illegible]ESTA
```

```
                    ;
044A  14 60         NVMFAT: CALL    STCPKI
044C  43 04                 ORL     A, #4           ; SET FATAL ERROR BIT
044E  A0                    MOV     @R0, A          ; SAVE STATE
044F  F1                    MOV     A,@R1
0450  53 FB                 ANL     A,#0FB
0452  A1                    MOV     @R1,A
0453  19                    INC     R1              ; POINT AT METER STATUS SECOND BYTE
0454  B1 80                 MOV     @R1, #80        ; SET FATAL BIT IN METER STATUS
0456  93                    RETR
                    ; TIMEOUT ROUTINES
0457  09            INTPOS: IN      A, P1
0458  37                    CPL     A
0459  B8 2?                 MOV     R0, #PRSTAT
045B  52 ??                 JB2     ENABTM          ; ENABLE TIMED-OUT
                    ; DISABLE TIMED OUT
045D  F0            DISBTM: MOV     A, @R0
                    ; CHECK SHUTTER BAR
045E  ?2 77                 JB?     ENTMDN
                    ; TRY TO TALK TO PRINTER MY HALF COULD BE SHORTED
0460  ?? FD                 ANL     P1, #0FDH       ; -> RTS
0462  B8 46                 MOV     R0, #70.        ; TIMEOUT CONTROL
0464  ?4 16         DISTM1: CALL    DL??0
0466  E8 64                 DJNZ    R0, DISTM1
0468  BF 04                 MOV     R7, #SNTFAT
046A  ?? 33                 JMP     FATERS
                    ; ENABLE TIME-OUT
046C  F0            ENABTM: MOV     A, @R0
046D  53 ?1                 ANL     A, #0?1         ; CHECK IF SWITCH ON PRIV OR DATER, HARD ERROR
046F  ?6 77                 JNZ     ENTMDN          ; TIMEOUT OK
                    ; RESET BASE - BEST GUESS
0471  B8 36                 MOV     R0, #PRSTAT
0473  F0                    MOV     A, @R0
0474  ?? ??                 ORL     A, #80
0476  A0                    MOV     @R0, A
0477  24 ??         ENTMDN: JMP     SOFTE?
                    ; TRIP TIME-OUT
0479  BF 08         TRIPTM: MOV     R7, #TRPFAT
047B  84 33                 JMP     FATERR
                    ;
047D  BF 07         SET?TM: MOV     R7, #SETFAT
047F  84 33                 JMP     FATERR
                    ; CLEAR TIMER TIME-OUT
0481  D5            TIMSTP: SEL     RB1
0482  65                    STOP    TCNT
0483  27                    CLR     A
0484  B8 35                 MOV     R0, #TIMWHO
0486  A0                    MOV     @R0, A
0487  C8                    DEC     R0              ; POINT TO TIMCNT
0488  20                    XCH     A, @R0          ; 0 AND LOAD REMAIN TIME COUNTS
0489  93                    RETR
                    ;
                            INCLUDE DMO:CTXMES
                            SUBTTL  TRANSMIT MESSAGE
                            PAGE

                    ;       *****************************************************************
                    ;       **                                                             **
                    ;       **           TRANSMIT MESSAGE AND VERIFY ECHO                  **
                    ;       **                                                             **
                    ;       *****************************************************************
                    ;
                    ;       TRANSMIT MESSAGE OF N BYTES TO PRINTER OR CONTROL. RETURN ON SUCCESSFUL
                    ;       TRANSMIT OR TIME-OUT. IF MESSAGE IS TRANSMITTED THREE TIMES UNSUCCESSFULLY
                    ;       A FATAL ERROR OCCURS. TRANSMIT PACKET CONTAINS THE FOLLOWING: (1) NUMBER
                    ;       OF BYTES TO TRANSMIT, AND (2) DATA TO TRANSMIT.
                    ;
                    ;       I-M     A       = ADDRESS OF TRANSMIT PACKET
                    ;       --M     R0, R2 - R7
                    ;       I--     F1         = UNIT
                    ;                                 0, CONTROL
                    ;                                 1, PRINTER
                    ;
048A  A5            PRCTX:  CLR     F1              ; SET F1 FLAG FOR PRINTER
048B  B5                    CPL     F1
                    ;
048C  A8            CTXMES: MOV     R0,A            ; SAV PACKET ADDRESS
                    ; SET VALUE FOR LOW OUTPUT
048D  74 F2         CTXME1: CALL    LOWSET          ; SETUP LOW OUTPUT MASK
                    ; TRY TO ACQUIRE LINE TO TRANSMIT
048F  76 98                 JF1     CTXPS0          ; PRINTER
                    ; CONTROL
0491  26 C3                 JNT0    CTXCNC          ; RECEIVE FIRST
0493  39                    OUTL    P1, A
0494  36 94         CTXCWT: JT0     CTXCWT          ; WAIT FOR CONTROL CTS
0496  84 A3                 JMP     CTXPS1          ; HAVE CONTROL
                    ; PRINTER
0498  46 CB         CTXPS0: JNT1    CTXCNP          ; RECEIVE FIRST
049A  39                    OUTL    P1, A
                    ; WAIT CONTENTION PERIOD 50 - 100 U-SEC
049B  BA 04                 MOV     R2, #4          ; WAIT FOR 75 U -SEC
049D  46 C8         CTXMSP: JNT1    CTXCNP          ; HAVE CONTENTION PRINTER WINS
049F  EA 9D                 DJNZ    R2, CTXMSP
04A1  56 A1         CTXPWT: JT1     CTXPWT          ; WAIT FOR PRINTER CTS
                    ; NOW HAVE CONTROL, WAIT > 120 U-SEC BEFORE START EDGE
04A3  AE            CTXPS1: MOV     R6,A            ; STORE LOW MASK
04A4  54 F6                 CALL    TMRTST
04A6  F0                    MOV     A, @R0          ; #BYTES -> ACC
04A7  18                    INC     R0              ; POINT TO DATA
04A8  07                    DEC     A               ; ADJ BYTE COUNT TO N-1
04A9  AA                    MOV     R2, A           ; SAVE ADJ BYTE COUNT
04AA  C6 B3                 JZ      CTXMST          ; MESSAGE ONLY ONE (1) BYTE
                    ; LOOP FOR N-1 BYTES
04AC  97            CTXMLP: CLR     C               ; C = 1 END OF BYTE
04AD  A7                    CPL     C
04AE  14 29                 CALL    CTXBYT
04B0  96 D0                 JNZ     CTXMER          ; FATAL COMMUNICATION ERROR
04B2  18                    INC     R0
04B3  EA AC                 DJNZ    R2, CTXMLP
                    ; OUTPUT LAST BYTE
04B5  97            CTXMST: CLR     C               ; C = 0 END OF MESSAGE
04B6  14 29                 CALL    CTXBYT
04B8  96 D0                 JNZ     CTXMER          ; FATAL COMMUNICATION ERROR
                    ; MESSAGE OK OUTPUT ACK PULSE
04BA  FE                    MOV     A, R6           ; MASK FROM BYTE ROUTINE
04BB  39                    OUTL    P1, A           ; START PULSE
04BC  14 B0                 CALL    DEL300
04BE  89 22                 ORL     P1, #22         ; END PULSE
04C0  14 B0                 CALL    DEL300          ; ENSURE PROPPER IDLE TIME
04C2  83                    RET                     ; A = 0 NO ERROR
                    ; RECEIVE FIRST
04C3  D5            CTXCNC: SEL     RB1
04C4  D4 2C                 CALL    CNCRX           ; RECEIVE MESSAGE
04C6  84 CD                 JMP     CTXCN2
                    ; PRINTER
04C8  D5            CTXCNP: SEL     RB1
04C9  94 28                 CALL    PRCRX
04CB  74 16                 CALL    DOSTAT          ; PROCESS PRINTER MESSAGE NOW
04CD  C5            CTXCN2: SEL     RB0
04CE  84 8D                 JMP     CTXME1
                    ; FATAL ERROR
04D0  C4 61         CTXMER: JMP     FATECH
                    ;
                            INCLUDE DMO:CTLECC
                            SUBTTL  COMPUTE CONTROL SUM CRC
                            PAGE
```

```
                          ;        ************************************************************
                          ;        **                                                        **
                          ;        **          COMPUTE CONTROL SUM CRC                       **
                          ;        **                                                        **
                          ;        ************************************************************
                          ;
                          ; COMPUTE CONTROL SUM CRC
04D2    B8 6E             CTLECC: MOV     R0, #WORKBF
04D4    B9 2A                     MOV     R1, #ASCREG
04D6    BA 05                     MOV     R2, #ASCRSZ
04D8    14 65                     CALL    BLKMOV
04DA    54 BF                     CALL    CTLSUM          ; COMPUTE CONTROL SUM
04DC    BA 05                     MOV     R2, #ASCRSZ
04DE    F4 C1                     CALL    CRC
04E0    B8 3C                     MOV     R0, #CONECC
04E2    83                        RET
                          ;
                                  INCLUDE DM0:POSUPD
                                  SUBTTL  UPDATE METER CONTROL FLAGS
                                  PAGE
                          ;        ************************************************************
                          ;        **                                                        **
                          ;        **          UPDATE METER-CONTROL FLAGS                    **
                          ;        **                                                        **
                          ;        ************************************************************
                          ;
                          ;        UPDATE INSUFFICIENT FUNDS AND LOW POSTAGE IN METER STATUS.
                          ;
                          ;        -OM     A         = RESULTS OF UPDATES
                          ;                              BIT 1 = "1", INSUFFICIENT FUNDS
                          ;                              BIT 0 = "1", >= UNLOCK VALUE
                          ;        --M     R0, R1, R2
                          ;        --M     F0
                          ;
                          ; GENERAL SUBROUTINE TO CLEAR AND LOAD POSTAGE INTO WORK BUFFER
04E3    F4 EA             POSWRK: CALL    CLRWRK          ; ZERO WORK BUFFER
04E5    B8 71                     MOV     R0, #WORKBF + 3
04E7    B9 3C                     MOV     R1, #POSVAL
04E9    BA 02                     MOV     R2, #POSTSZ- 1
04EB    F1                        MOV     A,@R1
04EC    30                        XCHD    A, @R0          ; MOV ONLY LOW NIBBLE OF POSTAGE HIGH BYTE
04ED    18                        INC     R0
04EE    19                        INC     R1
04EF    14 65                     CALL    BLKMOV
04F1    BA 03                     MOV     R2, #POSTSZ
04F3    83                        RET
                          ; UPDATE METER STATUS AND DETERMINE UNLOCK STATUS
04F4    94 E3             POSUPD: CALL    POSWRK
04F6    B9 2B                     MOV     R1, #DSCREG + DSCRSZ - 1
04F8    1A                        INC     R2              ; RETURNED AS POST SIZE, NEED DESC SIZE
04F9    14 6D                     CALL    DECSUB
04FB    27                        CLR     A
04FC    B6 FF                     JF0     POSBAT          ; IF EQUAL OK
04FE    F7                        RLC     A               ; C = INSUFF
04FF    AB                POSBAT: MOV     R3, A
0500    BE 37                     MOV     R0, #BATCNT
0502    BA 03                     MOV     R2, #BATCSZ
0504    F0                POSBA1: MOV     A, @R0
0505    96 0E                     JNZ     POSLOW
0507    18                        INC     R0
0508    EA 04                     DJNZ    R2, POSBA1
                          ; ALL ZERO
050A    23 10                     MOV     A, #10
050C    4B                        ORL     A, R3
050D    AB                        MOV     R3, A
050E    B9 4C             POSLOW: MOV     R1, #LOWPOS
0510    14 29                     CALL    LIMTST
0512    03 03                     ADD     A, #4-1
0514    A8                        MOV     R0, A           ; ADDR OF LOW BYTE OF CONV LOW POS WARNING
0515    B9 2B                     MOV     R1, #DSCREG+DSCRSZ-1
0517    BA 04                     MOV     R2, #DSCRSZ
0519    14 6D                     CALL    DECSUB
051B    FB                        MOV     A, R3
051C    F7                        RLC     A               ; C = 0  NO WARNING, C = 1  WARNING
051D    47                        SWAP    A
051E    B8 56                     MOV     R0, #MRSTAT
0520    20                        XCH     A, @R0
0521    53 CF                     ANL     A, #0CFH
0523    40                        ORL     A, @R0
0524    A0                        MOV     @R0, A
                          ; DETERMINE UNLOCK STATUS
0525    94 E3                     CALL    POSWRK
0527    B9 4B                     MOV     R1, #UNLOCK+UNLVSZ-1
0529    14 6D                     CALL    DECSUB
052B    FB                        MOV     A, R3
052C    53 FE                     ANL     A, #0FE
052E    F7                        RLC     A
052F    83                        RET
                          ;
                                  INCLUDE DM0:FMTCN
                                  SUBTTL  CONVERSION ROUTINE TO TAKE VARIABLE FORMAT TO METER UNITS
                                  PAGE
                          ;        ************************************************************
                          ;        **                                                        **
                          ;        **          CONVERT TO METER UNITS                        **
                          ;        **                                                        **
                          ;        ************************************************************
                          ;
                          ;        WILL TAKE A PACKET AND ADJUST THE ASSUMED DECIMAL PLACE TO CONFORM
                          ;        TO METER UNITS. THE PACKET CONSISTS OF A FORMAT BYTE (HIGH NIBBLE = NO.
                          ;        OF DIGITS, LOW NIBBLE = NO. OF DECIMALS) AND N DATA BYTES.
                          ;
                          ;        IOM     A         = ON CALL,    CONVERSION SPEC FINAL FORMAT
                          ;                          = ON RETURN, START ADDRESS OF CONVERTED DATA
                          ;        I--     R1        = INPUT PACKET ADDRESS
                          ;        --M     R0, R2 - R7
                          ;
0530    24 76             FMTERR: JMP     SOFTER
                          ;
0532    AD                FMTCNV: MOV     R5,A            ; SAVE SPEC
0533    53 0F                     ANL     A, #0F          ; EXTRACT ACTUAL METER DEC PLACES
0535    2D                        XCH     A, R5           ; SAVE
0536    5D                        XRL     A, R5           ; MASK TO NO. DIGITS
0537    47                        SWAP    A
0538    AC                        MOV     R4, A           ; SAVE
0539    27                        CLR     A
053A    31                        XCHD    A, @R1          ; LOAD LOW NIBB, NO. DEC PLACES
053B    97                        CLR     C               ; COMPUTE TRAIL ZERO'S TO ADD
053C    A7                        CPL     C
053D    17                        INC     A               ; TEST IF DEFAULT IN USE
053E    C6 41                     JZ      FMTCH1          ; COMP 2' OF 0 IS 0
0540    07                        DEC     A               ; RESTORE  A
0541    37                FMTCH1: CPL     A               ; SUB USING C
0542    7D                        ADDC    A, R5
0543    E6 30                     JNC     FMTERR          ; CARRY SHOULD BE SET
0545    AD                        MOV     R5, A
0546    F1                        MOV     A, @R1
0547    47                        SWAP    A
0548    C6 30                     JZ      FMTERR          ; ZERO DIGITS NOT ALLOWED
054A    AE                        MOV     R6, A
054B    [illegible]               ADD     A, R5           ; COMPUTE NO OF LEAD ZERO TO ADD
054[illegible]                    CPL     C               ; C SHOULD = 0 AFTER ADD NEED * 1
054[illegible]                    CPL     A
[illegible]                       ADDC    A, R4
05[illegible]                     JNC     FMTERR
```

```
0551  AF              MOV     R7, A
0552  19              INC     R1                  ; ADJUST POINTER TO DATA
                ; TO COMPUTE THE NUMBER OF LEADING ZERO BYTE BEFORE MOVE EQUATION AS FOLLOWS
                ; BASIC EQU     ( LEAD DIGITS + 1(ROUND) + 1 IF SHIFT NEEDED + 1 IF ODD NUM OF DIG IN ) ALL DIV BY 2
                ; FIRST SUB     ( LEAD DIG + 1 IF EVEN DIG IN + 1 IF SHIFT ) ALL DIV BY 2
                ; FINAL ( LEAD DIG + 1 IF (DIG IN + 1 + ODD + 1 IF SHIFT
0553  FD              MOV     A, R5               ; LOAD TRAILING ZERO COUNT
0554  67              RRC     A                   ; STORE ODD / EVEN IN CARRY BIT
0555  14 6A           CALL    CLRWRK              ; ZERO WORK BUFFER
0557  7F              ADDC    A, R7               ; LEADING DIGITS + SHIFT OR NO SHIFT
0558  2E              XCH     A, R6
0559  17              INC     A                   ; + 1 FOR ROUNDING
055A  67              RRC     A                   ; DIV BY 2
055B  AA              MOV     R2, A               ; SAV BYTE COUNT IN
055C  27              CLR     A
055D  7E              ADDC    A, R6               ; ADD LEAD DIG + SHIFT + ODD IN
055E  67              RRC     A                   ; DIV BY 2
055F  03 6E           ADD     A, #WORKBF          ; MOVE POINTER TO END OF LEADING ZERO'S
0561  A8              MOV     R0, A
                ; MOVE FROM REC BUFF TO WORK AND VALIDATE DIGITS 0-9
0562  F1        FMTCH2: MOV     A, @R1
0563  A0              MOV     @R0, A
                ; VALIDATE
0564  03 66           ADD     A, #60
0566  F6 B0           JC      FMTERR
0568  47              SWAP    A
0569  03 60           ADD     A, #60
056B  F6 B0           JC      FMTERR
056D  18              INC     R0
056E  19              INC     R1
056F  EA 62           DJNZ    R2, FMTCH2
0571  FC              MOV     A, R4               ; LOAD BYTE COUNT INTO R2
0572  17              INC     A                   ; ROUND
0573  67              RRC     A                   ; DIVIDE BY 2
0574  AA              MOV     R2, A
0575  2D              XCH     A, R5               ; LOAD TRAIL ZERO COUNT
0576  67              RRC     A                   ; MOVE ODD / EVEN INTO C BIT
0577  23 6E           MOV     A, #WORKBF          ; POINT AT BEGINING OF DATA
0579  E6 7D           JNC     FMTCH3              ; IF EVEN NO SHIFT NEEDED
057B  B4 B2           CALL    FMTNB2
057D  2D        FMTCH3: XCH     A, R5
057E  AA              MOV     R2, A
057F  FD              MOV     A, R5
0580  A9              MOV     R1, A
0581  83              RET
                ;
                        SUBTTL  MOVE STRING LEFT N NIBBLES
                        PAGE
                ;       ***************************************************************
                ;       **                                                           **
                ;       **      MOVE STRING LEFT N NIBBLES                           **
                ;       **                                                           **
                ;       ***************************************************************
                ;
                ;       I/O     A       = BUFFER ADDRESS INPUT AND OUTPUT
                ;       I--     R0      = FROM POINTER
                ;       I--     R1      = TARGET POINTER
                ;       I--     R2      = NUMBER OF BYTES TO SHIFT
                ;       --M     R7
                ;
                ; LDD COUNT SET UP
0582  A9        FMTNB2: MOV     R1, A
0583  A8              MOV     R0, A
0584  AF              MOV     R7, A               ; SAVE BUFF ADDR POINTER
0585  18              INC     R0
0586  27              CLR     A
0587  31              XCHD    A, @R1              ; SWAP FIRST BYTE
0588  47              SWAP    A                   ; MOVE NIBB LEFT 1 NIBB
0589  A1              MOV     @R1, A              ; STORE
                ; MOVE LOOP
058A  F0        FMTNB1: MOV     A, @R0              ; LOAD 1 BYTE
058B  47              SWAP    A                   ; MOVE LOW NIBBLE LEFT
058C  31              XCHD    A, @R1              ; MOVE HIGH NIBBLE TO LOW NIBBLE OF NEXT ADDR
058D  A0              MOV     @R0, A              ; SAVE INTERUM RESULT
058E  18              INC     R0
058F  19              INC     R1
0590  EA 8A           DJNZ    R2, FMTNB1          ; CONTINUE TILL ALL NIBBLES MOVED
0592  FF              MOV     A, R7               ; R1 HAS BUFFER ADDR
0593  83              RET
                ;
                        INCLUDE DM0:CRXBYT
                        SUBTTL  RECEIVE ONE BYTE
                        PAGE
                ;       ***************************************************************
                ;       **                                                           **
                ;       **              RECEIVE BYTE AND ECHO                        **
                ;       **                                                           **
                ;       ***************************************************************
                ;
                ;       RECEIVE 10 BITS (1 START + 8 DATA + 1 STOP), AND ECHO. EACH BIT
                ;       WILL BE SAMPLED 6-8 CYCLES FROM LEADING EDGE, AND ECHOED TO THE
                ;       TRANSMITTER WITHIN 20 U-SEC OF SAMPLING.
                ;
                ;       I--     R0      = ADDRESS OF DATA BYTE
                ;       I--     R7      = MASK FOR LOW OUTPUT
                ;       --M     R5, R6
                ;       -OM     C       = VALUE OF STOP BIT
                ;
0594  BE 0A     CRXBYT: MOV     R6, #10.            ; SET LOOP COUNTER VALUE FOR 10 BITS
0596  76 9C           JF1     CRXPED              ; LOOK FOR PRINTER START EDGE
0598  26 98     CRXCWT: JNT0    CRXCWT              ; WAIT FOR CONTROL START EDGE
059A  A4 AB           JMP     CRXBYL              ; CONTINUE START DETECTED
                ;
059C  46 9C     CRXPED: JNT1    CRXPED              ; WAIT FOR PRINTER START EDGE
059E  A4 AB           JMP     CRXBYL              ; EQUALIZE TIME
                ; MAIN SAMPLE LOOP
05A0  BD 04     CRXBL0: MOV     R5, #4              ; PROVIDE PROPER DELAY FOR 104 U-SEC
05A2  ED A2     CRXBL1: DJNZ    R5, CRXBL1          ; WAIT
05A4  F0              MOV     A, @R0              ; LOAD ACCRUED DATA IN ACC
05A5  67              RRC     A                   ; SHIFT BIT INTO DATA
05A6  A0              MOV     @R0, A              ; STORE ACCRUED DATA
05A7  00              NOP
05A8  97        CRXBYL: CLR     C
05A9  A7              CPL     C                   ; SET UP FOR LOGIC "1"
05AA  76 B4           JF1     CRXBL3              ; PRINTER
                ; CONTROL
05AC  26 B6           JNT0    CRXBL4              ; CONTROL RECEIVED LOGIC "1"
                ; RECEIVED LOGIC "0"
05AE  A7        CRXBL2: CPL     C
05AF  89 22           ORL     P1, #22             ; ECHO HIGH
05B1  EE A0           DJNZ    R6, CRXBL0
05B3  83              RET
                ;
05B4  56 AE     CRXBL3: JT1     CRXBL2              ; PRINTER RECEIVED LOGIC "0"
                ; RECEIVED LOGIC "0"
05B6  FF        CRXBL4: MOV     A, R7
05B7  39              OUTL    P1, A               ; ECHO LOW
05B8  EE A0           DJNZ    R6, CRXBL0
05BA  83              RET
                ;
                        INCLUDE DM0:ENABLE
                        SUBTTL  ENABLE METER
                        PAGE
```

```
                        ;       ******************************************************************
                        ;       **                                                              **
                        ;       **              ENABLE METER                                    **
                        ;       **                                                              **
                        ;       ******************************************************************
                        ;
                        ;       IF METER IS DISABLED, THEN ENABLE METER AND VERIFY PRINTER'S RESPONSE.
                        ;       ELSE DO NOTHING.
                        ;
                        ; CHECK IF METER ENABLED
05BB    14 69           ENABLE: CALL    STCHKI          ; CHECK STATE IF CAN ENABLE
05BD    96 DB                   JNZ     ENARET          ; CAN NOT ENABLE
                        ; CHECK METER STATUS IF ALLOWED
05BF    F1                      MOV     A, @R1
05C0    53 64                   ANL     A, #064         ;  DATER, INSUF  ENABLED
05C2    96 DB                   JNZ     ENARET
                        ; NOW TRY TO ENABLE
05C4    94 1?                   CALL    STR60N
05C6    99 FB                   ANL     P1, #0FBH       ; ENABLE ACC HALF
05C8    23 41           ENABL1: MOV     A, #ENBLHD      ; SEND ENABLE COMMAND TO PR
05CA    14 94                   CALL    GETSTS          ; SEND CMD, REC STATUS AND PROCESS
05CC    37                      CPL     A               ; PR STATUS RETURNED IN ACC
05CD    52 C8                   JB2     ENABL1          ; IF NOT ENABLED KEEP LOOKING TILL TIMEOUT
05CF    BB EC           ENABNT: MOV     R3, #140.       ; ALLOW 20. MILLI-SEC FOR BOUNCE SETTLING
05D1    14 F6           ENABL2: CALL    DEL300
05D3    56 D7                   JT1     ENABL3
05D5    14 B6                   CALL    RECSTS
05D7    EB D1           ENABL3: DJNZ    R3, ENABL2
05D9    94 B1                   CALL    TIMSTP
05DB    83              ENARET: RET
                        ;
                                INCLUDE DM9:SETINT
                                SUBTTL  SET POSTAGE FOR PRINTING
                                PAGE
                                *******          *****           **********     **
                                
                                        SET POSTAGE ON PRINTER WHEELS
                                
                                **********   ******  
                        ;       ?       R0, R1
                        
0?      24 ?            SETERR: JMP     SOFTER
                        ;
0?      B9 4E           SETINT: MOV     R1, #SETLIM
05E0    ?2 93                   CALL    LIMTST
05E2    ?3 03                   ADD     A, #3           ; POINT TO LAST BYTE
05E4    A8                      MOV     R0, A
05E5    B9 ?                    MOV     R1, #CMPBUF + 2 ; LAST BYTE OF POSTAL VAL
05E7    14 6?                   CALL    DECSUB
05E9    ?6 D?                   JNC     SETERR          ; VALUE  LIMIT < ERROR
05EB    34 E7                   CALL    LSTATE
05ED    53 0?                   ANL     A, #0F          ; MASK OUT DISABL FLG
05EF    96 D?                   JNZ     SETERR          ; TO SET POSTAGE MUST BE IN NORM MOD
05F1    54 D?                   CALL    DISABL
05F3    B9 7B                   MOV     R1, #CMD BF
05F5    F1                      MOV     A, @R1
05F6    ?1 80                   ORL     A, #80          ; UNKNOWN SETTING
05F8    A1                      MOV     @R1, A
05F9    B? 0?                   MOV     R2, #3
05FB    B8 3?                   MOV     R0, #POSTVL
05FD    14 67                   CALL    PEKMOV
05FF    23 64                   MOV     A, #100.        ; 100, LOOPS    2.5 MS PER COUNT
0601    94 1?                   CALL    STR20M
0603    B0 0?                   MOV     @R0, #3         ; INDICATE SET POSTAGE BEING TIMED
0605    B8 7A                   MOV     R0, #CMDBUF+1
0607    B0 C1                   MOV     @R0, SPOSHD
0609    C8                      DEC     R0
060A    B0 C?                   MOV     @R0, #4
060C    18 3?                   CALL    CETDO
060E    F?              SETIN0: MOV     A, @R0
060F    D3 B1                   XRL     A, #POSAK
0611    C6 17                   JZ      SETIN1          ; HEADER IS ONE BYTE
0613    74 1?                   CALL    POSTAT
0615    C4 2?                   JMP     SETIN?
0617    54 ?            SETIN1: CALL    TIM??
0619    ?4 1?                   CALL    CLR??
061B    ?? 5?                   MOV     R1, #? L
061D    F1                      MOV     A, @R1
061F    B? 30                   MOV     R0, #?
0620    ?0                      ANL     A, ?
0621    20                      XCH     A, @R0          ; ? UNKNOWN SETTING
0622    ?? 7?                   CALL    ENBLE           ; CLEAR DISABLED ?
0624    D4 2?           SETIN2: CALL    PRCRX           ; RECEIVE PRINTER MESSAGE
0626    ?4 0?                   JMP     SETIN0
                        ;
                                INCLUDE  ?:RECMES
                                SUBTTL  RECEIVE MESSAGE
                                ;
                        ;       ******************************************************************
                        ;       **                                                              **
                        ;       **              RECEIVE MESSAGE                                 **
                        ;       **                                                              **
                        ;       ******************************************************************
                        ;
                        ;       RECEIVE MESSAGE OF N BYTES FROM PRINTER OR CONTROL.
                        ;
                        ;       --M     R0, R1, R4 - R7, F1, C
                        ;
0628    A5              PRCRX:  CLR     F1
0629    B5                      CPL     F1              ; F1 = 1 FOR PRINTER
062A    C? 2D                   JMP     CRXMES
                        ;
062C    A5              CNCRX:  CLR     F1
062D    B8 5C           CRXMES: MOV     R0, #RECBUF
062F    B9 5C                   MOV     R1, #RECBFL
0631    27                      CLR     A
0632    21                      XCH     A, @R1          ; ZERO FLAG AND ENSURE NO OVER-RUN
0633    96 6?                   JNZ     FATECH
0635    76 3D                   JF1     CRXMS1          ; PRINTER
                        ; CONTROL
0637    BC 08                   MOV     R4, #8          ; BYTE LIMIT FOR CONTROL MESSAGE
0639    36 39           CRXMS0: JT0     CRXMS0          ; DETECT CONTROL RTS
063B    C4 41                   JMP     CRXMS2
                        ; PRINTER
063D    56 3D           CRXMS1: JT1     CRXMS1
063F    BC 0?                   MOV     R4, #4          ; PRINTER BYTE LIMIT
                        ;
0641    34 F6           CRXMS2: CALL    TMRTST          ; ENSURE TIMER HAS > 4 MILLISEC TILL INTERRUPT
                        ; RESPOND WITH CTS
0643    74 F2                   CALL    IOFSET
0645    AF                      MOV     R7, A
0646    39                      OUTL    P1, A           ; GIVE CTS
                        ; RECEIVE LOOP
0647    ?4 ?4           CRXMLP: CALL    CRXBYT          ; RECEIVE ONE BYTE
0649    11                      INC     @R1             ; INCREMENT BYTE COUNTER
064A    18                      INC     R0              ; INCREMENT ADDRESS POINTER
064B    E6 51                   JNC     CRXFIN          ; MESSAGE RECEIVED
064D    EC 47                   DJNZ    R4,CRXMLP       ; RECEIVE ANOTHER BYTE
064F    C4 6?                   JMP     CRXFAT
                        ;
0651    34 B0           CRXFIN: CALL    DEL300
0653    27                      CLR     A
0654    7? 5D                   JF1     CRXFN1          ; PRINTER
                        ; CONTROL
```

```
0656  ?? ??              JMP    CRNFAT
0658  B0 FF    CRNMRT:  MOV    @R0, #0FFH         ; INSERT FLAG OF INVALID DATA AFTER LAST BYTE
065A  B8 3F             MOV    R0, #RCVBUF
065C  83                RET
                ;
065D  ??       CLEFNT:  MOV    @R1, A             ; CLEAR FLAG
065E  ?? 58             JMP    CLNMRT
                ;
0660  A1       CRNFAT:  MOV    @R1, A             ; ZERO RECEIVE FLAG
0661  BF 06    FATFCH:  MOV    R7, #ECHFAT
0663  04 53             JMP    FATERR
                ;
                        INCLUDE DMO:DSCCRC
                        SUBTTL  COMPUTE CRC FOR DESCENDING REGISTER
                        PAGE
                ;       ****************************************************************
                ;       **                                                            **
                ;       **          COMPUTE CRC FOR DESCENDING REGISTER               **
                ;       **                                                            **
                ;       ****************************************************************
                ;
0665  B8 25    DSCCRC:  MOV    R0, #DSCREG
0667  BA 64             MOV    R2, #DSCRSZ
0669  F4 CF             CALL   CRC
066B  B8 24             MOV    R0, #DSCECC
066D  83                RET
                ;
                        INCLUDE DMO:RSTCOM
                        SUBTTL  COMMON RESET CODE
                        PAGE
                ;       ****************************************************************
                ;       **                                                            **
                ;       **          COMMON RESET CODE                                 **
                ;       **                                                            **
                ;       ****************************************************************
                ;
                ;       COMMON RESET CODE.
                ;
066E  74 F3    RSTCOM:  CALL   CLRANT
0670  B8 41             MOV    R0, #RSTCNT
0672  93                RETR
                ;
                        INCLUDE DMO:NVMSTP
                        SUBTTL  NVM SETUP PAGE AND BASE ADDRESS SUBROUTINE
                        PAGE
                ;       ************************************************************
                ;       **                                                        **
                ;       **     NVM SETUP PAGE AND BASE ADDRESS SUBROUTINE         **
                ;       **                                                        **
                ;       ************************************************************
                ;
                ;       INITIALIZE P2 TO NMOS PAGE AND R5 TO NMOS ADDRESS FOR CURRENT
                ;       BLOCK OF NVM.
                ;
                ;       --OM    R5      = NMOS ADDRESS
                ;       --M     R1, R7
                ;       -OM     P2      = BITS 4-5 ARE NMOS PAGE
                ;       I--     NVMBLK  = CURRENT BLOCK OF NVM
                ;
0673  B9 5A    NVMSTP:  MOV    R1, #NVMBLK        ; GET LOCATION NO.
0675  F1                MOV    A, @R1
0676  47       NVMST1:  SWAP   A                  ; MOVE TO HIGH NIBBLE.
0677  AD                MOV    R5, A              ; TEMPORARY SAVE OF LOCATION NO.
0678  53 C0             ANL    A, #0C0H           ; USE BITS 6-7 FOR BASE ADDRESS.
067A  2D                XCH    A, R5              ; SAVE BASE ADDRESS, AND RETRIEVE LOCATION NO.
067B  53 30             ANL    A, #30H            ; USE BITS 4-5 FOR PAGE.
067D  AF                MOV    R7, A              ; TEMPORARY SAVE OF PAGE.
067E  53 10             ANL    A, #10H            ; SKEW STARTING ADDRESS.
0680  77                RR     A
0681  77                RR     A
0682  4D                ORL    A, R5
0683  AD                MOV    R5, A
0684  0A                IN     A, P2              ; GET CURRENT DATA OF PORT 2.
0685  53 CF             ANL    A, #0CFH           ; STRIP PAGE.
0687  4F                ORL    A, R7              ; INSERT NEW PAGE.
0688  3A                OUTL   P2, A              ; OUTPUT TO PORT 2.
0689  83                RET
                ;
                        INCLUDE DMO:NVMBYT
                        SUBTTL  NVM BYTE READ/ERASE/WRITE SUBROUTINE
                        PAGE
                ;       ************************************************************
                ;       **                                                        **
                ;       **     NVM BYTE READ/ERASE/WRITE SUBROUTINE               **
                ;       **                                                        **
                ;       ************************************************************
                ;
                ;       READ/ERASE/WRITE TWO CONSECUTIVE NIBBLES OF NMOS, COMPARE DATA
                ;       WITH EXPECTED DATA, AND EXTEND CRC CALCULATION FOR THOSE NIBBLES.
                ;
                ;       IOM     A       = ON CALL,   DOUBLE OPP CODE
                ;                         ON RETURN, COMPARISON RESULTS
                ;       I--     R0      = ADDRESS OF DATA OR STORAGE
                ;       IOM     R3      = MISMATCH COUNT
                ;       IOM     R4      = CRC VALUE
                ;       IOM     R5      = NMOS ADDRESS
                ;       --M     R1, R6, R7, F0, F1
                ;       --M     WORKBF+7
                ;
                ; SETUP READ OPP CODE.
068A  23 44    NVMBYR:  MOV    A, #44H            ; DOUBLE READ OPP CODE.
068C  C4 90             JMP    NVMBYT
                ; SETUP WRITE OPP CODE.
068E  23 11    NVMBYW:  MOV    A, #11H            ; DOUBLE WRITE OPP CODE.
                ; SAVE DATA FOR USE IN VERIFICATION.
0690  20       NVMBYT:  XCH    A, @R0             ; SWAP DATA INTO ACCUMULATOR.
0691  B9 75             MOV    R1, #(WORKBF + 7)          ; AND SAVE FOR COMPARISON.
0693  A1                MOV    @R1, A
                ; READ/ERASE/WRITE ONE BYTE.
0694  30                XCHD   A, @R0             ; SETUP OPP CODE AND DATA FOR HIGH NIBBLE OPERATION.
0695  47                SWAP   A
0696  D4 A5             CALL   NVMNIB             ; EXECUTE HIGH NIBBLE OPERATION.
0698  47                SWAP   A                  ; SAVE RESULT OF HIGH NIBBLE OPERATION, SETUP FOR LOW NIBBLE OPERATI
0699  20                XCH    A, @R0
069A  D4 A5             CALL   NVMNIB             ; EXECUTE LOW NIBBLE OPERATION.
069C  30                XCHD   A, @R0             ; SAVE RESULT OF LOW NIBBLE OPERATION.
                ; RETURN VERIFICATION.
069D  F0                MOV    A, @R0             ; GET RESULTS.
069E  B9 75             MOV    R1, #(WORKBF + 7)          ; AND COMPARE WITH EXPECTED DATA.
06A0  D1                XRL    A, @R1
06A1  C6 A4             JZ     NVM610             ; ARE THEY EQUAL?
06A3  1B                INC    R3                 ; NO, ADVANCE COUNTER.
06A4  83       NVM610:  RET
                ;
                        INCLUDE DMO:NVMNIB
                        SUBTTL  NVM NIBBLE READ/ERASE/WRITE SUBROUTINE
                        PAGE
                ;       ************************************************************
                ;       **                                                        **
                ;       **     NVM NIBBLE READ/ERASE/WRITE SUBROUTINE             **
                ;       **                                                        **
                ;       ************************************************************
                ;
```

```
                        ;       READ/ERASE/WRITE ONE NIBBLE OF NMOS, AND EXTEND CRC CALCULATION
                        ;       FOR THAT NIBBLE.
                        ;
                        ;       IOM     A       = ON CALL,   HIGH NIBBLE = OPP CODE
                        ;                                              10 = WRITE
                        ;                                              30 = ERASE
                        ;                                              20 = READ
                        ;                                              C0 = DE-SELECTED (INTERNAL ONLY)
                        ;                                    LOW NIBBLE  = DATA TO WRITE
                        ;                       = ON RETURN, HIGH NIBBLE = UNDEFINED
                        ;                                    LOW NIBBLE  = DATA READ
                        ;       IOM     R4      = CRC VALUE
                        ;       IOM     R5      = ON CALL,   ADDRESS OF NMOS NIBBLE
                        ;                         ON RETURN, ADDRESS + 1
                        ;       --M     R1, R6, R7, F0, F1
                        ;
                        ; OUTPUT INFORMATION TO DATA LATCHES AND SET FLAGS FOR READ AND WRITE.
06A5    B9 01           NVMNIB: MOV     R1,#1           ; SET 8755 ADDR FOR DATA REG PB
06A7    2D                      XCH     A,R5            ; SWAP ACC AND R5 TO OUTPUT ADDR
06A8    91                      MOVX    @R1,A           ; SET NMOS ADDR IN 8755 PIA PB
06A9    2D                      XCH     A,R5            ; PUT DATA AND OPP CODE BACK IN ACC
06AA    C9                      DEC     R1              ; SET 8755 ADDR TO PA
06AB    91                      MOVX    @R1,A           ; MOVE OPP CODE AND DATA TO 8755 PA
06AC    A5                      CLR     F1
06AD    F7                      RLC     A               ; TEST FOR READ AND WRITE OPP CODES AND SET
06AE    F7                      RLC     A               ; APPROPRIATE FLAGS
06AF    F7                      RLC     A
06B0    85                      CLR     F0              ; CONDITION F0 BIT FOR WRITE OPP CODE
06B1    F6 B4                   JNC     NVM710          ; LEAVE F0 = 0 IF NOT ERASE
06B3    95                      CPL     F0              ; SET F0 IF ERASE
06B4    67              NVM710: RRC     A               ; ROTATE READ BIT BACK TO CARRY BIT
                        ; SET 8755 DATA DIRECTION REGISTERS (DDR)
06B5    B9 03           NVM715: MOV     R1,#3           ; SET 8755 ADDR FOR DDR PB
06B7    23 FF                   MOV     A,#0FFH         ; LOAD OUTPUT MASK IN ACC
06B9    91                      MOVX    @R1,A           ; SET 8755 PB FOR OUTPUT
                        ; SET 8755 PA DDR FOR OUTPUT ON HI-NIBBLE AND IN OR OUT ON LOW-NIBBLE
06BA    F6 BE                   JNC     NVM720          ; IF NOT READ, DATA IS OUT SAME MASK
06BC    23 F0                   MOV     A,#0F0H         ; SET MASK FOR DATA INPUT
06BE    C9              NVM720: DEC     R1              ; 8755 ADDR FOR PA DDR
06BF    91                      MOVX    @R1,A           ; SET 8755 PA DDR
                        ; NMOS NOW ACTIVE AND SELECTED
06C0    B9 00           NVM730: MOV     R1,#0           ; 8755 ADDR SET FOR READ NIBBLE
06C2    81                      MOVX    A,@R1           ; READ CTRL AND DATA INTO ACC
                        ; CHIP IS ALREADY DE-ACTIVATED RETURN CTRL LINES TO DE-ACTIVE STATE
06C3    43 C0                   ORL     A,#0C0H         ; OVERWRITE OPP CODE, ENSURE CHIP CAN NOT BE SELECTED
06C5    91                      MOVX    @R1,A           ; DEACTIVATE NMOS MEMORY
06C6    76 CD                   JF1     NVM735
06C8    AE                      MOV     R6,A
06C9    47                      SWAP    A
06CA    F4 DB                   CALL    CRCNIB
06CC    FE                      MOV     A,R6
06CD    F6 E3           NVM735: JC      NVM750          ; IF READ, DONE
                        ; SETUP DELAY VALUE FOR WRITE OR ERASE
06CF    BE 31                   MOV     R6,#49.         ; SET DEFAULT DELAY FOR 10 MILLI-SEC
06D1    B6 D5                   JF0     NVM740
06D3    BE 04                   MOV     R6,#4.          ; CHANGE TO WRITE 1 MILLI-SEC
06D5    BF 17           NVM740: MOV     R7,#23.
06D7    EF D7           NVM745: DJNZ    R7,NVM745
06D9    EE D5                   DJNZ    R6,NVM740
                        ; ISSUE DUMMY READ TO END ERASE OR WRITE COMMAND
06DB    23 40                   MOV     A,#40H          ; ISSUE DUMMY READ
06DD    91                      MOVX    @R1,A           ; ISSUE READ OPP CODE
06DE    81                      MOVX    A,@R1           ; DUMMY READ
                        ; READ NOW FOR VERIFY
06DF    A7                      CPL     C               ; SET CARRY BIT TO DISABLE CHIP
06E0    B5                      CPL     F1
06E1    C4 B5                   JMP     NVM715
                        ; SETUP FOR NEXT NIBBLE.
06E3    AE              NVM750: MOV     R6,A
06E4    1D                      INC     R5
06E5    1D                      INC     R5
06E6    FD                      MOV     A,R5
06E7    53 0F                   ANL     A,#0FH
06E9    C6 F0                   JZ      NVM760
06EB    CD                      DEC     R5
06EC    0A                      IN      A,P2
06ED    D3 10                   XRL     A,#10H
06EF    3A                      OUTL    P2,A
06F0    FE              NVM760: MOV     A,R6
06F1    83                      RET
                        ;
                        ;
0700                            ORG     700
                                INCLUDE DM0:RAMSTP
                                SUBTTL  RAM POINTER AND COUNTER SETUP SUBROUTINE
                                PAGE

                        ;       **************************************************************
                        ;       **                                                          **
                        ;       **      RAM POINTER AND COUNTER SETUP SUBROUTINE            **
                        ;       **                                                          **
                        ;       **************************************************************
                        ;
                        ;       INITIALIZE R0 TO BEGINNING, AND R2 TO THE LENGTH, OF THE CURRENT
                        ;       ACTIVE BLOCK.
                        ;
                        ;       -OM     R0      = ADDRESS OF ACTIVE BLOCK IN RAM
                        ;       -OM     R2      = LENGTH OF ACTIVE BLOCK (BYTES)
                        ;       --M     R1
                        ;       I--     ACTBLK  = CURRENT ACTIVE BLOCK
                        ;
                        ; TABLE OF RAM POINTERS.
0700    20              NVMTBL: DB      20H             ; ADDRESS OF ACTIVE BLOCK #0.
0701    3A                      DB      3AH             ; ADDRESS OF ACTIVE BLOCK #1.
                        ;
                        ; SETUP POINTER (R0) AND COUNTER (R2).
0702    B9 59           RAMSTP: MOV     R1,#ACTBLK      ; SETUP RAM BUFFER POINTER.
0704    F1                      MOV     A,@R1
0705    A3                      MOVP    A,@A
0706    A8                      MOV     R0,A
0707    BA 1A                   MOV     R2,#1AH         ; SETUP BYTE COUNTER.
0709    83                      RET
                        ;
                                INCLUDE DM0:NVMCHG
                                SUBTTL  NVM CHANGE STATE & OPEN BLOCK SUBROUTINES
                                PAGE

                        ;       **************************************************************
                        ;       **                                                          **
                        ;       **      NVM CHANGE STATE SUBROUTINE                         **
                        ;       **                                                          **
                        ;       **      NVM OPEN BLOCK SUBROUTINE                           **
                        ;       **                                                          **
                        ;       **************************************************************
                        ;
                        ;       IF REQUIRED, THEN CLOSE CURRENT ACTIVE BLOCK AND OPEN NEW ONE.
                        ;
                        ;       --M     ALL REGISTERS & FLAGS
                        ;       IOM     ACTBLK  = ACTIVE BLOCK NUMBER
                        ;       IOM     NVMBLK  = BLOCK NUMBER OF NVM
                        ;       I--     STATE   = CURRENT STATE
                        ;       --M     WORKBF+0, +6, +7
                        ;
                        ; CALCULATE NEW ACTIVE BLOCK NO. AND COMPARE WITH CURRENT ONE.
070A    54 E7           NVMCHG: CALL    LSTATE          ; GET BITS 0-2 OF STATE.
070C    53 07                   ANL     A,#07H
070E    C6 12                   JZ      NVM110          ; IF BITS 0-2 ARE = 0, THEN NEW ACTIVE BLOCK NUMBER = 0.
```

```
0710  23 01            MOV   A,#1.          ; ELSE NEW ACTIVE BLOCK NUMBER = 1.
0712  B9 6F   NVM110:  MOV   R1,#WORKBF     ; TEMPORARY SAVE OF NEW ACTIVE BLOCK NUMBER.
0714  A1               MOV   @R1,A
0715  B9 59            MOV   R1,#ACTBLK     ; COMPARE WITH CURRENT ACTIVE BLOCK NUMBER.
0717  D1               XRL   A,@R1
0718  C6 5C            JZ    NVM150         ; ARE THEY EQUAL?
              ; CLOSE CURRENT ACTIVE BLOCK.
071A  15               DIS   I              ; *** BEGIN CRITICAL REGION #1 ***
071B  F4 8E            CALL  NVMWR          ; WRITE OUT CURRENT ACTIVE BLOCK.
071D  96 5D            JNZ   NVM190         ; WRITE SUCCESSFUL?
071F  37               CPL   A
0720  B9 5A            MOV   R1,#NVMBLK     ; INDICATE NO BLOCK OPEN.
0722  A1               MOV   @R1,A
0723  05               EN    I              ; *** END CRITICAL REGION #1   ***
0724  B9 6E            MOV   R1,#WORKBF     ; RETRIEVE NEW ACTIVE BLOCK NUMBER.
0726  F1               MOV   A,@R1
              ; CHANGE ACTIVE BLOCK NO., AND LOCATE NEW ACTIVE BLOCK.
0727  B9 59   NVMOPN:  MOV   R1,#ACTBLK     ; SAVE NEW ACTIVE BLOCK NUMBER.
0729  A1               MOV   @R1,A
072A  15               DIS   I              ; *** BEGIN CRITICAL REGION #2 ***
072B  F4 B4            CALL  NVMFND         ; FIND CURRENT LOCATION OF NEW ACTIVE BLOCK.
072D  C6 5D            JZ    NVM190         ; FOUND?
072F  05               EN    I              ; *** END CRITICAL REGION #2   ***
0730  B9 6E            MOV   R1,#WORKBF     ; YES. TEMPORARY SAVE OF CURRENT LOCATION.
0732  A1               MOV   @R1,A
              ; CALCULATE NEW LOCATION NO., AND ERASE IT.
0733  B9 59            MOV   R1,#ACTBLK     ; GET NEW ACTIVE BLOCK NO., AND TEMPORARILY SAVE CURRENT LOCATION.
0735  21               XCH   A,@R1
0736  96 40            JNZ   NVM130         ; NEW ACTIVE BLOCK NO. = 0 ?
0738  21               XCH   A,@R1          ; RESTORE ACTIVE BLOCK NO., AND RETRIEVE CURRENT LOCATION.
0739  17               INC   A              ; CALCULATE NEW LOCATION FOR ACTIVE BLOCK #0.
073A  96 43            JNZ   NVM140
073C  17               INC   A
073D  17               INC   A
073E  44 43            JMP   NVM140
0740  21      NVM130:  XCH   A,@R1          ; RESTORE ACTIVE BLOCK NO., AND RETRIEVE CURRENT LOCATION.
0741  03 01            ADD   A,#01H         ; CALCULATE NEW LOCATION FOR ACTIVE BLOCK #1.
0743  19      NVM140:  INC   R1             ; POINT TO NVMBLK.
0744  31               XCHD  A,@R1          ; SAVE NEW LOCATION.
0745  F4 7A            CALL  NVMER          ; ERASE NEW LOCATION.
0747  96 5E            JNZ   NVM195         ; ERASE SUCCESSFUL?
              ; RELEASE CURRENT LOCATION.
0749  15               DIS   I              ; *** BEGIN CRITICAL REGION #3 ***
074A  B9 6E            MOV   R1,#WORKBF     ; RETRIEVE CURRENT LOCATION.
074C  F1               MOV   A,@R1
074D  F4 76            CALL  NVMST1         ; SETUP TO ACCESS IT,
074F  B8 6F            MOV   R0,#WORKBF     ; AND RELEASE IT BY WRITING 00H AS ITS HEADER.
0751  B0 00            MOV   @R0,#00H
0753  D4 EE            CALL  NVMBYW
0755  96 5D            JNZ   NVM190         ; WAS 00H HEADER WRITTEN OK?
0757  B9 5A            MOV   R1,#NVMBLK     ; YES. INDICATE BLOCK NOW OPEN.
0759  21               XCH   A,@R1
075A  31               XCHD  A,@R1
075B  05               EN    I              ; *** END CRITICAL REGION #3   ***
075C  83      NVM150:  RET
              ; FATAL EXIT(S). HANDLE NVM FAILURE.
075D  05      NVM190:  EN    I              ; PERMIT INTERRUPTS.
075E  94 4A   NVM195:  CALL  NVMFAT         ; SET FATAL BIT.
0760  83               RET                  ; CHANGE ONLY CALLED FROM EXEC AND MUST RETURN
              ;
                       INCLUDE DM0:NVMRD
                       SUBTTL  NVM READ BLOCK SUBROUTINE
                       PAGE
              ;        **************************************************************
              ;        **                                                          **
              ;        **          NVM READ BLOCK SUBROUTINE                       **
              ;        **                                                          **
              ;        **************************************************************
              ;
              ;        FIND AND READ THE CURRENT ACTIVE BLOCK.
              ;
              ;        -0M     A        = CRC VERIFICATION
              ;        --M     ALL REGISTERS & FLAGS
              ;        I--     ACTBLK   = ACTIVE BLOCK NUMBER
              ;        --M     WORKBF+6, +7
              ;
              ; FIND BLOCK.
0761  B9 59   NVMRD:   MOV   R1,#ACTBLK     ; GET ACTIVE BLOCK NO.
0763  F1               MOV   A,@R1
0764  F4 B4            CALL  NVMFND         ; FIND ACTIVE BLOCK, AND SETUP TO ACCESS ITS LOCATION.
0766  C6 78            JZ    NVM220         ; FOUND?
              ; INITIALIZE CRC.
0768  BC FF            MOV   R4,#CRCINL     ; INITIAL VALUE FOR CRC.
              ; READ DATA.
076A  74 02            CALL  RAMSTP         ; INITIALIZE RAM POINTER AND COUNTER.
076C  94 8A   NVM210:  CALL  NVMBYR         ; READ BYTE, SAVE, AND UPDATE CRC.
076E  18               INC   R0             ; POINT TO NEXT STORAGE LOCATION.
076F  EA 6C            DJNZ  R2,NVM210      ; DONE?
              ; READ CRC, AND RETURN VERIFICATION.
0771  FC               MOV   A,R4           ; GET CRC.
0772  B8 74            MOV   R0,#(WORKBF + 6)       ; AND SAVE.
0774  A0               MOV   @R0,A
0775  94 8A            CALL  NVMBYR         ; READ CRC, AND COMPARE WITH CALCULATED CRC.
0777  37               CPL   A
0778  37      NVM220:  CPL   A
0779  83               RET
              ;
                       INCLUDE DM0:NVMER
                       SUBTTL  NVM ERASE BLOCK SUBROUTINE
                       PAGE
              ;        **************************************************************
              ;        **                                                          **
              ;        **          NVM ERASE BLOCK SUBROUTINE                      **
              ;        **                                                          **
              ;        **************************************************************
              ;
              ;        ERASE THE CURRENT BLOCK OF NVM.
              ;
              ;        -0M     A        = ERROR COUNT
              ;        --M     ALL REGISTERS & FLAGS
              ;        I--     NVMBLK   = BLOCK NUMBER OF NVM
              ;        --M     WORKBF+6, +7
              ;
              ; SETUP ERASE PARAMETERS.
077A  94 73   NVMER:   CALL  NVMSTP         ; SETUP TO ACCESS LOCATION.
077C  BA 1C            MOV   R2,#(1AH +2H)          ; NUMBER OF BYTES TO ERASE.
077E  BB 00            MOV   R3,#00H        ; INITIALIZE ERROR COUNTER.
              ; ERASE BLOCK.
0780  B8 74            MOV   R0,#(WORKBF + 6)       ; STORAGE FOR ERASE RESULTS.
0782  B0 FF   NVM310:  MOV   @R0,#0FFH      ; EXPECTED ERASE RESULT.
0784  23 33            MOV   A,#33H         ; DOUBLE ERASE OP CODE.
0786  15               DIS   I              ; *** PREVENT INTERRUPTS DURING ERASE ***
0787  94 96            CALL  NVMBYT         ; ERASE BYTE, VERIFY, AND UPDATE ERROR COUNT.
0789  05               EN    I              ; *** PERMIT INTERRUPTS AGAIN          ***
078A  EA 82            DJNZ  R2,NVM310      ; DONE?
              ; RETURN ERROR COUNT.
078C  FB               MOV   A,R3           ; GET ERROR COUNT.
078D  83               RET
              ;
                       INCLUDE DM0:NVMWR
                       SUBTTL  NVM WRITE BLOCK SUBROUTINE
                       PAGE
```

```
                            ;           ****************************************************************
                            ;           **                                                            **
                            ;           **      NVM WRITE BLOCK SUBROUTINE                            **
                            ;           **                                                            **
                            ;           ****************************************************************
                            ;
                            ;           WRITE OUT THE CURRENT ACTIVE BLOCK TO THE CURRENT BLOCK OF NVM.
                            ;
                            ;           -OM     A       = ERROR COUNT
                            ;            -M     ALL REGISTERS & FLAGS
                            ;           I--     ACTBLK  = ACTIVE BLOCK NUMBER
                            ;           I--     NVMBLK  = HIGH NIBBLE = WRITE PROTECT FLAG
                            ;                             LOW NIBBLE  = BLOCK NUMBER OF NVM
                            ;           --M     WORKBF+6, +7
                            ;
                            ; CHECK WRITE PROTECT FLAG.
078E    39 5A               NVMWR:  MOV     R1,#NVMBLK              ; GET WRITE PROTECT FLAG.
0790    F1                          MOV     A,@R1
0791    53 F0                       ANL     A,#0F0H
0793    96 B3                       JNZ     NVM420                  ; IS IT SET?
                            ; SETUP WRITE PARAMETERS.
0795    94 73                       CALL    NVMST0                  ; SETUP TO ACCESS LOCATION.
0797    BB 00                       MOV     R3,#00H                 ; INITIALIZE ERROR COUNT.
                            ; CALCULATE AND WRITE HEADER.
0799    39 59                       MOV     R1,#ACTBLK              ; GET ACTIVE BLOCK NO.
079B    F1                          MOV     A,@R1
079C    43 F0                       ORL     A,#0F0H                 ; SET HIGH NIBBLE TO F FOR HEADER.
079E    B8 74                       MOV     R0,#(WORKBF + 6)                ; SAVE HEADER.
07A0    A0                          MOV     @R0,A
07A1    94 BE                       CALL    NVMBYW                  ; WRITE HEADER.
                            ; INITIALIZE CRC.
07A3    BC FF                       MOV     R4,#CRCINL              ; INITIAL VALUE FOR CRC.
                            ; WRITE DATA.
07A5    F4 02                       CALL    RAMSTP                  ; INITIALIZE RAM POINTER AND COUNTER.
07A7    94 BE               NVM410: CALL    NVMBYW                  ; WRITE BYTE, VERIFY, UPDATE CRC, AND UPDATE ERROR COUNT.
07A9    18                          INC     R0                      ; POINT TO NEXT BYTE.
07AA    EA A7                       DJNZ    R2,NVM410               ; DONE?
                            ; WRITE CRC.
07AC    FC                          MOV     A,R4                    ; GET CRC.
07AD    B8 74                       MOV     R0,#(WORKBF + 6)                ; AND STORE.
07AF    A0                          MOV     @R0,A
07B0    94 BE                       CALL    NVMBYW                  ; WRITE CRC, VERIFY, AND UPDATE ERROR COUNT.
                            ; RETURN ERROR COUNT.
07B2    FB                          MOV     A,R3                    ; GET ERROR COUNT.
07B3    83                  NVM420: RET
                            ;
                                    INCLUDE DMO:NVMFND
                                    SUBTTL  NVM FIND ACTIVE BLOCK SUBROUTINE
                                    PAGE
                            ;           ****************************************************************
                            ;           **                                                            **
                            ;           **      NVM FIND ACTIVE BLOCK SUBROUTINE                      **
                            ;           **                                                            **
                            ;           ****************************************************************
                            ;
                            ;           SEARCH BLOCKS OF NVM TO FIND GIVEN HEADER, AND LEAVE NMOS PAGE
                            ;           AND ADDRESS SETUP TO ACCESS FIRST DATA NIBBLE.
                            ;
                            ;           IOM     A       = ON CALL, HEADER
                            ;                           = ON RETURN, BLOCK NUMBER OF NVM
                            ;           --M     ALL REGISTERS & FLAGS
                            ;           --M     WORKBF+6, +7
                            ;
                            ; SETUP SEARCH PARAMETERS.
07B4    AA                  NVMFND: MOV     R2,A                    ; TEMPORARY SAVE OF ACTIVE BLOCK NO.
07B5    43 F0                       ORL     A,#0F0H                 ; LOOK FOR HEADER WITH HIGH NIBBLE OF F.
07B7    2A                          XCH     A,R2                    ; SAVE HEADER, AND RETRIEVE ACTIVE BLOCK NO.
07B8    E7                          RL      A                       ; CALCULATE INITIAL SEARCH POINT.
07B9    D3 02                       XRL     A,#02H
07BB    AB                          MOV     R3,A                    ; AND SAVE.
                            ; SEARCH UNTIL ACTIVE BLOCK FOUND OR ALL BLOCKS OF NVM CHECKED.
07BC    B8 74                       MOV     R0,#(WORKBF + 6)                ; STORAGE FOR READ HEADER.
07BE    FB                  NVM310: MOV     A,R3                    ; GET LOCATION NO.
07BF    B2 CD                       JB5     NVM320                  ; ALL LOCATIONS SEARCHED?
07C1    D4 76                       CALL    NVMST1                  ; NO, SETUP TO ACCESS LOCATION.
07C3    FA                          MOV     A,R2                    ; GET SOUGHT HEADER.
07C4    A0                          MOV     @R0,A                   ; AND SAVE FOR COMPARISON.
07C5    D4 EA                       CALL    NVMBYR                  ; READ HEADER, COMPARE, AND UPDATE LOCATION NO.
07C7    96 BE                       JNZ     NVM310                  ; CORRECT HEADER FOUND?
                            ; SEARCH SUCCESSFUL -- RETURN NVM BLOCK NUMBER.
07C9    FB                          MOV     A,R3                    ; GET LOCATION NO.
07CA    43 F0                       ORL     A,#0F0H                 ; AND APPEND WRITE PROTECT FLAG.
07CC    83                          RET
                            ; SEARCH UNSUCCESSFUL -- RETURN ERROR INDICATOR.
07CD    27                  NVM320: CLR     A                       ; INDICATE ERROR.
07CE    83                          RET
                            ;
                                    INCLUDE DMO:CRC
                                    SUBTTL  CRC GENERATOR SUBROUTINE
                                    PAGE
                            ;           ****************************************************************
                            ;           **                                                            **
                            ;           **      CRC GENERATOR SUBROUTINE                              **
                            ;           **                                                            **
                            ;           ****************************************************************
                            ;
                            ;           GENERATE CRC FOR ANY GIVEN DATA STRING.
                            ;
                            ;           -OM     A       = CRC VALUE
                            ;           I-M     R0      = ADDRESS OF DATA STRING
                            ;           I-M     R2      = LENGTH OF DATA STRING
                            ;           --M     R4, R7
                            ;
07CF    BC FF               CRC:    MOV     R4,#CRCINL              ; INITIALIZE REMAINDER.
07D1    F0                  CRC110: MOV     A,@R0                   ; GET DATA BYTE.
07D2    F4 D8                       CALL    CRCN1B                  ; AND EXTEND CRC FOR CURRENT BYTE.
07D4    F4 D8                       CALL    CRCN1B
07D6    18                          INC     R0                      ; POINT TO NEXT BYTE.
07D7    EA D1                       DJNZ    R2,CRC110               ; DONE?
07D9    FC                          MOV     A,R4                    ; RETURN CRC IN ACCUMULATOR.
07DA    83                          RET
                            ;
                                    INCLUDE DMO:CRCN1B
                                    SUBTTL  CRC (SINGLE NIBBLE) GENERATOR SUBROUTINE
                                    PAGE
                            ;           ****************************************************************
                            ;           **                                                            **
                            ;           **      CRC (SINGLE NIBBLE) GENERATOR SUBROUTINE              **
                            ;           **                                                            **
                            ;           ****************************************************************
                            ;
                            ;           EXTEND THE CURRENT CRC VALUE TO INCLUDE ONE MORE NIBBLE OF DATA.
                            ;
                            ;           I-M     A       = HIGH NIBBLE = DATA
                            ;                             LOW NIBBLE  = DON'T CARE
                            ;           IOM     R4      = CRC VALUE
                            ;           --M     R7
                            ;
07DB    BF 04               CRCN1B: MOV     R7,#4                   ; INITIALIZE BIT COUNTER.
07DD    97                  CRC210: CLR     C                       ; LEFT SHIFT OF CARRY-REMAINDER-DATA.
07DE    F7                          RLC     A                       ; CY <- R5 <- A <- 0
07DF    2C                          XCH     A,R4
07E0    F7                          RLC     A
07E1    E6 E5                       JNC     CRC220                  ; OUT-SHIFTED BIT OF REMAINDER = 1 ?
07E3    D3 9B                       XRL     A,#CRCPLY               ; YES, XOR REMAINDER WITH GENERATOR POLYNOMIAL.
07E5    2C                  CRC220: XCH     A,R4                    ; SAVE REMAINDER, AND GET DATA.
07E6    EF DD                       DJNZ    R7,CRC210               ; DONE?
```

```
07E8  83                    RETR
                    ;
                            INCLUDE  DM0:CLRBLK
                            SUBTTL   CLEAR BLOCK OF RAM
                            PAGE
                    ;       ************************************************************
                    ;       **                                                        **
                    ;       **          CLEAR BLOCK OF INTERNAL RAM                   **
                    ;       **                                                        **
                    ;       ************************************************************
                    ;
                    ;       CLEAR (ZERO) BLOCK OF INTERNAL RAM
                    ;
                    ;       I-M     R0        = START ADDRESS
                    ;       I-M     R2        = NUMBER OF BYTES TO CLEAR
                    ;
07E9  D5            CLRWK:  SEL     RB1
07EA  B8 5?         CLRWRK: MOV     R0, #WORKBF
07EC  BA 0?                 MOV     R2, #WRKBSZ
                    ;
07EE  27            CLRBLK: CLR     A
                    ;
07EF  A0            CLRBK1: MOV     @R0, A
07F0  18                    INC     R0
07F1  EA FE                 DJNZ    R2, CLRBK1
07F3  93                    RETR
                    ;
                            INCLUDE  DM0:CLRAMT
                            SUBTTL   CLEAR AMOUNT AND COMBO BUFFERS
                            PAGE
                    ;       ************************************************************
                    ;       **                                                        **
                    ;       **          CLEAR AMOUNT AND COMBO BUFFERS                **
                    ;       **                                                        **
                    ;       ************************************************************
                    ;
                    ;       UTILITY TO CLEAR AMOUNT AND COMBO BUFFERS.
                    ;
07F4  D5            CLRAM:  SEL     RB1
07F5  B8 7?         CLRAMT: MOV     R0, #AMTBF
07F7  BA 0?                 MOV     R2, #AMTSZ * 2
07F9  F4 EE                 CALL    CLRBLK
07FB  93                    RETR
                    ;
                            INCLUDE  DM0:RESET
                            SUBTTL   RESET
                            PAGE
                    ;       ************************************************************
                    ;       **                                                        **
                    ;       **          RESET                                         **
                    ;       **                                                        **
                    ;       ************************************************************
                    ;
                    ;       MANUAL RESET
                    ;
                    ;       ARGUMENTS       -- NONE
                    ;
                    ;       USED            R0, R1, R2, R4, R5, R6, R7
                    ;
                    ;  JUMP TABLE ENTRY
                    ;
0890                        ORG     890
0890  F9            PGRO0:  MOV     A, R1
0891  A3                    MOVP    A, @A
0892  2? 09                 JMP     PG900
                    ;
                    ;  SPECIAL ENTRY TO ONLY CLEAR ERROR COUNT
0884  23 83         RSTPM6: MOV     A, #(DSCRSZ/2)*10 + 3
0886  B4 32                 CALL    FMTCH
0888  6A                    ADD     A, R2
0889  07                    DEC     A                    ; POINT TO LAST BYTE
088A  A8                    MOV     R0, A
088B  B9 28                 MOV     R1, #DSCREG+DSCRSZ -1
088D  14 6D                 CALL    DECSUB
088F  C6 95                 JZ      RST1A                ; IF EQUAL CLEAR ERROR COUNT
                    ;  IF ERROR CLEAR AMT AND CMBO BUFF INCR RESET TRY COUNTER AND RETURN SOFT ERROR
0891  C5            RSTERR: SEL     RB0
0892  54 6E                 CALL    RSTCOM
0894  F0                    MOV     A, @R0               ; LOAD RESET TRY COUNT
0895  03 F7                 ADD     A, #0F7              ; CHECK RETRY COUNT IF >= 9 DO NOT INCREMENT
0897  F6 E0                 JC      RSTFAT
0899  10                    INC     @R0
089A  14 A6         RSTER1: CALL    CHGPRY
089C  14 AE                 CALL    CHGPRY
089E  24 76         RSTER2: JMP     SOFTERR
                    ;  CHECK COMBO DIGITS
08A0  C5            RESET1: SEL     RB0
08A1  96 9E                 JNZ     RSTER2               ; FORMAT FOR COMBO NOT "8F"
08A3  18                    INC     R0
08A4  F0                    MOV     A, @R0               ; LOAD DATA
08A5  D1                    XRL     A, @R1
08A6  96 D?                 JNZ     RSTRMS               ; NOT MANUAL COMBO CHECK FOR RMRS
08A8  19                    INC     R1
08A9  EA A0                 DJNZ    R2, RESET1
                    ;  CHECK FOR FUND REMOVAL
08AB  B9 76                 MOV     R1, #AMTBF
08AD  F1                    MOV     A, @R1
08AE  D3 22                 XRL     A, #22               ; FORMAT MUST BE "22"
08B0  96 C7                 JNZ     RSTMN1
08B2  19                    INC     R1
08B3  F1                    MOV     A, @R1
08B4  96 C6                 JNZ     RSTMAN               ; DATA MUST BE "00"
                    ;  LAST NIBBLE OF DESCENDING REGISTER MUST BE ZERO TO TRACK MANUAL RMRS SYSTEM
08B6  B8 23                 MOV     R0, #DSCREG + DSCRSZ -1
08B8  F0                    MOV     A, @R0
08B9  53 0F                 ANL     A, #0F               ; CHECK ONLY LAST NIBBLE
08BB  96 9?                 JNZ     RSTER2
                    ;  ZERO DESCENDING REGISTER
08BD  B8 23                 MOV     R0, #DSCREG
08BF  BA 06                 MOV     R2, #DSCRSZ
08C1  F4 EE                 CALL    CLRBLK
08C3  D5                    SEL     RB1
08C4  44 AB                 JMP     RST11                ; MUST STILL CLEAR BUFFERS AND COMPUTE NEW DSCECC AND CONECC
                    ;
                    ;  FOR MANUAL RESET CHECK RETRY COUNT AND PRESENCE OF PRIV STATE
08C6  C9            RSTMAN: DEC     R1                   ; RESTORE POINTER TO FORMAT
08C7  B4 E7         RSTMN1: CALL    LSTATE               ; LOAD STATE VALUE AND DO NOT DISTURB REG VALUES
08C9  37                    CPL     A                    ; BIT 0 SHOULD BE "1"
08CA  12 ?F                 JB0     RSTRMS
08CC  23 72                 MOV     A, #(DSCRSZ/2-1)*10+2   ; FORMAT CHECK TO PENNIES
08CE  B4 32                 CALL    FMTCH
08D0  B4 B2                 CALL    FMTN02               ; ENTRY FOR SHIFT ONE NIBBLE  ODD DIGIT COUNT
08D2  F5                    SEL     MB1
08D3  44 B4                 JMP     RSTAMT
                    ;
08D5  F5            RST1A:  SEL     MB1
08D6  ?? ?2                 JMP     RST11A
                    ;
                    ;
                    ;  RMRS RESET
08D8  54 E7         RSTRMS: CALL    LSTATE               ; CHECK STATE IS NORM
08DA  12 91                 JB0     RSTERR
08DC  F5                    SEL     MB1
08DD  ?4 ??                 JMP     RMRS
                    ;
```

```
;
;   IF FAILED HERE
;
RSTERR: SEL     MB0
RSTEAT: MOV     R7, #RSTTRY
        JMP     FATERR
        PAGE
        ORG     930
POSRBO: MOV     A, R1
        MOVP    A, @A
        JMP     PAGRET
;
;   CHECK FOR MANUAL COMBINATION
RESET:  MOV     R0, #CMBOBF
        MOV     R1, #RSTBAS       ; POINT AT MANUAL COMBO
        MOV     R2, #4            ; NO OF BYTES
        MOV     A, @R0            ; LOAD FORMAT, MUST BE "BF"
        XRL     A, #BF
        JNZ     RESET1
;
RMBS:   MOV     R1, #CMBOBF+1
        MOV     R0, #CMBOBF+1
        MOV     R4, #2
RSTRM1: CLR     A
        MOV     R3, #2
RSTRM2: MOV     R7, A
        MOV     A, @R0            ; LOAD COMBO BYTE
        ADD     A, #60            ; CHECK FOR DIGITS ABOVE 9
        JC      RMSERR
        SWAP    A
        ADD     A, #60
        JC      RMSERR
        SWAP    A
        ADD     A, #A0            ; SEPARATE ONE DIGIT
        RL      A                 ; TABLE AT END OF PAGE IN REVERSE ORDER
        MOVP    A, @A             ; CONV COMBO DIGIT TO TAPE CODE
        ORL     A, R7
        ORL     A, #50
        SWAP    A
        RL      A
        MOVP    A, @A
        XRL     A, @R1
        INC     R0
        DJNZ    R3, RSTRM2
        MOV     @R1, A
        INC     R1
        DJNZ    R4, RSTRM1
;   NOW LOOK UP STORED COMBINATION INDEXED BY ICOUNT
        MOV     R0, #DATIS1
        MOV     A, @R0
        CLR     C
        RLC     A
        RL      A
        MOV     R1, A
        DEC     R0
        MOV     A, @R0            ; LOAD MS BYTE OF COUNT
        RLC     A                 ; INCLUDE C FROM REDEFINED MODULO 128
        JB2     RMSERR            ; BIT 2 = 1   512  NO MORE COMBINATION'S
        ADD     A, #LOW PAGBR
        JMPP    @A
;   TABLE FOR JUMP
PAGBR:  DB      LOW PAG800
        DB      LOW PAGA00
        DB      LOW PAGC00
        DB      LOW PAGE00
;
PAG800: JMP     PG800
PAGA00: JMP     PGA00
PAGC00: JMP     PGC00
PAGE00: JMP     PGE00
;
PAGRET: MOV     R0, #CMBOBF + 2 ; CHECK COMBO AGAINST STORED
        XRL     A, @R0
        JNZ     RMSERR
        DEC     R0
        MOV     A, R1
        XRL     A, @R0
        JNZ     RMSERR
        SEL     MB0
        MOV     R1, #AMTBF
        MOV     A, #DSCRSZ*20 + 3
        CALL    FMTCH
        MOV     R7, A             ; SAVE START ADDR OF DATA
        MOV     R0, #RSTVAR       ; CHECK RECEIV AMT VS STORED RESET AMT
RMBS1:  MOV     A, @R0
        XRL     A, @R1
        JNZ     RMSERR
        INC     R0
        INC     R1
        DJNZ    R2, RMBS1
;
        MOV     A, R7
        SEL     MB1
        JMP     RSTAMT
;
;   RMBS ERROR
RMSERR: SEL     MB1
        JMP     RSTERR
;   RMBS COMBO TO TAPE CONVERSION TABLE
        ORG     9F6
        DB      1, 0, 20, 2,   8, 40, 4, 10,  80, 0
;
;   KEY ( COMBO DIGIT )    TAPE BIT
;         0                  0
;         9                  -   NO BIT
;         8                  5
;         7                  1
;         6                  3
;         5                  6
;         4                  3
;         3                  4
;         2                  7
;
        PAGE
        ORG     0A00
PGA00:  MOV     A, R1
        MOVP    A, @A
        JMP     PG800
;
;   COMMON CODE FOR MANUAL AND RMBS RESETS
;
RSTAMT: SEL     MB0
        ADD     A, #DSCRSZ -1     ; POINT TO LAST BYTE
        MOV     R0, A
        MOV     R1, #RSTCNT
        MOV     A, @R1
        ADD     A, #0F7
        JNC     RSTAM2            ; C = 0 , RSTCNT < 9
        SEL     MB1
        JMP     RSTEAT
;   ADD RESET AMT TO DSCREG VALUE
RSTAM1: MOV     R1, #DSCREG+DSCRSZ-1
```

```
                 MOV     R2, #DSCRSZ
                 CALL    DECADD
                 JC      RSTERA          ; RAP AROUND NOT ALLOWED
                 MOV     R2, #DSCRSZ
                 MOV     @R1, A          ; STORE NEW DSC CRC
        RSTAM2:  INC     R1
                 INC     R0
                 MOV     A, @R0
                 MOV     @R1, A
                 DJNZ    R2, RSTAM2
                 MOV     R0, #DATE+1     ; UPDATE ICOUNT FOR RMRS
                 INC     @R0
                 MOV     A, @R0
                 JNZ     RSTI1
                 DEC     R0
                 INC     @R0
        RSTI1:   SEL     MB0
                 CALL    SSCCRC
                 MOV     @R0, A
        ;   CLEAR VIT AND COMBO BUFFERS AND CLEAR RSTCNT COUNTER
                 CALL    CTLECC          ; COMPUTE NEW CONTROL SUM CRC
                 MOV     @R0, A
        RSTCLA:  SEL     MB0
                 CALL    CLRCOM
                 MOV     @R0, A          ; CLEAR RESET ERROR COUNTER
        RST12:   CALL    CHGPRV          ; CHANGE PRIV BIT
                 CALL    CHGPRV
                 JMP     SPESTA
        ;
        RSTERA:  SEL     MB1
                 JMP     RSTERB
        ;
                 ORG     01B0
        PGA00:   XCH     A, R1
                 MOVP    A, @A
                 JMP     PAGRET
        ;
                 ORG     0CB0
        PGC09:   MOV     A, R1
                 MOVP    A, @A
                 JMP     PGD00
        ;
                 ORG     0DB0
        PGD00:   XCH     A, R1
                 MOVP    A, @A
                 JMP     PAGRET
        ;
                 ORG     0EB0
        PGE00:   XCH     A, R1
                 MOVP    A, @A
                 JMP     PGF00
        ;
                 ORG     0FB0
        PGF09:   XCH     A, R1
                 MOVP    A, @A
                 JMP     PAGRET
        ;
        ;
                 INCLUDE DMO:PWRUP
                 SUBTTL  POWER UP & INITIALIZE
                 PAGE
        ;        ***************************************************************
        ;        **                                                          **
        ;        **                  POWER UP AND INITIALIZE                 **
        ;        **                                                          **
        ;        ***************************************************************
        ;
        ;        INITIALIZE ACCOUNTING SYSTEM.  ENSURE ACCOUNTING FUNCTION IS READY.
        ;
        ;        R0      = ADDRESS FOR NVM
        ;        R1      = ADDRESS FOR NVM LOAD
        ;        R2      = COUNTER
        ;
        PWRUPA:  SEL     MB0             ; SET FOR CALL S TO LOWER 2 K
                 XRL     A, @R0
                 JZ      PWRUP2          ; ASCREG OK?
                 INC     R0              ; POINT AT MSB OF ASC REG
                 MOV     @R0, #0FF
        PWRUP2:  CALL    DSCCRC
                 XRL     A, @R0
                 JZ      PWRUP4          ; DSCCRC OK?
                 INC     R0              ; POINT AT DESC REG
                 MOV     @R0, #0FF
        PWRUP4:  MOV     R0, #ACTBLK
                 INC     @R0
                 INC     R0              ; POINT AT NVMBLK
                 MOV     @R0, #0F0       ; INDICATE NO BLOCK OPEN
                 EN      I               ; ARM INTERRUPT
                 CALL    NVMPD
                 JZ      PWRUP5          ; READ OK?
                 CALL    NVMEAT
        ; CHECK COMPUTED CONTROL SUM AGAINST STORED CONECC
        PWRUP5:  CALL    CTLECC
                 XRL     A, @R0
                 JNZ     PWREPB
        ; RECEIVE PRINTER STATUS
                 CALL    STR2CT          ; A = 0   ABOUT 3 SEC TO ALLOW SHUTTER TO RETURN HOME
                 CALL    PRGPS
                 STOP    TCNT
                 MOV     A, R0           ; LOAD NEW PRINTER STATUS
                 XRL     A, #VLISHD      ; HEADER = "30" ?
                 JNZ     PWRPRE          ; PRINTER ERROR
        ; HAVE STATUS
                 MOV     R1, #MRSTAT     ; CLEAR RESET BASE BIT
                 ANL     @R1, #40
                 INC     R0              ; POINT AT STATUS ADDR
                 MOV     R1, #PRSTAT     ; POINT AT OLD PRINTER STATUS
                 MOV     A, @R0
                 JB7     PWRPRE          ; FATAL ERROR SET
                 XRL     A, @R1
                 JB1     PWRUP6          ; TRAP IN PROCESS, ACCOUNT COMPLETE OR PWR DOWN
                 ANL     A, #40
        PWRUP6:  XRL     A, @R1          ; COMPARE HOME POSITIONS
                 JZ      PWRUP7          ; NO ACCOUNTING
        ; DO ACCOUNTING
                 CALL    DOACCT
        PWRUP7:  MOV     R0, #PRSTAT     ; CHECK PRIV SWITCH
                 MOV     R1, #STATE
                 ANL     A, #40          ; LOAD PRSTAT
                 ORL     A
                 JNZ     PWRUPB          ; PRIV SW CLOSED
                 ORL     @R1             ; SET PRIV STATE
        PWRUPB:  MOV     R0, #WRXBF1     ; SET EXIT POST
                 MOV     A, @R1          ; CHECK TO SEE IF FATAL
                 JB7     PWRLDY          ; IF FATAL NO SETTING TO PRINTER
                 MOV     @R0, #4         ; 4 BYTES
                 INC     R0
                 MOV     @R0, #SPOSHD
                 INC     R0
                 MOV     R1, #POSVAL
                 MOV     R2, #POSTSZ
                 CALL    BFMOV
                 CALL    STR1CT          ; SET TIMER FOR ABOUT 10 MILLI SEC
                 MOV     A, #WRCMD
                 CALL    TBCTX
```

```
                CALL    ICRT
; WHILE COUNTER SETTING POSTAGE, ERASE NVM
                CALL    LSTVIE          ; NEED ACT BLOCK (STATE CAN ONLY BE 0 OR 1)
                CALL    NVCLK
                MOV     R0,#POSVAL      ; 0 POSTAGE VALUE
                MOV     R0,#20          ; PROTECT AGAINST POWER DOWN DURING PRINTER INITIAL SETTING
                INC     R0
                MOV     R2,#POSTSZ-1
                CALL    CLRBLK
; WAIT REST OF SET POST TIME
PWRUP9:         CALL    STR20H
                JMP     SETIN2
PWRUP8:         JMP     CLTRIN
PWRUPB:         CALL    BANGAT
PWRUP9:         JMP     DOSSTA
;
;
                END
```

| | | | | | | | | | |
|---|---|---|---|---|---|---|---|---|---|
| A | =0?9E | ACMPID | 0C45 | ACTBLK | 0059 | AMTBF | 0076 | AMTSZ | 0005 |
| ASCURC | 02CA | ASCECC | 0029 | ASCREG | 002A | ASCRSZ | 0005 | ASERSZ | 0001 |
| BADPCM | 0372 | BATAMT | 0623 | BATASZ | 0004 | BYTCNT | 0057 | BATCSZ | 0003 |
| BLKMOV | 0653 | BUS | =0004 | C | =0007 | CBCPAV | 0036 | CLK | =0010 |
| CLEAN | 07F4 | CLRAMT | 07F5 | CLRBAT | 018F | CLRBED | 0094 | CLRBKI | 07EF |
| CLRTCK | 07EE | CLRSZR | 01A2 | CLRSHP | 0647 | CLRWK | 07E9 | CLRWRK | 07EA |
| CMB?? | 007B | CLRSZ | 0005 | CMDDAT | 01B5 | CMBONY | 017A | CNCLX | 062C |
| CMDESS | 015F | CNT | =0009 | CNTNFL | 005B | COMFAT | 0006 | CONFCC | 003C |
| CRC | 076F | CRCTBL | 00FF | CRCNTB | 070B | CRCPLY | 00?B | CRC110 | 0701 |
| CRC210 | 0799 | CRC230 | 0755 | CRNBLO | 05A0 | CRNBL1 | 05?2 | CRNBL2 | 05AE |
| CRNBL? | 0?84 | CRNBL4 | 0586 | CRNBYL | 05AB | CRNBYT | 0594 | CRNCST | 059B |
| CRNFN? | 0??? | CRNF1? | 0651 | CRNFNT | 065D | CRNMES | 0620 | CRNMLP | 0647 |
| CRNSET | 0?58 | CRNMSG | 0639 | CRNSET | 0659 | CRNMS2 | 0641 | CRNPED | 059C |
| CTBNCG | 0382 | CTLSUM | 02BF | CTGHLP | 0033 | CTBL.I | 0039 | CTXBL2 | 003E |
| CTXBL1 | 0??? | CTXBLS | 0044 | CTXBL6 | 0051 | CTXBL7 | 0035 | CTXBLB | 0037 |
| CTXB?9 | 007C | CTXNCT | 0029 | CTXNCN | 04C3 | CTXNCP | 04C8 | CTXCN2 | 04CD |
| CTXNST | 0?F4 | CTXMLR | 0419 | CTXMES | 04BC | CTXMP1 | 04BD | CTXMLP | 04AC |
| CTXMLP | 049D | CTXMSG | 049B | CTXMST | 04A3 | CTXPS7 | 04B5 | CTXPST | 04A1 |
| DATE | 003A | DATESZ | 0002 | DBB | =0011 | DEC100 | 02EC | DECADI | 02ED |
| DECSB1 | 0071 | DECS?2 | 007B | DECSUB | 006D | DELOOP | 0082 | DEL330 | 0080 |
| DISAB? | 0202 | DISAB1 | 025B | DISAB2 | 02E1 | DISAB? | 02F5 | DISBTM | 045D |
| DISRET | 029A | DISSTA | 0181 | DISTM1 | 04?4 | DOACCT | 0313 | DOSTAT | 0316 |
| DOSTA1 | 0123 | DOST?? | 0338 | DOST?4 | 0340 | DOSTA5 | 0354 | DOSTA6 | 0363 |
| DOS?A7 | 03?E | DOTTYA | 034D | DOSTSA | 035D | DOTRIP | 0370 | DOTRP1 | 038C |
| DOTRP2 | 0393 | DOTRP3 | 0397 | DOTRP4 | 039F | DOTRP5 | 03A6 | DSBLS | 0189 |
| DSCLPD | 0942 | DSCCEC | 0665 | DSCECC | 0024 | DSCREG | 0025 | DSCRSZ | 0004 |
| DSERSZ | 0001 | ECHFAT | 0006 | ENABLE | 055B | ENABL1 | 05C8 | ENABL2 | 05D1 |
| ENABL3 | 05?7 | ENABKT | 05CF | ENABTM | 046C | ENARET | 05DB | ENBLE | 017C |
| ENBLED | ??51 | ENDEPD | 0043 | ENDENT | 01AC | ENTNBD | 00C5 | ENTAMT | 01C3 |
| ENTCB1 | 01BB | ENTCHD | 00?6 | ENTCMB | 0189 | ENTMSN | 0477 | EXCBAS | 0128 |
| EXCD?S | 0130 | EXCERR | 0?2? | EXCENT | 0043 | FATCOD | 0042 | FATCOM | 0431 |
| FATDSB | 0661 | FATLBL | 0433 | FATERI | 0447 | FATRRI | 043C | FMTCH | 0332 |
| FMTCH1 | 05?1 | FMTCH2 | 0562 | FMTCH3 | 057D | FMTERR | 0530 | FMTNB1 | 05BA |
| FMTHP? | 0782 | FMT0?1 | 0247 | FMTCT2 | 0251 | FMT0?A | 025A | FMT000 | 025E |
| FMT0?1 | 0210 | FMT002 | 026A | FMT003 | 0278 | FMT004 | 0280 | FMT010 | 0286 |
| FMT011 | 0293 | FMT012 | 0297 | FMT014 | 029C | FMTS0F | 02B7 | FMTSTA | 0289 |
| FMTSIS | 02?? | FMTTKI | 02?E | FMTVAL | 0227 | FTCSZ | 0001 | F0 | =000D |
| F1 | =20?D | G?T9 | 0084 | GETDTA | 0371 | GET100 | 00BA | GETSTA | 0090 |
| GETSTS | 0?24 | HOMFAT | 0005 | HRDEAD | 0174 | I | =000C | IDLE0 | 013A |
| IDLE1 | 0140 | IDLE2 | 0152 | IDLE3 | 0154 | IDLE4 | 014C | IDLE5 | 0153 |
| INTCNT | 0004 | LGTPOS | 0037 | LAST | 007F | LIMIST | 0029 | LOWPOS | 004C |
| LOWSET | 0?F2 | LOWSTI | 03FA | LSTVIE | 02F7 | LSTVIS | 02CB | LWPSS? | 0002 |
| M30 | =2??B | M?? | =30C? | MESASZ | 0002 | MSTSTY | 01B6 | MSTCT | 0036 |
| NSE??? | 0??5 | N?ERSZ | 0054 | NMBS?Z | 0001 | N????? | 0044 | NODYC? | 0049 |
| NVCLK | 003A | NVBYE | 0685 | NVBYT | 0000 | NVBYS | 0680 | NVBJHC | 070? |
| NVCO? | ???? | NVDEAT | 044A | NVNL?D | 0742 | NV?BLB | 06A5 | NVMOPN | 0727 |
| NVDFD | 0761 | NV?STF | 0673 | NVMST1 | 0676 | NVMPBL | 0760 | NVMSE | 07BE |
| NVM110 | 0712 | NVM130 | 0740 | NVM150 | 0743 | NVM170 | 0750 | NVM190 | 0750 |
| NVM?? | ??3F | NVM2?? | 0750 | NVM220 | 0778 | NVM?40 | 07F2 | NVM410 | 07A7 |
| NVM?20 | 0??? | NVM?40 | 0791 | NVM?20 | 07C? | NVM?10 | 06?4 | NVM710 | 0654 |
| NVM?15 | 0?35 | NVM?? | 069E | NVM730 | 06?? | NVM735 | 06CD | NVM?40 | 06D5 |
| NVM?5 | 0?07 | NVM??0 | 06?? | NVM760 | 06F0 | PACACH | 00C9 | PAGBR | 0013 |
| PAGSCH | ???? | PAGS?? | 00?D | PAGRET | 00CF | PAGS00 | 00C7 | PECEKT | 0026 |
| PEN?? | 00?? | PEN?? | 0??C | PGDS00 | 0130 | PG?00 | 0?3? | PGD00 | 0080 |
| PGD?? | 02?? | PG?00 | 0??0 | PG?00 | 01?0 | PG900 | 0080 | POLCNT | 0030 |
| POSBAT | 0?FF | POSFA1 | 0504 | POSLOW | 050E | POSTSZ | 0003 | POSUPD | 04F4 |
| POSVAL | 0030 | POSVAB | 0081 | POSWRK | 0413 | PRCRX | 062B | PRCTX | 048A |
| PROFAT | 0?02 | P?STAT | 002F | PRSTSZ | 0001 | PRTFAT | 0001 | PSW | =0003 |
| PWBUP | 0?69 | PWRUP3 | 0FF7 | PWRUP9 | 0FF9 | PWRUP8 | 0FF5 | PWRUP | 000E |
| PWRUPA | 0?04 | PWRUP? | 3024 | PWRUP2 | 0FBB | PWRUP4 | 0F93 | PWRUP5 | 0F?0 |
| PWRUP? | 0?8E | PWRUP7 | 0FC3 | PWRUP8 | 0FCC | PWRUP9 | 0FF1 | P1 | =0105 |
| P2 | =0205 | P4 | =0006 | P5 | =0106 | P6 | =0206 | P7 | =0306 |
| QRZSTA | 0114 | RAMSTF | 0792 | RB0 | =00?B | RB1 | =100? | RCNMES | 015? |
| RECBEL | 0??7 | RECBSZ | 0008 | RECBUF | 005E | RECSTS | 0080 | RECST1 | 0098 |
| RCQVID | 0?50 | RESET | 0554 | RESET1 | 0030 | RETESC | 0117 | RETVAL | 01C? |
| RRES | 098? | RRES1 | 09E3 | RRSEKR | 09FF | RSTAMT | 0AB4 | RSTAMT | 0192 |
| RSTAR2 | 07?D | RSTBAS | 0030 | RSTBSZ | 0004 | RSTCNT | 004? | RSTCOM | 066E |
| RSTC?Z | 0??8 | RSTDAN | 0ABC | RSTERR | 0891 | RSTCP1 | 089A | RSTER2 | 039E |
| RSTFAT | 0?E0 | RSTFTE | 08DF | RSTPAN | 08C6 | RSTPN1 | 0907 | RSTIOS | 08D8 |
| RSTOBB | 0995 | RSTRO? | 099E | RSTRU6 | 08D4 | RSTRSZ | 0005 | RSTR20 | 04?B |
| RSTSZY | 0??? | RSTYAK | 09BD | RSTYSZ | 00C4 | RSTTA | 0?05 | RSTTT | 0??? |
| RSTT?A | 0?82 | RST12 | 0A96 | R0 | =0002 | R1 | =0102 | R2 | =0202 |
| R3 | =0?02 | R4 | =0402 | R5 | =0502 | R6 | =0602 | R7 | =0702 |
| SETTRO | 0?4? | SERENT | 01CF | SETNO? | 01?3 | SERENI | 01?1 | SETI?R | 0?3C |
| SETCAT | 0007 | SETINT | 0?9E | SET1?0 | 0?4F | SETIN1 | 0617 | SETIN2 | 062? |
| SETPIN | 0?4E | SETPSZ | 0??? | SETP?O | 01?7 | SETPOS | 010F | SETPTM | 0?7D |
| SETSER | 01?7 | SETSHL | 0?4? | SETSR? | 0191 | SETTRA | 0176 | SPOS? | 00C1 |
| STATE | 0053 | STATRB | 0040 | STOHK | 005E | STOBE? | 000? | STRMIL | 0007 |
| STRIFT | 0417 | STRIGN | 0304 | STR20? | 0419 | STRSET | 0412 | T | =00?? |
| TBC?DI | 0?F0 | TBC?DS | 0110 | TBCBDS | 0108 | TCST | =000? | TCNTI | =200C |
| TIMCNT | 0054 | TIMCBY | 2423 | TIMINT | 0324 | TIMSTP | 041? | TIMS00 | 0033 |
| TRIOST | 02?6 | TRIOST | 02?E | TRIOST | 0514 | TRIPTM | 0479 | TRPTYT | 0008 |
| TROSET | 0154 | TRPTOL | 0043 | UNLOCK | 0049 | UNLSZ | 0003 | VALUE | 0231 |
| VALUES | 0?32 | VALSBD | 0030 | WORKBF | 006E | WRKBFI | 0066 | WRKBSZ | 0008 |
| WTP?YZ | 0?C0 | | | | | | | | |

No errors detected

Cross reference listing (MICREF version 4.0)

Symbol    Refs (* = definition  $ = set  (blank) = read)

```
ACMPID    131*   1496
ACTBLK    165*   10?,   2?56   2189   2203   2212   2263
                 2952   2955
AMTBF     ?96*   107    ?62    703    2494   2550   2669
AMTSZ     ?9     ?89    2455
ASCECC    209    ?34*   1249
ASCURC    76*    77     943
ASCREG    77*    73     9??    1047   104?   1246   1523
ASCRSZ    73     941    12??   1249   15??   1527
ASERSZ    72
BADPCM    ???    1241   1256   1271
BATAMT    8??    81     659    1651   1255
BATASZ    81     660    1255   1257
BATCSZ    ?1?    83     1052   1267   1570
BLKMOV    ??     660    1267   1249   1571
BUS       303*   457    159    660    730    623    1216
                 1525   1552   1344   2875
CBCPAV    1??*   2557   2328   2147   2746
CLK       ??     2403*
CLRAMT    1??*   1956   2332
CLRBAT    ??     63?*
CLRBED    ?30*
CLRBKI    2?7*   2479
CLRBLK    ?4?    661    2475*  2496   2565   2865
CLRSTR    5?9    67?
CLRSHP    ?3?*
```

| | | | | | | | |
|---|---|---|---|---|---|---|---|
| [illegible] | [illegible] | [illegible] | | | | | |
| CURVPK | 1256 | [illegible] | 1653 | 2472* | | | |
| [illegible] | [illegible] | 110 | 565 | 667 | 704 | 1031 | 1808 |
| | | 1616 | 2609 | 2540 | [illegible] | 2661 | |
| [illegible] | 110 | | | | | | |
| [illegible] | 632 | 633* | | | | | |
| [illegible] | 637 | [illegible] | | | | | |
| [illegible] | [illegible] | 1701 | [illegible] | | | | |
| [illegible] | 559 | [illegible] | | | | | |
| [illegible] | [illegible] | [illegible] | 560 | 592 | 1116 | | |
| [illegible] | [illegible] | [illegible] | | | | | |
| [illegible] | [illegible] | 35 | 529 | | | | |
| [illegible] | 942 | 1525 | [illegible] | 2421* | | | |
| [illegible] | 2402* | 2424 | | | | | |
| [illegible] | [illegible] | 2474 | | | | | |
| [illegible] | 2451 | 2456* | | | | | |
| [illegible] | [illegible] | 2246 | 2341 | 2421 | | | |
| [illegible] | 2109 | [illegible] | 2424 | 2446* | | | |
| [illegible] | [illegible] | [illegible] | | | | | |
| [illegible] | [illegible] | [illegible] | 1777 | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | 1762* | | | | |
| [illegible] | [illegible] | [illegible] | | | | | |
| [illegible] | 1720* | [illegible] | | | | | |
| [illegible] | 1542 | [illegible] | 1926* | | | | |
| [illegible] | [illegible] | [illegible] | | | | | |
| [illegible] | [illegible] | [illegible] | | | | | |
| CRNSUS | [illegible] | 1982* | | | | | |
| [illegible] | [illegible] | 1911 | | | | | |
| [illegible] | 1919* | 1924 | | | | | |
| [illegible] | [illegible] | 1893 | | | | | |
| [illegible] | 1792 | [illegible] | 1833 | | | | |
| [illegible] | [illegible] | [illegible] | | | | | |
| CRDPED | [illegible] | [illegible] | 1733 | | | | |
| [illegible] | [illegible] | 1522 | 2742 | 2814 | | | |
| [illegible] | 319 | 322* | 1626 | | | | |
| [illegible] | [illegible] | 561 | 373 | | | | |
| [illegible] | [illegible] | 365 | | | | | |
| [illegible] | [illegible] | [illegible] | 364 | | | | |
| [illegible] | [illegible] | 373 | | | | | |
| [illegible] | [illegible] | [illegible] | | | | | |
| [illegible] | [illegible] | [illegible] | | | | | |
| [illegible] | [illegible] | 534 | 371* | | | | |
| [illegible] | [illegible] | 375* | | | | | |
| [illegible] | [illegible] | 358 | | | | | |
| [illegible] | [illegible] | 1514 | 1490 | | | | |
| [illegible] | 1402 | [illegible] | | | | | |
| [illegible] | [illegible] | [illegible] | | | | | |
| [illegible] | [illegible] | 1479 | 1504* | | | | |
| [illegible] | [illegible] | [illegible] | | | | | |
| [illegible] | [illegible] | [illegible] | | | | | |
| CTNIGR | 1485 | 1491 | 1510* | | | | |
| [illegible] | [illegible] | [illegible] | | | | | |
| [illegible] | 1482* | 1487 | | | | | |
| [illegible] | 1459 | 1466* | | | | | |
| [illegible] | 1464 | 1474* | | | | | |
| [illegible] | 1480 | [illegible] | | | | | |
| [illegible] | [illegible] | 1471 | | | | | |
| [illegible] | [illegible] | 1472 | | | | | |
| DATE | 83* | 84 | 2653 | 2732 | | | |
| DATESZ | 84 | | | | | | |
| [illegible] | [illegible] | 1612 | | | | | |
| [illegible] | 924 | 1002* | 1241 | 1258 | 1265 | 1270 | 2723 |
| [illegible] | [illegible] | 443 | | | | | |
| [illegible] | 439 | 441* | | | | | |
| [illegible] | 428* | 1249 | 1563 | 1586 | 1598 | 1832 | 2528 |
| DEL200 | [illegible] | 1402 | [illegible] | 1497 | 1807 | 1914 | |
| DELOOP | 523* | 523 | | | | | |
| [illegible] | [illegible] | 965* | | | | | |
| [illegible] | 968* | 969 | | | | | |
| [illegible] | [illegible] | | | | | | |
| [illegible] | [illegible] | 569 | 959* | 1637 | | | |
| [illegible] | [illegible] | | | | | | |
| [illegible] | [illegible] | 966 | | | | | |
| DISSTA | [illegible] | [illegible] | | | | | |
| [illegible] | [illegible] | [illegible] | | | | | |
| [illegible] | 1190 | [illegible] | 2437 | | | | |
| [illegible] | 1124 | 1127* | | | | | |
| [illegible] | [illegible] | 1142* | | | | | |
| [illegible] | [illegible] | [illegible] | | | | | |
| [illegible] | [illegible] | [illegible] | | | | | |
| [illegible] | 1117* | | | | | | |
| [illegible] | [illegible] | [illegible] | | | | | |
| [illegible] | [illegible] | [illegible] | | | | | |
| [illegible] | [illegible] | [illegible] | 1138* | | | | |
| [illegible] | 676 | [illegible] | [illegible] | 1856 | | | |
| [illegible] | [illegible] | 1186* | | | | | |
| [illegible] | [illegible] | [illegible] | | | | | |
| [illegible] | [illegible] | 1202 | | | | | |
| [illegible] | [illegible] | [illegible] | | | | | |
| [illegible] | 1215 | [illegible] | | | | | |
| [illegible] | [illegible] | 1213* | | | | | |
| [illegible] | 544 | [illegible] | | | | | |
| [illegible] | [illegible] | | | | | | |
| [illegible] | [illegible] | 1939* | 2739 | 2800 | | | |
| [illegible] | 74* | 77 | 1942 | | | | |
| [illegible] | 75* | 76 | 922 | 1048 | 1563 | 1584 | 1939 |
| | | 2527 | 2558 | 2563 | 2721 | | |
| [illegible] | 76 | 922 | 923 | 1248 | 1563 | 1584 | 1585 |
| | | [illegible] | 2522 | 2527 | 2558 | 2564 | 2574 |
| | | 2670 | 2712 | 2721 | 2722 | 2723 | |
| [illegible] | 78 | | | | | | |
| [illegible] | 243* | 1927 | | | | | |
| [illegible] | 1802* | 1805 | | | | | |
| [illegible] | [illegible] | 1619 | | | | | |
| [illegible] | [illegible] | [illegible] | | | | | |
| [illegible] | [illegible] | 651 | 1793* | | | | |
| [illegible] | [illegible] | [illegible] | | | | | |
| [illegible] | [illegible] | 1467 | | | | | |
| [illegible] | 1794 | [illegible] | [illegible] | | | | |
| [illegible] | [illegible] | [illegible] | [illegible] | | | | |
| [illegible] | 127* | 1302 | | | | | |
| ENDLOO | 129* | | | | | | |
| ENDENT | 545 | 677* | | | | | |
| [illegible] | 142* | | | | | | |
| [illegible] | 557 | 692* | | | | | |
| [illegible] | [illegible] | 693 | | | | | |
| [illegible] | [illegible] | | | | | | |
| [illegible] | 558 | [illegible] | | | | | |
| [illegible] | [illegible] | [illegible] | [illegible] | | | | |
| [illegible] | [illegible] | [illegible] | | | | | |
| [illegible] | 577 | 575 | [illegible] | [illegible] | | | |
| [illegible] | [illegible] | [illegible] | | | | | |
| [illegible] | [illegible] | [illegible] | | | | | |
| [illegible] | [illegible] | [illegible] | [illegible] | | | | |
| [illegible] | [illegible] | [illegible] | | | | | |
| [illegible] | [illegible] | [illegible] | [illegible] | | | | |
| [illegible] | [illegible] | [illegible] | | | | | |
| [illegible] | [illegible] | [illegible] | [illegible] | 1403 | 1418 | 1421 | 1928 |
| | | [illegible] | | | | | |
| [illegible] | [illegible] | [illegible] | | | | | |

| | | | | | | | |
|---|---|---|---|---|---|---|---|
| [illegible] | [illegible] | [illegible] | [illegible] | 2523 | 2573 | 2671 | |
| [illegible] | [illegible] | [illegible] | | | | | |
| [illegible] | [illegible] | 1689 | | | | | |
| [illegible] | [illegible] | 1690* | | | | | |
| [illegible] | [illegible] | [illegible] | 1643 | 1649 | 1674 | 1677 | |
| [illegible] | [illegible] | 1726 | | | | | |
| [illegible] | [illegible] | [illegible] | [illegible] | 2576 | | | |
| [illegible] | [illegible] | 859 | [illegible] | | | | |
| [illegible] | [illegible] | 890 | | | | | |
| [illegible] | [illegible] | 867* | | | | | |
| [illegible] | [illegible] | [illegible] | 791 | 875 | 877 | 892 | 891* |
| [illegible] | [illegible] | [illegible] | | | | | |
| [illegible] | [illegible] | | | | | | |
| [illegible] | [illegible] | 859* | | | | | |
| [illegible] | [illegible] | 846 | | | | | |
| [illegible] | [illegible] | [illegible] | | | | | |
| [illegible] | [illegible] | 861* | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | 919 | | | | | |
| [illegible] | [illegible] | 1233 | | | | | |
| [illegible] | [illegible] | [illegible] | | | | | |
| [illegible] | [illegible] | [illegible] | [illegible] | | | | |
| [illegible] | [illegible] | 1872 | | | | | |
| [illegible] | [illegible] | 1162* | 2006 | | | | |
| [illegible] | [illegible] | 612 | | | | | |
| [illegible] | [illegible] | 1137 | [illegible] | | | | |
| [illegible] | 242* | [illegible] | | | | | |
| [illegible] | [illegible] | 638 | | | | | |
| [illegible] | [illegible] | 912 | | | | | |
| [illegible] | [illegible] | | | | | | |
| [illegible] | [illegible] | [illegible] | 587 | 591* | 621 | | |
| [illegible] | [illegible] | [illegible] | [illegible] | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | | | | | | |
| [illegible] | [illegible] | 1581 | 1828 | | | | |
| [illegible] | [illegible] | 93 | 563 | 1058 | 1589 | | |
| [illegible] | [illegible] | 1437 | 1903 | | | | |
| [illegible] | [illegible] | [illegible] | | | | | |
| [illegible] | [illegible] | 793 | [illegible] | 981* | 1366 | 1834 | 2183 |
| | | 2571 | [illegible] | 2839 | | | |
| [illegible] | [illegible] | [illegible] | 646 | 982* | | | |
| [illegible] | [illegible] | | | | | | |
| [illegible] | 394 | [illegible] | | | | | |
| [illegible] | 98* | 99 | 293 | 387 | 1045 | 1055 | 1062 |
| | | 1117 | 1213 | 1411 | 1590 | 2825 | |
| [illegible] | [illegible] | [illegible] | 1059 | | | | |
| [illegible] | 91 | | | | | | |
| [illegible] | [illegible] | 90 | | | | | |
| [illegible] | [illegible] | | | | | | |
| [illegible] | [illegible] | [illegible] | | | | | |
| [illegible] | 2214 | 2221* | | | | | |
| [illegible] | 2217 | 2220 | [illegible] | | | | |
| [illegible] | 2191 | 2240* | | | | | |
| [illegible] | [illegible] | 2207 | 2235 | 2242* | | | |
| [illegible] | 2226 | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | 2362* | | | | | |
| [illegible] | [illegible] | [illegible] | | | | | |
| [illegible] | [illegible] | 2402* | | | | | |
| [illegible] | 2058 | 2840* | | | | | |
| [illegible] | 2079 | 2061* | | | | | |
| [illegible] | 2083* | 2117 | | | | | |
| [illegible] | 2087 | [illegible] | | | | | |
| [illegible] | [illegible] | | | | | | |
| [illegible] | [illegible] | [illegible] | | | | | |
| [illegible] | 2165 | 2167* | 2109 | | | | |
| [illegible] | [illegible] | [illegible] | | | | | |
| [illegible] | [illegible] | 2119* | | | | | |
| [illegible] | [illegible] | [illegible] | | | | | |
| [illegible] | [illegible] | [illegible] | 1977 | 2197 | 2236 | 2334 | |
| [illegible] | [illegible] | 2271 | 2276 | [illegible] | | | |
| [illegible] | 2019 | [illegible] | 2368 | | | | |
| [illegible] | [illegible] | 2254 | [illegible] | [illegible] | [illegible] | | |
| [illegible] | 593 | 395 | [illegible] | | | | |
| [illegible] | [illegible] | [illegible] | | | | | |
| [illegible] | [illegible] | [illegible] | [illegible] | 2243 | 2312 | 2870 | |
| [illegible] | [illegible] | [illegible] | [illegible] | | | | |
| [illegible] | [illegible] | [illegible] | [illegible] | | | | |
| [illegible] | [illegible] | [illegible] | | | | | |
| [illegible] | [illegible] | [illegible] | [illegible] | | | | |
| [illegible] | [illegible] | 2234 | [illegible] | | | | |
| [illegible] | [illegible] | [illegible] | [illegible] | | | | |
| [illegible] | [illegible] | | | | | | |
| [illegible] | 281 | [illegible] | [illegible] | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | [illegible] | 2767 | [illegible] | | |
| [illegible] | [illegible] | 74 | [illegible] | 290 | 1050 | 1263 | |
| [illegible] | [illegible] | [illegible] | 1264 | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | 1086 | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | 1247 | 1256 | [illegible] | [illegible] | 2852 |
| | | [illegible] | | | | | |
| [illegible] | [illegible] | [illegible] | [illegible] | | | | |
| [illegible] | [illegible] | [illegible] | [illegible] | 1056 | [illegible] | [illegible] | [illegible] |
| | | [illegible] | [illegible] | | | | |
| [illegible] | [illegible] | [illegible] | | | | | |
| [illegible] | [illegible] | [illegible] | [illegible] | [illegible] | | | |
| PROBX | [illegible] | 464 | [illegible] | 1866 | 1882* | 2819 | |
| [illegible] | 453 | [illegible] | [illegible] | | | | |
| [illegible] | [illegible] | 1092 | | | | | |
| [illegible] | [illegible] | [illegible] | 960 | 1094 | [illegible] | 2828 | 2838 |
| [illegible] | 79 | | | | | | |
| [illegible] | [illegible] | | | | | | |
| [illegible] | 263 | [illegible] | | | | | |
| [illegible] | [illegible] | [illegible] | | | | | |
| [illegible] | [illegible] | [illegible] | | | | | |
| [illegible] | [illegible] | 2856 | 2869* | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | [illegible] | | | | | |

| | | | | | | | |
|---|---|---|---|---|---|---|---|
| [illegible] | 2602 | 2631* | | | | | |
| [illegible] | 2605 | 2633* | | | | | |
| [illegible] | 2642 | 2644* | | | | | |
| [illegible] | 2467* | | | | | | |
| [illegible] | 791 | 2795* | | | | | |
| [illegible] | 569* | 651 | 662 | 669 | 691 | 731 | 1379 |
| | | 2789 | 2871 | | | | |
| [illegible] | 2136* | 2279 | 2751 | | | | |
| [illegible] | 615 | 613* | | | | | |
| [illegible] | 1035 | 194 | 797 | 1860 | 1888 | | |
| [illegible] | 106 | | | | | | |
| [illegible] | 1058 | 100 | 623 | 688 | 695 | 1887 | 1920 |
| [illegible] | 156 | 470* | | | | | |
| [illegible] | 153* | 605 | 978 | 1294 | 1809 | | |
| [illegible] | 147* | | | | | | |
| [illegible] | [illegible] | 2652* | | | | | |
| [illegible] | 2554* | 2546 | 2606 | | | | |
| [illegible] | 772* | 610 | 660 | | | | |
| [illegible] | 625 | 766* | | | | | |
| [illegible] | 2518 | 2612* | | | | | |
| [illegible] | 2674 | 2677 | | | | | |
| [illegible] | 2616 | 2621 | 2647 | 2663 | 2667 | 2676 | 2686* |
| [illegible] | 2767 | 2735 | 2740* | | | | |
| [illegible] | [illegible] | 2744* | | | | | |
| [illegible] | 2717* | | | | | | |
| [illegible] | 2529 | 2530* | | | | | |
| [illegible] | 2714 | 2721* | | | | | |
| [illegible] | 2727* | 2751 | | | | | |
| [illegible] | 2578 | 2691 | 2741 | | | | |
| [illegible] | [illegible] | 96 | 2665 | | | | |
| [illegible] | 96 | | | | | | |
| [illegible] | 265 | 67 | 1060 | 1957 | 2714 | | |
| [illegible] | [illegible] | 2542 | [illegible] | | | | |
| [illegible] | [illegible] | | | | | | |
| [illegible] | 2539* | 2542 | 2561 | | | | |
| [illegible] | 2728 | 2741* | | | | | |
| [illegible] | 2581* | 2586 | 2687 | 2772 | | | |
| [illegible] | 2585 | 2594* | | | | | |
| [illegible] | [illegible] | 2779 | | | | | |
| [illegible] | [illegible] | 2570* | | | | | |
| [illegible] | [illegible] | 2571* | | | | | |
| [illegible] | [illegible] | [illegible] | | | | | |
| [illegible] | [illegible] | [illegible] | | | | | |
| [illegible] | [illegible] | [illegible] | | | | | |
| [illegible] | [illegible] | 2573 | | | | | |
| [illegible] | [illegible] | [illegible] | | | | | |
| [illegible] | [illegible] | 2534 | | | | | |
| [illegible] | [illegible] | [illegible] | 2673 | | | | |
| [illegible] | [illegible] | | | | | | |
| [illegible] | [illegible] | | | | | | |
| [illegible] | 722 | 724 | 727* | | | | |
| [illegible] | 591* | | | | | | |
| [illegible] | 679 | 703* | | | | | |
| [illegible] | 1325* | 1953 | 1646 | | | | |
| [illegible] | 964* | 1420 | | | | | |
| [illegible] | 1354* | 1967 | | | | | |
| [illegible] | 1853 | 1375* | | | | | |
| [illegible] | 1857 | 1856* | 2068 | | | | |
| [illegible] | [illegible] | 1627* | | | | | |
| [illegible] | 93* | 94 | 564 | 1061 | 1827 | | |
| [illegible] | 3 | | | | | | |
| [illegible] | 63 | 694* | | | | | |
| [illegible] | 606 | 713* | | | | | |
| [illegible] | 722 | [illegible] | | | | | |
| [illegible] | 723 | [illegible] | | | | | |
| [illegible] | 142* | | | | | | |
| [illegible] | 662* | 675 | | | | | |
| [illegible] | 542 | 547 | 552 | 554 | 555 | 556 | 559 |
| | | 699* | 678 | 707 | 711 | 726 | 820 |
| | | 1415 | 1632 | 1825 | 2339 | | |
| [illegible] | 135* | 1149 | 2849 | | | | |
| [illegible] | 99* | 190 | 942 | 1131 | 2609 | | |
| [illegible] | 152* | | | | | | |
| [illegible] | 685* | 656 | 663 | 670 | 677 | | |
| [illegible] | 316* | 576 | 1381 | 1793 | | | |
| [illegible] | 467 | 605 | 678 | 908 | 1162 | 1325* | 2854 |
| [illegible] | 1156 | 1340* | 1846 | 2810 | 2867 | | |
| [illegible] | 967 | 1339* | 1860 | | | | |
| [illegible] | 1327* | | | | | | |
| [illegible] | [illegible] | 1342* | | | | | |
| [illegible] | 342* | | | | | | |
| [illegible] | 362* | | | | | | |
| [illegible] | 552* | 625 | | | | | |
| [illegible] | 96* | 97 | 1327 | 1346 | 1835 | | |
| [illegible] | 1578* | | | | | | |
| [illegible] | 267 | 1356* | | | | | |
| [illegible] | 1243 | 1367 | 1456* | 1811 | 1838 | | |
| [illegible] | [illegible] | 94 | 1526 | 1426 | | | |
| [illegible] | 1126 | 1623* | | | | | |
| [illegible] | 1474 | 1471 | 1951 | | | | |
| [illegible] | 1052 | 1191 | | | | | |
| [illegible] | 265 | 1321 | 1117* | | | | |
| [illegible] | 235* | 1417 | | | | | |
| [illegible] | 1262 | 1187 | | | | | |
| [illegible] | 237* | 1204 | | | | | |
| [illegible] | 91* | 92 | 362 | 1037 | 1397 | | |
| [illegible] | 92 | 1507 | | | | | |
| [illegible] | 257 | 1872* | | | | | |
| [illegible] | [illegible] | 654 | 1892* | | | | |
| [illegible] | 1434 | 711 | 1030 | 1223 | 2622 | | |
| [illegible] | 1477 | 10 | 454 | 822 | 836 | 1214 | 1239 |
| | | 1217 | 1255 | 1261 | 1264 | 1322 | 1331 |
| | | 1662 | 1687 | 2024 | 2016 | 2107 | 2200 |
| | | 2209 | 2229 | 2260 | 2276 | 2304 | 2345 |
| | | 2327 | 2306 | 2472 | | | |
| [illegible] | 106* | 197 | 463 | 490 | 2844 | 2855 | |
| [illegible] | 107 | 108 | 1261 | 1268 | 2473 | | |
| [illegible] | 57* | | | | | | |

```
                  ;
                          TITLE   MODEL 6500 PRINTER PROGRAM
                  ; PEPPRF - PRINTER
                  ; ASSEMBLY ORGANIZATION FOR PRINTER MAINLINE
                  ; AUXILIARY INTERPOSER VERSION
                  ;
                  ; ******************************************************
                  ; *                                                    *
                  ; *      COPYRIGHT 1979        PITNEY BOWES INCORPORATED *
                  ; *                                                    *
                  ; ******************************************************
                  ;
                  ; CHECKPOINT #2          SAME OBJECT CODE AS OCTOBER 4, 1979
                  ; OBJECT CODE PERTAINS TO INTEL 8048 SERIES MICROPROCESSORS
                  ;
                          INCLUDE DP2:EQUIV
                  ;
                  ; EQUIV - PRINTER
                  ; EQUIVALENCES
                  ;
                  ; RAM LOCATIONS
   0020           POSTH    EQU    20H     ; 'POSTAGE IS' HEADER
   0021           POSTB    EQU    21H     ; CURRENT POSTAGE (3)
   0124           DATEH    EQU    24H     ; 'DATE IS' HEADER          (X)
   0025           DATEB    EQU    25H     ; CURRENT DATE (3)          (X)
   0025           TEMP     EQU    28H     ; SCRATCH LOCATIONS (8)     (X)
```

```
0030          DELTA   EQU   30H      ; POSTAGE CHANGES (6)
0036          STATH   EQU   36H      ; STATUS HEADER
0037          STATUS  EQU   37H      ; STATUS
0038          DSTAH   EQU   38H      ; DIAGNOSTIC STATUS HEADER
0039          FESTA   EQU   39H      ; FATAL ERROR STATUS
003A          FISTA   EQU   3AH      ; FATAL ERROR INFORMATION      (X)
003B          DISTA   EQU   3BH      ; DISABLE STATUS
003C          INH     EQU   3CH      ; INPUT HEADER
003D          INB     EQU   3DH      ; INPUT BUFFER (3)
                      ;
                      ; (X) = NOT USED AT PRESENT
                      ;
                              PAGE
                              ORG    0
                      ; PAGE 0 CONTAINS INITIALIZATION, MAINLINE, SCHEDULER & SENSOR HANDLERS

                              INCLUDE DM2:INIT

                      ; INIT - [illegible]
                      ; [illegible] INITIALIZATION
                      ; STACK LEVELS NEEDED = 5, IF NO ERROR

                      ; INITIALIZE [illegible] HEADERS AND START TIMER (15 CYCLES = 62.[illegible]
              B8 36   INIT:   MOV   R0,#STATH        ; INITIALIZE STATUS HEADER
              B0 [illegible]  MOV   @R0,#050H
              18              INC   R0               ; POINT TO STATUS
              B0 00           MOV   @R0,#00
              B8 38           MOV   R0,#DSTAH        ; INITIALIZE DIAGNOSTIC STATUS HEADER
              B0 [illegible]  MOV   @R0,#[illegible]0H
              18              INC   R0               ; POINT TO FATAL ERROR STATUS
              B0 93           MOV   @R0,#93H         ; INITIALIZE
005E          55              STRT  T                ; START TIMER
                      ;
                      ; GET SHUTTER HOME AND INTERPOSER DOWN (71 CYCLES = 297.52 US. MIN.)
              BA [illegible]  MOV   R2,#[illegible]  ; 107 CYCLES = 448.[illegible]8 US. PER COUNT. TOTAL 49.32 MS
              [illegible]     INIT1:  CALL  SENSE    ; (64 CYCLES = 268.19 US.)
              [illegible]             CPL   A
              F2 [illegible]          JB7   INIT1    ; JUMP IF SHUTTER END. = LIGHT = LOW ON CPU PIN 19
              [illegible] 22          JB[illegible] INIT2 ; JUMP IF INTERPOSER DOWN = LIGHT = LOW ON CPU PIN [illegible]
              [illegible] 37          CALL  DL150    ; (36 CYCLES = 150.86 US.)
              [illegible]             DJNZ  R2,INIT1 ; JUMP IF MIN. TIME NOT UP
              [illegible]             CALL  FREEZE   ; SET AUXILIARY INTERPOSER
              [illegible]     INIT2:  MOV   R1,#85H  ; ERROR "INTERPOSER DIDN'T FALL"
              [illegible]             JMP   ERROR
                      ;
                      ; INITIALIZE MOTORS TO HOME POSITION (17649 CYCLES = 73[illegible]2.[illegible]00 [illegible])
              [illegible]     INIT3:  MOV   A,#0EDH ; (238.)
              39                      OUTL  P1,A     ; POWER MOTORS
              [illegible]             MOV   R0,A     ; WAIT 74 MS.
              [illegible]     MS74:   CALL  DL300    ; (72 CYCLES = 301.71 US. PER CALL)
              [illegible]             DJNZ  R0,MS74
              [illegible]             ORL   P1,#0FFH         ; UNPOWER MOTORS
                      ;
                      ; INITIALIZE SWITCHES (35 CYCLES = 146.67 US.)
              [illegible]             CALL  SWITCH   ; CHECK "OPAK", READ SWITCHES
              [illegible]             MOV   R6,A     ; STORE OSW
              [illegible]             CPL   A
              [illegible]             MOV   R0,#STATUS        ; POINT TO STATUS
              [illegible]             MOV   @R0,A    ; INITIALIZE SWITCH STATUS
              [illegible]             MOV   R0,#DISTA         ; POINT TO [illegible] STATUS
              [illegible]             MOV   @R0,A    ; STORE SWITCH INFO
                      ;
                      ; INITIALIZE SENSORS (69 CYCLES = 289.14 [illegible])
              [illegible] 06          CALL  SENSE    ; READ SENSORS
              [illegible]             MOV   R7,A     ; STORE OSENS
0039          53 10                   ANL   A,#10H   ; LOOK AT BIT 4 OF NEW SENSORS (HOME)
003B          40                      ORL   A,@R0    ; "OR" INTO STATUS
003C          A0                      MOV   @R0,A    ; RESTORE STATUS
                      ;
                      ; INITIALIZE PRINT WHEELS (11.6 CYCLES = 48.61 US. UNTIL RTS
003D          [illegible] 23          CALL  SSTAT    ; SEND STATUS TO ACCOUNTING
003F          34 51                   CALL  CHECK    ; WAIT FOR RTS AND RECEIVE MESSAGE
0041          54 B0                   CALL  IPOST    ; INITIALIZE PRINT WHEELS
                      ;
0043                  ZINIT   EQU   $-INIT
                      ;
                              PAGE
                              INCLUDE DM2:MAINF
                      ;
                      ; MAINF - PSP PRINTER MAINLINE (FIRST HALF)
                      ; STEADY-STATE LOOP
                      ; STACK LEVELS NEEDED = 4
                      ;
0043          09      MAN1:   IN    A,P1     ; MODULATE DIGIT MOTOR - 2 MS. ON = 1/4 POWER
0044          D3 01           XRL   A,#1     ; INVERT BIT 0
0046          39              OUTL  P1,A     ; RESTORE NEW MOTOR IMAGE
                      ;
0047          14 BE           CALL  SWITCH   ; READ SWITCHES
0049          2E              XCH   A,R6     ; SAVE NEW IN OSW
004A          DE              XRL   A,R6     ; LOOK AT CHANGES ONLY
004B          C6 62           JZ    MAN3     ; JUMP IF NO CHANGE
                      ;
004D          25 3B           MOV   R0,#3BH  ; CLEAR BITS 6 & 7 OF DISABLE STATUS
004F          74 2B           CALL  ENABL
0051          FE              MOV   A,R6     ; PUT NEW BITS IN 6 & 7 OF DISABLE STATUS
0052          C6 58           JZ    MAN2     ; IF ALL ARE OFF, CONTINUE
0054          43 08           ORL   A,#8H    ; IF ANY ARE ON, MAKE SURE WE NEED REPLY FROM ACCT.
0056          54 52           CALL  ESABL    ; DISABLE AS REQUIRED
0058          B8 37   MAN2:   MOV   R0,#STATUS        ; POINT TO STATUS
005A          F0              MOV   A,@R0    ; GET STATUS
005B          53 3F           ANL   A,#3FH   ; CLEAR BITS 6 & 7
005D          [illegible]     ORL   A,R6     ; INSERT NEW BITS
005E          A0              MOV   @R0,A    ; RESTORE
              [illegible]     SEL   RB0
              [illegible] 23  CALL  SSTAT    ; SEND NEW STATUS AND RETURN
                      ;
0062          C5      MAN3:   SEL   RB0
                      ;
0063          14 0D           CALL  SENSE    ; READ OPTICS
0065          2F              XCH   A,R7     ; SAVE NEW IN OSENS
              DF              XRL   A,R7     ; LOOK AT CHANGES ONLY
0067          [illegible]     JZ    [illegible] ; JUMP IF NO CHANGE
                      ;
[illegible]           ZMAIN   EQU   $-[illegible]
                      ;
                              PAGE
                              INCLUDE DM2:SHDLF
                      ;
                      ; SHDLF - PRINTER
                      ; SENSOR HANDLER
                      ; STACK LEVELS NEEDED = 4
                      ;
                      ; TIMING: MIN. TO RETURN (NO COMM.) = 22 CYCLES = 92.190 US.
                      ;         MAX. TO CTS IF RTS IS ON = 84 CYCLES = 352.000 US.
                      ;
                      ; STEPPER ENCODERS
0069          A9      SHDL:   MOV   R1,A     ; SAVE CHANGES IN R1
006A          53 0F           ANL   A,#0FH   ; LOOK AT ENCODERS ONLY
006C          C6 72           JZ    SHDL1    ; ERROR IF ENCODERS MOVED
006E          B9 [illegible]  MOV   R1,#[illegible]H
0070          24 [illegible]  JMP   ERROR    ; ENCODERS MOVED WHEN ILLEGAL
                      ;
                      ; JUMP BASED ON CHANGES
0072          F9      SHDL1:  MOV   A,R1     ; RESTORE CHANGES
0073          53 F0           ANL   A,#0F0H  ; LOOK AT NON-ENCODERS
0075          47              SWAP  A        ; PUT IN LOW ORDER
0076          [illegible]     [illegible] A,@A ; TRANSLATE
0077          72 7[illegible] JB3   SHOME    ; HOME CHANGED
0079          92 [illegible]  JB4   SHTN     ; SHUTTER OR INTERPOSER CHANGED
```

```
007D   [illegible]          MOV     R1,#62H
007F   24 A6                JMP     ERROR     ; INVALID CHANGE PATTERN
                    ;
                    ; HOME POSITION CHANGED
0071   FF           SHOME:  MOV     A,R7      ; LOOK AT DATA
0072   37                   CPL     A         ; HOME = 1 IF ON NOW
0073   53 [illegible]       ANL     A,#05     ; LOOK AT HOME ONLY
0075   [illegible]          JNZ     [illegible]  ; IF ON, RETURN
0077   F0                   MOV     A,@R0     ; BOTH OFF, GET STATUS
0078   [illegible]          JB[illegible]  [illegible]  ; RETURN IF ALREADY TRIPPED
007A   [illegible]          ORL     A,#[illegible]  ; NOT TRIPPED, TRIP METER
007C   A0                   MOV     @R0,A     ; RESTORE STATUS
007D   23 20                MOV     A,#20H    ; SET TRIP DISABLE BIT
007F   54 B2                CALL    [illegible]  ; [illegible] METER
0081   [illegible]          JMP     [illegible]  ; SEND STATUS AND RETURN
                    ;
                    ; SHUTTER AND/OR INTERPOSER CHANGED
[illegible]  F0     S[illegible]:  MOV  A,@R0  ; GET STATUS
[illegible]  53 C3          ANL     A,#0C3H   ; CLEAR BITS 2-5
[illegible]  4A             ORL     A,R2      ; PUT IN NEW DATA (CLEAR TRIP)
[illegible]  A0             MOV     @R0,A     ; RESTORE STATUS
[illegible]  [illegible] 25  S[illegible]2:  [illegible]  [illegible]  ; SEND STATUS AND RETURN
                    ;
[illegible]         ZS[illegible]  EQU  $-[illegible]
                    ;
                            PAGE

                            INCLUDE DM2:INTR

                    ; INTRF - COUNTER
                    ; CHECK INTERPOSER IN MAINLINE SCHEDULER
                    ; STACK LEVELS NEEDED = 0
                    ;
                    ; TIMING, IF NO ERROR -
                    ;    MINIMUM - 4 CYCLES = 16.762 US.
                    ;    AVERAGE - 16 CYCLES = 67.043 US.
                    ;    MAXIMUM - 20 CYCLES = 83.809 US.
                    ;
                    ; DECREMENT COUNTER IF SHUTTER HOME AND COUNT NOT ALREADY ZERO.
0093   FF           INTRF:  MOV     A,R7      ; LOOK AT SENSOR IMAGE
0094   37                   CPL     A         ; SHUTTER FORWARD NOW = 1
0095   12 AB                JB0     MAN4      ; RETURN IF SHUTTER FORWARD
0097   95                   SEL     RB1       ; SHUTTER IS HOME
0098   FA                   MOV     A,R2      ; LOOK AT COUNTER
0099   C6 A2                JZ      INTR2     ; CONTINUE IF ZERO
009B   EA AB                DJNZ    R2,INTR3        ; NOT ZERO; DECREMENT, RETURN IF NOW NOT ZERO
                    ;
                    ; COUNTER IS ZERO, ERROR IF INTERPOSER UP AND CONTROL DISABLED.
00A2   C5           INTR2:  SEL     RB0
00A3   0A                   IN      A,P2      ; LOOK AT CONTROL LINE
00A4   37                   CPL     A         ; POWER TO INTERPOSER NOW = 1
00A5   F2 AB                JB7     MAN4      ; RETURN IF NOT DISABLED
00A7   FF                   MOV     A,R7      ; LOOK AT SENSOR IMAGE AGAIN
00A8   92 1E                JB4     INIT2     ; ERROR IF INTERPOSER UP
00AA   C5           INTR3:  SEL     RB0       ; RETURN
                    ;
0013                ZINTRF  EQU     $-INTRF
                    ;
                            PAGE
                            INCLUDE DM2:MAIN2
                    ;
                    ; MAIN2 - PRINTER
                    ; CONTINUATION OF PEP PRINTER MAINLINE STEADY-STATE LOOP
                    ; STACK LEVELS NEEDED = 4
                    ;
                    ; TIMING: 5 CYCLES = 20.952 US. IF NO ACTIVITY
                    ;         37 CYCLES = 155.048 US. TO CTS IF RTS IS ON
                    ;         1.6 CYCLES = 6.7[illegible]5 US. TO END AFTER RTS FALSE TEST
                    ;
00AB   FB           MAN4:   MOV     A,R3      ; IS A RECEIVED MESSAGE QUEUED?
00AC   96 B6                JNZ     MAN6      ; JUMP IF SO.
00AE   56 40                JT1     MAN1      ; NO Q, JUMP IF RTS IS OFF TOO
00B0   24 53                CALL    CHECK     ; RTS, GET MESSAGE
00B2   54 C0        MAN5:   CALL    HDR       ; PARSE HEADER
00B4   04 40                JMP     MAN1      ; LOOP BACK
                    ;
00B6   07           MAN6:   DEC     A         ; WAS MORE THAN 1 MESSAGE QUEUED?
00B7   AB                   MOV     R3,A      ; RESTORE Q INDICATOR
00B8   C6 B2                JZ      MAN5      ; Q WAS 1, PARSE HEADER
00BA   B9 61                MOV     R1,#61H
00BC   24 AB                JMP     ERROR     ; INCOMING MESSAGE OVERLAID
                    ;
0013                ZMAIN2  EQU     $-MAN4
                    ;
                            PAGE
                            INCLUDE DM2:SWITCH
                    ;
                    ; SWITCH - PRINTER
                    ; READ SWITCHES, CHECK FOR INPUTS STUCK ON.
                    ; STACK LEVELS NEEDED = 0
                    ;
                    ; MAKE SURE LED'S HAVE BEEN OFF FOR 1 MS. BEFORE READING
                    ; ON RETURN, RB1 IS SELECTED
                    ;            A = STATUS EQUIVALENT OF SWITCHES
                    ; TIMING = 27 CYCLES INCLUDING CALL = 113.14 US. IF NO WAIT.
                    ;
00BE   16 C2        SWITCH: JTF     SWIT1     ; JUMP IF TIMER FLAG IS SET
00C0   04 BE                JMP     SWITCH    ; NOT SET, WAIT
                    ;
00C2   08           SWIT1:  INS     A,BUS     ; READ INPUT
00C3   37                   CPL     A         ; SHOULD BE 0 AFTER COMPL.
00C4   96 D5                JNZ     SWIT2     ; ERROR, IF NOT
                    ;
00C6   9A DF                ANL     P2,#0DFH        ; TURN ON SWITCHES
00C8   08                   INS     A,BUS     ; READ
00C9   8A 20                ORL     P2,#020H        ; TURN OFF SWITCHES
                    ;
00CB   53 F0                ANL     A,#0F0H   ; CLEAR LOW ORDER BITS
00CD   47                   SWAP    A         ; PUT DATA IN LOW ORDER
00CE   E3                   MOVP3   A,@A      ; TRANSLATE
00CF   B2 D9                JB5     SWIT3     ; ERROR IF BIT 5 IS ON
00D1   53 C0                ANL     A,#0C0H   ; CLEAR LOW ORDER 6 BITS
00D3   D5                   SEL     RB1
00D4   83                   RET               ; RETURN
                    ;
00D5   B9 61        SWIT2:  MOV     R1,#61H
00D7   24 AB                JMP     ERROR     ; STUCK ON
00D9   B9 62        SWIT3:  MOV     R1,#62H
00DB   24 A6                JMP     ERROR     ; ILLEGAL SWITCH PATTERN
                    ;
001F                ZSWITC  EQU     $-SWITCH

                            PAGE
                            INCLUDE DM2:SENSE
                    ;
                    ; SENSE - PRINTER
                    ; READ OPTICAL SENSORS
                    ; STACK LEVELS NEEDED = 2
                    ;
                    ; AFTER CALLING, WAIT AT LEAST 1 MS. BEFORE READING SWITCHES, OR 'DARK'
                    ; ON RETURN, A  = SENSOR READINGS
                    ;            R0 = ADDRESS OF STATUS
                    ;            R2 = TRANSLATED STATUS INFORMATION
                    ; TIMING = 64 CYCLES = 268.19 US. INCLUDING CALL.
                    ;
00DD   9A BF        SENSE:  ANL     P2,#0BFH        ; TURN ON OPTICS
00DF   54 A7                CALL    DL150     ; 36 CYCLES = 150.86 US.
                    ; 177.66 US. FROM TURNON UNTIL SENSORS READ
00E1   23 F3                MOV     A,#243.   ; 2 MS. LOOP; 1716 US. FROM TURNOFF TO FLAG SET
```

```
                                            13 COUNTS = 416 CYCLES = 1743.238 US.
00E3   62               ;       MOV     T,A        ; RESET TIMER COUNTER
00E4   16 E6                    JTF     $+2.       ; RESET FLAG IF ON
00E6   06                       INS     A,BUS      ; READ OPTICS
00E7   8A 40                    ORL     P2,#040H         ; TURN OFF OPTICS
                        ;
00E9   A8                       MOV     R0,A       ; SAVE READING
00EA   53 F0                    ANL     A,#0F0H    ; LOOK AT 4 NON-ENCODER BITS
00EC   17                       INC     A          ; POINT TO 2ND 16 BYTES - PAGE 3
00ED   47                       SWAP    A
00EE   E3                       MOVP3   A,@A       ; TRANSLATE
00EF   12 F6                    JB0     SENS1      ; BIT 0=1 IF ILLEGAL PATTERN
00F1   AA                       MOV     R2,A       ; SAVE NEW PATTERN FOR STATUS
00F2   F8                       MOV     A,R0       ; RESTORE READING
00F3   B8 37                    MOV     R0,#STATUS       ; POINT TO STATUS (FOR LATER)
00F5   83                       RET                ; RETURN
                        ;
00F6   B9 63            SENS1:  MOV     R1,#63H
00F8   24 AB                    JMP     ERROR      ; ILLEGAL SENSOR COMBINATION
                        ;
001D                    ZSENSE  EQU     $-SENSE
                        ;
0006                    P0FRSE  EQU     100H-$     ; FREE SPACE AT END OF PAGE 0.
                                PAGE
                        ;
0130                            ORG     100H
                        ; PAGE 1 CONTAINS COMMUNICATION ROUTINES AND ERROR HANDLER
                        ;
                                INCLUDE DM2:COUTF
                        ;
                        ; COUTF - PRINTER
                        ; PRINTER TRASMITTER ROUTINE
                        ; STACK LEVELS NEEDED = 3 IF NO ERROR
                        ;
                        ; IN CONTENTION, TIME INCL. CALL, TO CTS:
                        ;       MIN. = 35.8 CYCLES = 150.019 US.
                        ;       MAX. = 37 CYCLES = 155.048 US.
                        ;
                        ; OPERATES IN RB0; A,R0,R1,R2 DESTROYED, R5 MODIFIED
                        ; R1 - ADDRESS-1
                        ; R2 - BYTE COUNT
                        ; ON NORMAL RETURN: R2 = 0
                        ;                   R1 POINTS TO LAST BYTE
                        ;                   R0 = 0
                        ;                   A  = GARBAGE
                        ;                   R5 = COUNT OF RECEIVED MESSAGES QUEUED
                        ;
0100   1D               COUT1:  INC     R5         ; RTS, INCREMENT Q
0101   34 53                    CALL    CRECV      ; INPUT MESSAGE
0103   46 00            COUT:   JNT1    COUT1      ; ENTRY - JUMP IF RTS IS ON (T1 = 14.248 US. MAX.)
0105   9A EF                    ANL     P2,#0EFH         ; OUTPUT RTS
0107   B8 FC                    MOV     R0,#252.         ; TIME OUT FOR 23.24 MS. (T13)
0109   34 94            COUT2:  CALL    DEL18      ; WAIT 92.19 US. (LOOP TIME)
010B   46 15                    JNT1    COUT4      ; JUMP IF CTS IS ON
010D   E8 09                    DJNZ    R0,COUT2         ; TRY AGAIN IF TIME IS NOT UP
010F   B9 31                    MOV     R1,#31H
0111   24 AB                    JMP     ERROR      ; TIME UP, FATAL ERROR
                        ;
0113   34 47            COUT3:  CALL    TEST1      ; NOT LAST BYTE, OUTPUT INT. STOP, CHECK 8TH BIT ECHO
0115   34 92            COUT4:  CALL    DEL19      ; IF FIRST BYTE, T4 = 171.79 US.; IGNORE NEXT 3 COMMENTS
0117   56 B7                    JT1     CEROR      ; TEST INTERMEDIATE STOP BIT ECHO
0119   19                       INC     R1         ; POINT TO NEXT BYTE
011A   34 9A                    CALL    DEL12      ; T5 = 1135.619 US.
011C   F1                       MOV     A,@R1      ; GET NEXT BYTE
011D   B8 08                    MOV     R0,#8.     ; COUNT FOR 8 BITS
011F   97                       CLR     C          ; SET CARRY TO START BIT ECHO
0120   8A 10                    ORL     P2,#10H    ; OUTPUT 'START' EDGE
0122   34 9L                    CALL    DEL11
0124   34 9E            COUT5:  CALL    DEL8
0126   12 3F                    JB0     COUT7      ; JUMP IF NEXT BIT IS 1.
0128   34 45                    CALL    TEST0      ; OUTPUT 0 AND CHECK PREVIOUS ECHO
012A   67               COUT6:  RRC     A          ; MOVE CURRENT BIT TO C, NEXT BIT TO B0
012B   E8 24                    DJNZ    R0,COUT5         ; LOOP IF 8 BITS ARE NOT DONE
012D   34 9                     CALL    DEL8
012F   EA 13                    DJNZ    R2,COUT3         ; JUMP IF NOT LAST BYTE
0131   34 45                    CALL    TEST0      ; LAST BYTE, OUTPUT EOM STOP BIT, CHECK 8TH BIT ECHO
0133   34 95                    CALL    DEL17
0135   46 B7                    JNT1    CEROR      ; TEST EOM STOP BIT ECHO
0137   9A EF                    ANL     P2,#0EFH         ; TURN ON 'NO ERROR' PULSE (T6 = 1064.381 US.)
0139   14 A3                    CALL    DL300      ; T7 = 310.09 US.
013B   8A 10                    ORL     P2,#10H    ; TURN OFF 'NO ERROR' PULSE
013D   24 A5                    JMP     DL225      ; T14 = 1601.599 US. ; RETURN
                        ;
013F   34 47            COUT7:  CALL    TEST1      ; OUTPUT 1 AND CHECK PREVIOUS ECHO
0141   24 2A                    JMP     COUT6      ; RETURN TO LOOP
                        ;
0143   8A 10            TEST0:  ORL     P2,#10H    ; OUTPUT DATA ZERO
0145   24 49                    JMP     TEST11
                        ;
0147   9A EF            TEST1:  ANL     P2,#0EFH         ; OUTPUT DATA 1
0149   56 4E            TEST11: JT1     COUT8      ; JUMP IF LAST ECHO = 0
014B   E6 B7                    JNC     CEROR      ; ECHO = 1, ERROR IF CARRY = 0
014D   83                       RET
                        ;
014E   F6 B7            COUT8:  JC      CEROR      ; ECHO = 0, ERROR IF CARRY = 1
0150   83                       RET
                        ;
0051                    ZCOUT   EQU     $-COUT1
                        ;
                                PAGE
                                INCLUDE DM2:CRECVF
                        ;
                        ; CRECVF - PRINTER
                        ;     66 (DEC) BYTES
                        ;
                        ; CALL CRECV - SUBROUTINE TO RECEIVE COMMUNICATIONS INPUT
                        ; STACK LEVELS NEEDED = 2 IF NO ERROR
                        ;
                        ; TIMING, INCL. CALL, TO CTS:
                        ;       MIN.   30.8 CYCLES = 129.067 US.
                        ;       MAX. = 32 CYCLES = 134.095 US.
                        ;
                        ; OPERATES IN RB0 OR RB1
                        ; A & R0 ARE DESTROYED
                        ; INPUTS VARIABLE NUMBER OF BYTES STARTING AT RAM LOCATION 'INB'
                        ; INPUT BUFFER GOES FROM INB TO RAM BYTE 63 (3FH)
                        ; ASSUMES RTS IS ON AT ENTRY; ALSO ALL SENSORS ARE DISABLED
                        ; NOTE - NO T13 TIMEOUT, INTERPOSER IS USED INSTEAD
                        ; F1 = 1 WHEN INTERPOSER WAS ENABLED (P2B7=0) UPON ENTRY
                        ; ON NORMAL RETURN, A CONTAINS LAST BYTE RECEIVED
                        ;                   R0 POINTS TO LAST BYTE RECEIVED (IN RAM)
                        ;
                        ; CALL CRECS - ALTERNATE ENTRY POINT
                        ; WAIT FOR RTS BEFORE RECEIVING MESSAGE
                        ;
0151   56 51            CRECS:  JT1     $          ; WAIT FOR RTS
0153   0A               CRECV:  IN      A,P2       ; READ INTERPOSER CONTROL STATUS
0154   A5                       CLR     F1         ; SET FLAG TO 'DISABLE'
0155   F2 59                    JB7     CREV1      ; IF BIT 7 IS 1, LEAVE FLAG 'DISABLED'
0157   B5                       CPL     F1         ; IF BIT 7 IS 0, SET FLAG TO 'ENABLE'
0158   B8 CB            CREV1:  MOV     R0,#(INB-1)       ; POINT TO INPUT BUFFER-1.
015A   34 93                    CALL    DEL19      ; T3 = 127.377 US. MIN.
015C   53 EF            CREV2:  ANL     A,#0EFH    ; OUTPUT CTS OR INT. STOP BIT ECHO, DROP I'POSEL
015E   3A                       OUTL    P2,A
015F   46 5F                    JNT1    $          ; WAIT FOR L.E. OF START PULSE
0161   76 65                    JF1     CREV3      ; IF FLAG IS 1, ENABLE METER
0163   24 67                    JMP     CREV4      ; FLAG = 0, LEAVE METER DISABLED
0165   9A 7F            CREV3:  ANL     P2,#7FH    ; ENABLE METER
0167   18               CREV4:  INC     R0         ; MOVE BUFFER POINTER
0168   F8                       MOV     A,R0       ; TEST IF POINTER PAST BUFFER END
```

```
0169  D2 8F              JB6     CREV8    ; ERROR - TOO MANY BYTES
016B  8A 10              ORL     P2,#10H  ; ECHO 'START' AT CENTER OF BIT
016D  97                 CLR     C        ; CLEAR INCOMING DATA BIT
016E  00                 NOP              ; (DOUBLE NOP FOR BALANCE)
016F  23 80              MOV     A,#80H   ; INITIALIZE ACCUMULATOR
0171  34 96     CREV5:   CALL    DEL16
0173  56 88              JT1     CREV7    ; JUMP IF DATA = 0
0175  9A EF              ANL     P2,#0EFH        ; ECHO '1'
0177  A7                 CPL     C        ; SET INCOMING BIT
0178  00                 NOP              ; (BALANCE)
0179  67        CREV6:   RRC     A        ; MOVE NEW DATA TO ACCUMULATOR
017A  E6 71              JNC     CREV5    ; JUMP IF BYTE NOT DONE
017C  A0                 MOV     @R0,A    ; DONE, SAVE BYTE
017D  34 95              CALL    DEL14
017F  46 5C              JNT1    CREV2    ; JUMP IF STOP BIT IS NOT EOM
0181  8A 10              ORL     P2,#10H  ; ECHO EOM STOP
0183  [illegible]        CALL    DL300    ; TH = 1291.919 US.
0185  [illegible]        JNT1    DL300    ; JUMP IF 'NO ERROR' PULSE; T15 = 1391.116 US.; RETURN
                ;
0187  74 80     CE80R:   CALL    FREEZE   ; SET AUXILIARY INTERPOSER
0189  24 [illegible]     JMP     $        ; TRAP
                ;
018B  8A 10     CREV7:   ORL     P2,#10H  ; ECHO DATA 0
018D  24 79              JMP     CREV6
                ;
018F  B9 54     CREV8:   MOV     R1,#54H
0191  24 [illegible]     JMP     ERROR    ; MORE THAN BUFFER CAPACITY RECEIVED
                ;
0042            ZCHECK   EQU     $-CHECK
                ;
                         PAGE
                         INCLUDE DM2:DELAY
                ;
                ; DELAY - PRINTER
                ;
                ; SMALL TIMING DELAYS - 16 (DEC) BYTES
                ; DELAYS INCLUDE CALL, AND APPLY TO 3.58 MHZ. TV CRYSTAL
                ; STACK LEVELS NEEDED = 0
                ;
0193  00        DEL19:   NOP              ; 79.62 US.
0194  00        DEL18:   NOP              ; 75.43 US.
0195  00        DEL17:   NOP              ; 71.24 US.
0196  00        DEL16:   NOP              ; 67.05 US.
0197  00        DEL15:   NOP              ; 62.86 US.
0198  00        DEL14:   NOP              ; 58.67 US.
0199  00        DEL13:   NOP              ; 54.48 US.
019A  00        DEL12:   NOP              ; 50.29 US.
019B  00        DEL11:   NOP              ; 46.09 US.
019C  00        DEL10:   NOP              ; 41.90 US.
019D  00        DEL9:    NOP              ; 37.71 US.
019E  00        DEL8:    NOP              ; 33.52 US.
019F  00        DEL7:    NOP              ; 29.33 US.
01A0  00        DEL6:    NOP              ; 25.14 US.
01A1  00        DEL5:    NOP              ; 20.95 US.
01A2  83        DEL4:    RET              ; 16.76 US.
                ;
                ; MEDIUM TIMING DELAYS - 8 (DEC) BYTES
                ; DELAYS INCLUDE CALL, AND APPLY TO 3.58 MHZ. TV CRYSTAL
                ; STACK LEVELS NEEDED = 1
                ;
01A3  34 94     DL300:   CALL    DEL18    ; 301.71 US.   (72 CYCLES)
01A5  34 94     DL227:   CALL    DEL18    ; 226.29 US.   (54 CYCLES)
01A7  34 94     DL150:   CALL    DEL18    ; 150.86 US.   (36 CYCLES)
01A9  24 96              JMP     DEL16
                ;
0018            ZDELAY   EQU     $-DEL19
                ;
                         PAGE
                         INCLUDE DM2:ERRORF
                ;
                ; ERRORF - PRINTER
                ; FATAL ERROR HANDLER
                ; CAN BE ENTERED FROM RB0 OR RB1
                ; ERROR ENTRY - EXPLICIT CODE PASSED IN R1
                ;
01AB  8A FF     ERROR:   ORL     P2,#0FFH        ; TURN OFF INTERPOSER, LED'S, COMM., ETC
01AD  89 FF              ORL     P1,#0FFH        ; TURN OFF MOTORS
                ;
01AF  B8 37              MOV     R0,#STATUS
01B1  F0                 MOV     A,@R0
01B2  12 B7              JB0     ERR1     ; JUMP IF ERROR BIT ALREADY SET
01B4  10                 INC     @R0      ; NOT SET, SET ERROR BIT
01B5  B8 39              MOV     R0,#FESTA
01B7  F9                 MOV     A,R1     ; ERROR CODE IN ACCUMULATOR
01B8  A0                 MOV     @R0,A    ; PUT CODE IN FATAL ERROR STATUS
                ;
01B9  27        ERR1:    CLR     A
01BA  D7                 MOV     PSW,A    ; CLEAR & RESET PSW
                ;
01BB  A0                 MOV     @R0,A    ; COMM. TRANSMIT LINE DARK FOR 2338 US. MIN.
01BC  E9 BC              DJNZ    R0,$     ; (REF. TD = 1340.625 US. MAX.)
                ;
01BE  17                 INC     A        ; TURN ON BIT 0 OF DISABLE STATUS
01BF  74 [illegible]     CALL    WSABL
                ;
01C1  54 23              CALL    SSTAT    ; TRANSMIT STATUS
01C3  54 51              CALL    CHECK    ; WAIT FOR REQUEST AND RECEIVE MESSAGE
01C5  54 1D              CALL    FLAG     ; PROCESS MESSAGE
01C7  24 87              JMP     CE80R    ; FREEZE AND TRAP
                ;
[illegible]     ZERROR   EQU     $-ERROR
                ;
                         PAGE
                         INCLUDE DM2:ICOMON
                ;
                ; ICOMON - PRINTER
                ; COMMON JOBS CALLED BY IPOST
                ; STACK LEVELS NEEDED = 3
                ;
01C9  BA 09     ICOMON:  MOV     R2,#9    ; MOVE WHEEL 9 POSITIONS DOWN TO ZERO
01CB  74 [illegible]     CALL    PMOVE
01CD  CA                 DEC     R2       ; MOVE DOWN ONE BANK
01CE  44 [illegible]     JMP     PMOVE
01D0  A5                 CLR     F0       ; POINT 'UP'
01D1  83                 RET
                ;
000[illegible]  ZICOMN   EQU     $-ICOMON
                ;
002[illegible]  P1FREE   EQU     200H-$   ; FREE SPACE AT END OF PAGE
                         PAGE
                ;
0200                     ORG     200H
                ; PAGE 2 CONTAINS MESSAGE PARSER & HIGH LEVEL PRINT WHEEL ROUTINE
                ;
                         INCLUDE DM2:HDRF
                ;
                ; HDRF - PRINTER
                ; HEADER PARSER
                ; STACK LEVELS NEEDED = 3
                ;
0200  B8 30     HDR:     MOV     R0,#18H  ; POINT R0 TO INPUT AREA
0202  F0                 MOV     A,@R0
0203  D3 C1              XRL     A,#0C1H
0205  C6 45              JZ      IPOST    ; SELECT POSTAL
0207  F0                 MOV     A,@R0
0208  D3 50              XRL     A,#050H
020A  C6 23              JZ      SSTAT    ; SEND STATUS
020C  F0                 MOV     A,@R0
020D  D3 [illegible]     XRL     A,#041H
```

```
020F  C6 29          JZ     ENER      ; ENABLE PRINTER
0211  F8             MOV    A,R0
0212  D2 42          XRL    A,#042H
0214  C6 29          JZ     DISCR     ; DISABLE PRINTER
0216  F0             MOV    A,@R0
0217  D3 45          XRL    A,#045H
0219  C6 1F          JZ     ACCTC     ; ACCOUNTING COMPLETE (ENAB)
                     ;
                     ; 'SEND DIAGNOSTIC STATUS' ROUTINE
021B  B9 57   DIAG:  MOV    R1,#CDSTAH-1)   ; POINT TO HEADER
021D  44 25          JMP    SEND1     ; SEND 2 BYTES & RETURN
                     ;
                     ; ACCOUNTING COMPLETE
021F  23 DF   ACCTC: MOV    A,#0DFH   ; CLEAR BIT 5 IN DISABLE STATUS
0221  44 2B          JMP    ENABL     ; ENABLE
                     ;
                     ; SEND STATUS MESSAGE
                     ; STACK LEVELS NEEDED = 0
                     ;
                     ; TIMING, INCL. CALL (SSTAT):
                     ;     6 CYCLES = 25,[illegible] US. TO CALL COU
                     ;     [illegible] = 180,190 US. TO CTS
                     ;
0223  B9 55   SSTAT: MOV    R1,#(STATB-1)     ; R1 = HEADER ADDR
0225  BA 0[illegible] SEND1: MOV R2,#2  ;        R2 = SEND [illegible]
0227  [illegible]    JMP    COU       [illegible]
                     ;
                     EOG

                     INCLUDE DM2:STABLE
                     ;
                     ; ENABLE - PRINTER
                     ; STACK LEVELS NEEDED = 0
                     ;
                     ; MAY BE CALLED FROM RB0 OR RB1
                     ;
0229  23 F7   ENPE:  MOV    A,#0F7H   ; CLEAR BIT 3 IN DISABLE STATUS WORD
022B  B8 3D   ENABL: MOV    R0,#DSSTA        ; POINT TO DISABLE STATUS
022D  50             ANL    A,@R0     ; TURN OFF REQUIRED BITS
022E  44 37          JMP    DSAB1     ; CONTINUE
                     ;
0230  23 08   DISCR: MOV    A,#008H   ; SET BIT 3 IN DISABLE STATUS WORD
0232  B8 3D   DSCR1: MOV    R0,#DSSTA        ; POINT TO DISABLE STATUS
0234  40             ORL    A,@R0     ; TURN ON REQUIRED BITS
                     ;
0235  A0      DSAB1: MOV    @R0,A     ; RESTORE DISABLE STATUS
0236  C6 42          JZ     ENAB1     ; JUMP IF NOW CLEAR
0238  53 02          ANL    A,#02     ; IS IT PRESENTLY DISABLED?
023A  96 3F          JNZ    DSAB2     ; JUMP IF SO
023C  B9 [illegible] MOV    R1,#TAB   ; POINT TO RB1-R2
023E  B1 [illegible] MOV    @R1,#30   ; SET COUNTDOWN COUNTER
0240  8A 40   DSAB2: ORL    P2,#40H   ; NOT CLEAR, DISABLE
0242  83             RET
                     ;
0243  9A BF   ENAB1: ANL    P2,#0BFH
0245  83             RET
                     ;
[illegible]   [illegible] EQU   $ END
                     PAGE
                     INCLUDE DM2:SPOST
                     ;
                     ; SPOST - PRINTER
                     ; POSTAGE SELECTION SUBROUTINE
                     ; STACK LEVELS NEEDED = 3
                     ;
0245  54 BC   SPOST: CALL   DELT      ; COMPUTE MOVEMENTS
0247  19      SPOS1: INC    R1        ; POINT TO NEXT DELTA
0248  F1             MOV    A,@R1     ; READ DELTA FOR THIS BANK
0249  96 63          JNZ    SPOS4     ; BANK MOVEMENT REQUIRED
024B  EE 47          DJNZ   R6,SPOS1  ; 5 WHEELS DONE?
024D  B5 60   SPOS2: MOV    R5,#0     ; RESTORE CR
024F  8A 08          ORL    P2,#08H   ; TURN OFF OPTICS
0251  99 FE          ANL    P1,#0FEH  ; TURN OFF SPOOLS
0253  FF             MOV    A,R7      ; LOOK AT SENSORS
0254  53 0F          ANL    A,#0FH    ; LOOK AT [illegible]
0256  E3             MOVP3  A,@A      ; VALID FOR HOME POSITION?
0257  72 5D          JB3    SPOS3     ; JUMP IF OK
0259  B9 92          MOV    R1,#92H
025B  24 AB          JMP    ERROR     ; INVALID SENSORS FOR HOME POSITION
                     ;
025D  B9 4F   SPOS3: MOV    R1,#(POSTB-1)    ; POINT TO POSTAGE [illegible]
025F  BA 04          MOV    R2,#4     ; SEND 4 BYTES
0261  24 03          JMP    COUT      ; TRANSMIT NEW SETTING [illegible]
                     ;
0263  BA 02   SPOS4: MOV    R2,#2     ; BANK 2 TO [illegible]
0265  54 32          CALL   DMOVE     ; MOVE DIGITS
0267  FE             MOV    A,R6      ; MOVE BANK [illegible]
0268  AA             MOV    R2,A
0269  A5             CLR    F0        ; BANK [illegible]
026A  74 3F          CALL   BMOVE     ; MOVE BANK SELECTOR
026C  F1      SPOS5: MOV    A,@R1     ; GET CURRENT [illegible]
026D  C6 7[illegible] JZ    SPOS3     ; JUMP IF 0
026F  A5             CPL    F0        ; POINT BANK SELECTOR
0270  74 3A          CALL   BMOVE     ; MOVE BANK SELECTOR
0272  F1             MOV    A,@R1     ; GET CURRENT [illegible]
0273  F2 7[illegible] JB7   SPOS6     ; JUMP IF [illegible]
0275  [illegible]    CLR    F0        ; POSITIVE, [illegible]
0276  [illegible]    JMP    SPOS7     ; STEP, [illegible]
0278  37      SPOS6: CPL    A         ; [illegible] DELTA POSITIVE
0279  17             INC    A
027A  AA      SPOS7: MOV    R2,A      ; [illegible]
027B  74 3[illegible] CALL  DMOVE     ; MOVE DIGIT [illegible]
[illegible]
[illegible]   SPOS8: [illegible]      ; MOVE [illegible]
[illegible]          [illegible]      ; MOVE [illegible]
[illegible]          [illegible] [illegible]OS5
[illegible]
[illegible]          [illegible]      ; MOVE [illegible]
[illegible]   [illegible] MOV [illegible] ; LOCK [illegible]
[illegible]          [illegible]      ; POSITION [illegible]
[illegible]
029A  [illegible]    JMP    SPOS2     ; EXIT
                     ;
[illegible]   ZSPOST EQU    $-SPOST
                     ;
                     PAGE
                     INCLUDE DM2:IPOST
                     ;
                     ; IPOST - PRINTER
                     ; INITIALIZE PRINT WHEELS TO ZERO
                     ; STACK LEVELS NEEDED = 4
                     ;
028C  34 FC   IPOST: CALL   CLRB      ; ZERO 'OLD POSTAGE' BUFFER
028E  54 BC          CALL   DELT      ; UNPACK SELECTION
0290  54 F0          CALL   CLEB      ; CLEAR POSTAGE BUFFER AGAIN
0292  74 20          CALL   USELK     ; UNLOCK BANK SELECTOR
0294  FF             MOV    A,R7      ; TEST FOR BANK SELECTOR NOT HOME
0295  53 0C          ANL    A,#0CH    ; CHECK SENSOR BITS 2 AND 3 FOR ZEROES
0297  96 AF          JNZ    ACLO      ; JUMP IF NOT HOME
0299  F1             MOV    A,@R1     ; GET 1 NIBBLE
029A  72 AF          JB3    ACLO      ; JUMP IF POSTAGE NOT KNOWN
029C  BA 05          MOV    R2,#5     ; POSTAGE KNOWN, MOVE TO BANK 5
029E  74 3A          CALL   BMOVE
02A0  19      IPOST1: INC   R1        ; POINT TO DELTA FOR THIS BANK
02A1  23 F6          MOV    A,#0F6H   ; COMPLEMENT OF 9.
02A3  61             ADD    A,@R1     ; SUBTRACT PRESENT POSITION
```

```
0258  37              CPL     A
0255  AA              MOV     R2,A      ; MOVE UP TO POSITION 9
02A6  74 32           CALL    DMOVE
02A8  95              CPL     F0        ; POINT 'DOWN'
02A9  54 00           CALL    ICOMON    ; MOVE WHEEL TO ZERO AND BANK DOWN 1
02AB  EE A0           DJNZ    R6,IPOSTL       ; IS BANK 0?
02AD  44 B5           JMP     IPOSB     ; YES, FINISH UP.
                ;
02AF  1A        ALLO:   INC     R2        ; SEEK BANK 5
02B0  74 57             CALL    WSEEK
02B2  C6 AF             JZ      ALLO
02B4  74 20     ALL1:   CALL    DSEEK     ; SEEK 9 ON THIS WHEEL
02B6  54 02             CALL    ICOMON    ; MOVE WHEEL TO ZERO AND BANK DOWN 1
02B8  EE B4             DJNZ    R6,ALL1 ; IS BANK ZERO -
02BA  44 B5             JMP     IPOSB     ; YES, FINISH UP
                ;
0080            ZIPOST  EQU     $-IPOST

                        PAGE
                        INCLUDE DM2:DELT
                ;
                ; DELT - PRINTER
                ; SET UP WHEEL CHANGES (DELTAS) IN RAM: MOVE INPUT TO POSTAGE BUFFER
                ; STACK LEVELS NEEDED = 1
                ;
02BC  9A BF     DELT:   ANL     P2,#0BFH          ; TURN ON SENSORS
02BE  54 59             CALL    DISPR     ; DISABLE PRINTER
                ;
02C0  B8 21             MOV     R0,#POSTB         ; POINT TO OLD POSTAGE
02C2  B9 2D             MOV     R1,#INB ; POINT TO NEW POSTAGE
02C4  BA 03             MOV     R2,#3.    ; BYTE COUNT
02C6  D5                SEL     RB1
02C7  B8 30             MOV     R0,#DELTA         ; POINT TO CHANGE BUFFER
02C9  C5                SEL     RB0
02CA  F0        DELT1:  MOV     A,@R0     ; GET OLD BYTE
02CB  53 F0             ANL     A,#0F0H ; SAVE HIGH ORDER NIBBLE
02CD  47                SWAP    A         ; RIGHT ADJUST
02CE  AB                MOV     R3,A      ; SAVE
02CF  F1                MOV     A,@R1     ; GET NEW BYTE
02D0  47                SWAP    A         ; PUT HIGH ORDER IN RIGHT
02D1  54 E6             CALL    COMON
02D3  F0                MOV     A,@R0     ; GET OLD BYTE
02D4  53 0F             ANL     A,#0FH    ; SAVE LOW ORDER NIBBLE
02D6  AB                MOV     R3,A      ; SAVE
02D7  F1                MOV     A,@R1     ; GET NEW BYTE
02D8  A0                MOV     @R0,A     ; PUT IN OLD POSTAGE BUFFER
02D9  54 E6             CALL    COMON
02DB  18                INC     R0        ; MOVE BUFFER POINTERS
02DC  19                INC     R1
02DD  EA CA             DJNZ    R2,DELT1          ; ARE ALL 3 BYTES DONE?
                ;
                ; OTHER CODE USED BY IPOST AND SPOST
02DF  85                CLR     F0        ; POINT 'DOWN' TO UNLOCK
02E0  95                CPL     F0
02E1  B9 30             MOV     R1,#DELTA         ; PRESET DELTA POINTER
02E3  BE 03             MOV     R6,#3.    ; PRESET BANK POINTER
02E5  83                RET
                ;
002A            ZDELT   EQU     $-DELT
                ;
                        PAGE
                        INCLUDE DM2:COMON
                ;
                ; COMON - PRINTER
                ; COMMON CODE CALLED BY DELT
                ; STACK LEVELS NEEDED = 0
                ; TIMING INCL. CALL = 13 CYCLES = 54.476 US.
                ;
02E6  53 0F     COMON:  ANL     A,#0FH    ; KEEP RIGHT NIBBLE ONLY
02E8  37                CPL     A
02E9  6B                ADD     A,R3      ; SUBTRACT OLD FROM NEW
02EA  37                CPL     A
02EB  D5                SEL     RB1
02EC  A0                MOV     @R0,A     ; STORE IN DELTA BUFFER
02ED  18                INC     R0        ; MOVE POINTER
02EE  C5                SEL     RB0
02EF  83                RET
                ;
000A            ZCOMON  EQU     $-COMON
                ;
                        PAGE
                        INCLUDE DM2:CLRB
                ;
                ; CLRB - PRINTER
                ; CLEAR 'POSTAGE IS' BUFFER
                ; STACK LEVELS NEEDED = 0
                ; TIMING INCL. CALL = 15 CYCLES = 62.857 US.
                ;
02F0  B8 20     CLRB:   MOV     R0,#POSTB         ; POINT TO 'POSTAGE IS' BUFFER
02F2  B0 81             MOV     @R0,#081H         ; INSERT HEADER
02F4  27                CLR     A         ; ZERO BUFFER
02F5  18                INC     R0        ; POINT TO NEXT BYTE
02F6  A0                MOV     @R0,A     ; CLEAR BYTE.
02F7  18                INC     R0        ; ETC.
02F8  A0                MOV     @R0,A
02F9  18                INC     R0
02FA  A0                MOV     @R0,A
02FB  83                RET
                ;
000C            ZCLRB   EQU     $-CLRB
                ;
0004            P2FREE  EQU     300H-$    ; FREE SPACE AT END OF PAGE 2.
                        PAGE
                ;
0300                    ORG     300H
                ; PAGE 3 CONTAINS TRANSLATION TABLES & LOW LEVEL PRINT WHEEL ROUTINES
                ;
                        INCLUDE DM2:ENTBL
                ;
                ; ENTBL - PRINTER
                ;
                ; SENSOR TRANSLATE TABLE -  3-2-0-1 INCREASING (BITS 0-1) (CHANGES +1)
                ; ALSO:
                ;       BIT 2 - 1 = BAD ENCODER CHANGE (MOVED TOO FAST?)
                ;       BIT 3 - 0 = ERRONEOUS HOME POSITION BIT PATTERN
                ;       BIT 3 - 1 = VALID; HOME POSITION CHANGED
                ;       BIT 4 - 1 = VALID; SHUTTER OR INTERPOSER CHANGED
                ;       BIT 5 - 1 = SWITCH ERROR
                ;       BIT 6 - 1 = DATER DOOR OPEN
                ;       BIT 7 - 1 = PRIVILEGED ACCESS
                ;
                ;                                 ;  OLD  NEW  RESULT
                ;
0300  A1        ENTBL:  DB      10100001B         ;  00   00    0
0301  AA                DB      10101010B         ;  00   01   +1
0302  A8                DB      10101000B         ;  00   10   -1
0303  87                DB      10000111B         ;  00   11   ERROR
0304  F0                DB      11110000B         ;  01   00   -1
0305  E1                DB      11100001B         ;  01   01    0
0306  C7                DB      11000111B         ;  01   10   ERROR
0307  C2                DB      11000010B         ;  01   11   +1
0308  32                DB      00110010B         ;  10   00   +1
0309  07                DB      00000111B         ;  10   01   ERROR
030A  21                DB      00100001B         ;  10   10    0
030B  00                DB      00000000B         ;  10   11   -1
030C  57                DB      01010111B         ;  11   00   ERROR
030D  40                DB      01000000B         ;  11   01   -1
```

```
      0306  42              DB      01000010B       ;  11    10    +1
      0307  41              DB      01000001B       ;  11    11     0
                    ;
      0010          ZENTBL  EQU     $-ENTBL
                    ;
                            PAGE
                            INCLUDE DM2:TBL2
                    ;
                    ; TBL2 - PRINTER
                    ; SENSOR VALIDATION AND TRANSLATION TABLE
                    ;
                    ; BIT 0 -  1 = ERROR
                    ; BIT 1 -  NOT USED
                    ; BIT 2 -  1 = INTERPOSER UP (ENABLED)
                    ; BIT 3 -  TRIP (ALWAYS ZERO)
                    ; BIT 4 -  1 = HOME POSITION #2
                    ; BIT 5 -  1 = SHUTTER FORWARD
                    ; BIT 6 -  NOT USED
                    ; BIT 7 -  NOT USED
                    ;
      0310                  ORG     310H
                    ;
      0310  21      TBL2:   DB      00100001B       ; 0000  ERROR - BOTH HOME SENSORS ON
      0311  10              DB      00010000B       ; 0001  HOME 2 - DISABLED, SHUTTER PARTLY FWD.
      0312  00              DB      00000000B       ; 0010  HOME 1 - DISABLED, SHUTTER PARTLY FWD.
      0313  31              DB      00110001B       ; 0011  ERROR - INTERPOSER SET, DRUM NOT HOME
      0314  23              DB      00100011B       ; 0100  ERROR - BOTH HOME SENSORS ON
      0315  34              DB      00110100B       ; 0101  HOME 2 - SHUTTER FORWARD
      0316  24              DB      00100100B       ; 0110  HOME 1 - SHUTTER FORWARD
      0317  34              DB      00110100B       ; 0111  TRIPPED - IN PART CYCLE
      0318  01              DB      00000001B       ; 1000  ERROR - BOTH HOME SENSORS ON
      0319  10              DB      00010000B       ; 1001  HOME 2 - DISABLED
      031A  00              DB      00000000B       ; 1010  HOME 1 - DISABLED
      031B  11              DB      00010001B       ; 1011  ERROR - SHUTTER HOME, DRUM NOT HOME
      031C  05              DB      00000101B       ; 1100  ERROR - BOTH HOME SENSORS ON
      031D  14              DB      00010100B       ; 1101  HOME 2 - ENABLED
      031E  04              DB      00000100B       ; 1110  HOME 1 - ENABLED
      031F  15              DB      00010101B       ; 1111  ERROR - SHUTTER HOME, DRUM NOT HOME
                    ;
      0010          ZTBL2   EQU     $-TBL2
                    ;
                            PAGE
                            INCLUDE DM2:DSEEK
                    ;
                    ; DSEEK - PRINTER
                    ; SEEK EXTREME POSITION OF DIGIT SELECTOR IN DIRECTION F0
                    ; STACK LEVELS NEEDED = 2
                    ;
                    ; F0 = 0 MEANS 'UP'
                    ; R2 MUST BE 0 ON ENTRY
                    ;
                    ; NOTE - ON RETURN, F0 IS REVERSED, R2 AND R0 = 0
                    ;
      0320  1A      DSEEK:  INC     R2              ; MOVE 1 DIGIT
      0321  74 52           CALL    DMOVX
      0323  1A      DSEK:   INC     R2              ; MOVE ANOTHER DIGIT
      0324  74 52           CALL    DMOVX
      0326  C6 23           JZ      DSEK            ; IF SUCCESSFUL, MOVE 1 MORE
      0328  95              CPL     F0              ; REVERSE DIRECTION
      0329  FF              MOV     A,R7            ; LOOK AT SENSORS
      032A  53 03           ANL     A,#3H           ; LOOK AT DIGIT SELECT SENSORS
      032C  E3              MOVP3   A,@A            ; TRANSLATE
      032D  72 A5           JB3     P3RET           ; RETURN IF LEGIT. DIGIT
      032F  1A              INC     R2              ; R2 = 1.
      0330  64 52           JMP     DMOVX           ; STEP BACK
                    ;
      0012          ZDSEEK  EQU     $-DSEEK
                    ;
                            PAGE
                            INCLUDE DM2:DMOVE2
                    ;
                    ; DMOVE2 - PRINTER
                    ; MOVE BANK OR DIGIT R2 DIGITS IN DIRECTION F0, CHECK FOR ERROR.
                    ; F0 = 0 MEANS 'UP'
                    ; STACK LEVELS NEEDED = 2
                    ;
                    ; NOTE - ON RETURN, F0 IS UNCHANGED, R2 AND R0 = 0, R3 (MOTORS) = GARBAGE
                    ;
      0332  D5      DMOVE:  SEL     RB1             ; INITIALIZE RETRY COUNTER
      0333  BD 0A           MOV     R5,#10.
      0335  C5              SEL     RB0
      0336  74 52           CALL    DMOVX           ; FIRST TRY AT MOVE
      0338  64 45           JMP     DM2
                    ;
      033A  D5      BMOVE:  SEL     RB1             ; INITIALIZE RETRY COUNTER
      033B  BD 06           MOV     R5,#6.
      033D  C5              SEL     RB0
      033E  74 57           CALL    BMOVX           ; FIRST TRY AT MOVE
      0340  64 45           JMP     DM2
                    ;
      0342  C5      DM1:    SEL     RB0
      0343  74 61           CALL    PENT            ; RE-ENTER STEP PROGRAM PAST PMCNT INITIALIZATION
      0345  C6 A5   DM2:    JZ      P3RET           ; RETURN IF PMCNT = 0
      0347  1A              INC     R2              ; NOT ZERO, TRY ONE MORE STEP
      0348  D5              SEL     RB1
      0349  ED 42           DJNZ    R5,DM1          ; BUT DROP OUT IF RETRIES ARE DONE
      034B  B9 71           MOV     R1,#71H         ; BANK MOVE ERROR CODE
      034D  76 50           JF1     DM3             ; JUMP IF BANK
      034F  19              INC     R1              ; DIGIT MOVE ERROR CODE (=72H)
      0350  24 A6   DM3:    JMP     ERROR           ; PRINT WHEEL POSITIONING ERROR
                    ;
      0020          ZDMOVE  EQU     $-DMOVE
                    ;
                            PAGE
                            INCLUDE DM2:DMOVX2
                    ;
                    ; DMOVX2 - PRINTER
                    ; STACK LEVELS NEEDED = 1
                    ;
                    ; TIME INTERVAL BETWEEN ENCODER READS:
                    ;         MIN. = 34 CYCLES = 142.476 US.
                    ;         MAX. = 59 CYCLES = 247.238 US.
                    ;
                    ; ON ENTRY  - F0 = 0 FOR UP, F0 = 1 FOR DOWN
                    ;             R2 = NUMBER OF POSITIONS TO MOVE
                    ;             R7 = OLD SENSOR READINGS
                    ;
                    ; ON RETURN - F0 = UNCHANGED
                    ;             F1 = 0 FOR DIGITS, F1 = 1 FOR BANK
                    ;             R2 AND R0 = 0
                    ;             R3 (MOTORS) = GARBAGE
                    ;             IF NO ERROR, A AND R5 = 0
                    ;             R1 AND R6 UNCHANGED
                    ;             R4 = UNCHANGED
                    ;             R7 = CURRENT SENSOR READINGS
                    ;
      0352  A5      DMOVX:  CLR     F1              ; F1 = 0 FOR DIGIT SELECT
      0353  FA              MOV     A,R2            ; LOOK AT DIGIT COUNT
      0354  E7              RL      A               ; MULTIPLY BY 2 FOR ENCODER
      0355  64 5A           JMP     M1              ; CONTINUE
                    ;
      0357  A5      BMOVX:  CLR     F1              ; F1 = 1 FOR BANK SELECT
      0358  B5              CPL     F1
      0359  FA              MOV     A,R2            ; LOOK AT BANK COUNT
      035A  B6 5E   M1:     JF0     M2              ; IF DOWN, MAKE NEGATIVE
      035C  37              CPL     A               ; (2'S COMPLEMENT)
      035D  17              INC     A
      035E  AD      M2:     MOV     R5,A            ; SAVE IN ENCODER
      035F  C6 A5           JZ      P3RET           ; IF ZERO, RETURN
      0361  FA      PENT:   MOV     A,R2            ; REENTRY ENTRY
```

```
0362  E7                 RL     A         ; MULTIPLY R2 BY 4 FOR MOTOR STEPS
0363  E7                 RL     A
0364  AA                 MOV    R2,A      ; SAVE MOTOR STEPS
0365  B9 CC              MOV    R1,#0CCH        ; INITIALIZE TWO PHASE MOTOR IMAGE
0367  F6 70              JC     M5        ; JUMP IF DOWN (LEFT)
0369  FB         M3:     MOV    A,R3      ; LOOK AT MOTOR IMAGE
036A  F6 6E              JC     M4        ; JUMP IF DOWN (LEFT)
036C  77                 RR     A         ; UP - (RIGHT)
036D  77                 RR     A
036E  E7         M4:     RL     A
036F  A9                 MOV    R1,A      ; RESTORE MOTOR IMAGE
0370  F9         M5:     MOV    A,R1      ; MOTOR IMAGE IN ACC. (IF NECESSARY)
0371  53 FE              ANL    A,#0FEH   ; HOLD OTHER MOTOR IN HOME
0373  43 01              ORL    A,#01H
0375  76 78              JF1    M6        ; JUMP IF BANK
0377  47                 SWAP   A
0378  39         M6:     OUTL   P1,A      ; OUTPUT MOVE
0379  BE 23              MOV    R6,#35.   ; 5 MS. DELAY (196.4 TO 196.9 STEPS/SEC.)
037B  74 85              CALL   READ1     ; WAIT FOR 5 MS.
037D  EA 69              DJNZ   R2,M3     ; JUMP IF COUNT NOT DONE
037F  23 FF              MOV    A,#0FFH   ; BOTH MOTORS HOME
0381  39                 OUTL   P1,A
0382  BE D3              MOV    R6,#211.        ; 30.0876 MS. DELAY
0384  64 86              JMP    READ1     ; WAIT 30.0876 MS. AND RETURN
                 ;
0064             ZDMOVX  EQU    $-DMOVX
                 ;
                         PAGE
                         INCLUDE DM2:READ
                 ;
                 ; READ - PRINTER
                 ; UPDATE ENCODER READINGS DURING PRINT SELECTION
                 ; STACK LEVELS NEEDED = 6
                 ;
                 ; ON ENTRY  - F1 = 0 FOR DIGITS, F1 = 1 FOR BANK
                 ;             R6 = NUMBER OF LOOPS THROUGH ROUTINE BEFORE RETURNING
                 ;             R3 = ENCODER
                 ;             R7 = OLD SENSOR READING
                 ; ON RETURN - A  = ENCODER
                 ;             R0 = 0
                 ;             R4 = GARBAGE
                 ;             R5 = ENCODER
                 ;             R7 = CURRENT SENSOR READING
                 ;             R1,R2,R3,R6, AND F1 UNCHANGED
                 ; TIMING = 56 CYCLES (142.476 US.) PER LOOP, PLUS 4 CYCLES (16.762 US.)
                 ;     FOR CALL AND RETURN.
                 ;
0385  08         READ1:  INS    A,BUS     ; READ SENSORS
0386  2F                 XCH    A,R7      ; NEW SENSORS IN R7
0387  AC                 MOV    R4,A      ; OLD SENSORS IN R4
0388  DF                 XRL    A,R7      ; CHANGES NOW IN ACCUMULATOR
038A  76 A6              JF1    READ3     ; JUMP IF BANK SELECT
                 ;
                 ; DIGIT SELECTION ENCODER HANDLING
038C  53 0C              ANL    A,#0CH    ; LOOK AT BANK
038E  96 B5              JNZ    READ4     ; ERROR IF ANY CHANGES
0390  08                 INS    A,BUS     ; (2 CYCLE NOP FOR BALANCE)
0391  FF                 MOV    A,R7      ; GET NEW SENSORS
0392  53 03              ANL    A,#03H    ; LOOK AT DIGITS (NEW)
0394  2C                 XCH    A,R4      ; NEW IN R4, OLD IN A
0395  53 03              ANL    A,#03H    ; LOOK AT DIGITS (OLD)
0397  47                 SWAP   A         ; MOVE OLD TO BITS 2 & 3
                 ;
                 ; COMMON WRAPUP ROUTINE
0398  77         READ2:  RR     A
0399  77                 RR     A
039A  4C                 ORL    A,R4      ; COMBINE OLD AND NEW SENSORS
039B  E3                 MOVP3  A,@A      ; PICK UP TABLE ENTRY
039C  52 BA              JB2    READ6     ; IF BIT 2 = 1, ENCODER ERROR
039E  53 03              ANL    A,#03H    ; LOOK AT LAST 2 BITS
03A0  07                 DEC    A         ; ADJUST ENTRY TO PERMIT 8 BIT NEGATIVE NUMBER IF -1
03A1  6B                 ADD    A,R3      ; ADJUST OLD PMCNT
03A2  AB                 MOV    R3,A      ; STORE PMCNT
03A3  EE 86              DJNZ   R6,READ1        ; CONTINUE IF TIME NOT UP
03A5  83         P3RET:  RET              ; RETURN
                 ;
                 ; BANK SELECTION ENCODER HANDLING
03A6  53 03      READ3:  ANL    A,#03H    ; LOOK AT DIGITS
03A8  96 B3              JNZ    READ4     ; ERROR IF ANY CHANGES
03AA  FC                 MOV    A,R4      ; GET OLD SENSORS
03AB  53 0C              ANL    A,#0CH    ; LOOK AT BANK SENSORS
03AD  AC                 MOV    R4,A      ; SAVE BANK ONLY
03AE  FF                 MOV    A,R7      ; GET NEW SENSORS
03AF  53 0C              ANL    A,#0CH    ; LOOK AT NEW BANK SENSORS
03B1  64 98              JMP    READ2     ; MOVE NEW TO BITS 0 AND 1
                 ;
03B3  B9 87      READ4:  MOV    R1,#87H   ; DIGIT ENCODER MOVED WHEN BANK SELECTED
03B5  76 B8              JF1    READ5     ; JUMP IF BANK
03B7  19                 INC    R1        ; BANK ENCODER MOVED WHEN DIGIT SELECTED (#88H)
03B8  24 A9      READ5:  JMP    ERROR     ; WRONG ENCODER MOVED
                 ;
03BA  B9 84      READ6:  MOV    R1,#84H
03BC  24 AB              JMP    ERROR     ; ENCODER ERROR (MOVED TOO FAST?)
                 ;
0038             ZREAD   EQU    $-READ1
                 ;
                         PAGE
                         INCLUDE DM2:FREEZE
                 ;
                 ; FREEZE - PRINTER
                 ; SET AUXILIARY INTERPOSER
                 ; STACK LEVELS NEEDED = 2
                 ;
03BE  85         FREEZE: CLR    F0        ; POINT TO 'DOWN'
03BF  95                 CPL    F0
03C0  8A FF              ORL    P2,#0FFH        ; TURN OFF INTERPOSER, LED'S, ETC.
03C2  BA EF              MOV    R2,#239.
03C4  EA C4              DJNZ   R2,$      ; WAIT 2 MS. FOR LED DECAY
03C6  08                 INS    A,BUS     ; READ INPUTS, IF ANY
03C7  AF                 MOV    R7,A      ; STORE TO PREVENT 'READ' ERRORS
03C8  BA 03              MOV    R2,#3.    ; MOVE AT LEAST TWO DIGITS
03CA  74 32              CALL   DMOVX     ; MOVE AS REQUIRED
03CC  89 FF              ORL    P1,#0FFH        ; TURN OFF MOTORS
03CE  83                 RET
                 ;
0011             ZFREZE  EQU    $-FREEZE
                 ;
0031             C3FREE  EQU    400H-$    ; FREE SPACE AT END OF PAGE 3.
                 ;
0079             ZFREE   EQU    P0FREE+P1FREE+P2FREE+P3FREE
                 ;
                         END
```

| | | | | | | | | | |
|---|---|---|---|---|---|---|---|---|---|
| A | =001E | ACCTC | 021F | ALL0 | 02AF | ALL1 | 0284 | BMOVE | 033A |
| BMOVX | 0327 | BUS | =0004 | C | =0007 | CETOR | 0187 | CLK | =0010 |
| CLR0 | 0290 | CNT | =0009 | COMON | 02E6 | COUT | 0103 | COUT1 | 0100 |
| COUT2 | 0101 | COUT3 | 0112 | COUT4 | 0115 | COUT5 | 0124 | COUT6 | 012A |
| COUT7 | 013F | COUT8 | 014E | CRECV | 0153 | CRECK | 0151 | CREV1 | 0158 |
| CREV2 | 015C | CREV3 | 0165 | CREV4 | 0167 | CREV5 | 0171 | CREV6 | 0179 |
| CREV7 | 0130 | CREV8 | 018F | DATER | 0025 | DATER | 0024 | DBB | =0011 |
| DELT | 02DC | DELTA | 0030 | DELT1 | 02CA | DEL10 | 0191 | DEL11 | 0198 |
| DEL12 | 019A | DEL13 | 0199 | DEL14 | 0190 | DEL15 | 0197 | DEL16 | 0196 |
| DEL17 | 0195 | DEL18 | 0194 | DEL19 | 0193 | DEL4 | 01A2 | DEL5 | 01A1 |
| DEL6 | 01A0 | DEL7 | 019F | DEL8 | 019E | DEL9 | 019D | DIAG | 021B |

| | | | | | | | | | |
|---|---|---|---|---|---|---|---|---|---|
| DISPE | 0240 | DL150 | 01A7 | DL225 | 01A5 | DL300 | 01A1 | DMOVE | 0332 |
| DMDVX | 0 52 | DM1 | 0342 | DM2 | 0345 | DM3 | 0350 | DSABL | 0232 |
| DSAB1 | 0235 | DSAB2 | 023F | DSEEK | 0320 | DSEK | 0323 | DSSTA | 005B |
| DSTAB | 0058 | ENABL | 022B | ENAB1 | 0242 | ENFR | 0229 | ENTBL | 0309 |
| ERROR | 01A5 | GR1 | 01B9 | FESTA | 0039 | FREEZE | 030E | F0 | =000D |
| F1 | =200D | HOR | 0296 | I | =000C | ICONGN | 0109 | IND | 003D |
| IND | [illegible] | INIT | 0000 | INIT1 | 0011 | INIT2 | 001E | INIT3 | 0022 |
| IPSTA | 003A | INTAF | 009B | INTR2 | 0032 | INTR3 | 00A3 | IPOSB | 0285 |
| IPOST | 028C | IPOSTL | 02A9 | MAN1 | 0043 | MAN2 | 0031 | MAN3 | 0062 |
| MAN4 | 00AB | MAN5 | 0082 | MAN6 | 0086 | MBO | =200B | MB1 | =300B |
| M574 | 0026 | M1 | 035A | M2 | 035E | M3 | 0369 | M4 | 036E |
| M5 | 0370 | M6 | 0376 | POSTB | 0021 | POSTR | 0020 | PSW | =0003 |
| P2FREE | 0096 | P1 | =0105 | P1FREE | 002E | P2 | =0205 | P2FREE | 0004 |
| PFREE | 0031 | PSPOST | 03A5 | P4 | =6006 | P5 | =0106 | P6 | =0206 |
| P7 | =0306 | RC90 | =000B | RH1 | =100B | READ1 | 0286 | READ2 | 0398 |
| READ3 | 0136 | READ4 | 03B3 | READ5 | 03BB | READ6 | 03BA | RENT | 0361 |
| R0 | =0302 | R1 | =0102 | R2 | =0202 | R3 | =6302 | R4 | =6402 |
| R5 | =1502 | R6 | =6602 | R7 | =6702 | SEND1 | 0225 | SENSE | 00D9 |
| SENSE | 00F6 | SHDL | 0069 | SHDL1 | 0072 | SHIN | 0094 | SHIN2 | 0096 |
| SHORE | 0077 | S2OST | 0215 | SPOS1 | 0247 | SPOS2 | 024D | SPOS3 | 025D |
| SPOS | 0263 | SPOS5 | 026C | SPOS6 | 0276 | SPOS7 | 027A | SPOS8 | 027E |
| SSTA | 0223 | STATF | 0036 | STATUS | 0037 | SWITCH | 003E | SWIT1 | 00C2 |
| SWIT2 | 0305 | SWIT3 | 00D9 | T | =0004 | TBL2 | 0310 | TCRT | =0007 |
| TC | =200C | TEMP | 0026 | TEST0 | 0145 | TEST1 | 0147 | TEST11 | 0149 |
| T | 0069 | ZCUB | 000C | ZCOMDR | 000A | ZCOUT | 0051 | ZCRECV | 0042 |
| ZDOAY | 0018 | ZDELT | 002A | ZDMOVE | 0020 | ZDMOVX | 0034 | ZDSEEK | 0012 |
| ZENT | 000C | ZENTBL | 0010 | ZFROOB | 001F | ZFREZE | 0011 | ZHOR | 0029 |
| [illegible] | 0039 | ZINIT | 0043 | ZINTRP | 0053 | ZIPOST | 0055 | ZMAIN | 0026 |
| [illegible] | 0013 | ZLEAD | 0055 | ZSENSE | 0010 | ZSHOC | 0024 | ZSPOST | 0047 |
| ZSWITC | 000F | ZTB2 | 0010 | | | | | | |

No errors detected

Cross reference listing (MICREF version 4.0)

| Symbol | Refs (# = definition | $ = write | (blank) = read) | | | |
|---|---|---|---|---|---|---|
| ACCTC | 589 | 596# | | | | |
| ALLO | 713 | 715 | 729# | 731 | | |
| ALLI | 732# | 754 | | | | |
| BMOVE | 556 | 674 | 678 | 692 | 717 | 942# |
| BMOVX | 730 | 945 | 938# | | | |
| CERGO | 364 | 381 | 395 | 396 | 463# | 542 |
| CLOS | 767 | 709 | 809# | 820 | | |
| COMMON | 761 | 767 | 789# | 799 | | |
| CONT | 323# | 608 | 667 | | | |
| CONT1 | 351# | 353 | 401 | | | |
| CONT2 | 356# | 358 | | | | |
| CONT3 | 362# | 378 | | | | |
| CONT4 | 357 | 363# | | | | |
| CONT5 | 372# | 376 | | | | |
| CONT6 | 375# | 368 | | | | |
| CONT7 | 373 | 387# | | | | |
| CONT8 | 394 | 398# | | | | |
| CRECV | 237 | 352 | 426# | | | |
| CRECX | 98 | 429# | 472 | 540 | | |
| CREC1 | 432 | 434# | | | | |
| CREC2 | 433# | 438 | | | | |
| CREC3 | 439 | 441# | | | | |
| CREC4 | 1.6 | 442# | | | | |
| CREC5 | 449# | 457 | | | | |
| CREC6 | 454# | 467 | | | | |
| CREC7 | 450 | 466# | | | | |
| CREND | 414 | 46# | | | | |
| DATE0 | 25# | | | | | |
| DATE1 | 26# | | | | | |
| DEL10 | 492# | | | | | |
| DEL11 | 371 | 491# | | | | |
| DEL12 | 366 | 490# | | | | |
| DEL13 | 489# | | | | | |
| DEL14 | 457 | 488# | | | | |
| DEL15 | 487# | | | | | |
| DEL16 | 479 | 486# | 507 | | | |
| DEL17 | 580 | 485# | | | | |
| DEL18 | 356 | 484# | 504 | 505 | 506 | |
| DEL19 | 361 | 435 | 483# | 509 | | |
| DEL4 | 498# | | | | | |
| DEL5 | 497# | | | | | |
| DEL6 | 496# | | | | | |
| DEL7 | 495# | | | | | |
| DEL8 | 372 | 377 | 494# | | | |
| DEL9 | 493# | | | | | |
| DELT | 650 | 708 | 746# | 779 | | |
| DELT1 | 755# | 770 | | | | |
| DELTA | 27# | 753 | 775 | | | |
| DIAG | 541 | 592# | | | | |
| DISPR | 586 | 625# | 747 | | | |
| DL150 | 66 | 301 | 506# | | | |
| DL225 | 383 | 505# | | | | |
| DL300 | 76 | 383 | 460 | 461 | 504# | |
| DM1 | 948# | 953 | | | | |
| DM2 | 940 | 946 | 950# | | | |
| DM3 | 955 | 957# | | | | |
| DMOVE | 554 | 673 | 686 | 695 | 723 | 936# | 939 |
| DMOVX | 912 | 914 | 922 | 939 | 983# | 1022 | 1108 |
| DSAB1 | 623 | 629# | | | | |
| DSAB2 | 632 | 635# | | | | |
| DSABL | 124 | 179 | 537 | 626# | | |
| DSEEK | 710 | 722 | 911# | 924 | | |
| DSEK | 915# | 913 | | | | |
| DSSTA | 30# | 86 | 621 | 626 | | |
| DSTAB | 36# | 54 | 592 | | | |
| ENAB1 | 630 | 633# | | | | |
| ENABL | 120 | 597 | 621# | | | |
| ENFR | 581 | 620# | 641 | | | |
| ENTBL | 144# | 861 | | | | |
| ERR | 324 | 336# | | | | |
| ERROR | 70 | 157 | 167 | 245 | 281 | 283 | 322 |
| | | 360 | 470 | 519# | 344 | 663 | 937 |
| | | 1046 | 1087 | | | | |
| FESTA | 3# | 326 | | | | |
| FREEZE | 68 | 153 | 1100# | 1112 | | |
| GR1 | 280 | 574# | 616 | | | |
| HCOMDR | 573# | 560 | 725 | 733 | | |
| IND | 35# | 750 | | | | |
| IND | 34# | 433 | 574 | | | |
| INIT | 20# | 101 | | | | |
| INIT1 | 62# | 64 | 67 | | | |
| INIT2 | 69# | 210 | | | | |
| INIT3 | 5 | 75# | | | | |
| IPSTA | 32# | | | | | |
| INTR2 | 209 | 213# | | | | |
| INTR3 | 210 | 219# | | | | |
| IPOSB | 168 | 173 | 175 | 204# | 221 | |
| IPOST | 653# | 727 | 735 | | | |
| IPOSR | 99 | 707# | 737 | | | |
| IPOSTL | 718# | 72 | | | | |
| M1 | 926 | 941# | | | | |
| M2 | 937 | 954# | | | | |
| M3 | 1002# | 1016 | | | | |
| M4 | 1002 | 1006# | | | | |
| M5 | 1002 | 1106# | | | | |
| M6 | 1011 | 101# | | | | |
| MAN1 | 106# | 140 | 236 | 239 | | |
| MAN2 | 152 | 127# | | | | |

| | | | | | | |
|---|---|---|---|---|---|---|
| [illegible] | 117 | [illegible] | | | | |
| [illegible] | 206 | 216 | 234* | 247 | | |
| [illegible] | 233* | [illegible] | | | | |
| [illegible] | [illegible] | [illegible] | | | | |
| [illegible] | 76* | [illegible] | | | | |
| [illegible] | [illegible] | [illegible] | | | | |
| [illegible] | 562* | [illegible] | | | | |
| [illegible] | [illegible] | 1116 | | | | |
| [illegible] | [illegible] | 1116 | | | | |
| [illegible] | 920 | 950 | 995 | 1071* | | |
| [illegible] | [illegible] | 749 | | | | |
| [illegible] | [illegible] | [illegible] | 809 | | | |
| [illegible] | [illegible] | [illegible] | 1044* | 1070 | 1091 | |
| [illegible] | [illegible] | [illegible] | | | | |
| [illegible] | [illegible] | 1074* | | | | |
| [illegible] | [illegible] | 1073 | [illegible] | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | 667* | | | | |
| [illegible] | [illegible] | 321* | | | | |
| [illegible] | [illegible] | 90 | 135 | 300* | 324 | |
| [illegible] | [illegible] | 189 | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | 696 | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | [illegible] | | | | |
| [illegible] | [illegible] | [illegible] | 698 | | | |
| [illegible] | 47 | [illegible] | [illegible] | 539 | 300 | 606* |
| [illegible] | 20* | [illegible] | [illegible] | | | |
| [illegible] | 29* | 84 | [illegible] | 318 | 322 | |
| [illegible] | [illegible] | [illegible] | | | | |
| [illegible] | 266 | 280* | | | | |
| [illegible] | 275 | [illegible] | | | | |
| [illegible] | 81 | [illegible] | 261* | 262 | 283 | |
| [illegible] | [illegible] | [illegible] | | | | |
| [illegible] | 26* | | | | | |
| [illegible] | 374 | 379 | [illegible] | | | |
| [illegible] | [illegible] | 387 | 393* | | | |
| [illegible] | [illegible] | 394* | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| ZBDIG | 610* | | | | | |
| [illegible] | 560* | | | | | |
| [illegible] | [illegible] | | | | | |
| [illegible] | 221* | | | | | |
| ZIPOST | 737* | | | | | |
| ZMAIN | 140* | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |
| [illegible] | [illegible] | | | | | |

It is known and understood that the terms postage meter and postal meter, as used herein, refer to the general definition of a device for the imprinting of a defined unit value for governmental or private carrier parcel, envelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including accounting and printing functions.

The present invention is particularly directed to use in a postal meter which will employ varying features and functions, described in differing aspects, in any one or more of the following groups of copending patent applications, including this one, all filed concurrently on Oct. 30, 1979: Ser. No. 89,424 to Jones, et al, for "POSTAGE METER HAVING INTERACTIVE ARITHMETIC OPERATION CAPABILITY"; Ser. No. 89,425 to Eckert, et al, for "POSTAGE METER HAVING FIELD RESETTABLE CONTROL VALUES"; Ser. No. 89,426 to Eckert, et al, for "ELECTRONIC POSTAGE METER HAVING KEYBOARD ENTERED COMBINATION FOR RECHARGING"; Ser. No. 89,422 to Eckert, et al, for "ELECTRONIC POSTAGE METER HAVING CHECK DATE WARNING"; Ser. No. 89,427 to Eckert, et al, for "ELECTRONIC POSTAGE METER HAVING RESET BASE WARNING"; Ser. No. 89,434 To Muller for "ELECTRONIC POSTAGE METER OPERATING VOLTAGE VARIATION SENSING SYSTEM"; Ser. No. 84,412 to Eckert, et al, for "PRINT CONTROL SYSTEM"; Ser. No. 89,413 to Soderberg, et al, for "ELECTRONIC POSTAGE METER HAVING PLURAL COMPUTING SYSTEMS"; Ser. No. 89,411 to Eckert, et al, for "INTERPOSER CONTROL FOR ELECTRONIC POSTAGE METER".

While this invention has been disclosed and described with reference to a single embodiment thereof, it will be apparent that variations and modifications may be made therein, and it is intended in the following claims to cover each such variation and modification as falls within the true spirit and scope of the invention.

What is claimed is:

1. An intercommunication system having a plurality of units, wherein each of said units has a computing system, a signal receiving terminal and a signal transmitting terminal, the transmitting and receiving terminals of each one of said units being connected to the receiving and transmitting terminals of another of said units, each of said units having a stable clock, each unit having means for transmitting messages by way of its transmitting terminal asynchronously in a serial message format of bit groupings of a determined number of bits and with start and stop bit, and the bits of the groupings having determined constant relative timing and said units further comprising means for sampling their receiving terminals at predetermined times for receiving sent messages, and means sampling their receiving terminals to enable the transmission of messages by way of their transmitting terminals.

2. The communication system of claim 1 wherein said units are units of a postal meter and are physically connected together, and wherein said postal meter has three of said units including a control unit, an accounting unit and a settable printing unit, said control unit being connected internally to communicate solely with said accounting unit and said printing unit being connected to communicate solely with said accounting unit.

3. The system of claim 2 wherein said control unit has second transmitting and receiving terminals for communication with external devices.

4. The communication system of claim 3 wherein said control unit comprises a keyboard for receiving manually entered data, and means for converting such data to said serial message for transmitting to said accounting unit.

5. The system of claim 4 wherein said accounting unit includes registers for storing data received from each of said control and printing units, for the formation of status messages employing data derived from each of said units.

6. The system of claim 1 for a postal meter having a plurality of structurally interconnected units, wherein each of said units includes means responsive to the initiation of a message from another unit for retransmitting said message back to said other units for error checking, and each unit, in response to an error-free retransmitted message received thereby comprising means applying a no-error terminal pulse to said message, for providing error-free transmission of messages.

7. The system of claim 6 having three such units, namely, a control unit, an accounting unit having registers for storing data related to said postage meter and for producing a status message therefrom and a settable printing unit, said control unit and printing unit being connected to transmit and receive messages within the postal meter solely with said accounting unit.

8. The system of claim 7 wherein said control unit comprises means for producing setting signals for setting the settable printing means of said printing unit.

9. The intercommunication system of claim 1 wherein said plurality of units form a signal device and are separated one from the other only by walls, whereby the connections between the terminals are substantially not subject to external interference.

10. The system of claim 9 wherein said units are units of a postage meter, at least two of said units being within a common secure housing.

11. A communication system having a plurality of interconnected units, each unit having a computer programmed to perform determined functions in the respective units, a serial receiving terminal coupled to a serial transmitting terminal of another of the units, and a serial transmitting terminal connected to a serial receiving terminal of the other unit, each unit further having means for applying signals asynchronously to its transmitting terminal in a serial format of a determined number of bits with start and stop bits, means for sampling the receiving terminal at determined times following receipt of a start bit, a separate stable clock for controlling the timing of transmitted bits in the sampling times of received signals, means when receiving signals for applying each received bit to its transmitting terminal upon receipt of a bit, means when transmitting for comparing each bit transmitted with the bit at its receiving terminal in the next bit period, and means responsive to an absence of comparison between said received and transmitted bits for applying an error signal to its transmitting terminal.

12. The communication system of claim 11 wherein said interconnected units are physically connected units of a postal meter, and are within common secure walls.

13. The communication system of claim 11 wherein said system is a postal meter and has three of said interconnected units mechanically connected together, secure walls enclosing first and second of said units and a third of said units being outside of said walls, said first unit comprising an accounting system for retaining accounting records of such postal meter, and said second unit comprising a printing system for said postal meter, for printing postage.

14. The communication system of claim 13 wherein said third unit comprises a control system for receiving data corresponding to postage to be printed, each of said units comprising a separate microprocessor.

15. The communication system of claim 14 wherein the receiving and transmitting terminals of said second unit are connected only to said first unit, and said first unit has receiving and transmitting terminals also connected to said third unit.

16. The communication system of claim 13 wherein the receiving and transmitting terminals of said first and second units comprise the only signal transferring means between these units, whereby information, data and control signals are serially transmitted by way of the common receiving and transmitting terminals of said first and second units.

17. The communication system of claim 16 wherein the only signal transfer means between said first and third units is by way of signal receiving and transmitting terminals of said first unit, whereby control, data and information signals between said first and third units are transmitted within each way by way of a signal path.

18. A postal meter having an accounting unit and a printing unit within a common secure wall, said accounting and printing units having separate microprocessors for performing separate functions related to the respective units, said units being interconnected for signal transfer solely by way of a first one-way serial communication path from said printing unit to said accounting unit and a second one-way serial communication path from said accounting unit to said printing unit, said printing and accounting units comprising means to apply signals to said first and second communication paths respectively in serial format on a bit-by-bit basis a predetermined number of bits with start and stop bits, each said unit comprising a separate stable clock for timing the bit transmission therein and for sampling bits received from the other unit, each unit further comprising means for periodically sampling the respective communication paths for receipt of signals from the other of said units, and for immediately retransmitting each received bit to the other of said units, each unit further comprising means for sampling each transmitted bit with a bit received in the next bit cycle from the other unit, and for transmitting an error signal to the other unit in the absence of a comparison.

19. The postal meter of claim 18 further comprising a control unit outside of said wall and having a further microprocessor, said control unit being connected to said accounting unit, for signal transfer, solely by way of a pair of oppositely directed one-way serial signal communication paths.

20. The postal meter of claim 18 wherein each of said units comprises means for testing the communication paths on which it receives signals prior to the application of digital signals to the communication path on which it transmits signals.

21. In an electronic postage meter having a secure housing enclosing a printing unit and an accounting unit, each of said units having a computing system, a signal receiving terminal and a signal transmitting terminal, the transmitting and receiving terminals of each one of said units being connected to the receiving and transmitting terminals of the other of said units respectively, each of said units having a stable clock, each unit having means for transmitting messages by way of its transmitting terminal asynchronously in a serial message format of bit groupings of a determined number of bits and with a stop and start bit, and the bits of the groupings having determined constant relative timing and said units further comprising means for sampling the receiving terminals at predetermined times for receiving sent messages.

22. The electronic postage meter of claim 21 wherein each unit further comprises means for sampling its receiving terminals to enable transmission of messages by way of its transmitting terminals.

23. The electronic postage meter of claim 22 wherein each said unit comprises means responsive to the receipt of messages from the other of said units for immediately retransmitting, on a bit by bit basis, the received message to the other of said units, means for comparing such retransmitted messages with messages originating in each of said units, and means responsive to comparison between original and retransmitted messages for applying a no-error pulse to the respective signal transmitting terminals.

24. The electronic postage meter of claim 23 wherein said no-error pulse is applied to the respective transmitting terminal between each of said bit groupings upon a comparison of the original message and retransmitted message of the preceding grouping.

25. A postage meter comprising a first secure housing enclosing a printing unit for printing postage, a second housing within said first housing and enclosing an accounting unit having at least one register for accounting of postage printed by said meter, a control unit external of said first housing and including a keyboard and a display, a first microprocessor in said printing unit and having a program for controlling the printing of postage by said printing unit, a second microprocessor in said accounting unit and having a program for controlling accounting functions in said postage meter that must be secure from tampering, a third microprocessor in said control unit and having a program for controlling said keyboard and display, said first and second microprocessors being interconnected by way of a first two-way transmission path and said second and third microprocessors being interconnected by way of a second two-way transmission path, each of said microprocessors having transmission means for transmitting messages on the respective path in a serial bit code of groupings of a determined number of bits with start and stop bits, each microprocessor further having a receiver for receiving messages from the respective two-way transmission path, each two-way transmission path comprising a send line and a receive line, each microprocessor further comprising means for setting the signal level at its respective send line, means preparatory to the transmission of a message for testing its respective receive line twice, means responsive to the occurrence of said given level at the respective receive line at both tests for changing the signal level at its respective transmit line, and then transmitting messages in said format, each microprocessor being responsive to signal levels other than said given level on the respective receive line for inhibiting the transmitting of messages therefrom, each microprocessor further comprising means responsive to the receipt of messages on its receive line for substantially immediately retransmitting said messages on its send line independently of the level of its respective receive line, means for comparing each message originating therein with each message retransmitted thereto and applying a no-error pulse to its send line in response to a correct comparison, said no-error pulse being applied between said groupings and corresponding to the immediately preceding grouping, whereby each unit is substantially immediately informed of the correctness or incorrectness of messages received therein, said postage meter further comprising means responsive to the absence of a no-error pulse in a message transmission for inhibiting further operation of said meter.

26. The postage meter of claim 25 further comprising an external device, said control unit comprising means for bidirectional communication with said external device.

27. The postage meter of claim 26 wherein said external device comprises means for controlling keyboard functions of said postage meter.

28. The postage meter of claim 27 wherein said external device is a scale.

29. The postage meter of claim 26 wherein said external device comprises means for receiving data from said postage meter.

30. The postage meter of claim 29 wherein said external device is a display.

31. The postage meter of claim 29 wherein said external device is a printing means.

* * * * *